US008589227B1

(12) United States Patent
Bridge et al.

(10) Patent No.: US 8,589,227 B1
(45) Date of Patent: Nov. 19, 2013

(54) METHOD AND SYSTEM FOR RECONCILING ADVERTISING INVOICES AND FOR PROVIDING PROMPT PAYMENT THEREFOR

(75) Inventors: Thomas E. Bridge, Labadie, MO (US); Steven L. Vache, Wildwood, MO (US)

(73) Assignee: Media Management, Incorporated, Chesterfield, MO (US)

( * ) Notice: Subject to any disclaimer, the term of this patent is extended or adjusted under 35 U.S.C. 154(b) by 1919 days.

(21) Appl. No.: 11/253,040

(22) Filed: Oct. 18, 2005

Related U.S. Application Data

(63) Continuation-in-part of application No. 10/810,466, filed on Mar. 26, 2004, now abandoned.

(51) Int. Cl.
*G06Q 30/00* (2012.01)

(52) U.S. Cl.
USPC .......................................................... 705/14.41

(58) Field of Classification Search
USPC .......................................................... 705/14
See application file for complete search history.

(56) References Cited

U.S. PATENT DOCUMENTS

| | | | |
|---|---|---|---|
| 3,725,650 | A | 4/1973 | Gelder |
| 5,401,946 | A | 3/1995 | Weinblatt |
| 5,515,270 | A | 5/1996 | Weinblatt |
| 5,794,210 | A | 8/1998 | Goldhaber et al. |
| 5,854,746 | A | 12/1998 | Yamamoto et al. |
| 5,855,008 | A | 12/1998 | Goldhaber et al. |
| 5,991,734 | A | 11/1999 | Moulson |
| 6,006,197 | A | 12/1999 | d'Eon et al. |
| 6,078,922 | A | 6/2000 | Johnson et al. |
| 6,088,676 | A | 7/2000 | White, Jr. |
| 6,092,060 | A | 7/2000 | Guinta et al. |
| 6,128,603 | A | 10/2000 | Dent et al. |
| 6,173,271 | B1 | 1/2001 | Goodman et al. |
| 6,182,050 | B1 | 1/2001 | Ballard |
| 6,236,980 | B1 | 5/2001 | Reese |
| 6,249,770 | B1 | 6/2001 | Erwin et al. |
| 6,286,005 | B1 | 9/2001 | Cannon |
| 6,338,043 | B1 | 1/2002 | Miller |
| 6,353,929 | B1 | 3/2002 | Houston |
| 6,450,407 | B1 | 9/2002 | Freeman et al. |
| 6,701,301 | B2 | 3/2004 | Seet |

(Continued)

OTHER PUBLICATIONS

Office Action for U.S. Appl. No. 10/810,466 dated Dec. 24, 2008.

(Continued)

*Primary Examiner* — Matthew L Hamilton
(74) *Attorney, Agent, or Firm* — Thompson Coburn LLP

(57) ABSTRACT

A computer-implemented method of reconciling media property invoice data for advertising services with advertising agency final buy data, the media property invoice data comprising a plurality of invoice items, each invoice item corresponding to an actual advertisement spot that was run by the media property, the final buy data comprising a plurality of final buy items, each final buy item corresponding to an advertisement spot request that was placed by the advertising agency with the media property, the method comprising: (a) comparing the invoice items with the final buy items; and (b) responsive to the comparing step, identifying the invoice items for which a payment to the media property is authorized. Based on this comparison, an electronic fund transfer of the appropriate amount of money can be made from a financial account to the media property. Further still, GUIs for exception handling can be presented to a user to identifying any actions that should be taken on invoice items that trigger an exception handling condition. Corresponding systems and software are also disclosed herein.

30 Claims, 300 Drawing Sheets

(56) References Cited

U.S. PATENT DOCUMENTS

| | | | | |
|---|---|---|---|---|
| 6,839,687 | B1 | 1/2005 | Dent et al. | |
| 6,985,882 | B1 | 1/2006 | Del Sesto | |
| 7,039,599 | B2 | 5/2006 | Merriman et al. | |
| 7,039,931 | B2 | 5/2006 | Whymark | |
| 7,085,732 | B2 | 8/2006 | Gould | |
| 7,275,038 | B1 * | 9/2007 | Weinstock et al. | 705/5 |
| 2001/0032333 | A1 | 10/2001 | Flickinger | |
| 2002/0007308 | A1 | 1/2002 | Anderson et al. | |
| 2002/0099600 | A1 | 7/2002 | Merriman et al. | |
| 2002/0128938 | A1 | 9/2002 | Schofield et al. | |
| 2002/0161625 | A1 | 10/2002 | Brito-Valladares et al. | |
| 2003/0036918 | A1 | 2/2003 | Pintsov | |
| 2003/0046161 | A1 | 3/2003 | Kamangar et al. | |
| 2003/0055731 | A1 | 3/2003 | Fouraker et al. | |
| 2003/0070167 | A1 | 4/2003 | Holtz et al. | |
| 2003/0149634 | A1 * | 8/2003 | Hyun | 705/26 |
| 2003/0225629 | A1 | 12/2003 | Banks et al. | |
| 2004/0024633 | A1 | 2/2004 | Whymark | |
| 2004/0025177 | A1 | 2/2004 | Whymark | |
| 2004/0216157 | A1 * | 10/2004 | Shain et al. | 725/42 |
| 2004/0249726 | A1 | 12/2004 | Linehan | |
| 2004/0267806 | A1 | 12/2004 | Lester | |
| 2005/0010523 | A1 | 1/2005 | Myklebust et al. | |
| 2005/0021395 | A1 | 1/2005 | Luu | |
| 2006/0089880 | A1 | 4/2006 | Merriman | |
| 2006/0195399 | A1 * | 8/2006 | Tenenbaum et al. | 705/40 |
| 2006/0195863 | A1 | 8/2006 | Whymark | |
| 2006/0211369 | A1 | 9/2006 | Steelberg et al. | |
| 2007/0039018 | A1 * | 2/2007 | Saslow et al. | 725/22 |
| 2007/0073581 | A1 | 3/2007 | Kempe et al. | |

OTHER PUBLICATIONS

Restriction Requirement for U.S. Appl. No. 10/810,466 dated Sep. 16, 2008.

Audit Central; About Audit Central; Date Unknown.

Audit Central; About the Auditors; downloaded from http://www.audit-central.com/auditors.htm on Nov. 21, 2001.

Audit Central; Request an Audit; downloaded from http://www.audit-central.com/auditreq.htm on Nov. 21, 2001.

BPA International; Benefits; downloaded from http://www.bpai.com/media_owners/owners.htm on Nov. 21, 2001.

Fish Information Service Web Site Activity; Interactive Audit Report; Date Unknown.

RealNetworks; 1998 Press Releases; downloaded from http://www.realnetworks.com/company/press/releases/1998/adclicks.html on Nov. 21, 2001.

"Case Studies—Network", downloaded from Internet Archive Wayback Machine on Apr. 13, 2011, for "www.mediaaudit.com/network.htm" with respect to Sep. 14, 2000, 1 page.

"Case Studies—Spot Broadcast", downloaded from Internet Archive Wayback Machine on Apr. 13, 2011, for "www.mediaaudit.com/spot.htm" with respect to Jun. 19, 2000, 1 page.

"Frequently Asked Questions", downloaded from Internet Archive Wayback Machine on Apr. 13, 2011, for "www.mediaaudit.com/faqs.htm" with respect to Jun. 19, 2000, 1 page.

"Introduction to Media Management Inc.", downloaded from Internet Archive Wayback Machine on Apr. 13, 2011, for "www.mediaaudit.com/mmiintro.htm" with respect to Oct. 6, 1999, 1 page.

"Media Management Inc.'s Philosophy", downloaded from Internet Archive Wayback Machine on Apr. 13, 2011, for "www.mediaaudit.com/mmiphilosophy.htm" with respect to Oct. 6, 1999, 1 page.

"Media Management Inc.'s Services", downloaded from Internet Archive Wayback Machine on Apr. 13, 2011, for "www.mediaaudit.com/mmiservices.htm" with respect to Mar. 4, 2000, 1 page "Prosecution History for U.S. Appl. No. 10/423,628 (Shain)", downloaded from PAIR on May 16, 2011.

"Why MMI", downloaded from Internet Archive Wayback Machine on Apr. 13, 2011, for "www.mediaaudit.com/whymmi.htm" with respect to Jul. 11, 2000, 1 page.

Archived Website Pages for "www.mediaaudit.com" downloaded from Internet Archive Wayback Machine on Apr. 13, 2011 for Apr. 27, 1999-Mar. 4, 2000, 8 pages.

Archived Website Pages for "www.mediaaudit.com" downloaded from Internet Archive Wayback Machine on Apr. 13, 2011 for Apr. 4, 2005-Aug. 15, 2006, 17 pages.

Archived Website Pages for "www.mediaaudit.com" downloaded from Internet Archive Wayback Machine on Apr. 13, 2011 for Jun. 11, 2000-Sep. 14, 2000, 10 pages.

* cited by examiner

400

| Media (402) | Client (404) | Product (406) | Est. Code (408) | Est. Name (410) | Buy Dates (412) | Market (414) | Station (416) | Line (418) | Program (420) | Daypart (422) | Length (424) | Rotation (426) | Times (428) | Cost Per Spot (430) | TRP Est. (432) | Week A Spots (434) | Week B Spots (436) | Week C Spots (438) | Comments (440) |
|---|---|---|---|---|---|---|---|---|---|---|---|---|---|---|---|---|---|---|---|
| TV | ClientA | ProductX | 123 | xads | m1/d1 - m2/d2 | St. Louis | xxxx-TV | 005 | Show1 | PRI | 30 | M-F | 8-9 pm | $975.00 | 6 | 1 | 1 | 0 | ... |
| TV | ClientA | ProductX | 123 | xads | m1/d1 - m2/d2 | St. Louis | xxxx-TV | 005 | Show2 | PRI | 30 | F | 9-10 pm | $500.00 | 3 | 0 | 1 | 0 | ... |
| TV | ClientA | ProductX | 123 | xads | m1/d1 - m2/d2 | St. Louis | xxxx-TV | 008 | Show3 | EFG | 30 | SA-SU | 6:30 - 7 pm | $200.00 | 3 | 1 | 0 | 0 | ... |

| Client (502) | AOR (504) | Estimate Name (506) | Estimate Number (508) | Station Invoice Number (510) | Invoice Date (512) | Spot Date (514) | Spot Time (516) | Spot Length (518) | Gross Spot Cost (520) | Ad-ID (or ISCI creative code) (522) |
|---|---|---|---|---|---|---|---|---|---|---|
| Client A | Agency X | xads | 123 | 123456789 | 3/30/2005 | 2/1/2005 | 9:33 pm | 30 | $600.00 | abc123 |
| Client A | Agency X | xads | 123 | 123456789 | 3/30/2005 | 2/3/2005 | 7:10 pm | 30 | $750.00 | abc123 |
| Client A | Agency X | xads | 123 | 123456789 | 3/30/2005 | 2/7/2005 | 5:42 pm | 30 | $450.00 | abc123 |

Figure 8D:
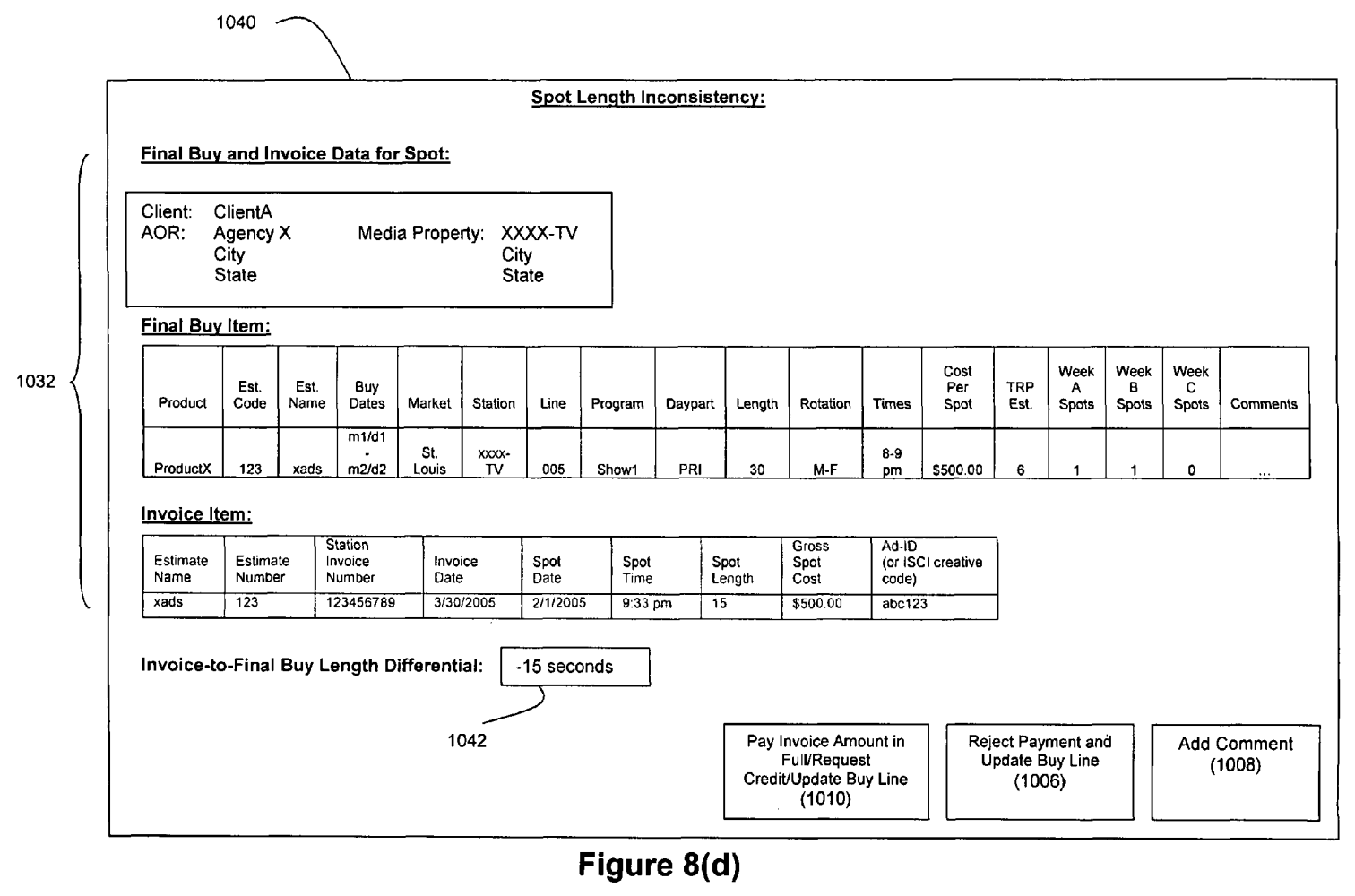

Spot Length Inconsistency:

Final Buy and Invoice Data for Spot:

Client: ClientA
AOR: Agency X
City
State

Media Property: XXXX-TV
City
State

Final Buy Item:

| Product | Est. Code | Est. Name | Buy Dates | Market | Station | Line | Program | Daypart | Length | Rotation | Times | Cost Per Spot | TRP Est. | Week A Spots | Week B Spots | Week C Spots | Comments |
|---|---|---|---|---|---|---|---|---|---|---|---|---|---|---|---|---|---|
| ProductX | 123 | xads | m1/d1 - m2/d2 | St. Louis | XXXX-TV | 005 | Show1 | PRI | 30 | M-F | 8-9 pm | $500.00 | 6 | 1 | 1 | 0 | ... |

Invoice Item:

| Estimate Name | Estimate Number | Station Invoice Number | Invoice Date | Spot Date | Spot Time | Spot Length | Gross Spot Cost | Ad-ID (or ISCI creative code) |
|---|---|---|---|---|---|---|---|---|
| xads | 123 | 123456789 | 3/30/2005 | 2/1/2005 | 9:33 pm | 15 | $500.00 | abc123 |

Invoice-to-Final Buy Length Differential: -15 seconds

1042

Pay Invoice Amount in Full/Request Credit/Update Buy Line (1010)

Reject Payment and Update Buy Line (1006)

Add Comment (1008)

Figure 8F:
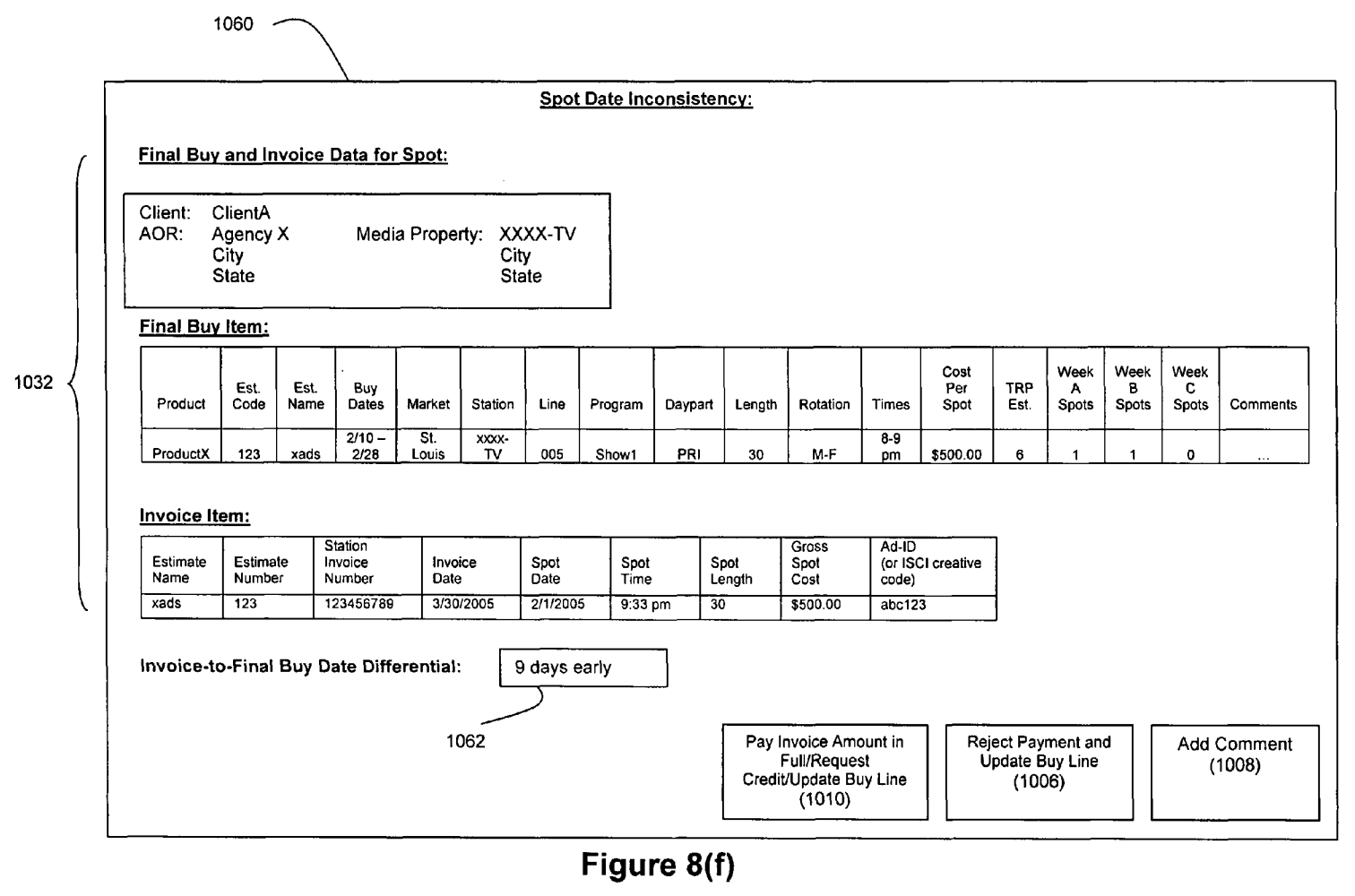

Spot Date Inconsistency:

Final Buy and Invoice Data for Spot:

Client: ClientA
AOR: Agency X
City
State

Media Property: XXXX-TV
City
State

Final Buy Item:

| Product | Est. Code | Est. Name | Buy Dates | Market | Station | Line | Program | Daypart | Length | Rotation | Times | Cost Per Spot | TRP Est. | Week A Spots | Week B Spots | Week C Spots | Comments |
|---|---|---|---|---|---|---|---|---|---|---|---|---|---|---|---|---|---|
| ProductX | 123 | xads | 2/10 – 2/28 | St. Louis | XXXX-TV | 005 | Show1 | PRI | 30 | M-F | 8-9 pm | $500.00 | 6 | 1 | 1 | 0 | ... |

Invoice Item:

| Estimate Name | Estimate Number | Station Invoice Number | Invoice Date | Spot Date | Spot Time | Spot Length | Gross Spot Cost | Ad-ID (or ISCI creative code) |
|---|---|---|---|---|---|---|---|---|
| xads | 123 | 123456789 | 3/30/2005 | 2/1/2005 | 9:33 pm | 30 | $500.00 | abc123 |

Invoice-to-Final Buy Date Differential: 9 days early

1062

Pay Invoice Amount in Full/Request Credit/Update Buy Line (1010)

Reject Payment and Update Buy Line (1006)

Add Comment (1008)

Figure 9:
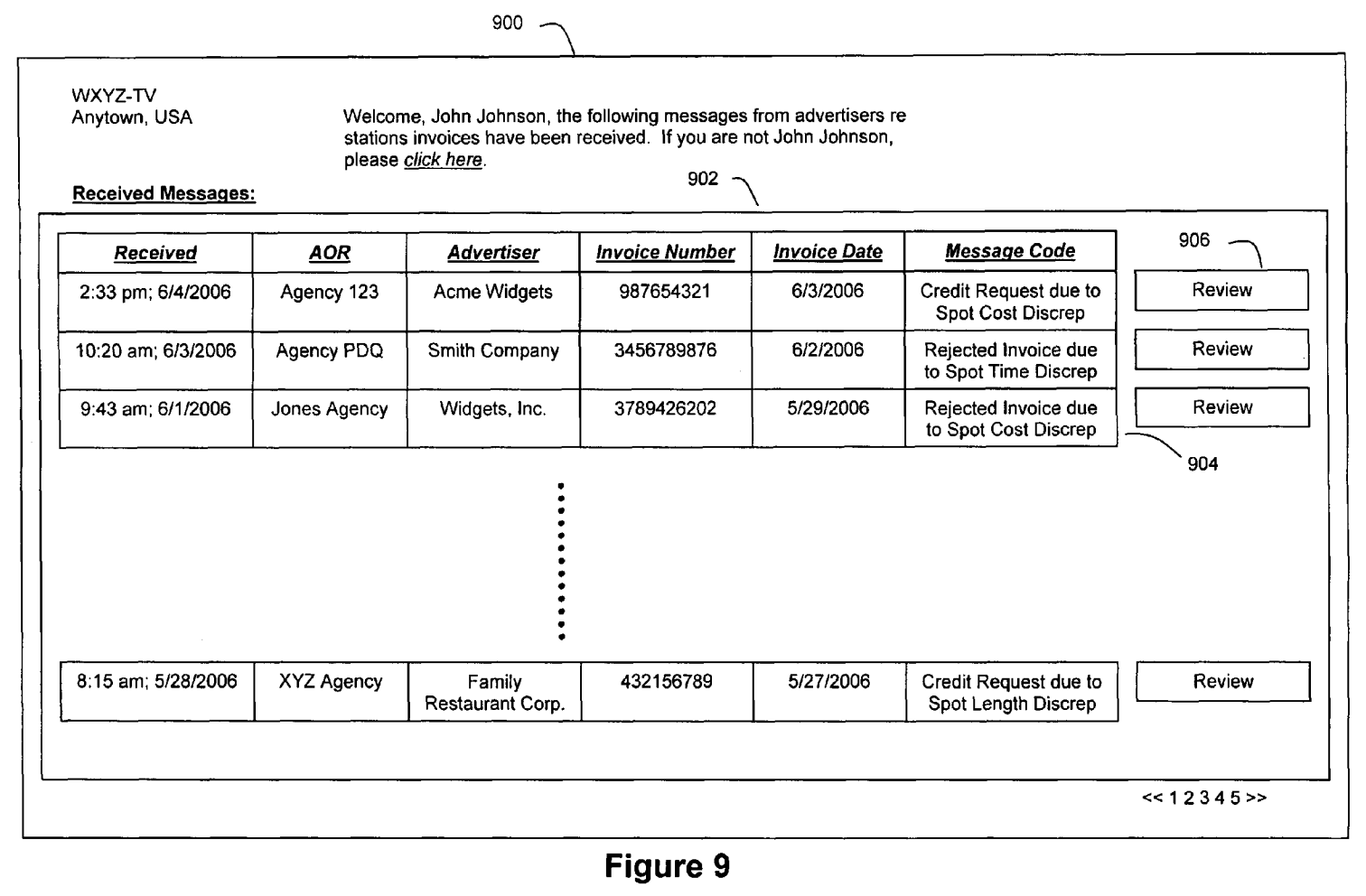

WXYZ-TV
Anytown, USA

Welcome, John Johnson, the following messages from advertisers re stations invoices have been received. If you are not John Johnson, please *click here*.

Received Messages:

902

906

| ***Received*** | ***AOR*** | ***Advertiser*** | ***Invoice Number*** | ***Invoice Date*** | ***Message Code*** | |
|---|---|---|---|---|---|---|
| 2:33 pm; 6/4/2006 | Agency 123 | Acme Widgets | 987654321 | 6/3/2006 | Credit Request due to Spot Cost Discrep | Review |
| 10:20 am; 6/3/2006 | Agency PDQ | Smith Company | 3456789876 | 6/2/2006 | Rejected Invoice due to Spot Time Discrep | Review |
| 9:43 am; 6/1/2006 | Jones Agency | Widgets, Inc. | 3789426202 | 5/29/2006 | Rejected Invoice due to Spot Cost Discrep | Review |
| ⋮ | | | | | | |
| 8:15 am; 5/28/2006 | XYZ Agency | Family Restaurant Corp. | 432156789 | 5/27/2006 | Credit Request due to Spot Length Discrep | Review |

Figure 10A:
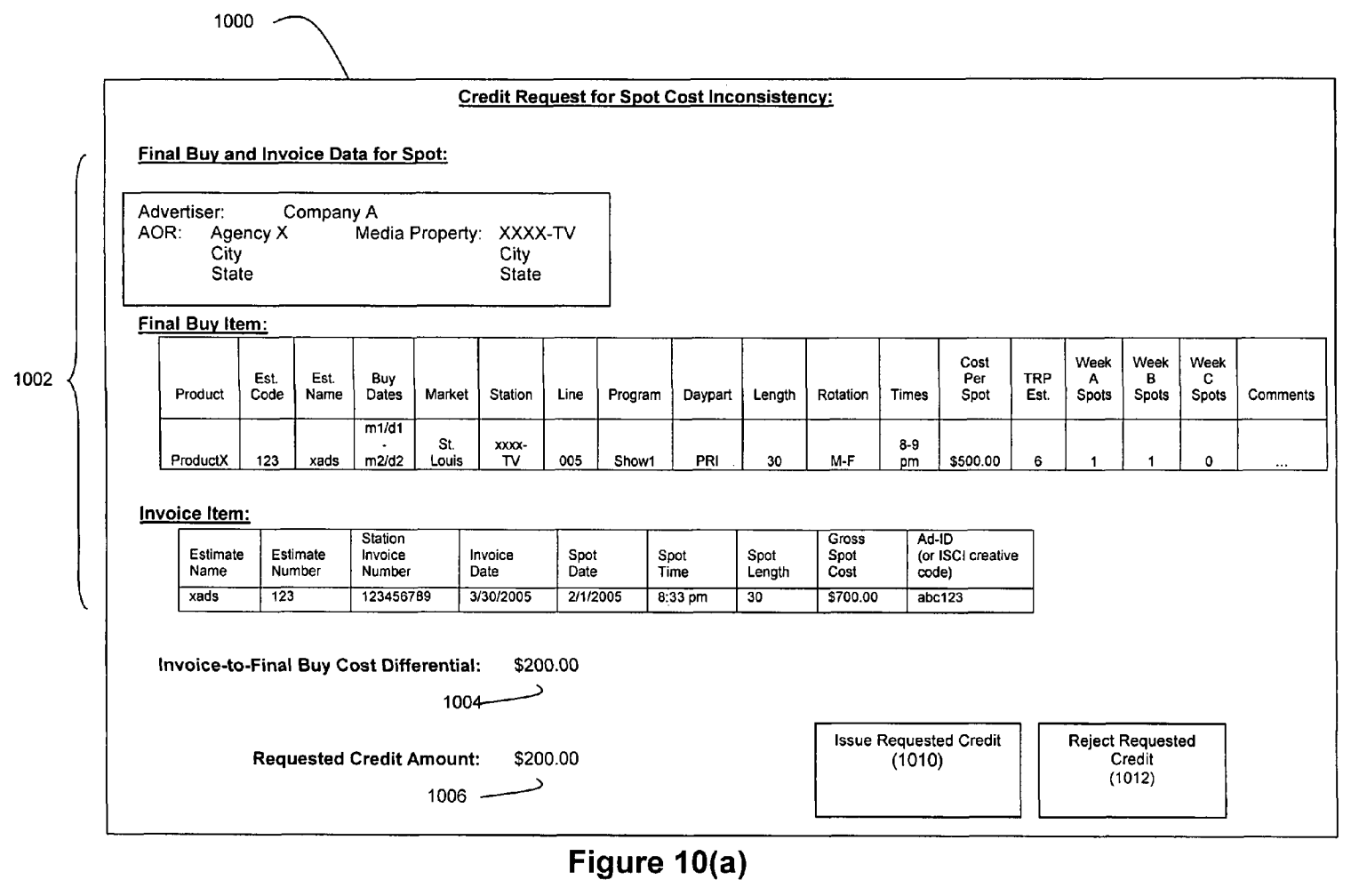

Credit Request for Spot Cost Inconsistency:

Final Buy and Invoice Data for Spot:

Advertiser: Company A
AOR: Agency X, City, State
Media Property: XXXX-TV, City, State

Final Buy Item:

| Product | Est. Code | Est. Name | Buy Dates | Market | Station | Line | Program | Daypart | Length | Rotation | Times | Cost Per Spot | TRP Est. | Week A Spots | Week B Spots | Week C Spots | Comments |
|---|---|---|---|---|---|---|---|---|---|---|---|---|---|---|---|---|---|
| ProductX | 123 | xads | m1/d1 - m2/d2 | St. Louis | xxxx-TV | 005 | Show1 | PRI | 30 | M-F | 8-9 pm | $500.00 | 6 | 1 | 1 | 0 | ... |

Invoice Item:

| Estimate Name | Estimate Number | Station Invoice Number | Invoice Date | Spot Date | Spot Time | Spot Length | Gross Spot Cost | Ad-ID (or ISCI creative code) |
|---|---|---|---|---|---|---|---|---|
| xads | 123 | 123456789 | 3/30/2005 | 2/1/2005 | 8:33 pm | 30 | $700.00 | abc123 |

Invoice-to-Final Buy Cost Differential: $200.00

Requested Credit Amount: $200.00

Issue Requested Credit (1010)

Reject Requested Credit (1012)

Figure 10B:
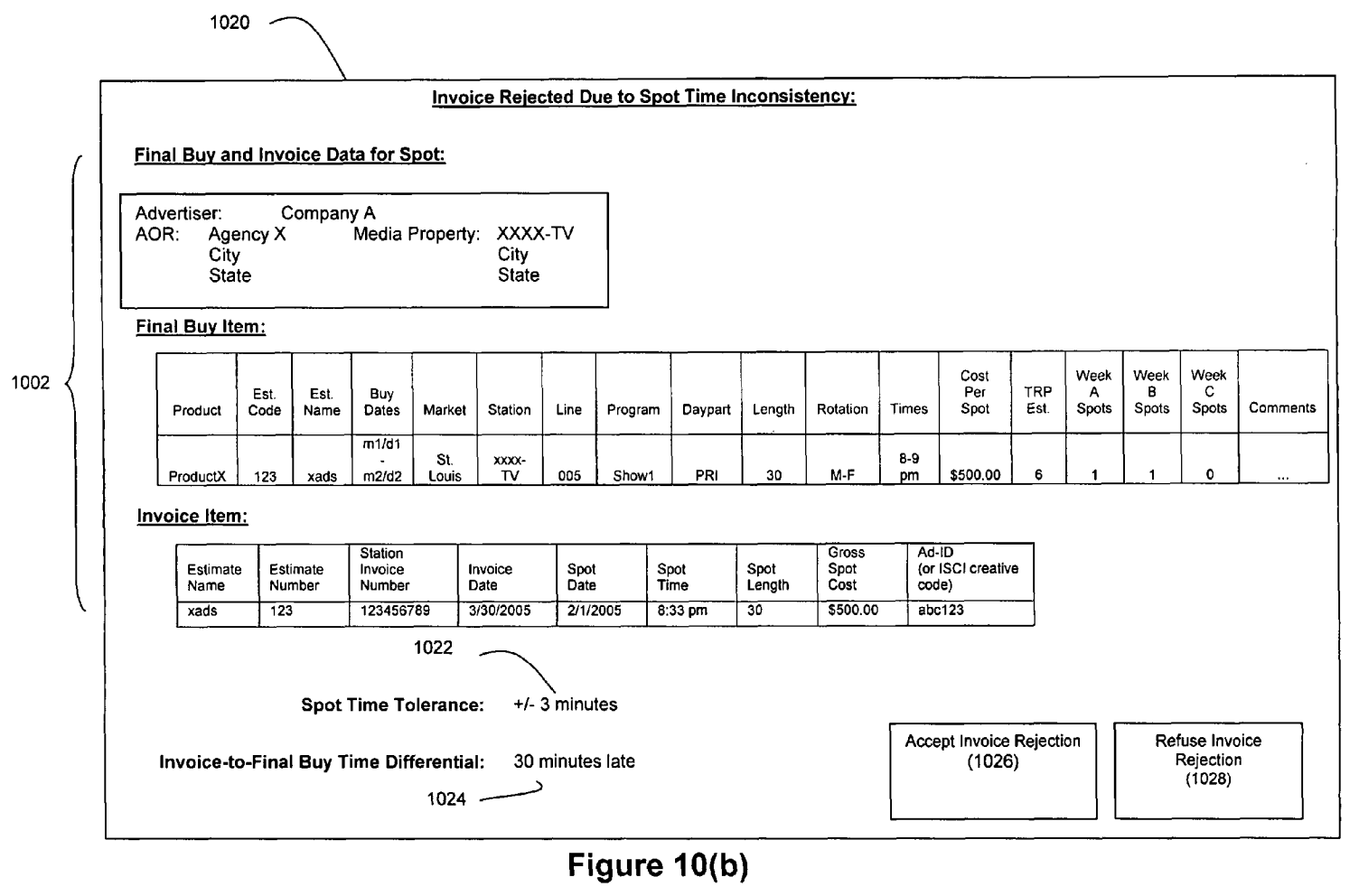

Invoice Rejected Due to Spot Time Inconsistency:

Final Buy and Invoice Data for Spot:

Advertiser: Company A
AOR: Agency X
City
State
Media Property: XXXX-TV
City
State

Final Buy Item:

| Product | Est. Code | Est. Name | Buy Dates | Market | Station | Line | Program | Daypart | Length | Rotation | Times | Cost Per Spot | TRP Est. | Week A Spots | Week B Spots | Week C Spots | Comments |
|---|---|---|---|---|---|---|---|---|---|---|---|---|---|---|---|---|---|
| ProductX | 123 | xads | m1/d1 - m2/d2 | St. Louis | xxxx-TV | 005 | Show1 | PRI | 30 | M-F | 8-9 pm | $500.00 | 6 | 1 | 1 | 0 | ... |

Invoice Item:

| Estimate Name | Estimate Number | Station Invoice Number | Invoice Date | Spot Date | Spot Time | Spot Length | Gross Spot Cost | Ad-ID (or ISCI creative code) |
|---|---|---|---|---|---|---|---|---|
| xads | 123 | 123456789 | 3/30/2005 | 2/1/2005 | 8:33 pm | 30 | $500.00 | abc123 |

1022

Spot Time Tolerance: +/- 3 minutes

Invoice-to-Final Buy Time Differential: 30 minutes late

1024

Accept Invoice Rejection (1026)

Refuse Invoice Rejection (1028)

| Media (1502) | Client (1504) | Product (1506) | Est. Code (1508) | Est. Name (1510) | Buy Dates (1512) | Market (1514) | Station (1516) | Line (1518) | Program (1520) | Daypart (1522) | Length (1524) | Rotation (1526) | Times (1528) | Cost Per Spot (1530) | TRP Est. (1532) | Week A Spots (1534) | Week B Spots (1536) | Week C Spots (1538) | Comments (1540) |
|---|---|---|---|---|---|---|---|---|---|---|---|---|---|---|---|---|---|---|---|
| TV | ClientA | ProductX | 123 | xads | m1/d1 - m2/d2 | St. Louis | xxxx-TV | 005 | Show1 | PRI | 30 | M-F | 8-9 pm | $975.00 | 6 | 1 | 1 | 0 | ... |
| TV | ClientA | ProductX | 123 | xads | m1/d1 - m2/d2 | St. Louis | xxxx-TV | 005 | Show2 | PRI | 30 | F | 9-10 pm | $500.00 | 3 | 0 | 1 | 0 | ... |
| TV | ClientA | ProductX | 123 | xads | m1/d1 - m2/d2 | St. Louis | xxxx-TV | 008 | Show3 | EFG | 30 | SA-SU | 6:30 - 7 pm | $200.00 | 3 | 1 | 0 | 0 | ... |

| Media (1602) | Client (1604) | Product (1606) | Est. Code (1608) | Est. Name (1608) | Market (1610) | Station (1612) | Date (1614) | Day (1616) | Time (1618) | Length (1620) | Invoice Cost (1622) | Invoice Number (1624) | Film/ISCI (1626) |
|---|---|---|---|---|---|---|---|---|---|---|---|---|---|
| TV | ClientA | ProductX | 123 | xads | St. Louis | xxxx-TV | mm/dd/yy | MON | 803P | 30 | $500.00 | 12345 | abc123 |
| TV | ClientA | ProductX | 123 | xads | St. Louis | xxxx-TV | mm/dd/yy | MON | 912P | 30 | $400.00 | 12345 | abc123 |
| TV | ClientA | ProductX | 123 | xads | St. Louis | xxxx-TV | mm/dd/yy | SAT | 642P | 30 | $600.00 | 12345 | abc123 |

| Package (1802) | Input (1804) | Output (1806) | Media Type (1808) |
|---|---|---|---|
| Adware | A | PA | TV |
| Adware | ACC | PA | TV |
| Adware | B | BS | TV |
| Adware | BON | BS | TV |
| Adware | D | DT | TV |
| Adware | DAY | DT | TV |
| Adware | E | EF | TV |
| Adware | EAM | EM | TV |
| Adware | EFG | EF | TV |
| Adware | EFR | EF | TV |
| Adware | EMN | EM | TV |
| Adware | ENW | EN | TV |
| Adware | L | LF | TV |
| Adware | LFG | LF | TV |
| Adware | LFR | LF | TV |
| Adware | LNW | LN | TV |
| Adware | M | EN | TV |
| Adware | N | LN | TV |
| Adware | O | ROS | TV |
| Adware | OVN | LF | TV |
| Adware | P | PR | TV |
| Adware | PAC | PA | TV |
| Adware | PP | PR | TV |
| Adware | PRI | PR | TV |
| Adware | PRM | PR | TV |
| Adware | PRT | PR | TV |
| Adware | R | ROS | TV |
| Adware | S | SP | TV |
| Adware | SPO | SP | TV |
| Adware | SPT | SP | TV |
| Adware | T | EM | TV |
| Adware | TRA | BB | TV |
| Adware | UDL | UD | TV |
| Adware | W | WE | TV |
| Adware | WEK | WE | TV |
| Adware | WKD | WE | TV |
| Adware | WKN | WE | TV |

| Package (1802) | Input (1804) | Output (1806) | Media Type (1808) |
|---|---|---|---|
| Adware | Y | PR | TV |
| DDS | A | PA | TV |
| DDS | ACC | PA | TV |
| DDS | AMD | AM | Radio |
| DDS | AMN | EM | TV |
| DDS | B | BS | TV |
| DDS | BNS | BS | TV |
| DDS | BON | BS | Radio |
| DDS | BON | BS | TV |
| DDS | CRE | CR | TV |
| DDS | DAY | DT | TV |
| DDS | E | EF | TV |
| DDS | EAM | EM | TV |
| DDS | EFG | EF | TV |
| DDS | EFR | EF | TV |
| DDS | EMN | EM | TV |
| DDS | EMR | EM | TV |
| DDS | ENW | EN | TV |
| DDS | ERM | EM | TV |
| DDS | EVE | EV | Radio |
| DDS | FRG | LF | TV |
| DDS | INP | PR | TV |
| DDS | IPR | PR | TV |
| DDS | L | LF | TV |
| DDS | LFG | LF | TV |
| DDS | LFG | LF | TV |
| DDS | LNW | LN | TV |
| DDS | M | EM | TV |
| DDS | MGW | BS | TV |
| DDS | MID | MD | Radio |
| DDS | MRN | EM | TV |
| DDS | N | EN | TV |
| DDS | OVN | LF | TV |
| DDS | P | PR | TV |
| DDS | PAC | PA | TV |
| DDS | PMD | PM | Radio |
| DDS | PPR | PR | TV |

| Package (1802) | Input (1804) | Output (1806) | Media Type (1808) |
|---|---|---|---|
| DDS | PRE | PR | TV |
| DDS | PRI | PR | TV |
| DDS | PRQ | PR | TV |
| DDS | PRT | PR | TV |
| DDS | PSP | SP | TV |
| DDS | ROT | ROS | TV |
| DDS | S | SP | TV |
| DDS | SPO | PM | Radio |
| DDS | SPO | SP | TV |
| DDS | SPT | SP | TV |
| DDS | TAX | BB | TV |
| DDS | UDL | UD | TV |
| DDS | UDW | UD | TV |
| DDS | UND | UD | TV |
| DDS | WKD | WE | Radio |
| DDS | WKD | WE | TV |
| Smart+ | 3.6 | EM | TV |
| Smart+ | AM | EM | TV |
| Smart+ | AV | BS | TV |
| Smart+ | B | BS | TV |
| Smart+ | BD | BS | TV |
| Smart+ | BNS | BS | TV |
| Smart+ | BON | BS | TV |
| Smart+ | BON | BS | TV |
| Smart+ | CH | DT | TV |
| Smart+ | DA | DT | TV |
| Smart+ | EM2 | EM | TV |
| Smart+ | EN2 | EN | TV |
| Smart+ | EV | EV | Radio |
| Smart+ | FRG | EF | TV |
| Smart+ | FL | LF | TV |
| Smart+ | IP | PR | TV |
| Smart+ | KN | EN | TV |
| Smart+ | LN2 | LN | TV |
| Smart+ | LRP | LNR | TV |
| Smart+ | MGW | BS | TV |
| Smart+ | OVN | BS | TV |

| Package (1802) | Input (1804) | Output (1806) | Media Type (1808) |
|---|---|---|---|
| Smart+ | PA2 | PA | TV |
| Smart+ | PAC | PA | TV |
| Smart+ | PF | PR | TV |
| Smart+ | PI | PR | TV |
| Smart+ | PR2 | PR | TV |
| Smart+ | PT | PR | TV |
| Smart+ | PT2 | PR | TV |
| Smart+ | Q | UD | TV |
| Smart+ | ROS | ROS | TV |
| Smart+ | RO | ROS | TV |
| Smart+ | RO1 | ON | Radio |
| Smart+ | ROT | ROS | TV |
| Smart+ | RT | ROS | TV |
| Smart+ | S | SP | TV |
| Smart+ | SP2 | SP | TV |
| Smart+ | SS | WE | Radio |
| Smart+ | TRA | BS | TV |
| Smart+ | UDU | UD | TV |
| Smart+ | WK | ROS | Radio |
| Smart+ | WK | WE | TV |
| Smart+ | WS | SP | TV |
| Strata | AM | EM | TV |
| Strata | AV | BS | TV |
| Strata | B | BS | TV |
| Strata | BN | BS | TV |
| Strata | BS15 | BS | TV |
| Strata | CB | UD | TV |
| Strata | CPA | PA-C | TV |
| Strata | CPT | PR-C | TV |
| Strata | CS | SP-C | TV |
| Strata | DA | DT | TV |
| Strata | DAY | DT | TV |
| Strata | DT10 | DT | TV |
| Strata | DT15 | DT | TV |
| Strata | EF:15 | EF | TV |
| Strata | EF15 | EF | TV |

| Package (1802) | Input (1804) | Output (1806) | Media Type (1808) |
|---|---|---|---|
| Strata | EM10 | EM | TV |
| Strata | EM15 | EM | TV |
| Strata | EMN | EM | TV |
| Strata | EN 15 | EN | TV |
| Strata | EN:15 | EN | TV |
| Strata | EN15 | EN | TV |
| Strata | EV | EV | Radio |
| Strata | LF15 | LF | TV |
| Strata | LN10 | LN | TV |
| Strata | LN15 | LN | TV |
| Strata | MD | DT | TV |
| Strata | NC | BS | TV |
| Strata | NC15 | BS | TV |
| Strata | OV | UD | TV |
| Strata | PA:15 | PA | TV |
| Strata | PA10 | PA | TV |
| Strata | PA15 | PA | TV |
| Strata | PM | PR | TV |
| Strata | PR15 | PR | TV |
| Strata | PT | PR | TV |
| Strata | PT 15 | PR | TV |
| Strata | PT:15 | PR | TV |
| Strata | PT10 | PR | TV |
| Strata | PT15 | PR | TV |
| Strata | PT-C | PR-C | TV |
| Strata | ROT | ROS | TV |
| Strata | RT | ROS | Radio |
| Strata | RT | ROS | TV |
| Strata | RT10 | ROS | TV |
| Strata | S | SP | TV |
| Strata | S15 | SP | TV |
| Strata | SP15 | SP | TV |
| Strata | SPT | SP-C | TV |
| Strata | WE15 | WE | TV |
| Strata | WK | WE | Radio |
| Strata | WK | WE | TV |

Figure 18

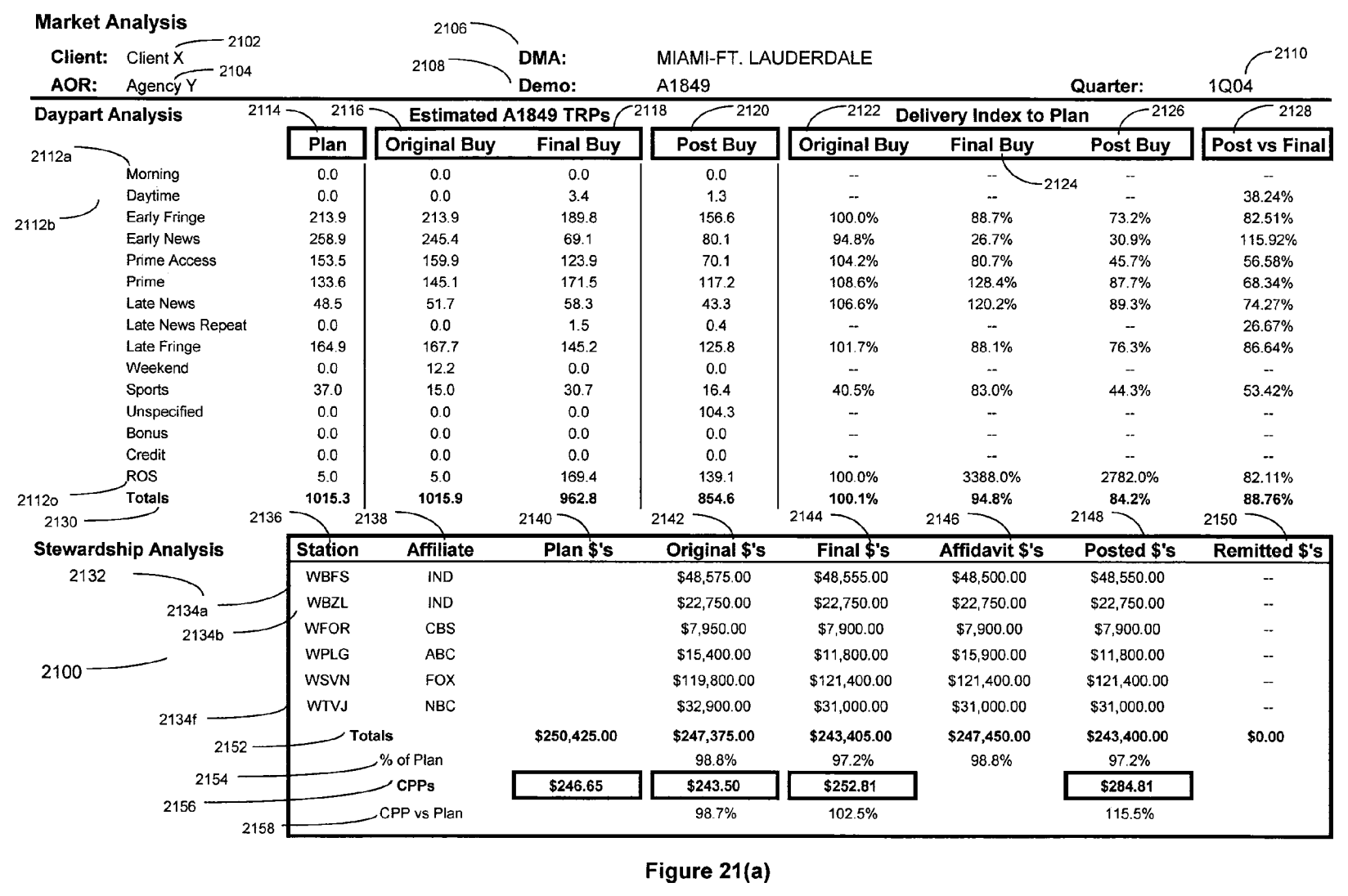

Market Analysis

Client: Client X DMA: MIAMI-FT. LAUDERDALE

AOR: Agency Y Demo: A1849 Quarter: 1Q04

| Daypart Analysis | Plan | Estimated A1849 TRPs Original Buy | Final Buy | Post Buy | Delivery Index to Plan Original Buy | Final Buy | Post Buy | Post vs Final |
|---|---|---|---|---|---|---|---|---|
| Morning | 0.0 | 0.0 | 0.0 | 0.0 | -- | -- | -- | -- |
| Daytime | 0.0 | 0.0 | 3.4 | 1.3 | -- | -- | -- | 38.24% |
| Early Fringe | 213.9 | 213.9 | 189.8 | 156.6 | 100.0% | 88.7% | 73.2% | 82.51% |
| Early News | 258.9 | 245.4 | 69.1 | 80.1 | 94.8% | 26.7% | 30.9% | 115.92% |
| Prime Access | 153.5 | 159.9 | 123.9 | 70.1 | 104.2% | 80.7% | 45.7% | 56.58% |
| Prime | 133.6 | 145.1 | 171.5 | 117.2 | 108.6% | 128.4% | 87.7% | 68.34% |
| Late News | 48.5 | 51.7 | 58.3 | 43.3 | 106.6% | 120.2% | 89.3% | 74.27% |
| Late News Repeat | 0.0 | 0.0 | 1.5 | 0.4 | -- | -- | -- | 26.67% |
| Late Fringe | 164.9 | 167.7 | 145.2 | 125.8 | 101.7% | 88.1% | 76.3% | 86.64% |
| Weekend | 0.0 | 12.2 | 0.0 | 0.0 | -- | -- | -- | -- |
| Sports | 37.0 | 15.0 | 30.7 | 16.4 | 40.5% | 83.0% | 44.3% | 53.42% |
| Unspecified | 0.0 | 0.0 | 0.0 | 104.3 | -- | -- | -- | -- |
| Bonus | 0.0 | 0.0 | 0.0 | 0.0 | -- | -- | -- | -- |
| Credit | 0.0 | 0.0 | 0.0 | 0.0 | -- | -- | -- | -- |
| ROS | 5.0 | 5.0 | 169.4 | 139.1 | 100.0% | 3388.0% | 2782.0% | 82.11% |
| **Totals** | **1015.3** | **1015.9** | **962.8** | **854.6** | **100.1%** | **94.8%** | **84.2%** | **88.76%** |

Stewardship Analysis

| Station | Affiliate | Plan $'s | Original $'s | Final $'s | Affidavit $'s | Posted $'s | Remitted $'s |
|---|---|---|---|---|---|---|---|
| WBFS | IND | | $48,575.00 | $48,555.00 | $48,500.00 | $48,550.00 | -- |
| WBZL | IND | | $22,750.00 | $22,750.00 | $22,750.00 | $22,750.00 | -- |
| WFOR | CBS | | $7,950.00 | $7,900.00 | $7,900.00 | $7,900.00 | -- |
| WPLG | ABC | | $15,400.00 | $11,800.00 | $15,900.00 | $11,800.00 | -- |
| WSVN | FOX | | $119,800.00 | $121,400.00 | $121,400.00 | $121,400.00 | -- |
| WTVJ | NBC | | $32,900.00 | $31,000.00 | $31,000.00 | $31,000.00 | -- |
| **Totals** | | **$250,425.00** | **$247,375.00** | **$243,405.00** | **$247,450.00** | **$243,400.00** | **$0.00** |
| % of Plan | | | 98.8% | 97.2% | 98.8% | 97.2% | |
| **CPPs** | | **$246.65** | **$243.50** | **$252.81** | | **$284.81** | |
| CPP vs Plan | | | 98.7% | 102.5% | | 115.5% | |

Figure 21(a)

DMA Delivery Recap

2164
2166

Client: Client X

AOR: Agency Y

2168 Demo: A1849

2170 Quarter: 1Q04

| Daypart Analysis | 2172 | 2174 Estimated A1849 TRPs | 2176 | 2178 | 2180 | Delivery Index to Plan 2182 | 2184 | 2186 |
|---|---|---|---|---|---|---|---|---|
| DMA 2162a | Plan | Original Buy | Final Buy | Post Buy | Original Buy | Final Buy | Post Buy | Post vs Final |
| MIAMI-FT. LAUDERDALE 2162b | 1015.3 | 1015.9 | 962.8 | 854.6 | 100.1% | 94.8% | 84.2% | 88.76% |
| WEST PALM BEACH-FT. PIERCE | 1136.0 | 1130.4 | 1061.3 | 922.9 | 99.5% | 93.4% | 81.2% | 86.96% |

Multi AOR DMA Delivery Recap 2190

Client: Client X 2191

Demo: A2554 2192 Quarter: 1Q04 2193

2194 2195 2196 2197 2198 2199

| DMA | AOR | Delivery Index to Plan: Original Buy | Final Buy | Post Buy | Post vs Final |
|---|---|---|---|---|---|
| Albany, GA | Agency A | -- | 92.4% | 110.3% | 119.33% |
| Atlanta, GA | Agency A | 102.6% | 97.5% | 89.8% | 92.08% |
| Augusta, GA | Agency A | 102.6% | 97.8% | 111.1% | 113.61% |
| Birmingham (Anniston and Tuscaloos | Agency A | 100.6% | 101.7% | 119.5% | 117.55% |
| Bluefield-Beckley-Oak Hill, WV | Agency A | 101.7% | 100.8% | 129.0% | 127.99% |
| Charleston, SC | Agency A | 99.9% | 95.6% | 106.1% | 110.93% |
| Charleston-Huntington, WV | Agency A | 96.1% | 92.9% | 108.8% | 117.12% |
| Chattanooga, TN | Agency B | 95.8% | 95.1% | 100.8% | 106.06% |
| Cincinnati, OH | Agency B | 101.3% | 99.3% | 130.0% | 130.85% |
| Columbia, SC | Agency B | 95.7% | 93.9% | 93.0% | 99.05% |
| Columbia-Jefferson City, MO | Agency B | 100.3% | 99.8% | 106.2% | 106.42% |
| Columbus, GA | Agency B | 98.9% | 97.3% | 103.9% | 106.80% |
| Columbus-Tupelo-West Point, MS | Agency B | 98.9% | 97.9% | 95.5% | 97.58% |
| Dothan, AL | Agency B | 96.0% | 92.9% | 93.4% | 100.54% |
| Evansville, IN | Agency B | 97.9% | 102.9% | 90.4% | 87.88% |
| Huntsville-Decatur (Florence), AL | Agency B | 100.5% | 99.4% | 100.9% | 101.51% |
| Jackson, MS | Agency B | 95.8% | 93.2% | 88.4% | 94.85% |
| Jacksonville, FL | Agency B | 101.0% | 101.5% | 107.8% | 106.20% |
| Knoxville, TN | Agency B | 100.5% | 97.5% | 137.5% | 141.00% |
| Lexington, KY | Agency C | 97.5% | 96.8% | 114.2% | 117.97% |
| Little Rock-Pine Bluff, AR | Agency C | 100.2% | 99.0% | 102.3% | 103.30% |
| Louisville, KY | Agency C | 100.0% | 98.7% | 110.0% | 111.42% |
| Macon, GA | Agency C | 100.4% | 98.7% | 82.3% | 83.38% |
| Memphis, TN | Agency C | 100.7% | 96.6% | 106.7% | 110.45% |
| Montgomery (Selma), AL | Agency C | 100.4% | 97.2% | 103.3% | 106.28% |

Figure 21(c)

Multi AOR DMA Delivery Recap 2101

Client: Client X 2103
Demo: A2554 2105
Quarter: 1Q04 2107

| DMA 2109 | AOR 2111 | Estimated A2554 TRPs 2113<br>Plan | Original Buy 2115 | Final Buy 2117 | Post Buy 2119 |
|---|---|---|---|---|---|
| Albany, GA | Agency A | 1275.1 | 0.0 | 1178.8 | 1406.7 |
| Atlanta, GA | Agency A | 250.0 | 256.4 | 243.7 | 224.4 |
| Augusta, GA | Agency A | 1390.0 | 1426.5 | 1358.9 | 1543.8 |
| Birmingham (Anniston and Tuscaloos | Agency A | 2300.0 | 2313.6 | 2338.7 | 2749.2 |
| Bluefield-Beckley-Oak Hill, WV | Agency A | 1450.0 | 1474.2 | 1461.1 | 1870.1 |
| Charleston, SC | Agency A | 2050.0 | 2048.3 | 1959.8 | 2174.1 |
| Charleston-Huntington, WV | Agency A | 2000.0 | 1921.0 | 1857.3 | 2175.3 |
| Chattanooga, TN | Agency B | 2075.0 | 1987.7 | 1972.3 | 2091.9 |
| Cincinnati, OH | Agency B | 1000.0 | 1012.7 | 993.4 | 1299.9 |
| Columbia, SC | Agency B | 1450.0 | 1387.3 | 1361.4 | 1348.4 |
| Columbia-Jefferson City, MO | Agency B | 900.0 | 902.4 | 898.2 | 955.9 |
| Columbus, GA | Agency B | 1915.0 | 1893.9 | 1863.1 | 1989.8 |
| Columbus-Tupelo-West Point, MS | Agency B | 2251.0 | 2225.9 | 2203.0 | 2149.7 |
| Dothan, AL | Agency B | 1725.0 | 1655.9 | 1602.0 | 1610.7 |
| Evansville, IN | Agency B | 1700.0 | 1664.9 | 1749.3 | 1537.3 |
| Huntsville-Decatur (Florence), AL | Agency B | 2075.0 | 2085.6 | 2062.0 | 2093.2 |
| Jackson, MS | Agency B | 1990.0 | 1907.2 | 1853.8 | 1758.4 |
| Jacksonville, FL | Agency B | 900.0 | 909.1 | 913.3 | 969.9 |
| Knoxville, TN | Agency B | 1325.1 | 1331.4 | 1292.3 | 1822.2 |
| Lexington, KY | Agency C | 850.0 | 828.5 | 823.0 | 970.9 |
| Little Rock-Pine Bluff, AR | Agency C | 800.0 | 801.6 | 792.0 | 818.1 |
| Louisville, KY | Agency C | 1825.0 | 1825.1 | 1801.8 | 2007.5 |
| Macon, GA | Agency C | 1700.0 | 1707.0 | 1678.3 | 1399.3 |
| Memphis, TN | Agency C | 2375.2 | 2391.6 | 2294.4 | 2534.1 |
| Montgomery (Selma), AL | Agency C | 2451.0 | 2460.7 | 2383.3 | 2533.0 |

Daypart Average Rating Analysis

| | | |
|---|---|---|
| **Client:** | Client X | 2202 |
| **DMA:** | MIAMI-FT. LAUDERDALE | 2204 |
| **Demo:** | A1849 | 2206 |
| **Quarter:** | 1Q04 | 2208 |

2210

| **Daypart:** | **EM** (2218a) | **DT** (2218b) | **EF** (2218c) | **EN** (2218d) | **PA** (2218e) | **PR** (2218f) | **LN** (2218g) | **LF** (2218h) |
|---|---|---|---|---|---|---|---|---|
| 2212 Final Ratings Estimate | -- | 1.7 | 2.0 | 1.3 | 3.3 | 3.4 | 2.4 | 1.5 |
| 2214 Posted Rating | -- | 0.7 | 1.9 | 1.7 | 2.4 | 2.6 | 2.1 | 1.4 |
| 2216 NSI Average Rating | 1.0 | 0.8 | 1.2 | 2.4 | 2.1 | 2.5 | 2.8 | 0.9 |

| **Daypart:** | **EM** | **DT** | **EF** | **EN** | **PA** | **PR** | **LN** | **LF** |
|---|---|---|---|---|---|---|---|---|
| 2220 Index: Final to Daypart Average | -- | 212.5% | 166.7% | 54.2% | 157.1% | 136.0% | 85.7% | 166.7% |
| 2222 Index: Posted to Daypart Average | -- | 87.5% | 158.3% | 70.8% | 114.3% | 104.0% | 75.0% | 155.6% |

Daypart Cost per Point Analysis

Final Buy vs. Posted vs. SQAD

| | | | |
|---|---|---|---|
| **Client:** | Client X (2302) | | |
| **DMA:** | MIAMI-FT. LAUDERDALE (2304) | **AOR:** (2310) | Agency Y |
| **Demo:** | A1849 (2306) | **Length:** (2312) | 30 |
| **Quarter:** | 1Q04 (2308) | **Factor:** | 100% (2314) |

2315

2322a … 2322h

| Cost/Points (Gross) | EM | DT | EF | EN | PA | PR | LN | LF |
|---|---|---|---|---|---|---|---|---|
| Final Buy (2316) | -- | -- | $181.64 | $272.07 | $309.93 | $363.27 | $317.32 | $175.14 |
| Posted (2318) | -- | -- | $202.43 | $216.60 | $429.39 | $498.51 | $404.16 | $192.21 |
| SQAD (2320) | $217.00 | $274.00 | $344.00 | $410.00 | $492.00 | $845.00 | $572.00 | $293.00 |

| Index to SQAD (L) | EM | DT | EF | EN | PA | PR | LN | LF |
|---|---|---|---|---|---|---|---|---|
| Final Buy (2324) | -- | -- | 52.8% | 66.4% | 63.0% | 43.0% | 55.5% | 59.8% |
| Posted (2326) | -- | -- | 58.8% | 52.8% | 87.3% | 59.0% | 70.7% | 65.6% |

DMA Daypart Cost per Point Analysis

Posted vs SQAD Recap

| | | | | |
|---|---|---|---|---|
| **Client:** | Client X (2332) | | **AOR:** | Agency Y (2338) |
| **Demo:** | A1849 (2334) | | **Length:** | 30 (2340) |
| **Quarter** | 1Q04 (2336) | | **Factor:** | 100% (2342) |

2346 2348a 2348h 2344a 2344b

| DMA | Index to SQAD | EM | DT | EF | EN | PA | PR | LN | LF |
|---|---|---|---|---|---|---|---|---|---|
| MIAMI-FT. LAUDERDALE | L | -- | -- | 58.8% | 52.8% | 87.3% | 59.0% | 70.7% | 65.6% |
| WEST PALM BEACH-FT. PIERCE | L | -- | -- | 118.1% | 74.4% | 88.6% | 88.4% | 106.6% | 120.1% |
| | **System Average vs. SQAD** | -- | -- | 88.5% | 63.6% | 88.0% | 73.7% | 88.6% | 92.8% |

Multi AOR DMA Daypart Cost per Point Analysis

Posted vs SQAD Recap

Client: Client X

Demo: A1849

Quarter 1Q04

Date: mm/dd/yy

Length: 30

Factor: 100%

| DMA | AOR | Index to SQAD | EM | DT | EF | EN | PA | PR | LN | LF |
|---|---|---|---|---|---|---|---|---|---|---|
| Minneapolis-St. Paul, MN | Agency A (2362a) | L | -- | -- | 51.7% | 76.1% | 59.0% | 51.5% | 80.8% | 69.2% |
| | | **Agency Average vs. SQAD** | **--** | **--** | **51.7%** | **76.1%** | **59.0%** | **51.5%** | **80.8%** | **69.2%** |
| Atlanta, GA | Agency B (2362b) | L | -- | -- | 69.6% | 92.8% | 86.7% | 104.0% | 93.4% | 111.3% |
| Macon, GA | Agency B | L | -- | -- | 140.3% | 166.5% | 110.0% | 99.2% | 208.7% | -- |
| | | **Agency Average vs. SQAD** | **--** | **--** | **104.9%** | **129.7%** | **98.4%** | **101.6%** | **151.1%** | **111.3%** |
| Cincinnati, OH | Agency C (2362c) | L | -- | -- | 60.3% | 97.5% | 88.6% | 84.1% | 84.6% | 107.7% |
| Dayton, OH | Agency C | L | -- | -- | 106.9% | 108.1% | 97.2% | 119.7% | 98.6% | 142.6% |
| | | **Agency Average vs. SQAD** | **--** | **--** | **83.6%** | **102.8%** | **92.9%** | **101.9%** | **91.6%** | **125.1%** |
| | | **Multi AOR Average vs. SQAD** | **--** | **--** | **80.1%** | **102.9%** | **83.4%** | **85.0%** | **107.8%** | **101.9%** |

Figure 23(c)

Detailed Under Delivery(UD) Restitution Tracking Analysis

| | | | |
|---|---|---|---|
| **Client** | | **AOR** | |
| **Demo** | A1849 | **Date** | 10-May-02 |
| **Quarters** | 1Q01 - 4Q01 | | |

| | Station | Final Purcahsed TRPs | Posted Delivery TRPs | Posted Delivery Index | TRPs Owed | Restitution TRPs Posted | Revised Post Index | Balance TRPs Owed |
|---|---|---|---|---|---|---|---|---|
| **MIAMI-FT. LAUDERDALE** | | **3781.5** | **3379.3** | **89.4%** | **217.2** | **165.0** | **93.7%** | **61.1** |
| | WBFS | 748.1 | 706.5 | 94.4% | 51.5 | 30.8 | 98.6% | 20.7 |
| | WBZL | 566.1 | 509.5 | 90.0% | 12.5 | 7.4 | 91.3% | 5.1 |
| | WFOR | 263.0 | 203.1 | 77.2% | 36.1 | 44.9 | 94.3% | 0.0 |
| | WPLG | 206.6 | 210.7 | 102.0% | 0.0 | 0.0 | 102.0% | 0.0 |
| | WSVN | 1451.3 | 1374.9 | 94.7% | 0.0 | 0.0 | 94.7% | 0.0 |
| | WTVJ | 546.4 | 374.6 | 68.6% | 117.1 | 81.9 | 83.5% | 35.3 |

| | |
|---|---|
| Value Owed | $48,218.78 |
| Value Received | $35,935.67 |
| **Balance** | **$14,168.02** |

Multi DMA Under Delivery(UD) Restitution Tracking Analysis

2444

| | | | |
|---|---|---|---|
| **Client** | Client X | **AOR** | Agency Y |
| **Demo** | A1849 | **Date** | mm/dd/yy |
| **Quarter** | 4Q01 | | |

| DMA | Posted Gross $s (2446) | Final Purchased TRPs (2448) | Posted Delivery TRPs (2450) | Posted Delivery Index (2452) | TRPs Owed (2454) | Restitution TRPs Posted (2456) | Revised Post Index (2458) |
|---|---|---|---|---|---|---|---|
| MIAMI-FT. LAUDERDALE (2442a) | $243,400.00 | 962.8 | 854.6 | 88.8% | 70.2 | 0.0 | 88.8% |
| WEST PALM BEACH-FT. PIERCE (2442b) | $97,160.00 | 1061.3 | 922.9 | 87.0% | 75.5 | 110.7 | 97.4% |
| **Total:** | **$340,560.00** | | | | | | |

Figure 24(b)

Multi Agency Under Delivery(UD) Restitution Tracking Analysis

Client Client X
Quarter 1Q04
2462

Date mm/dd/yy 2464
2464a
2464b
2460

| AOR | DMAs Purchased | Posted Delivery Index | TRPs Owed | Restitution TRPs Posted | Value Owed | Value Received | Balance |
|---|---|---|---|---|---|---|---|
| Agency A | 1 | 103.2% | 21.4 | 0.0 | $6,054.92 | $0.00 | $6,054.92 |
| Agency B | 2 | 98.8% | 62.7 | 43.6 | $16,547.58 | $15,124.40 | $10,338.25 |
| Agency C | 2 | 142.4% | 21.3 | 23.0 | $11,675.59 | $12,607.45 | $0.00 |
| Agency D | 2 | 106.4% | 7.9 | 5.9 | $1,437.09 | $1,073.27 | $854.98 |
| Agency E | 10 | 98.3% | 371.0 | 0.0 | $47,866.65 | $0.00 | $47,866.65 |
| Agency F | 1 | 117.9% | 3.8 | 0.0 | $317.83 | $0.00 | $317.83 |
| Agency G | 1 | 93.3% | 19.1 | 0.0 | $1,837.61 | $0.00 | $1,837.61 |
| Agency H | 3 | 98.9% | 8.3 | 0.0 | $640.62 | $0.00 | $640.62 |
| Agency I | 8 | 110.5% | 83.0 | 0.0 | $22,790.56 | $0.00 | $22,790.56 |
| Agency J | 6 | 116.4% | 1.0 | 134.9 | $77.85 | $18,830.72 | $77.85 |
| Agency K | 1 | 101.4% | 51.3 | 0.0 | $12,180.68 | $0.00 | $12,180.68 |
| Agency L | 1 | 122.4% | 14.0 | 10.4 | $1,624.84 | $1,207.02 | $928.48 |
| Agency M | 3 | 85.9% | 111.5 | 49.5 | $4,969.14 | $3,116.32 | $2,942.00 |
| Agency N | 9 | 111.7% | 21.4 | 61.0 | $5,512.63 | $16,212.01 | $1,849.60 |
| Agency O | 12 | 102.2% | 263.4 | 10.0 | $31,677.98 | $1,093.90 | $30,584.08 |
| Agency P | 1 | 95.4% | 32.8 | 14.6 | $2,542.33 | $1,131.65 | $1,410.68 |
| Agency Q | 2 | 102.6% | 33.0 | 90.3 | $4,724.94 | $7,121.53 | $3,364.07 |
| Agency R | 3 | 88.1% | 291.3 | 0.0 | $62,454.31 | $0.00 | $62,454.31 |
| | **Average Delivery** | 105.1% | | | $234,933.15 | $77,518.27 | $206,493.17 |
| | | | | balance outstanding | | 87.9% | |

Figure 24(c)

Multi DMA / Multi AOR Under Delivery(UD) Restitution Tracking Analysis

2480

Client Client X

Demo A-1849 Date mm/dd/yy

Quarter 1Q04

| DMA | AOR | | Posted Gross $s | Final Purchased TRPs | Posted Delivery TRPs | Posted Delivery Index | TRPs Owed | Restitution TRPs Posted | Revised Post Index |
|---|---|---|---|---|---|---|---|---|---|
| **Minneapolis-St. Paul, MN** | Agency A (2482a) | | $210,865.00 | 1002.9 | 1086.5 | 108.3% | 0.0 | 0.0 | 108.3% |
| | | **Total:** | **$210,865.00** | | | | | | |
| **Atlanta, GA** | Agency B (2482b) | | $453,615.00 | 1542.0 | 1574.8 | 102.1% | 41.2 | 12.6 | 102.9% |
| **Macon, GA** | Agency B | | $34,355.00 | 836.0 | 621.7 | 74.4% | 167.9 | 0.0 | 74.4% |
| | | **Total:** | **$487,970.00** | | | | | | |
| **Washington, DC (Hagerstown, MD)** | Agency C (2482c) | | $387,500.00 | 830.0 | 1008.0 | 121.4% | 0.0 | 0.0 | 121.4% |
| | | **Total:** | **$387,500.00** | | | | | | |

Figure 24(d)

Restricted Programming Report

Client: Client X
Agency: Agency Y Date: mm/dd/yy
Quarter: 1Q04

2504 2502

| DMA | Program | | Cost | Posted DMA Cost | Index | TRPs | Posted DMA TRPs | Index |
|---|---|---|---|---|---|---|---|---|
| Atlanta, GA | 20/20 | | $6,000.00 | | 2.3% | 18.8 | | 2.1% |
| | Primetime Thursday | | $1,400.00 | | 0.5% | 4.9 | | 0.5% |
| | | **DMA Total** | **$7,400.00** | **$265,400.00** | **2.8%** | **23.7** | **900.2** | **2.6%** |
| Baltimore, MD | Girlfriends / Abby | | $2,400.00 | | 1.4% | 14.6 | | 1.5% |
| | Half and Half | | $5,000.00 | | 2.9% | 11.3 | | 1.1% |
| | | **DMA Total** | **$7,400.00** | **$174,525.00** | **4.2%** | **25.9** | **1005.4** | **2.6%** |
| Chicago, IL | Dr. Phil | | $0.00 | | 0.0% | 3.1 | | 0.3% |
| | | **DMA Total** | **$0.00** | **$465,500.00** | **0.0%** | **3.1** | **974.7** | **0.3%** |
| Cleveland-Akron (Canton), Ol | Boston Public | | $3,000.00 | | 1.6% | 3.5 | | 0.4% |
| | Married With Children | | $3,500.00 | | 1.9% | 9.3 | | 1.0% |
| | | **DMA Total** | **$6,500.00** | **$188,395.00** | **3.5%** | **12.8** | **905.6** | **1.4%** |
| Dallas-Ft. Worth, TX | Girlfriends | | $0.00 | | 0.0% | 2.6 | | 0.3% |
| | One on One | | $0.00 | | 0.0% | 1.9 | | 0.2% |
| | Parkers | | $0.00 | | 0.0% | 1.8 | | 0.2% |
| | | **DMA Total** | **$0.00** | **$406,600.00** | **0.0%** | **6.3** | **982.6** | **0.6%** |
| Hartford & New Haven, CT | 20/20 | | $0.00 | | 0.0% | 3.0 | | 0.3% |
| | Blind Date | | $0.00 | | 0.0% | 0.1 | | 0.0% |
| | Primetime Live | | $0.00 | | 0.0% | 2.0 | | 0.2% |
| | | **DMA Total** | **$0.00** | **$148,475.00** | **0.0%** | **5.1** | **906.1** | **0.6%** |
| | | **Total** | **$21,300.00** | | | **96.9** | | |

Detailed Unspecified Activity Report

Client: Client X

Agency: Agency Y

Quarter: 1Q04

2510

| DMA | Station | | Spot Date and Time | Actual Gross Cost |
|---|---|---|---|---|
| Denver, CO | KMGH | | 3/3/04 6:53 PM | $0.00 |
| | KMGH | | 3/4/04 9:36 PM | $0.00 |
| | KMGH | | 3/5/04 8:37 PM | $0.00 |
| | KMGH | | 3/9/04 5:57 PM | $1,250.00 |
| | | **Station Total** | | **$1,250.00** |
| | | **DMA Total** | | **$1,250.00** |
| Hartford & New Haven, CT | WHPX | | 1/12/04 8:07 PM | $35.00 |
| | WHPX | | 1/12/04 8:22 PM | $40.00 |
| | WHPX | | 1/12/04 9:36 PM | $35.00 |
| | | **Station Total** | | **$110.00** |
| | | **DMA Total** | | **$110.00** |
| Philadelphia, PA | WTXF | | 1/12/04 10:24 PM | $0.00 |
| | WTXF | | 1/16/04 10:22 PM | $1,300.00 |
| | WTXF | | 1/18/04 10:27 PM | $1,300.00 |
| | | **Station Total** | | **$2,600.00** |
| | | **DMA Total** | | **$2,600.00** |
| | | **Grand Total** | | **$3,960.00** |

Figure 25(b)

Bonus Daypart Distribution Report

Client: Client X

Agency: Agency Y

Quarter: 1Q04 Date: mm/dd/yy

2520

| DMA | Daypart Code | Posted Rating | Actual Spot Count |
|---|---|---|---|
| Atlanta, GA | EN | 2.9 | 2 |
| | LF | 7.3 | 4 |
| | LN | 0.6 | 1 |
| | PA | 1.5 | 1 |
| | PR | 61.6 | 15 |
| | | **73.9** | **23** |
| | EN | 2.6 | 1 |
| | PA | 4.6 | 2 |
| | PR | 53.7 | 14 |
| | WE | 12.0 | 12 |
| | | **72.9** | **29** |
| | EF | 1.1 | 1 |
| | EM | 6.7 | 4 |
| | EN | 3.4 | 3 |
| | LF | 4.8 | 5 |
| | LN | 12.7 | 9 |
| | PA | 4.7 | 4 |
| | PR | 9.8 | 4 |
| | | **43.2** | **30** |
| | **Totals** | **190.0** | **82** |

Figure 25(c)

Billboard Daypart Distribution Report

Client: Client X
Agency: Agency Y
Quarter: 1Q04
Date: mm/dd/yy

2530

| DMA | Daypart Code | Posted Rating | Actual Spot Count |
|---|---|---|---|
| Boston, MA | EF | 0.0 | 3 |
| | EN | 0.0 | 2 |
| | PR | 0.0 | 2 |
| | | **0.0** | **7** |
| Cincinnati, C | EM | 0.0 | 4 |
| | EN | 0.0 | 2 |
| | LN | 0.0 | 3 |
| | | **0.0** | **9** |
| Hartford & N | PR | 0.0 | 6 |
| | | **0.0** | **6** |
| Houston, TX | PR | 0.0 | 2 |
| | | **0.0** | **2** |
| Las Vegas, | EF | 0.0 | 1 |
| | EM | 0.0 | 5 |
| | EN | 0.0 | 1 |
| | LN | 0.0 | 1 |
| | | **0.0** | **8** |
| Miami-Ft. La | EF | 0.0 | 4 |
| | EM | 0.0 | 5 |
| | EN | 0.0 | 5 |
| | LF | 0.0 | 1 |
| | PR | 0.0 | 2 |
| | | **0.0** | **17** |
| | **Totals** | **0.0** | **49** |

Figure 25(d)

ISCI Report

Client: Client X
Agency: Agency Y Date: mm/dd/yy
Quarter: 1Q04

2540

| DMA | Station | ISCI | Actual Spot Count | Percentage |
|---|---|---|---|---|
| Cincinnati, C | WSTR | HNCD0003 | 5 | 13.5% |
| | | HNCD0006 | 8 | 21.6% |
| | | HNCD0007 | 4 | 10.8% |
| | | HNCR0004 | 6 | 16.2% |
| | | HNCS0001 | 2 | 5.4% |
| | | HNCS0005 | 6 | 16.2% |
| | | HNCS0006 | 6 | 16.2% |
| | | Total | 37 | |
| | WXIX | HNCD0003 | 10 | 12.8% |
| | | HNCD0006 | 14 | 17.9% |
| | | HNCD0007 | 12 | 15.4% |
| | | HNCR0004 | 18 | 23.1% |
| | | HNCS0001 | 3 | 3.8% |
| | | HNCS0005 | 12 | 15.4% |
| | | HNCS0006 | 9 | 11.5% |
| | | Total | 78 | |
| | | **Cincinnati, OH** | 115 | |
| Cleveland-A | WBNX | HNCD0003 | 5 | 11.4% |
| | | HNCD0006 | 9 | 20.5% |
| | | HNCD0007 | 6 | 13.6% |
| | | HNCR0004 | 9 | 20.5% |
| | | HNCS0001 | 2 | 4.5% |
| | | HNCS0005 | 8 | 18.2% |
| | | HNCS0006 | 5 | 11.4% |
| | | Total | 44 | |
| | WJW | HNCD0003 | 11 | 38.0% |
| | | HNCD0006 | 18 | 62.0% |
| | | Total | 29 | |
| | | **Cleveland-Akron (Canton), OH** | 73 | |

Figure 25(e)

ISCI DMA Rollup Report

Client: Client X
Agency: Agency Y Date: mm/dd/yy
Quarter: 1Q04

2550

| DMA | ISCI | Actual Spot Count | Percentage |
|---|---|---|---|
| Atlanta, GA | | | |
| | HHNS0003 | 1 | 0.3% |
| | HNCD0003 | 49 | 13.1% |
| | HNCD0006 | 76 | 20.4% |
| | HNCD0007 | 34 | 9.1% |
| | HNCR0004 | 50 | 13.4% |
| | HNCS0001 | 24 | 6.4% |
| | HNCS0003 | 1 | 0.3% |
| | HNCS0005 | 54 | 14.5% |
| | HNCS0006 | 50 | 13.4% |
| | HNSD1013 | 18 | 4.8% |
| | HNSS1013 | 16 | 4.3% |
| | **Atlanta, GA** | **373** | |
| Baltimore, MD | | | |
| | HNCD0003 | 52 | 14.4% |
| | HNCD0007 | 1 | 0.3% |
| | HNCF0007 | 3 | 0.8% |
| | HNCG0003 | 23 | 6.4% |
| | HNCG0004 | 32 | 8.9% |
| | HNCG0005 | 23 | 6.4% |
| | HNCG0007 | 38 | 10.6% |
| | HNCR0004 | 49 | 13.6% |
| | HNCR0007 | 1 | 0.3% |
| | HNCS0001 | 22 | 6.1% |
| | HNCS0003 | 1 | 0.3% |
| | HNCS0005 | 56 | 15.6% |
| | HNCS0006 | 58 | 16.1% |
| | HNDC0003 | 1 | 0.3% |
| | **Baltimore, MD** | **360** | |

Figure 25(f)

DMA Minimum Final Ratings Report

Client: Client X
Agency: Agency Y Date: mm/dd/yy
Quarter: 1Q04

| | | | Final | | | Final | |
|---|---|---|---|---|---|---|---|
| **DMA** | **Daypart** | **Violation Cost** | **Daypart Cost** | **Index** | **Violation TRPs** | **Daypart TRPs** | **Index** |
| Atlanta, GA | LN | $400.00 | $400.00 | 100.0% | 1.0 | 6.0 | 16.7% |
| | PA | $200.00 | $46,850.00 | 0.4% | 2.0 | 177.6 | 1.1% |
| | PR | $1,000.00 | $71,600.00 | 1.4% | 6.0 | 159.3 | 3.8% |
| | SP | $3,700.00 | $48,900.00 | 7.6% | 1.3 | 52.8 | 2.5% |
| **DMA Total** | | $5,300.00 | $265,400.00 | 2.0% | 10.3 | 888.7 | 1.2% |
| Baltimore, MD | LF | $0.00 | $16,325.00 | 0.0% | 3.0 | 108.5 | 2.8% |
| | PR | $1,650.00 | $31,150.00 | 5.3% | 20.0 | 143.5 | 13.9% |
| **DMA Total** | | $1,650.00 | $174,525.00 | 0.9% | 23.0 | 896.0 | 2.6% |
| Boston, MA (Manche | LF | $1,600.00 | $57,125.00 | 2.8% | 0.0 | 123.5 | 0.0% |
| | LN | $11,050.00 | $105,550.00 | 10.5% | 20.0 | 138.0 | 14.5% |
| | PA | $3,000.00 | $150,000.00 | 2.0% | 7.0 | 240.0 | 2.9% |
| | PR | $10,500.00 | $127,500.00 | 8.2% | 14.5 | 110.0 | 13.2% |
| **DMA Total** | | $26,150.00 | $526,675.00 | 5.0% | 41.5 | 809.0 | 5.1% |
| Chicago, IL | LN | $500.00 | $98,100.00 | 0.5% | 1.0 | 170.0 | 0.6% |
| | PR | $0.00 | $75,000.00 | 0.0% | 3.5 | 101.0 | 3.5% |
| | SP | $17,500.00 | $35,500.00 | 49.3% | 11.0 | 25.0 | 44.0% |
| **DMA Total** | | $18,000.00 | $465,500.00 | 3.9% | 15.5 | 885.0 | 1.8% |
| Cleveland-Akron (Ca | PR | $1,100.00 | $46,300.00 | 2.4% | 4.5 | 140.5 | 3.2% |
| **DMA Total** | | $1,100.00 | $188,395.00 | 0.6% | 4.5 | 889.5 | 0.5% |

2560

Note: Totals exclude under delivery

Figure 25(g)

DMA Separation Report

Client: Client X

Agency: Agency Y Separation Minutes: 20 (2572)

Quarter: 1Q04

Date: mm/dd/yy

| | | Spot 1 (2574) | | | | Spot 2 (2576) | | | | 2578 |
|---|---|---|---|---|---|---|---|---|---|---|
| DMA | Station | Program | Date | Length | Cost | Program | Date | Length | Cost | Separation (minutes) |
| Atlanta, GA | WAGA | 70S SHOW | 1/18/04 7:25 PM | 30 | $100 | 70S SHOW | 1/18/04 7:29 PM | 30 | $300 | 4 |
| | WAGA | KING OF THE | 3/8/04 7:39 PM | 30 | $400 | KING OF THE | 3/8/04 7:57 PM | 30 | $800 | 18 |
| | WATL | PRIME SUN R | 1/19/04 10:27 PM | 30 | $0 | PRIME SUN R | 1/19/04 10:45 PM | 30 | $0 | 18 |
| | WGCL | ENVERYBODY- | 3/7/04 7:15 PM | 30 | $800 | ENVERYBODY- | 3/7/04 7:31 PM | 30 | $500 | 16 |
| | WSB | LF ROTATION | 1/11/04 11:44 PM | 30 | $0 | LF ROTATION | 1/11/04 11:57 PM | 30 | $600 | 13 |
| | WSB | LF ROTATION | 2/4/04 12:43 AM | 30 | $0 | LF ROTATION | 2/4/04 1:02 AM | 30 | $200 | 19 |
| | WSB | ACTION NEW | 3/12/04 12:42 AM | 30 | $225 | ACTION NEW | 3/12/04 1:01 AM | 30 | $225 | 19 |
| | | **DMA Spot Pair Total** | **7** | | | | | | | |
| Baltimore, MD | WBFF | LATE NEWS | 1/7/04 10:59 PM | 30 | $575 | LATE NEWS | 1/7/04 11:10 PM | 30 | $250 | 11 |
| | WBFF | LATE NEWS | 1/9/04 10:54 PM | 30 | $575 | LATE NEWS | 1/9/04 11:06 PM | 30 | $250 | 12 |
| | WBFF | FOX NFC | 1/19/04 1:25 PM | 30 | $0 | FOX NFC | 1/19/04 1:43 PM | 30 | $0 | 18 |
| | WMAR | JEOPARDY | 3/4/04 7:42 PM | 30 | $275 | JEOPARDY | 3/4/04 8:01 PM | 30 | $1,400 | 19 |
| | WNUV | THAT 70S SH | 2/11/04 7:43 PM | 30 | $550 | THAT 70S SH | 2/11/04 7:59 PM | 30 | $1,000 | 16 |
| | WNUV | MARTIN | 3/3/04 10:45 PM | 30 | $250 | MARTIN | 3/3/04 10:52 PM | 30 | $250 | 7 |
| | WNUV | STEVE HARV | 3/7/04 10:29 PM | 30 | $325 | STEVE HARV | 3/7/04 12:39 PM | 30 | $250 | 10 |
| | WNUV | MARTIN | 3/7/04 10:39 PM | 30 | $250 | MARTIN | 3/7/04 10:58 PM | 30 | $250 | 19 |
| | WUTB | SEINFELD | 1/10/04 6:30 PM | 30 | $250 | SEINFELD | 1/10/04 6:46 PM | 30 | $0 | 16 |
| | WUTB | WILL & GRAC | 2/5/04 7:13 PM | 30 | $250 | WILL & GRAC | 2/5/04 7:28 PM | 30 | $250 | 15 |
| | | **DMA Spot Pair Total** | **10** | | | | | | | |

2570

Note: Excludes Billboards

Figure 25(h)

CLIENT

Q4, 2001

CIRCLE AUDIT® Report

Figure 26

Audit Goals

- Provide Client with a third-party verification system of agency media buys
- Verify compliance to client-approved buying guidelines
- Identify and report the value of the TRP's due to client for under delivery restitution. UD is based on station specific delivery Sample Audit 4Q01 CIRCLE AUDIT

Figure 27

Audit Methodology

- All Plan data is reported from agency goal reports
- Original Buy data reflects agency's initial buy in the market
- Final Buy data is affidavit reconciled data with adjustments to daypart codes and overrides by MMI according to buying guidelines supplied by either the agency or client
- No-Charge weight buylines with estimated ratings are coded to the appropriate daypart
- No-Charge weight buylines with no estimated ratings are coded as Bonus
- Overnight (M-SU 1-5AM) reported as Bonus (BS)
- Spots taken as credit recoded as "CR"

Sample Audit 4Q01 CIRCLE AUDIT

Audit Methodology (Cont)

- Post Buy data comes directly from MMI's Nielsen data tape for the appropriate quarter of activity
- All in-sweep activity posted against the actual NSI rating (All sweep books for the quarter are applied)
- Posted ratings are not break averaged
- Out of sweep activity posted against the four week average of the major sweep book unless override rationale is provided
- Billboard buylines recoded as "BB" rather than the daypart code assigned. Billboards are not posted Sample Audit 4Q01 CIRCLE AUDIT

Audit Methodology (Cont)

- When prior quarter Under Delivery Restitution is reported on agency buy and coded as “Bonus” with no indication that it is prior quarter Restitution (either on the buy or the invoice), it is included in MMI post-buy analysis of the quarter and not towards Restitution recovered
- Affidavits are copies of station affidavits
- Remittance is proof of agency payment to media vendors via copies of checks and/or disbursement journals
- Spots taken as credit recoded as “CR”
- Spots that do match any buyline because of day, date, time, length or rate are reported against bottom line post, however, they are not attributed to a specific daypart. They are reported as “Unspecified”

Sample Audit 4Q01 CIRCLE AUDIT Figure 30 5

MMI Audit Philosophy

- The Plan defines the client expectations
  - Total TRPs to be achieved for the market, TRPs by daypart, Reach and Frequency levels, percent of buy planned in key dayparts and a determined expenditure to achieve those goals
- The Original Buy (order) supports the buyer's ability to achieve the approved Plan
- The Final Buy, when reconciled against affidavits and properly daypart coded, shows how well the buy was maintained, where daypart TRPs moved from/to, if the overall cost was maintained. In short, delivery of client expectations throughout the buy Sample Audit 4Q01 CIRCLE AUDIT

MMI Audit Philosophy (Cont)

- The Post Buy is indexed on several levels
  - Post vs. Plan
    - Daypart specific TRP
    - Overall delivery TRP and CPP
  - Post vs. Final Buy
    - Daypart specific TRP
    - Overall delivery TRP and CPP
  - Posted Daypart Average Ratings vs. NSI Daypart Average Ratings
  - Posted Daypart CPP vs Low SQAD by Daypart Sample Audit 4Q01 CIRCLE AUDIT Figure 32 7

MMI Audit Philosophy (Cont)

- Metered markets should post at a minimum of 100% of the buyer's estimated delivery
  - Overnight data is available daily
    - Example: use program HH share applied to PUT to check projected demo rating
    - Order as in-flight restitution, appropriate number of Bonus spots to maintain the projected TRP level of the buy

Figure 33

MMI Audit Philosophy (Cont)

- Key dayparts should Post at 100% of buyer's estimated delivery. Key dayparts are identified as the following:
  - Early Fringe
  - Early News
  - Prime Access
  - Prime

Figure 34

MMI Audit Philosophy (Cont)

- Correlating Average Ratings to Low SQAD
  - Final and Post Buy Average Ratings by Daypart indexed to NSI Post Book by Daypart Average Ratings
  - Final and Post Buy CPP by Daypart indexed to Quarter's Low SQAD CPP
    - Average Ratings above post book NSI Average Rating with CPPs above Low SQAD: acceptable correlation
    - Average Ratings below post book NSI Average Rating with CPPs below Low SQAD: acceptable correlation
    - Average Ratings below the post book NSI Average Ratings with CPPs above Low SQAD: unacceptable correlation
    - Average Ratings at or above NSI Average Ratings with CPPs below Low SQAD: preferred correlation Sample Audit 4Q01 CIRCLE AUDIT 10

Figure 35

Audit Results

- Number of DMA's Audited (4Q01) 62
- Number of Agencies Audited (4Q01) 17
- Total Dollars Posted (Gross) $6,174,632.00
- Value of UD Restitution (Gross) $264,831.68
- Posting Overview
  - DMA Delivery vs. Plan
    - +110% 14 or 22.6%
    - 90-110% 25 or 40.3%
    - 80-90% 13 or 21.0%
    - Less than 80% 10 or 16.1%
  - DMA Delivery vs. Final Buy
    - +110% 16 or 25.8%
    - 90-110% 30 or 48.4%
    - 80-90% 10 or 16.1%
    - Less than 80% 6 or 9.7%

Sample Audit 4Q01 CIRCLE AUDIT

Figure 36

Multi Agency Under Delivery(UD) Restitution Tracking Analysis

Client

Date

Quarter 4Q01

| AOR | DMAs Purchased | Posted Delivery Index | TRPs Owed | Restitution TRPs Posted | Value Owed | Value Received | Balance |
|---|---|---|---|---|---|---|---|
| | 3 | 99.4% | 55.3 | 0.0 | $5,642.85 | $0.00 | $5,642.85 |
| | 2 | 94.1% | 88.0 | 0.0 | $24,185.75 | $0.00 | $24,185.75 |
| | 4 | 108.1% | 94.8 | 0.0 | $8,012.59 | $0.00 | $8,012.59 |
| | 1 | 76.9% | 151.8 | 29.4 | $27,603.31 | $5,346.10 | $22,257.22 |
| | 2 | 89.1% | 100.2 | 4.0 | $32,763.27 | $667.12 | $32,096.15 |
| | 2 | 96.5% | 38.3 | 15.7 | $8,644.77 | $2,857.27 | $5,787.50 |
| | 1 | 77.9% | 75.2 | 0.0 | $16,848.56 | $0.00 | $16,848.56 |
| | 2 | 96.9% | 11.5 | 0.0 | $1,712.38 | $0.00 | $1,712.38 |
| | 13 | 104.3% | 178.5 | 0.0 | $33,480.81 | $0.00 | $33,480.81 |
| | 5 | 108.9% | 19.5 | 0.0 | $2,276.14 | $0.00 | $2,276.14 |
| | 1 | 93.7% | 50.7 | 0.0 | $13,560.01 | $0.00 | $13,560.01 |
| | 3 | 76.1% | 443.5 | 0.0 | $18,125.10 | $0.00 | $18,125.10 |
| | 6 | 109.5% | 48.1 | 5.1 | $8,343.09 | $557.69 | $7,785.40 |
| | 12 | 100.6% | 206.0 | 21.3 | $26,277.28 | $1,665.40 | $24,611.88 |
| | 1 | 119.2% | 69.2 | 6.9 | $10,302.73 | $1,027.30 | $9,275.44 |
| | 2 | 49.2% | 14.6 | 0.0 | $2,393.93 | $0.00 | $2,393.93 |
| | 2 | 87.9% | 145.7 | 110.7 | $24,659.11 | $10,134.37 | $14,524.73 |

Average Delivery 93.3%

Page 1 of 1

Figure 37

CLIENT

2001 Multi-Quarter Audit Results

Figure 38

Multi Quarter (1Q01-4Q01) Audit Results

- Number of Audits (1Q01-4Q01) 235
- Total Dollars Posted (Gross) $23,972,464.00
- Value of UD Restitution (Gross) $1,017,687.09
- Posting Overview
  - Delivery vs. Plan
    - +110% 48 or 20.1%
    - 90-110% 108 or 46.2%
    - 80-90% 41 or 17.5%
    - Less than 80% 38 or 16.2%
  - Delivery vs. Final Buy
    - +110% 46 or 19.6%
    - 90-110% 129 or 54.9%
    - 80-90% 35 or 14.9%
    - Less than 80% 25 or 10.6%

Sample Audit 4Q01 CIRCLE AUDIT Figure 39 13

Multi-Quarter (1Q01-4Q01) Audit Results (Cont)

- Restitution Trend Analysis
  - 1Q01
    - Owed $186,133.75
    - Recovered $117,125.38
      - » 62.9% of $'s recovered
  - 2Q01
    - Owed $251,051.75
    - Recovered $101,487.73
      - » 40.4% of $'s recovered
  - 3Q01
    - Owed $315,669.90
    - Recovered $101,573.01
      - » 32.2% of $'s recovered
  - 4Q01
    - Owed $264,831.08
    - Recovered $22,255.25
      - » 8.4% of $'s recovered

Sample Audit 4Q01 CIRCLE AUDIT Figure 40 14

Multi-Quarter Audit Results (Cont)

- Restitution Recap
  - 4 Quarter Analysis (1Q01-4Q01)
    - Owed $1,017,687.08
    - Recovered $342,441.37
      - » 33.6% of $'s recovered
  - 4 Quarter Analysis (1Q00-4Q00)
    - Owed $905,181.01
    - Recovered $695,907.25
      - » 76.9% of $'s recovered

Sample Audit 4Q01 CIRCLE AUDIT Figure 41 15

Multi Agency Under Delivery(UD) Restitution Tracking Analysis

Client

Date

Quarters 1Q01 - 4Q01

| AOR | DMAs Purchased | Posted Delivery Index | TRPs Owed | Restitution TRPs Posted | Value Owed | Value Received | Balance |
|---|---|---|---|---|---|---|---|
| | 6 | 99.7% | 156.2 | 0.0 | $13,197.06 | $0.00 | $13,197.06 |
| | 2 | 105.8% | 30.0 | 30.0 | $4,003.33 | $4,003.33 | $0.00 |
| | 11 | 101.0% | 241.7 | 0.0 | $61,127.41 | $0.00 | $61,127.41 |
| | 7 | 94.4% | 167.1 | 0.0 | $12,002.37 | $0.00 | $12,002.37 |
| | 4 | 75.9% | 880.7 | 460.1 | $157,902.92 | $80,461.00 | $77,441.92 |
| | 1 | 88.9% | 19.3 | 0.0 | $1,854.46 | $0.00 | $1,854.46 |
| | 1 | 158.9% | 0.0 | 0.0 | $0.00 | $0.00 | $0.00 |
| | 7 | 89.4% | 224.0 | 13.3 | $97,184.33 | $5,631.35 | $91,552.98 |
| | 12 | 109.7% | 394.1 | 418.6 | $73,582.25 | $65,640.99 | $7,941.26 |
| | 3 | 92.7% | 40.0 | 0.0 | $19,446.03 | $0.00 | $19,446.03 |
| | 4 | 90.4% | 146.7 | 0.0 | $35,827.46 | $0.00 | $35,827.46 |
| | 2 | 96.9% | 11.5 | 0.0 | $1,712.38 | $0.00 | $1,712.38 |
| | 49 | 101.5% | 958.0 | 188.8 | $161,941.33 | $33,820.82 | $128,120.51 |
| | 1 | 117.9% | 0.0 | 0.0 | $0.00 | $0.00 | $0.00 |
| | 1 | 96.4% | 19.3 | 0.0 | $3,131.77 | $0.00 | $3,131.77 |
| | 19 | 104.0% | 182.7 | 0.0 | $20,384.15 | $0.00 | $20,384.15 |
| | 3 | 102.6% | 75.5 | 23.2 | $19,837.36 | $5,872.36 | $13,965.00 |
| | 12 | 77.2% | 1208.9 | 66.9 | $42,024.48 | $1,656.01 | $40,368.47 |
| | 23 | 108.4% | 281.7 | 145.5 | $51,532.43 | $24,794.74 | $26,737.69 |
| | 47 | 98.6% | 1167.0 | 563.0 | $122,287.98 | $46,267.91 | $76,020.06 |
| | 1 | 110.2% | 0.0 | 0.0 | $0.00 | $0.00 | $0.00 |
| | 4 | 107.6% | 129.4 | 30.7 | $19,246.60 | $4,575.54 | $14,671.06 |
| | 6 | 88.7% | 224.2 | 28.9 | $13,379.53 | $4,766.29 | $8,613.23 |
| | 8 | 90.6% | 493.5 | 451.9 | $86,081.48 | $64,951.03 | $21,130.45 |

Page 1 of 2

Figure 42

Multi Agency Under Delivery(UD) Restitution Tracking Analysis

Client

Date

Quarters 1Q01 - 4Q01

| AOR | DMAs Purchased | Posted Delivery Index | TRPs Owed | Restitution TRPs Posted | Value Owed | Value Received | Balance |
|---|---|---|---|---|---|---|---|
| Average Delivery | | 100.3% | | | | | |

Page 2 of 2

Figure 43

CLIENT

Q4, 2001

Agency and DMA Specific

CIRCLE AUDIT® Reports

Figure 44

DMA Delivery Recap

Client:
AOR: Demo: A1849 Quarter: 4Q01

| Daypart Analysis | | Estimated A1849 TRPs | | | Delivery Index to Plan | | | |
|---|---|---|---|---|---|---|---|---|
| DMA | Plan | Original Buy | Final Buy | Post Buy | Original Buy | Final Buy | Post Buy | Post vs Final |
| MIAMI-FT. LAUDERDALE | 1015.3 | 1015.9 | 962.8 | 854.6 | 100.1% | 94.8% | 84.2% | 88.76% |
| WEST PALM BEACH-FT. PIERCE | 1136.0 | 1130.4 | 1061.3 | 922.9 | 99.5% | 93.4% | 81.2% | 86.96% |

Figure 45

Multi DMA Under Delivery(UD) Restitution Tracking Analysis

Client AOR

Demo A1849 Date

Quarter 4Q01

| DMA | Posted Gross $s | Final Purchased TRPs | Posted Delivery TRPs | Posted Delivery Index | TRPs Owed | Restitution TRPs Posted | Revised Post Index |
|---|---|---|---|---|---|---|---|
| MIAMI-FT. LAUDERDALE | $243,400.00 | 962.8 | 854.6 | 88.8% | 70.2 | 0.0 | 88.8% |
| WEST PALM BEACH-FT. PIERCE | $97,160.00 | 1061.3 | 922.9 | 87.0% | 75.5 | 110.7 | 97.4% |
| Total: | $340,560.00 | | | | | | |

Page 1 of 1

Figure 46

AAAA Inc.
Miami-Ft. Lauderdale

Daypart Management vs. Plan

- EF daypart at 73.2% vs. Plan
- EN daypart at 30.9% vs. Plan
- PA daypart at 45.7% vs. Plan
- PR daypart at 87.7% vs. Plan
- LN daypart at 89.3% vs. Plan
- LF daypart at 76.3% vs. Plan
- SP daypart at 44.3% vs. Plan
- ROS daypart at 2782.0% vs. Plan

- Cost/Point Management
  - All daypart cost per points efficient relative to the average ratings posted Sample Audit 4Q01 CIRCLE AUDIT

Figure 47

AAAA Inc.
Miami-Ft. Lauderdale

- Cost/Point Management
  - All daypart cost per points efficient relative to the average ratings posted
- Value of Unspecified TRPs $11,232.00
- Value of UD Restitution $17,747.23
- Buying Guideline Issues
  - ROS not an approved daypart
  - Sports not an approved daypart Sample Audit 4Q01 CIRCLE AUDIT

AAAA Inc.
Miami-Ft. Lauderdale

- Daypart Coding Changes
  - EN to ROS
  - EN to EF
  - PR to ROS
  - LN to LF
- Prime to post to a minimum of 100% of planned TRPs
  - Post vs Plan 87.7%
  - Post vs Final 68.3%

Figure 49

Market Analysis

Client: DMA: MIAMI-FT. LAUDERDALE

AOR: Demo: A1849 Quarter: 4Q01

Daypart Analysis

| | Plan | Estimated A1849 TRPs: Original Buy | Estimated A1849 TRPs: Final Buy | Post Buy | Delivery Index to Plan: Original Buy | Delivery Index to Plan: Final Buy | Delivery Index to Plan: Post Buy | Post vs Final |
|---|---|---|---|---|---|---|---|---|
| Morning | 0.0 | 0.0 | 0.0 | 0.0 | - | - | - | - |
| Daytime | 0.0 | 0.0 | 3.4 | 1.3 | - | - | - | 38.24% |
| Early Fringe | 213.9 | 213.9 | 189.8 | 156.6 | 100.0% | 88.7% | 73.2% | 82.51% |
| Early News | 258.9 | 245.4 | 69.1 | 80.1 | 94.8% | 26.7% | 30.9% | 115.92% |
| Prime Access | 153.5 | 159.9 | 123.9 | 70.1 | 104.2% | 80.7% | 45.7% | 56.58% |
| Prime | 133.6 | 145.1 | 171.5 | 117.2 | 108.6% | 128.4% | 87.7% | 68.34% |
| Late News | 48.5 | 51.7 | 58.3 | 43.3 | 106.6% | 120.2% | 89.3% | 74.27% |
| Late News Repeat | 0.0 | 0.0 | 1.5 | 0.4 | - | - | - | 26.67% |
| Late Fringe | 164.9 | 167.7 | 145.2 | 125.8 | 101.7% | 88.1% | 76.3% | 86.64% |
| Weekend | 0.0 | 12.2 | 0.0 | 0.0 | - | - | - | - |
| Sports | 37.0 | 15.0 | 30.7 | 16.4 | 40.5% | 83.0% | 44.3% | 53.42% |
| Unspecified | 0.0 | 0.0 | 0.0 | 104.3 | - | - | - | - |
| Bonus | 0.0 | 0.0 | 0.0 | 0.0 | - | - | - | - |
| Credit | 0.0 | 0.0 | 0.0 | 0.0 | - | - | - | - |
| ROS | 5.0 | 5.0 | 169.4 | 139.1 | 100.0% | 3388.0% | 2782.0% | 82.11% |
| Totals: | 1015.3 | 1015.9 | 962.8 | 854.6 | 100.1% | 94.8% | 84.2% | 88.76% |

Stewardship Analysis

| Station | Affiliate | Plan $'s | Original $'s | Final $'s | Affidavit $'s | Posted $'s | Remitted $'s |
|---|---|---|---|---|---|---|---|
| WBFS | IND | | $48,575.00 | $48,555.00 | $48,500.00 | $48,550.00 | - |
| WBZL | IND | | $22,750.00 | $22,750.00 | $22,750.00 | $22,750.00 | - |
| WFOR | CBS | | $7,950.00 | $7,900.00 | $7,900.00 | $7,900.00 | - |
| WPLG | ABC | | $15,400.00 | $11,800.00 | $15,900.00 | $11,800.00 | - |
| WSVN | FOX | | $119,800.00 | $121,400.00 | $121,400.00 | $121,400.00 | - |
| WTVJ | NBC | | $32,900.00 | $31,000.00 | $31,000.00 | $31,000.00 | - |
| Totals | | $250,425.00 | $247,375.00 | $243,405.00 | $247,450.00 | $243,400.00 | $0.00 |
| % of Plan | | | 98.8% | 97.2% | 98.8% | 97.2% | |
| CPPs | | $246.65 | $243.50 | $252.81 | | $284.81 | |
| CPP vs Plan | | | 98.7% | 102.5% | | 115.5% | |

Figure 50

Daypart Average Rating Analysis

Client:
DMA: MIAMI-FT. LAUDERDALE
Demo: A1849
Quarter: 4Q01

| Daypart: | EM | DT | EF | EN | PA | PR | LN | LF |
|---|---|---|---|---|---|---|---|---|
| Final Ratings Estimate | - | 1.7 | 2.0 | 1.3 | 3.3 | 3.4 | 2.4 | 1.5 |
| Posted Rating | - | 0.7 | 1.9 | 1.7 | 2.4 | 2.6 | 2.1 | 1.4 |
| NSI Average Rating | 1.0 | 0.8 | 1.2 | 2.4 | 2.1 | 2.5 | 2.8 | 0.9 |

| Daypart: | EM | DT | EF | EN | PA | PR | LN | LF |
|---|---|---|---|---|---|---|---|---|
| Index: Final to Daypart Average | - | 212.5% | 166.7% | 54.2% | 157.1% | 136.0% | 85.7% | 166.7% |
| Index: Posted to Daypart Average | - | 87.5% | 158.3% | 70.8% | 114.3% | 104.0% | 75.0% | 155.6% |

Figure 51

Daypart Cost per Point Analysis

Final Buy vs. Posted vs. SQAD

Client:

DMA: MIAMI-FT. LAUDERDALE

Demo: A1849

Quarter: 4Q01

AOR:

Length: 30

Factor: 100 %

| Cost/Points (Gross) | EM | DT | EF | EN | PA | PR | LN | LF |
|---|---|---|---|---|---|---|---|---|
| Final Buy | - | - | $181.64 | $272.07 | $309.93 | $363.27 | $317.32 | $175.14 |
| Posted | - | - | $202.43 | $216.60 | $429.39 | $498.51 | $404.16 | $192.21 |
| SQAD | $217.00 | $274.00 | $344.00 | $410.00 | $492.00 | $845.00 | $572.00 | $293.00 |

| Index to SQAD (L) | EM | DT | EF | EN | PA | PR | LN | LF |
|---|---|---|---|---|---|---|---|---|
| Final Buy | - | - | 52.8% | 66.4% | 63.0% | 43.0% | 55.5% | 59.8% |
| Posted | - | - | 58.8% | 52.8% | 87.3% | 59.0% | 70.7% | 65.6% |

Figure 52

Detailed Under Delivery(UD) Restitution Tracking Analysis

Client AOR

Demo A1849 Date

Quarter 4Q01

| | Station | Final Purchased TRPs | Posted Delivery TRPs | Posted Delivery Index | TRPs Owed | Restitution TRPs Posted | Revised Post Index | Balance TRPs Owed |
|---|---|---|---|---|---|---|---|---|
| MIAMI-FT. LAUDERDALE | | 962.8 | 854.6 | 88.8% | 70.2 | 0.0 | 88.8% | |
| | WBFS | 263.6 | 185.7 | 70.4% | 51.5 | 0.0 | 70.4% | 51.5 |
| | WBZL | 101.0 | 103.4 | 102.4% | 0.0 | 0.0 | 102.4% | 0.0 |
| | WFOR | 25.1 | 25.1 | 100.0% | 0.0 | 0.0 | 100.0% | 0.0 |
| | WPLG | 38.0 | 48.7 | 128.2% | 0.0 | 0.0 | 128.2% | 0.0 |
| | WSVN | 418.9 | 405.8 | 96.9% | 0.0 | 0.0 | 96.9% | 0.0 |
| | WTVJ | 116.2 | 85.9 | 73.9% | 18.7 | 0.0 | 73.9% | 18.7 |

| | |
|---|---|
| Value Owed | $17,747.23 |
| Value Received | $0.00 |
| Balance | $17,747.23 |

DMA Purchased CPP $252.81

Figure 53

AAAA Inc.
West Palm Beach-Ft. Pierce

Daypart Management vs. Plan

- EF daypart at 44.8% vs. Plan
- PA daypart at 75.2% vs. Plan
- PR daypart at 89.0% vs. Plan
- LN daypart at 39.3% vs. Plan
- LF daypart at 56.6% vs. Plan
- ROS daypart at 239.3% vs. Plan

- Cost/Point Management
  - LN and LF cost per points not efficient relative to the average ratings posted Sample Audit 4Q01 CIRCLE AUDIT Figure 54 20

AAAA Inc.
West Palm Beach-Ft. Pierce

- Value of Unspecified TRPs $8,352.25
- Value of UD Restitution $10,134.37
- Buying Guideline Issues
  - ROS not an approved daypart
  - Daypart Coding Changes
    - EF to EN
    - EN to PA
    - EN to EF
    - PA to ROS Sample Audit 4Q01 CIRCLE AUDIT

Figure 55

AAAA Inc.
West Palm Beach-Ft. Pierce

– Prime to post to a minimum of 100% of planned TRPs

- Post vs Plan 89.0%
- Post vs Final 88.3%

Sample Audit 4Q01 CIRCLE AUDIT Figure 56 22

Market Analysis

Client: DMA: WEST PALM BEACH-FT. PIERCE

AOR: Demo: A1849 Quarter: 4Q01

Daypart Analysis

| | Estimated A1849 TRPs | | | | Delivery Index to Plan | | | |
|---|---|---|---|---|---|---|---|---|
| | Plan | Original Buy | Final Buy | Post Buy | Original Buy | Final Buy | Post Buy | Post vs Final |
| Morning | 0.0 | 0.0 | 0.0 | 0.0 | - | - | - | - |
| Daytime | 0.0 | 0.0 | 0.0 | 0.0 | - | - | - | - |
| Early Fringe | 262.4 | 262.4 | 203.1 | 117.6 | 100.0% | 77.4% | 44.8% | 57.90% |
| Early News | 279.8 | 279.8 | 281.1 | 270.2 | 100.0% | 100.5% | 96.6% | 96.12% |
| Prime Access | 190.7 | 190.7 | 173.0 | 143.5 | 100.0% | 90.7% | 75.2% | 82.95% |
| Prime | 135.7 | 135.7 | 136.8 | 120.8 | 100.0% | 100.8% | 89.0% | 88.30% |
| Late News | 57.2 | 57.2 | 61.3 | 22.5 | 100.0% | 107.2% | 39.3% | 36.70% |
| Late News Repeat | 0.0 | 0.0 | 0.0 | 0.0 | - | - | - | - |
| Late Fringe | 193.4 | 187.8 | 166.8 | 109.5 | 97.1% | 86.2% | 56.6% | 65.65% |
| Weekend | 0.0 | 0.0 | 1.2 | 2.2 | - | - | - | 183.33% |
| Sports | 0.0 | 0.0 | 0.0 | 0.0 | - | - | - | - |
| Unspecified | 0.0 | 0.0 | 0.0 | 96.4 | - | - | - | - |
| Bonus | 0.0 | 0.0 | 0.0 | 0.0 | - | - | - | - |
| Credit | 0.0 | 0.0 | 0.0 | 0.0 | - | - | - | - |
| ROS | 16.8 | 16.8 | 38.0 | 40.2 | 100.0% | 226.2% | 239.3% | 105.79% |
| Totals: | 1136.0 | 1130.4 | 1061.3 | 922.9 | 99.5% | 93.4% | 81.2% | 86.96% |

Stewardship Analysis

| Station | Affiliate | Plan $'s | Original $'s | Final $'s | Affidavit $'s | Posted $'s | Remitted $'s |
|---|---|---|---|---|---|---|---|
| WFLX | FOX | | $32,950.00 | $32,100.00 | $32,100.00 | $32,100.00 | - |
| WPBF | ABC | | $11,135.00 | $10,960.00 | $10,960.00 | $10,960.00 | - |
| WPEC | CBS | | $17,450.00 | $17,450.00 | $17,450.00 | $17,450.00 | - |
| WPTV | NBC | | $31,075.00 | $30,400.00 | $30,400.00 | $30,400.00 | - |
| WTVX | IND | | $6,250.00 | $6,250.00 | $6,250.00 | $6,250.00 | - |
| Totals | | $98,860.00 | $98,860.00 | $97,160.00 | $97,160.00 | $97,160.00 | $0.00 |
| | % of Plan | | 100.0% | 98.3% | 98.3% | 98.3% | |
| | CPPs | $87.02 | $87.46 | $91.55 | | $105.28 | |
| | CPP vs Plan | | 100.5% | 105.2% | | 121.0% | |

Figure 57

Daypart Average Rating Analysis

Client:

DMA: WEST PALM BEACH-FT. PIERCE

Demo: A1849

Quarter: 4Q01

| Daypart: | EM | DT | EF | EN | PA | PR | LN | LF |
|---|---|---|---|---|---|---|---|---|
| Final Ratings Estimate | - | - | 2.2 | 2.7 | 4.4 | 3.7 | 5.1 | 1.9 |
| Posted Rating | - | - | 1.3 | 2.6 | 3.7 | 3.7 | 3.2 | 1.3 |
| NSI Average Rating | 2.1 | 1.0 | 1.3 | 3.7 | 3.1 | 4.0 | 3.5 | 1.3 |

| Daypart: | EM | DT | EF | EN | PA | PR | LN | LF |
|---|---|---|---|---|---|---|---|---|
| Index: Final to Daypart Average | - | - | 169.2% | 73.0% | 141.9% | 92.5% | 145.7% | 146.2% |
| Index: Posted to Daypart Average | - | - | 100.0% | 70.3% | 119.4% | 92.5% | 91.4% | 100.0% |

Figure 58

Daypart Cost per Point Analysis

Final Buy vs. Posted vs. SQAD

| | | | |
|---|---|---|---|
| **Client:** | | **AOR:** | |
| **DMA:** | WEST PALM BEACH-FT. PIERCE | **Length:** | 30 |
| **Demo:** | A1849 | **Factor:** | 100 % |
| **Quarter:** | 4Q01 | | |

| **Cost/Points (Gross)** | EM | DT | EF | EN | PA | PR | LN | LF |
|---|---|---|---|---|---|---|---|---|
| Final Buy | - | - | $51.75 | $109.21 | $91.91 | $158.81 | $87.28 | $62.50 |
| Posted | - | - | $86.18 | $112.32 | $110.80 | $158.32 | $132.22 | $92.47 |
| SQAD | $86.00 | $86.00 | $73.00 | $151.00 | $125.00 | $179.00 | $124.00 | $77.00 |

| **Index to SQAD (L)** | EM | DT | EF | EN | PA | PR | LN | LF |
|---|---|---|---|---|---|---|---|---|
| Final Buy | - | - | 70.9% | 72.3% | 73.5% | 88.7% | 70.4% | 81.2% |
| Posted | - | - | 118.1% | 74.4% | 88.6% | 88.4% | 106.6% | 120.1% |

Figure 59

Detailed Under Delivery(UD) Restitution Tracking Analysis

Client | AOR

Demo A1849 | Date

Quarter 4Q01

| | Station | Final Purchased TRPs | Posted Delivery TRPs | Posted Delivery Index | TRPs Owed | Restitution TRPs Posted | Revised Post Index | Balance TRPs Owed |
|---|---|---|---|---|---|---|---|---|
| WEST PALM BEACH-FT. PIERCE | | 1081.3 | 922.9 | 87.0% | 75.5 | 110.7 | 97.4% | |
| | WFLX | 368.5 | 305.4 | 83.3% | 24.5 | 33.1 | 92.4% | 0.0 |
| | WPBF | 128.0 | 104.6 | 81.7% | 10.6 | 7.0 | 87.2% | 3.6 |
| | WPEC | 189.0 | 213.3 | 112.9% | 0.0 | 0.0 | 112.9% | 0.0 |
| | WPTV | 272.6 | 222.9 | 81.8% | 22.4 | 31.9 | 93.5% | 0.0 |
| | WTVX | 105.2 | 76.7 | 72.9% | 18.0 | 38.7 | 108.7% | 0.0 |

| | |
|---|---|
| Value Owed | $6,911.88 |
| Value Received | $10,134.37 |
| Balance | $0.00 |

DMA Purchased CPP $91.55

Page 2 of 2

Figure 60

Observations & Trends

- Client approved daypart definitions and acceptable daypart substitutions were provided by agency
  - Daypart coding varied by market
- Program and day restrictions were provided to MMI in written form
  - Day rotations should reflect a W-SA schedule
  - Sports were not to be purchased against the target of A18-49
  - Exceptions were made to the above if the spots were n/c or bonus
- No-charge spots were secured in all markets
- *Final Buys were provided to MMI in rerated form. By rerating, the buyer is adjusting program ratings from that which was originally negotiated with the station affecting your posted delivery vs. final buy*

Sample Audit 4Q01 CIRCLE AUDIT 23

Figure 61

Observations & Trends

- Both markets audited are metered markets. Posted delivery vs Plan for those markets ranged from 86.9% (West Palm Beach) to 88.7% (Miami)
- Based on a system average CPP by Daypart Vs. Low SQAD, the agency delivered a posted CPP indexing from 63.6% (Early News) to 92.8% (Late Fringe)

Figure 62

DMA Daypart Cost per Point Analysis

Posted vs SQAD Recap

Client: AOR:

Demo: A1849 Length: 30

Quarter: 4Q01 Factor: 100 %

| DMA | Index to SQAD | EM | DT | EF | EN | PA | PR | LN | LF |
|---|---|---|---|---|---|---|---|---|---|
| MIAMI-FT. LAUDERDALE | L | - | - | 58.8% | 52.8% | 87.3% | 59.0% | 70.7% | 65.6% |
| WEST PALM BEACH-FT. PIERCE | L | - | - | 118.1% | 74.4% | 88.6% | 88.4% | 106.6% | 120.1% |
| | System Average vs. SQAD | - | - | 88.5% | 63.6% | 88.0% | 73.7% | 88.6% | 92.8% |

Figure 63

Multi Quarter (1Q01-4Q01) Under Delivery Recap

- Miami-Ft. Lauderdale
  - TRPs Owed 314.6
  - TRPs Recovered 179.9
  - TRPs Due 134.7
  - Value of Restitution TRPs Due $30,665.56

- West Palm Beach-Ft. Pierce
  - TRPs Owed 178.9
  - TRPs Recovered 272.0
  - TRPs Due 0.0
  - Value of Restitution TRPs Due $0.00

Sample Audit 4Q01 CIRCLE AUDIT 25

Figure 64

Multi DMA Under Delivery(UD) Restitution Tracking Analysis

Client | AOR
Demo A1849 | Date
Quarters 1Q01 - 4Q01

| DMA | Posted Gross $s | Final Purchased TRPs | Posted Delivery TRPs | Posted Delivery Index | TRPs Owed | Restitution TRPs Posted | Revised Post Index |
|---|---|---|---|---|---|---|---|
| MIAMI-FT. LAUDERDALE | $901,440.00 | 4978.6 | 4366.7 | 87.7% | 314.6 | 179.9 | 91.3% |
| WEST PALM BEACH-FT. PIERCE | $383,105.00 | 5480.7 | 5124.4 | 93.5% | 178.9 | 272.0 | 98.5% |
| Total: | $1,284,545.00 | | | | | | |

Figure 65

Detailed Under Delivery(UD) Restitution Tracking Analysis

Client | AOR
Demo A1849 | Date
Quarters 1Q01 - 4Q01

| | Station | Final Purchased TRPs | Posted Delivery TRPs | Posted Delivery Index | TRPs Owed | Restitution TRPs Posted | Revised Post Index | Balance TRPs Owed |
|---|---|---|---|---|---|---|---|---|
| MIAMI-FT. LAUDERDALE | | 4978.6 | 4366.7 | 87.7% | 314.6 | 179.9 | 91.3% | |
| | WBFS | 1039.2 | 932.7 | 89.8% | 87.3 | 27.8 | 92.4% | 59.5 |
| | WBZL | 728.1 | 651.7 | 89.5% | 16.1 | 11.0 | 91.0% | 5.1 |
| | WFOR | 343.3 | 273.4 | 79.6% | 38.2 | 44.5 | 92.6% | 0.0 |
| | WPLG | 319.7 | 278.3 | 87.1% | 34.2 | 16.0 | 92.1% | 18.2 |
| | WSVN | 1845.1 | 1707.7 | 92.6% | 21.6 | 33.3 | 94.4% | 0.0 |
| | WTVJ | 703.2 | 522.9 | 74.4% | 117.2 | 47.3 | 81.1% | 69.9 |

| | |
|---|---|
| Value Owed | $69,887.85 |
| Value Received | $39,222.29 |
| Balance | $30,665.56 |

Page 1 of 2

Figure 66

Detailed Under Delivery(UD) Restitution Tracking Analysis

Client AOR

Demo A1849 Date

Quarters 1Q01 - 4Q01

| | Station | Final Purchased TRPs | Posted Delivery TRPs | Posted Delivery Index | TRPs Owed | Restitution TRPs Posted | Revised Post Index | Balance TRPs Owed |
|---|---|---|---|---|---|---|---|---|
| WEST PALM BEACH-FT. PIERCE | | 5480.7 | 5124.4 | 93.5% | 178.9 | 272.0 | 98.5% | |
| | WFLX | 1703.6 | 1694.7 | 99.5% | 31.6 | 40.2 | 101.8% | 0.0 |
| | WPBF | 514.4 | 455.2 | 88.5% | 24.9 | 23.1 | 93.0% | 3.6 |
| | WPEC | 478.2 | 480.1 | 100.4% | 24.0 | 80.1 | 117.1% | 0.0 |
| | WPTV | 2070.9 | 1928.1 | 93.1% | 22.4 | 31.9 | 94.6% | 0.0 |
| | WTVX | 713.6 | 566.3 | 79.4% | 76.0 | 96.7 | 92.9% | 0.0 |

| | |
|---|---|
| Value Owed | $16,193.62 |
| Value Received | $25,728.74 |
| Balance | $0.00 |

Page 2 of 2

Figure 67

Recommendations

- Define acceptable rotations (horizontal/vertical)
  - Credits and makegoods due to rotation
- Develop timeline for recovery of Under Delivery Restitution and handling of stations that do not provide restitution in a timely manner
- Define restricted programming
- Use of rerated buys
- Daypart management by buyers that includes coding and acceptable makegood policies within the daypart purchased as well as in substitution dayparts
  - Early Fringe vs Prime Access
  - Prime Access vs Prime
  - Late Fringe vs Prime
  - Early Fringe vs Weekend

Figure 68

Print

Figure 69

APPENDIX B

Print

- Brand analyses provided for all April, May, and June insertions in
  - 31 consumer publications
  - 2 Hispanic magazines
  - 3 car enthusiast magazines
  - 3 nurse publications
  - 1 Auto Show Program
  - 1 sports sponsorship publication

Brand Analysis

- print ads are analyzed to verify that ads ran as ordered
- All discrepancies are noted on the following pages
- Total gross value of ads with print discrepancies:

$1,127,249 (25.0% of spending)

Brand Analysis

- Compared insertion orders to ads "as run" in checking copies of issues and publication invoices
  - All creative unit sizes ran as ordered except
    - Automotive News, 5/12 Gross Cost: $14,778
      - "Smart Stock" creative ran as B/W not 4C as ordered
      - Also in this issue, competitive ads ( and ) appeared within 6 pages of ad

Brand Analysis

- All creative ad copy ran as ordered except
  - AJN, June Gross Cost: $16,530
  - Nursing, June Gross Cost: $18,830
    - HMA ads in both pubs ran with "One Taken Care of" creative not "Call Button" as ordered

Brand Analysis

- Compared requested and/or guaranteed ad positions as indicated on insertion orders
  - All were met with the following exceptions
    - Car & Driver, April Gross cost: $90,176
      - ad appeared on LHP, not RHP as ordered
      - Also in this issue, competitive ad ( ) appeared within 6 pages of ad 2Q03 Figure 74 58

Brand Analysis

- Exceptions (cont'd)
  - Men's Health, April Gross cost: $77,527
    - ad did not appear in Malegrams; appeared opposite Editor's column
  - Motor Trend, April Gross cost: $76,293
    - ad did not appear on page 61 opposite "Firsts"; appeared on page 27 opposite Editor's column
    - Also in this issue competitive ads ( ) appeared within 6 pages of ad

Brand Analysis

– Exceptions (cont'd)

- Smithsonian, April Gross cost: $62,088
  - ad did not appear in Mall section as ordered; appeared in Points of Interest
- This Old House, April Gross cost: $41,433
  - ad did not appear in Luxuries or By Design as ordered; appeared in Upkeep

Brand Analysis

– Exceptions (cont'd)
- Car & Driver, May Gross cost: $90,176
  – ad did not appear in 1st 50% of book as ordered; appeared on page 155 out 184 (84%)
  – Also in this issue, competitive ad ( ) appeared within 12 pages of ad
- Motor Trend SUV Guide, May Gross cost: $15,326
  – ad did not appear in 1st 30% of book as ordered; appeared on page 50 out 128 (39%)

2Q03 Figure 77 61

Brand Analysis

– Exceptions (cont'd)
- Southern Living, May

Gross cost: $75,465

– ad did not appear in 1st 25% of book as ordered; appeared on page 85 out of 220 (39%)
- Sports Illustrated, May Gross cost: $137,860

– ad did not appear in Inside Columns as ordered; appeared in Book Excerpt

Brand Analysis

- Exceptions (cont'd)
  - This Old House, May Gross cost: $41,433
    - ad did not appear in Luxuries or By Design; appeared in Finances
  - Car & Driver, June Gross cost: $90,176
    - ad did not appear in 1st 50% of book as ordered; appeared on page 107 out 188 (57%)
    - Also in this issue, competitive ads ( ) appeared within 6 pages of ad

Brand Analysis

- Exceptions (cont'd)
  - Motor Trend, June Gross cost: $76,293
    - ad did not appear opposite TOC as ordered; appeared in Road Tests on page 115
    - Also in this issue, competitive ads ( ) appeared within 6 pages of ad
  - Smithsonian, June Gross cost: $62,088
    - ad did not appear in Mall as ordered; appeared in Object at Hand

Brand Analysis

- All issues were examined for competitive advertising separation requirements as indicated on the insertion orders
  - Brand Analysis indicates CPPV (competitive page placement violation) when requirements fall short

Brand Analysis

- All were met with the following exceptions
  - Motor Trend, May Gross cost: $76,293
    - Competitive ads ( ) appeared within 6 pages of ad
  - Golf Magazine, June Gross cost: $64,484
    - Competitive ad ( ) appeared within 6 pages of ad

Brand Publication Analysis

Client: Agency:

Brand:

| | | | | | | | |
|---|---|---|---|---|---|---|---|
| Cost Data | Insertion Order: | $14,050.50 | Publication: | American Journal of Nursing | Purchased Gross Circ. (000's): | 338.8 |
| | Billed to Client: | $14,050.50 | Month: | 4/2003 | Page Placement: | 10 |
| | Invoiced Amount: | $14,050.50 | Insertion Date: | Apr 1 2003 | Page Size: | Full Page |
| | Purchased CPM: | $41.47 | Audited: | ☑ | Color: | 4 Color Bleed |
| | | | | | Tearsheet: | ☑ |

Competitive Review

| Brand(s) | Page Placement | Headline |
|---|---|---|

Notes 128 total pages.

Figure 83

Brand Publication Analysis

Client: Agency:

Brand:

| | | | | | | |
|---|---|---|---|---|---|---|
| **Cost Data** | **Insertion Order:** $12,082.75 | | **Publication:** Army Navy Times | | **Purchased Gross Circ. (000's):** 242.0 | |
| | **Billed to Client:** $12,082.75 | | **Month:** 4/2003 | | **Page Placement:** Cover 3 | |
| | **Invoiced Amount:** $12,082.63 | | **Insertion Date:** Apr 14 2003 | | **Page Size:** Tab Page | |
| | **Purchased CPM:** $49.93 | | **Audited:** ☑ | | **Color:** 4 Color Bleed | |
| | | | | | **Tearsheet:** ☑ | |

Competitive Review

| Brand(s) | Page Placement | Headline |
|---|---|---|
| | 17 | Operation: Throw you back |

·Notes 54 total pages.

Figure 84

Brand Publication Analysis

Client: Agency:

Brand:

| | | | | | | | |
|---|---|---|---|---|---|---|---|
| **Cost Data** | **Insertion Order:** | $2,975.00 | **Publication:** | Automundo | **Purchased Gross Circ. (000's):** | 55.0 |
| | **Billed to Client:** | $2,975.00 | **Month:** | 4/2003 | **Page Placement:** | Cover 3 |
| | **Invoiced Amount:** | $2,976.00 | **Insertion Date:** | Apr 1 2003 | **Page Size:** | Full Page |
| | **Purchased CPM:** | $54.09 | **Audited:** | ☑ | **Color:** | 4 Color Bleed |
| | | | | | **Tearsheet:** | ☑ |

Competitive Review

| Brand(s) | Page Placement | Headline |
|---|---|---|
| | Cover 4 | De' vuelta cuando |
| | 20 | El tanque lleno |
| | Cover 2 | Juntos pero no revueltos. |
| | 15 | Ser Papas Hoy |

Notes 38 total pages.

Page 3 of 21

Figure 85

Brand Publication Analysis

Client: Agency:

Brand:

| | | | | | | | |
|---|---|---|---|---|---|---|---|
| **Cost Data** | **Insertion Order:** | $76,649.60 | **Publication:** | Car & Driver | **Purchased Gross Circ. (000's):** | 1350.0 |
| | **Billed to Client:** | $76,649.60 | **Month:** | 4/2003 | **Page Placement:** | 12 |
| | **Invoiced Amount:** | $76,649.60 | **Insertion Date:** | Apr 1 2003 | **Page Size:** | Full Page |
| | **Purchased CPM:** | $56.78 | **Audited:** | ☑ | **Color:** | 4 Color Bleed |
| | | | | | **Tearsheet:** | ☑ |

Competitive Review

| Brand(s) | Page Placement | | Headline |
|---|---|---|---|
| | 33 | | Nothing can keep up |
| | 4 | | |
| | 120 | | You've heard of mountain |
| | 14 | (CPPV) | Best. Best. Best. |
| | 66 | | Buff. In the Buff. |
| | Cover 2 | | The tank is full. |
| | 42 | | Best Premium Sports |
| | 96 | | Burn rubber, not money. |
| | 78 | | European driving performance |
| | 82 | | Can a thousand horsepower |
| | 67 | | "ZZZZZZZZZZ" |
| | 153 | | About the brain |
| | 108 | | Sign up go with |
| | 128 | | Never confuse your net |
| | 40 | | The new |
| | 29 | | Der Neu |
| | Cover 4 | | The new |
| | 104 | | The all-new |

Notes Ad ran on LHP not RHP as ordered. 180 total pages.

CPPV - Competitive Page Placement Violation

Page 4 of 21

Figure 86

Brand Publication Analysis

| | |
|---|---|
| Cover 3 | Remember when driving |
| 136 | The |
| 90 | C'mon. C'mon. C'mon. |
| 48 | You're a dad. |
| 117 | Rise up and flee |
| 54 | Run It's the sport |

Notes Ad ran on LHP not RHP as ordered. 180 total pages.

CPPV - Competitive Page Placement Violation

Page 5 of 21

Figure 87

Brand Publication Analysis

Client: Agency:

Brand:

| | | | | | | |
|---|---|---|---|---|---|---|
| Cost Data | Insertion Order: | $35,002.15 | Publication: | Fast Company | Purchased Gross Circ. (000's): | 725.0 |
| | Billed to Client: | $35,002.15 | Month: | 4/2003 | Page Placement: | 80 |
| | Invoiced Amount: | $35,002.15 | Insertion Date: | Apr 1 2003 | Page Size: | Half Page Spread |
| | Purchased CPM: | $48.28 | Audited: | ☑ | Color: | 4 Color |
| | | | | | Tearsheet: | ☑ |

Competitive Review

| Brand(s) | Page Placement | Headline |
|---|---|---|
| | 20 | The 260 hp |
| | Cover 2 | |
| | 65 | Some are inspired by |
| | Cover 3 | Evil Twin included. |
| | 105 | "Anybody else in there?" |
| | 73 | There I was face to |
| | 94 | 302-hp best in class |
| | 49 | In this case, the |
| | 11 | Once you drive one, |
| | 40 | Introducing the new |
| | 32 | Pavement will always be |
| | 56 | The All-New |

Notes 122 total pages.

Page 6 of 21

Figure 88

Brand Publication Analysis

Client: Agency:

Brand:

| | | | | | | | |
|---|---|---|---|---|---|---|---|
| **Cost Data** | **Insertion Order:** | $54,811.40 | **Publication:** | Golf Magazine | **Purchased Gross Circ. (000's):** | 1400.0 |
| | **Billed to Client:** | $54,811.40 | **Month:** | 4/2003 | **Page Placement:** | 174 |
| | **Invoiced Amount:** | $54,811.40 | **Insertion Date:** | Apr 1 2003 | **Page Size:** | Half Page Spread |
| | **Purchased CPM:** | $39.15 | **Audited:** | ☑ | **Color:** | 4 Color |
| | | | | | **Tearsheet:** | ☑ |

Competitive Review

| Brand(s) | Page Placement | Headline |
|---|---|---|
| | 32 | The 260-hp : |
| | 212 | American's greatest car |
| | 163 | Break Through |
| | 197 | "Alone at Last." |
| | Cover 4 | Once you drive one, |
| | 58 | Introducing the new |
| | 11 | The four corners |

Notes 277 total pages.

Page 7 of 21

Figure 89

Brand Publication Analysis

Client: Agency:

Brand:

| | | | | | | | |
|---|---|---|---|---|---|---|---|
| Cost Data | Insertion Order: | $65,897.95 | Publication: | Men's Health | Purchased Gross Circ. (000's): | 1625.0 |
| | Billed to Client: | $65,897.78 | Month: | 4/2003 | Page Placement: | 23 |
| | Invoiced Amount: | $65,897.00 | Insertion Date: | Apr 1 2003 | Page Size: | Full Page |
| | Purchased CPM: | $40.55 | Audited: | ☑ | Color: | 4 Color Bleed |
| | | | | | Tearsheet: | ☑ |

Competitive Review

| Brand(s) | Page Placement | Headline |
|---|---|---|
| | 75 | The 200-hp, 6 speed |
| | 47 | Evil Twin Included. |
| | Cover 4 | Up here, the vehicle |
| | 2 | Sign up go with |
| | 67 | In this case, the |
| | 56 | Makes everything else |
| | 111 | Earthshaking power. |
| | 101 | The 2003 |

Notes Did not run in Malegrams, ran opp. Editor's column. 172 total pages.

Page 8 of 21

Figure 90

Brand Publication Analysis

Client: Agency:
Brand:

| Cost Data | | | | | | |
|---|---|---|---|---|---|---|
| Insertion Order: | $64,849.05 | Publication: | Motor Trend | Purchased Gross Circ. (000's): | | 1250.0 |
| Billed to Client: | $64,849.05 | Month: | 4/2003 | Page Placement: | | 27 |
| Invoiced Amount: | $64,849.05 | Insertion Date: | Apr 1 2003 | Page Size: | Full Page | |
| Purchased CPM: | $51.88 | Audited: | ☑ | Color: | | 4 Color Bleed |
| | | | | Tearsheet: | | ☑ |

Competitive Review

| Brand(s) | Page Placement | | Headline |
|---|---|---|---|
| | 82 | | The 200-hp, 6 speed |
| | Cover 4 | | Nothing can keep up |
| | 132 | | |
| | 87 | | So much power, you |
| | Cover 2 | | The tank is full. |
| | 111 | | Best Premium Sports |
| | 55 | | Motor Trend Truck |
| | 68 | | The most horsepower |
| | Cover 3 | | During auto show season, |
| | 32 | (CPPV) | 270 watts. 6 speakers. |
| | 28 | (CPPV) | Renegade fearless unexpected |
| | 11 | | Uber Auto |
| | 57 | | The new |
| | 4 | | Remember when driving |
| | 76 | | The |
| | 20 | | The four corners |
| | 44 | | Your first-class |
| | 53 | | A "Best Buy" |

Notes Did not run on page 61 opp. "Firsts"; ran opposite Editor's column. 160 total pages.

CPPV - Competitive Page Placement Violation

Page 9 of 21

Figure 91

Brand Publication Analysis

| | |
|---|---|
| 65 | Slow and steady |
| 93 | Rise up and flee |

Notes Did not run on page 61 opp. "Firsts"; ran opposite Editor's column. 160 total pages.

CPPV - Competitive Page Placement Violation

Figure 92

Brand Publication Analysis

Client: Agency:

Brand:

| | | | | | | |
|---|---|---|---|---|---|---|
| **Cost Data** | **Insertion Order:** | $4,275.50 | **Publication:** | New York Auto Show | **Purchased Gross Circ. (000's):** | 5.0 |
| | **Billed to Client:** | $4,275.50 | **Month:** | 4/2003 | **Page Placement:** | 63 |
| | **Invoiced Amount:** | $4,275.50 | **Insertion Date:** | Apr 18 2003 | **Page Size:** | Full Page |
| | **Purchased CPM:** | $850.00 | **Audited:** | ☑ | **Color:** | 4 Color Bleed |
| | | | | | **Tearsheet:** | ☑ |

Competitive Review

| Brand(s) | Page Placement | Headline |
|---|---|---|
| | Cover 3 | Flip a switch and |
| | 18 | Land Shark. |
| | 6 | was here. |
| | 40 | This vehicle causes frequent |
| | 8 | Never has something |
| | 36 | Bold New Crew |
| | 10 | The arrives |
| | 31 | 2003 |
| | 21 | "Wish we'd thought of that". |
| | 2 | Side cargo doors. |
| | 12 | Different for the sake |
| | 15 | Introducing the all-new |
| | 75 | Come see concept |
| | 14 | Come see the |
| | 4 | Putting the world |
| | 67 (CPPV) | Chip. O'l block. |
| | 27 | |
| | 35 | The all-new |

Notes Received 1/3 page dealer listing at N/C. 144 total pages. No comp separation guarantee.

CPPV - Competitive Page Placement Violation

Page 11 of 21

Figure 93

Brand Publication Analysis

| | |
|---|---|
| Cover 2 | Turning the Auto Show |
| 49 | Seats up to five |
| 47 | Meet the car company |
| 22 | This is what happens |
| 55 | Here are few tips |
| 71 | Now available in extra |
| 51 | Six Brilliant ways to drive |
| Cover 2 | "Man! Have you seen |
| Cover 4 | Announcing our first |
| 16 | The voice in our head |

Notes Received 1/3 page dealer listing at N/C. 144 total pages. No comp separation guarantee.

CPPV - Competitive Page Placement Violation

Figure 94

Brand Publication Analysis

Client: Agency:

Brand:

| | | | | | | | |
|---|---|---|---|---|---|---|---|
| Cost Data | Insertion Order: | $17,945.20 | Publication: | New York Times | Purchased Gross Circ. (000's): | 1118.6 |
| | Billed to Client: | $17,945.20 | Month: | 4/2003 | Page Placement: | 11 |
| | Invoiced Amount: | $17,945.20 | Insertion Date: | Apr 16 2003 | Page Size: | 56 Column Inch |
| | Purchased CPM: | $16.04 | Audited: | ☑ | Color: | Black and White |
| | | | | | Tearsheet: | ☑ |

Competitive Review

| Brand(s) | Page Placement | Headline |
|---|---|---|

Notes NY Auto Show Section.

Page 13 of 21

Figure 95

Brand Publication Analysis

Client: Agency:

Brand:

| Cost Data | | | | | | |
|---|---|---|---|---|---|---|
| | Insertion Order: | $16,005.50 | Publication: | Nursing | Purchased Gross Circ. (000's): | 316.9 |
| | Billed to Client: | $16,005.50 | Month: | 4/2003 | Page Placement: | 13 |
| | Invoiced Amount: | $16,005.50 | Insertion Date: | Apr 1 2003 | Page Size: | Full Page |
| | Purchased CPM: | $50.51 | Audited: | ☑ | Color: | 4 Color Bleed |
| | | | | | Tearsheet: | ☑ |

Competitive Review

| Brand(s) | Page Placement | Headline |
|---|---|---|

Notes 96 total pages.

Page 14 of 21

Figure 96

Brand Publication Analysis

Client:

Agency:

Brand:

| | | | | | | |
|---|---|---|---|---|---|---|
| Cost Data | Insertion Order: | $109,012.50 | Publication: | People | Purchased Gross Circ. (000's): | 3350.0 |
| | Billed to Client: | $109,012.50 | Month: | 4/2003 | Page Placement: | 28 |
| | Invoiced Amount: | $109,012.50 | Insertion Date: | Apr 21 2003 | Page Size: | Half Page Spread |
| | Purchased CPM: | $32.54 | Audited: | ☑ | Color: | 4 Color |
| | | | | | Tearsheet: | ☑ |

Competitive Review

| Brand(s) | Page Placement | Headline |
|---|---|---|
| | 111 | Is there an award |
| | 86 | It's a bit of a |
| | 103 | joes Zero to |
| | 46 | Caution was not thrown |
| | 122 | V6 engine / Next |
| | 139 | Onlookers derive almost |
| | 86 | Run it's the sport |

Notes 152 total pages.

Page 15 of 21

Figure 97

Brand Publication Analysis

Client: Agency:

Brand:

| | | | | | | |
|---|---|---|---|---|---|---|
| **Cost Data** | **Insertion Order:** | $49,082.40 | **Publication:** | Real Simple | **Purchased Gross Circ. (000's):** | 1200.0 |
| | **Billed to Client:** | $49,082.40 | **Month:** | 4/2003 | **Page Placement:** | 54 |
| | **Invoiced Amount:** | $49,082.40 | **Insertion Date:** | Apr 1 2003 | **Page Size:** | Full Page |
| | **Purchased CPM:** | $40.90 | **Audited:** | ☑ | **Color:** | 4 Color Bleed |
| | | | | | **Tearsheet:** | ☑ |

Competitive Review

| Brand(s) | Page Placement | Headline |
|---|---|---|
| Chevy | Cover 4 | The |
| Kia | 147 | It will just look |
| Toyota | 117 | Get Noticed. |
| Toyota | 157 | Even those who |
| Volkswagen | 69 | Time to disappear. |

Notes 238 total pages.

Page 16 of 21

Figure 98

Brand Publication Analysis

Client:

Agency:

Brand:

| | | | | | | |
|---|---|---|---|---|---|---|
| Cost Data | Insertion Order: | $92,514.00 | Publication: | Shape Magazine | Purchased Gross Circ. (000's): | 1600.0 |
| | Billed to Client: | $92,514.00 | Month: | 4/2003 | Page Placement: | 8 |
| | Invoiced Amount: | $92,514.00 | Insertion Date: | Apr 1 2003 | Page Size: | Spread |
| | Purchased CPM: | $57,82 | Audited: | ☑ | Color: | 4 Color |
| | | | | | Tearsheet: | ☑ |

Competitive Review

| Brand(s) | Page Placement | Headline |
|---|---|---|
| | 50 | V6 engine/Next |
| | 34 | The New |

Notes 194 total pages.

Page 17 of 21

Figure 99

Brand Publication Analysis

Client: Agency:

Brand:

| | | | | | | |
|---|---|---|---|---|---|---|
| **Cost Data** | **Insertion Order:** | $52,774.80 | **Publication:** | Smithsonian | **Purchased Gross Circ. (000's):** | 2000.0 |
| | **Billed to Client:** | $52,774.80 | **Month:** | 4/2003 | **Page Placement:** | 32 |
| | **Invoiced Amount:** | $52,774.80 | **Insertion Date:** | Apr 1 2003 | **Page Size:** | Half Page Spread |
| | **Purchased CPM:** | $26.39 | **Audited:** | ☑ | **Color:** | 4 Color |
| | | | | | **Tearsheet:** | ☑ |

Competitive Review

| Brand(s) | Page Placement | Headline |
|---|---|---|
| | 48 | "3.5 Seconds Flat." |
| | Cover 4 | act #2: |

Notes 128 total pages. Ran in Points of Interest not Mall section.

Figure 100

Brand Publication Analysis

Client: Agency:

Brand:

| | | | | | | |
|---|---|---|---|---|---|---|
| **Cost Data** | **Insertion Order:** $117,181.00 | **Publication:** | Sports Illustrated | **Purchased Gross Circ. (000's):** | 3150.0 |
| | **Billed to Client:** $117,181.00 | **Month:** | 4/2003 | **Page Placement:** | 80 |
| | **Invoiced Amount:** $117,181.00 | **Insertion Date:** | Apr 7 2003 | **Page Size:** | Half Page Spread |
| | **Purchased CPM:** $37.20 | **Audited:** | ☑ | **Color:** | 4 Color |
| | | | | **Tearsheet:** | ☑ |

Competitive Review

| Brand(s) | Page Placement | Headline |
|---|---|---|
| | 20 | It's a bit of |
| | 29 | goes Zero to |
| | 83 | "Hey, That's Cheating." |
| | 31 | Imagine, A golf tournament |
| | 36 | And you thought March |
| | Cover 2 | The All-New |

Notes 92 total pages.

Figure 101

Brand Publication Analysis

Client: Agency:

Brand:

| | | | | | | |
|---|---|---|---|---|---|---|
| Cost Data | Insertion Order: | $42,313.85 | Publication: | Sunset Magazine | Purchased Gross Circ. (000's): | 1400.0 |
| | Billed to Client: | $42,313.85 | Month: | 4/2003 | Page Placement: | 46 |
| | Invoiced Amount: | $42,313.85 | Insertion Date: | Apr 1 2003 | Page Size: | Half Page Spread |
| | Purchased CPM: | $30.22 | Audited: | ☑ | Color: | 4 Color |
| | | | | | Tearsheet: | ☑ |

Competitive Review

| Brand(s) | Page Placement | Headline |
|---|---|---|
| | Cover 2 | Break Through |
| | 91 | Protection and Fun |
| | 34 | The |
| | 213 | Burn Rubber, Not Money. |
| | 147 | "Anybody else in there?" |
| | 23 | It will just look |
| | 13 | Run it's the sport |

Notes 212 total pages.

Page 20 of 21

Figure 102

Brand Publication Analysis

Client: Agency:

Brand:

| | | | | | | |
|---|---|---|---|---|---|---|
| **Cost Data** | **Insertion Order:** | $35,218.05 | **Publication:** | This Old House | **Purchased Gross Circ. (000's):** | 950.0 |
| | **Billed to Client:** | $35,217.88 | **Month:** | 4/2003 | **Page Placement:** | 42 |
| | **Invoiced Amount:** | $35,217.88 | **Insertion Date:** | Apr 1 2003 | **Page Size:** | Half Page Spread |
| | **Purchased CPM:** | $37.07 | **Audited:** | ☑ | **Color:** | 4 Color |
| | | | | | **Tearsheet:** | ☑ |

Competitive Review

| Brand(s) | Page Placement | Headline |
|---|---|---|
| | 66 | A Sledgehammer in |
| | 83 | Motor Trend ' |
| | 125 | Up here, the vehicle |
| | 27 | It will just look |
| | Cover 2 | Introducing the new |
| | Cover 4 | Find your oun road. |

Notes 154 total pages. Ran in Upkeep, not in Luxuries or By Design.

Page 21 of 21

Figure 103

Brand Publication Analysis

Client: Agency:

Brand:

| | | | | | | | |
|---|---|---|---|---|---|---|---|
| Cost Data | Insertion Order: | $14,050.50 | Publication: | American Journal of Nursing | Purchased Gross Circ. (000's): | | 338.8 |
| | Billed to Client: | $14,050.50 | Month: | 5/2003 | Page Placement: | | 10 |
| | Invoiced Amount: | $14,050.50 | Insertion Date: | May 1 2003 | Page Size: | Full Page | |
| | Purchased CPM: | $41.47 | Audited: | ☑ | Color: | | 4 Color Bleed |
| | | | | | Tearsheet: | | ☑ |

Competitive Review

| Brand(s) | Page Placement | Headline |
|---|---|---|

Notes 132 total pages

Page 1 of 27

Figure 104

Brand Publication Analysis

Client: Agency:

Brand:

| | | | | | | |
|---|---|---|---|---|---|---|
| Cost Data | Insertion Order: | $12,082.75 | Publication: | Army Navy Times | Purchased Gross Circ. (000's): | 242.0 |
| | Billed to Client: | $12,082.75 | Month: | 5/2003 | Page Placement: | Cover 3 |
| | Invoiced Amount: | $12,082.75 | Insertion Date: | May 5 2003 | Page Size: | Tab Page |
| | Purchased CPM: | $49.93 | Audited: | ☑ | Color: | 4 Color Bleed |
| | | | | | Tearsheet: | ☑ |

Competitive Review

| Brand(s) | Page Placement | Headline |
|---|---|---|
| | Cover 2 | Hauling, Towing and |

Notes 62 total pages

Page 2 of 27

Figure 105

Brand Publication Analysis

Client: Agency:

Brand:

| Cost Data | | | | | | |
|---|---|---|---|---|---|---|
| Insertion Order: | $12,561.30 | Publication: | Automotive News | Purchased Gross Circ. (000's): | | 80.0 |
| Billed to Client: | $12,561.05 | Month: | 5/2003 | Page Placement: | | 15 |
| Invoiced Amount: | $12,561.04 | Insertion Date: | May 12 2003 | Page Size: | Tab Page | |
| Purchased CPM: | $157.02 | Audited: | ☑ | Color: | | 4 Color Bleed |
| | | | | Tearsheet: | | ☑ |

Competitive Review

| Brand(s) | Page Placement | Headline |
|---|---|---|
| | 23 | Perfection . . . Achieved. |
| | 32 | 25 years, silver. 50 years |
| | 10 (CPPV) | With folks like |
| | 19 (CPPV) | It just makes sense |
| | 21 (CPPV) | You've made the |
| | Cover 3 | Boosting Mississippi's Economy. |
| | Cover 2 | would like |

Notes 52 total pages. "Smart Stock" creative is B/W, not 4/C.

CPPV - Competitive Page Placement Violation

Page 3 of 27

Figure 106

Brand Publication Analysis

Client: Agency:

Brand:

| | | | | | | | |
|---|---|---|---|---|---|---|---|
| **Cost Data** | **Insertion Order:** | $76,649.60 | **Publication:** | Car & Driver | **Purchased Gross Circ. (000's):** | 1350.0 |
| | **Billed to Client:** | $76,649.60 | **Month:** | 5/2003 | **Page Placement:** | 155 |
| | **Invoiced Amount:** | $76,649.60 | **Insertion Date:** | May 1 2003 | **Page Size:** | Full Page |
| | **Purchased CPM:** | $56.78 | **Audited:** | ☑ | **Color:** | 4 Color Bleed |
| | | | | | **Tearsheet:** | ☑ |

Competitive Review

| Brand(s) | Page Placement | Headline |
|---|---|---|
| | Cover 4 | Introducing the |
| | 26 | Every boy becomes a |
| | 57 | Break Through |
| | 8 | Break Through |
| | Cover 2 | Break Through |
| | 43 | Of course the last |
| | 79 | We'll be there. |
| | Cover 3 | The new ! |
| | 85 | "Fits like a glove". |
| | 90 | And they don't know. |
| | 149 (CPPV) | When commuting to |
| | 100 | VVT-I. Or why padded |
| | 41 | Stimulas the new V8 |
| | 30 | Security. Unlike any |
| | 74 | Remember when driving |
| | 108 | Message Board |
| | 62 | Take a ride in |
| | 49 | Recharged Reinvigorated |

Notes 184 total pages. Did not appear in 1st 60% of book.

CPPV - Competitive Page Placement Violation

Page 4 of 27

Figure 107

Brand Publication Analysis

| | |
|---|---|
| 12 | If you're going to |
| 89 | Welcome to the state |
| 2 | "Control your power |
| 128 | A "Best Buy" |
| 4 | Not everyone was qualified |

Notes 184 total pages. Did not appear in 1st 50% of book.

CPPV - Competitive Page Placement Violation

Page 5 of 27

Figure 108

Brand Publication Analysis

Client:

Agency:

Brand:

| | | | | | | |
|---|---|---|---|---|---|---|
| Cost Data | Insertion Order: | $63,071.87 | Publication: | Entertainment Weekly | Purchased Gross Circ. (000's): | 1600.0 |
| | Billed to Client: | $63,071.87 | Month: | 5/2003 | Page Placement: | 106 |
| | Invoiced Amount: | $63,071.87 | Insertion Date: | May 9 2003 | Page Size: | Half Page Spread |
| | Purchased CPM: | $39.42 | Audited: | ☑ | Color: | 4 Color |
| | | | | | Tearsheet: | ☑ |

Competitive Review

| Brand(s) | Page Placement | Headline |
|---|---|---|
| | Cover 2 | Introducing the |
| | 44 | 3 straight years, |
| | 77 | They don't make cars |
| | 60 | Find out why a |
| | 69 | Global Exteremes: |
| | Cover 4 | 43 MPG. Translation: |

Notes 119 total pages.

Page 6 of 27

Figure 109

Brand Publication Analysis

Client:

Agency:

Brand:

| | | | | | | |
|---|---|---|---|---|---|---|
| Cost Data | Insertion Order: | $70,745.50 | Publication: | ESPN | Purchased Gross Circ. (000's): | 1650.0 |
| | Billed to Client: | $70,745.50 | Month: | 5/2003 | Page Placement: | 112 |
| | Invoiced Amount: | $70,745.50 | Insertion Date: | May 12 2003 | Page Size: | Half Page Spread |
| | Purchased CPM: | $42.88 | Audited: | ☑ | Color: | 4 Color |
| | | | | | Tearsheet: | ☑ |

Competitive Review

| Brand(s) | Page Placement | Headline |
|---|---|---|
| | 62 | Motor Trend Truck of |
| | 42 | 100 years of attitude. |
| | 75 | Every day of the week |
| | 53 | About this brain |
| | 94 | The new ! |
| | 8 | Hauling, towing and |
| | Cover 2 | A rush, hour after hour. |
| | 26 | Rise up and flee |

Notes 120 total pages.

Page 7 of 27

Figure 110

Brand Publication Analysis

Client: Agency:

Brand:

| | | | | | | |
|---|---|---|---|---|---|---|
| **Cost Data** | **Insertion Order:** $21,848.40 | **Publication:** | FHM | **Purchased Gross Circ. (000's):** | | 1100.0 |
| | **Billed to Client:** $21,848.40 | **Month:** | 5/2003 | **Page Placement:** | | 72 |
| | **Invoiced Amount:** $21,848.00 | **Insertion Date:** | May 1 2003 | **Page Size:** | Half Page Spread | |
| | **Purchased CPM:** $19.86 | **Audited:** | ☑ | **Color:** | | 4 Color |
| | | | | **Tearsheet:** | | ☑ |

Competitive Review

| Brand(s) | Page Placement | Headline |
|---|---|---|
| | 43 | European driving performance |
| | 20 | Hauling, towing and |
| | Cover 2 | C'mon. C'mon. C'mon |
| | 10 | Rise up and flee |

Notes 168 total pages

Page 8 of 27

Figure 111

Brand Publication Analysis

Client: Agency:

Brand:

| | | | | | | |
|---|---|---|---|---|---|---|
| Cost Data | Insertion Order: | $425.00 | Publication: | Goal Magazine | Purchased Gross Circ. (000's): | 30.0 |
| | Billed to Client: | $425.00 | Month: | 5/2003 | Page Placement: | 37 |
| | Invoiced Amount: | $425.00 | Insertion Date: | May 1 2003 | Page Size: | Standard Page |
| | Purchased CPM: | $14.17 | Audited: | ☑ | Color: | 4 Color Bleed |
| | | | | | Tearsheet: | ☑ |

Competitive Review

| Brand(s) | Page Placement | Headline |
|---|---|---|

Notes 54 total pages

Page 9 of 27

Figure 112

Brand Publication Analysis

Client: Agency:

Brand:

| Cost Data | | | | | | |
|---|---|---|---|---|---|---|
| Insertion Order: | $55,777.00 | Publication: | Instyle | Purchased Gross Circ. (000's): | 1600.0 |
| Billed to Client: | $55,777.00 | Month: | 5/2003 | Page Placement: | 268 |
| Invoiced Amount: | $55,777.00 | Insertion Date: | May 1 2003 | Page Size: | Half Page Spread |
| Purchased CPM: | $34.86 | Audited: | ☑ | Color: | 4 Color |
| | | | | Tearsheet: | ☑ |

Competitive Review

| Brand(s) | Page Placement | Headline |
|---|---|---|
| | 198 | Introducing the |
| | 285 | We'll be there, |
| | 305 | The |
| | 382 | The I |
| | 392 | The 215-horsepower |
| | 412 | Bright Lights. Superstar |
| | 328 | Burn Rubber, Not Money. |
| | 335 | Every day of the week |
| | 32 | Have we gotten ahead |
| | 420 | V6 engine / Next generation |
| | 375 | When commuting to |
| | Cover 3 | The new discovery. |
| | 135 | Attento Italia |
| | 277 | THX certified sound. |
| | 158 | Style. Unlike any other |
| | 232 | Remember when driving |
| | 258 | 2003 |
| | 46 | Welcome to the state |

Notes 458 total pages.

Page 10 of 27

Figure 113

Brand Publication Analysis

241 The 2003

Notes 458 total pages.

Page 11 of 27

Figure 114

Brand Publication Analysis

Client: Agency:

Brand:

| | | | | | | | |
|---|---|---|---|---|---|---|---|
| **Cost Data** | **Insertion Order:** | $35,335.35 | **Publication:** | Marie Claire | **Purchased Gross Circ. (000's):** | 875.0 |
| | **Billed to Client:** | $35,335.35 | **Month:** | 5/2003 | **Page Placement:** | 86 |
| | **Invoiced Amount:** | $35,335.35 | **Insertion Date:** | May 1 2003 | **Page Size:** | Full Page |
| | **Purchased CPM:** | $40.38 | **Audited:** | ☑ | **Color:** | 4 Color Bleed |
| | | | | | **Tearsheet:** | ☑ |

Competitive Review

| Brand(s) | Page Placement | Headline |
|---|---|---|
| | 121 | V6 engine / Next |

Notes 248 total pages

Page 12 of 27

Figure 115

Brand Publication Analysis

Client: Agency:

Brand:

| | | | | | | |
|---|---|---|---|---|---|---|
| Cost Data | Insertion Order: | $67,197.60 | Publication: | Money | Purchased Gross Circ. (000's): | 1900.0 |
| | Billed to Client: | $67,197.60 | Month: | 5/2003 | Page Placement: | 144 |
| | Invoiced Amount: | $67,197.60 | Insertion Date: | May 1 2003 | Page Size: | Half Page Spread |
| | Purchased CPM: | $35.37 | Audited: | ☑ | Color: | 4 Color |
| | | | | | Tearsheet: | ☑ |

Competitive Review

| Brand(s) | Page Placement | Headline |
|---|---|---|
| | 106 | Certified agility, Certified |
| | 69 | / as here. |
| | 87 | Break through |
| | 15 | Zero to "I'll take |
| | 136 | One company |
| | 78 | Your boss just bought |
| | 98 | It's a bit of a |
| | 125 | "ZZZZZZZZ" |
| | 113 | When commuting to work, |
| | 23 | . . . The world has been |
| | 36 | Genuine exhilaration's back. |
| | 56 | Driver is king. |
| | 50 | You know those toys |
| | Cover 2 | Not everyone was qualified |
| | 51 | The mini-market. |

Notes 150 total pages

Page 13 of 27

Figure 116

Brand Publication Analysis

Client: Agency:

Brand:

| | | | | | | |
|---|---|---|---|---|---|---|
| **Cost Data** | **Insertion Order:** | $64,849.05 | **Publication:** | Motor Trend | **Purchased Gross Circ. (000's):** | 1250.0 |
| | **Billed to Client:** | $64,849.05 | **Month:** | 5/2003 | **Page Placement:** | 45 |
| | **Invoiced Amount:** | $64,849.05 | **Insertion Date:** | May 1 2003 | **Page Size:** | Full Page |
| | **Purchased CPM:** | $51.88 | **Audited:** | ☑ | **Color:** | 4 Color Bleed |
| | | | | | **Tearsheet:** | ☑ |

Competitive Review

| Brand(s) | Page Placement | | Headline |
|---|---|---|---|
| | 40 | (CPPV) | Introducing the |
| | 11 | | Break Through |
| | 107 | | We'll be there. |
| | 62 | | Buff. In the Buff. |
| | 93 | | like a rock |
| | Cover 2 | | Of course the last |
| | 108 | | Because tattoos are |
| | 28 | | Sign up and go with |
| | 56 | | When's the last time |
| | Cover 4 | | Sports cars or luxury |
| | 49 | (CPPV) | Stimulus the New V8 |
| | 130 | | One year test verdict |
| | 23 | | Recharged Reinvigorated |
| | 91 | | "Control your Power and |
| | 101 | | The All-New |
| | 8 | | Run it's the sport |
| | 33 | | Drivers Wanted. |

Notes 160 total pages

CPPV - Competitive Page Placement Violation

Page 14 of 27

Figure 117

Brand Publication Analysis

Client:

Agency:

Brand:

| | | | | | | |
|---|---|---|---|---|---|---|
| Cost Data | Insertion Order: | $13,027.10 | Publication: | Motor Trend Special | Purchased Gross Circ. (000's): | 150.0 |
| | Billed to Client: | $13,027.10 | Month: | 5/2003 | Page Placement: | 50 |
| | Invoiced Amount: | $13,027.10 | Insertion Date: | May 1 2003 | Page Size: | Spread |
| | Purchased CPM: | $86.85 | Audited: | ☑ | Color: | 4 Color Bleed |
| | | | | | Tearsheet: | ☑ |

Competitive Review

| Brand(s) | Page Placement | Headline |
|---|---|---|
| | 126 | was here. |
| | 19 | You've heard of mountain |
| | 69 | Best. Best. Best. |
| | 7 | This is what you |
| | Cover 4 | worst |
| | 24 | They have a starring |
| | 73 | It's a bit of a control |
| | 111 | "Fits like a glove". |
| | 2 | "Hey, that's cheating". |
| | 28 | Our surefooted 4-wheel |
| | 34 | Sign up go with |
| | Cover 2 | Warning: Use the cup |
| | 12 | There I was face |
| | 90 | Introducing the new |
| | 4 | It's "Best Buy" status |
| | 58 | Not everyone was qualified |

Notes SUV Guide. 128 total pages. Did not run in 1st 30%.

Figure 118

Brand Publication Analysis

Client: Agency:

Brand:

| | | | | | | |
|---|---|---|---|---|---|---|
| **Cost Data** | **Insertion Order:** $63,246.80 | **Publication:** | National Geographic | **Purchased Gross Circ. (000's):** | | 2869.4 |
| | **Billed to Client:** $63,246.80 | **Month:** | 5/2003 | **Page Placement:** | | 165 |
| | **Invoiced Amount:** $63,246.80 | **Insertion Date:** | May 1 2003 | **Page Size:** | Full Page | |
| | **Purchased CPM:** $22.04 | **Audited:** | ☑ | **Color:** | | 4 Color Bleed |
| | | | | **Tearsheet:** | | ☑ |

Competitive Review

| Brand(s) | Page Placement | Headline |
|---|---|---|
| | 177 | was here. |
| | 6 | The New |
| | 24 | The |
| | 14 | There's something about |
| | Cover 2 | It's a bit of a |
| | 42 | To a gearhead, this |
| | 34 | You can drive off |
| | 46 | Take a ride in |
| | 173 | "If you're tough enough, |
| | Cover 4 | The All-New |

Notes Natl. Geo. 25th edition. 178 total pages

Page 16 of 27

Figure 119

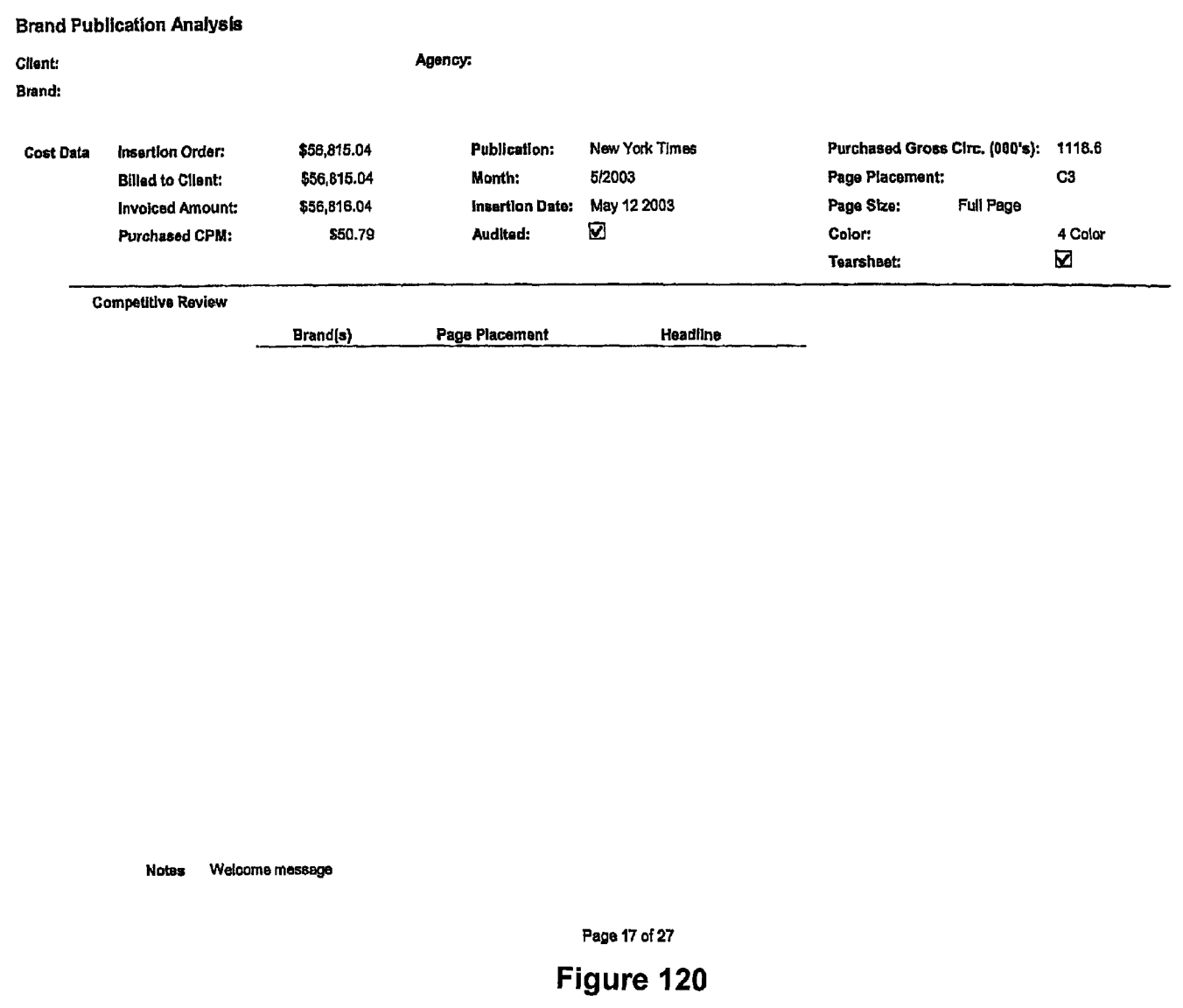

Brand Publication Analysis

Client: Agency:

Brand:

| | | | | | | |
|---|---|---|---|---|---|---|
| **Cost Data** | **Insertion Order:** | $56,815.04 | **Publication:** | New York Times | **Purchased Gross Circ. (000's):** | 1118.6 |
| | **Billed to Client:** | $56,815.04 | **Month:** | 5/2003 | **Page Placement:** | C3 |
| | **Invoiced Amount:** | $56,816.04 | **Insertion Date:** | May 12 2003 | **Page Size:** | Full Page |
| | **Purchased CPM:** | $50.79 | **Audited:** | ☑ | **Color:** | 4 Color |
| | | | | | **Tearsheet:** | ☑ |

Competitive Review

| Brand(s) | Page Placement | Headline |
|---|---|---|

Notes Welcome message

Page 17 of 27

Figure 120

Brand Publication Analysis

Client: Agency:

Brand:

| | | | | | | |
|---|---|---|---|---|---|---|
| Cost Data | Insertion Order: | $109,012.50 | Publication: | People | Purchased Gross Circ. (000's): | 3350.0 |
| | Billed to Client: | $109,012.50 | Month: | 5/2003 | Page Placement: | 48 |
| | Invoiced Amount: | $109,012.50 | Insertion Date: | May 26 2003 | Page Size: | Half Page Spread |
| | Purchased CPM: | $32.54 | Audited: | ☑ | Color: | 4 Color |
| | | | | | Tearsheet: | ☑ |

Competitive Review

| Brand(s) | Page Placement | Headline |
|---|---|---|
| | 99 | Quality is now an |
| | 2 | Here's to muscle. Past. |
| | 162 | All Day. All Night. |
| | 73 | To a gearhead, This |

Notes 166 total pages

Page 18 of 27

Figure 121

Brand Publication Analysis

Client: Agency:

Brand:

| | | | | | | |
|---|---|---|---|---|---|---|
| **Cost Data** | **Insertion Order:** | $10,285.00 | **Publication:** | RN Magazine | **Purchased Gross Circ. (000's):** | 203.5 |
| | **Billed to Client:** | $10,285.00 | **Month:** | 5/2003 | **Page Placement:** | 19 |
| | **Invoiced Amount:** | $10,285.00 | **Insertion Date:** | May 1 2003 | **Page Size:** | Full Page |
| | **Purchased CPM:** | $50.54 | **Audited:** | ☑ | **Color:** | 4 Color Bleed |
| | | | | | **Tearsheet:** | ☑ |

Competitive Review

| Brand(s) | Page Placement | Headline |
|---|---|---|

Notes 98 total pages

Page 19 of 27

Figure 122

Brand Publication Analysis

Client: Agency:

Brand:

| | | | | | | | |
|---|---|---|---|---|---|---|---|
| **Cost Data** | **Insertion Order:** | $46,257.00 | **Publication:** | Shape Magazine | **Purchased Gross Circ. (000's):** | | 1600.0 |
| | **Billed to Client:** | $46,257.00 | **Month:** | 5/2003 | **Page Placement:** | | 58 |
| | **Invoiced Amount:** | $46,257.00 | **Insertion Date:** | May 1 2003 | **Page Size:** | Half Page Spread | |
| | **Purchased CPM:** | $28.91 | **Audited:** | ☑ | **Color:** | | 4 Color |
| | | | | | **Tearsheet:** | | ☑ |

Competitive Review

| Brand(s) | Page Placement | Headline |
|---|---|---|
| | 35 | |
| | 77 | European Driving Performance |
| | 24 | four wheel |
| | 2 | Message Board |
| | 12 | Nothing like a little |
| | 50 | "Feel safe and you |

Notes 248 total pages

Page 20 of 27

Figure 123

Brand Publication Analysis

Client:

Agency:

Brand:

| | | | | | | |
|---|---|---|---|---|---|---|
| Cost Data | Insertion Order: | $64,145.25 | Publication: | Southern Living | Purchased Gross Circ. (000's): | 2550.0 |
| | Billed to Client: | $64,145.25 | Month: | 5/2003 | Page Placement: | 85 |
| | Invoiced Amount: | $64,145.25 | Insertion Date: | May 1 2003 | Page Size: | Full Page |
| | Purchased CPM: | $25.16 | Audited: | ☑ | Color: | 4 Color Bleed |
| | | | | | Tearsheet: | ☑ |

Competitive Review

| Brand(s) | Page Placement | Headline |
|---|---|---|
| | 43 | The 260-hp. |
| | 159 | Zero to "I'll take it" |
| | Cover 4 | The new |
| | 24 | The |
| | 126 | Burn Rubber, Not Money. |
| | 92 | It's a bit of a |
| | Cover 2 | Remember when driving |
| | 12 | Not everyone was qualified |

Notes 220 total pages. Not within 1st 25%.

Page 21 of 27

Figure 124

Brand Publication Analysis

Client:

Agency:

Brand:

| | | | | | | | |
|---|---|---|---|---|---|---|---|
| Cost Data | Insertion Order: | $0.00 | Publication: | Southern Living Vacations | Purchased Gross Circ. (000's): | | 200.0 |
| | Billed to Client: | $0.00 | Month: | 5/2003 | Page Placement: | | 231 |
| | Invoiced Amount: | $0.00 | Insertion Date: | May 1 2003 | Page Size: | Full Page | |
| | Purchased CPM: | $0.00 | Audited: | ☑ | Color: | | 4 Color Bleed |
| | | | | | Tearsheet: | | ☑ |

Competitive Review

| Brand(s) | Page Placement | Headline |
|---|---|---|
| | Cover 4 | The 260 hp |
| | 103 | |
| | 195 | Break through |
| | 26 | Your boss just bought |
| | 219 | When commuting to |

Notes 264 total pages.

Page 22 of 27

Figure 125

Brand Publication Analysis

Client: Agency:

Brand:

| | | | | | | |
|---|---|---|---|---|---|---|
| **Cost Data** | **Insertion Order:** | $117,181.00 | **Publication:** | Sports Illustrated | **Purchased Gross Circ. (000's):** | 3150.0 |
| | **Billed to Client:** | $117,181.00 | **Month:** | 5/2003 | **Page Placement:** | 66 |
| | **Invoiced Amount:** | $117,181.00 | **Insertion Date:** | May 12 2003 | **Page Size:** | Half Page Spread |
| | **Purchased CPM:** | $37.20 | **Audited:** | ☑ | **Color:** | 4 Color |
| | | | | | **Tearsheet:** | ☑ |

Competitive Review

| Brand(s) | Page Placement | Headline |
|---|---|---|
| | 58 | You've heard of mountain |
| | 73 | Some superheroes use |
| | 28 | Room for every Tom, |
| | 49 | It's a bit of a |
| | 54 | A true champion no |
| | 56 | Every King needs a |
| | Cover 2 | Here's to muscle. Past. |
| | Cover 3 | All Day. All Night. |
| | 26 | . . . The world has been |
| | 37 | The new |
| | 15 | Get Noticed. |

Notes 88 total pages. Ran in Book Excerpt, not Inside Columns.

Page 23 of 27

Figure 126

Brand Publication Analysis

Client: Agency:

Brand:

| | | | | | | | |
|---|---|---|---|---|---|---|---|
| **Cost Data** | **Insertion Order:** | $0.00 | **Publication:** | Sunset Summer Travel | **Purchased Gross Circ. (000's):** | | 180.0 |
| | **Billed to Client:** | $0.00 | **Month:** | 5/2003 | **Page Placement:** | | 2 |
| | **Invoiced Amount:** | $0.00 | **Insertion Date:** | May 1 2003 | **Page Size:** | Full Page | |
| | **Purchased CPM:** | $0.00 | **Audited:** | ☑ | **Color:** | | 4 Color Bleed |
| | | | | | **Tearsheet:** | | ☑ |

Competitive Review

| Brand(s) | Page Placement | Headline |
|---|---|---|
| | Cover 3 | "Anybody else in there?" |
| | 39 | When commuting to work |

Notes 128 total pages

Page 24 of 27

Figure 127

Brand Publication Analysis

Client: Agency:

Brand:

| | | | | | | |
|---|---|---|---|---|---|---|
| **Cost Data** | **Insertion Order:** | $35,218.05 | **Publication:** | This Old House | **Purchased Gross Circ. (000's):** | 950.0 |
| | **Billed to Client:** | $35,217.88 | **Month:** | 5/2003 | **Page Placement:** | 68 |
| | **Invoiced Amount:** | $35,217.88 | **Insertion Date:** | May 1 2003 | **Page Size:** | Half Page Spread |
| | **Purchased CPM:** | $37.07 | **Audited:** | ☑ | **Color:** | 4 Color |
| | | | | | **Tearsheet:** | ☑ |

Competitive Review

| Brand(s) | Page Placement | Headline |
|---|---|---|
| | Cover 4 | Best. Best. Best. |
| | 145 | They have a starring |
| | 42 | Room for every Tom, |
| | 32 | Not the same old |
| | 88 | We over did it. |
| | Cover 2 | Remember when driving |
| | 9 | There's a difference |

Notes 166 total pages. Ran in Finances not Luxuries or By Design.

Figure 128

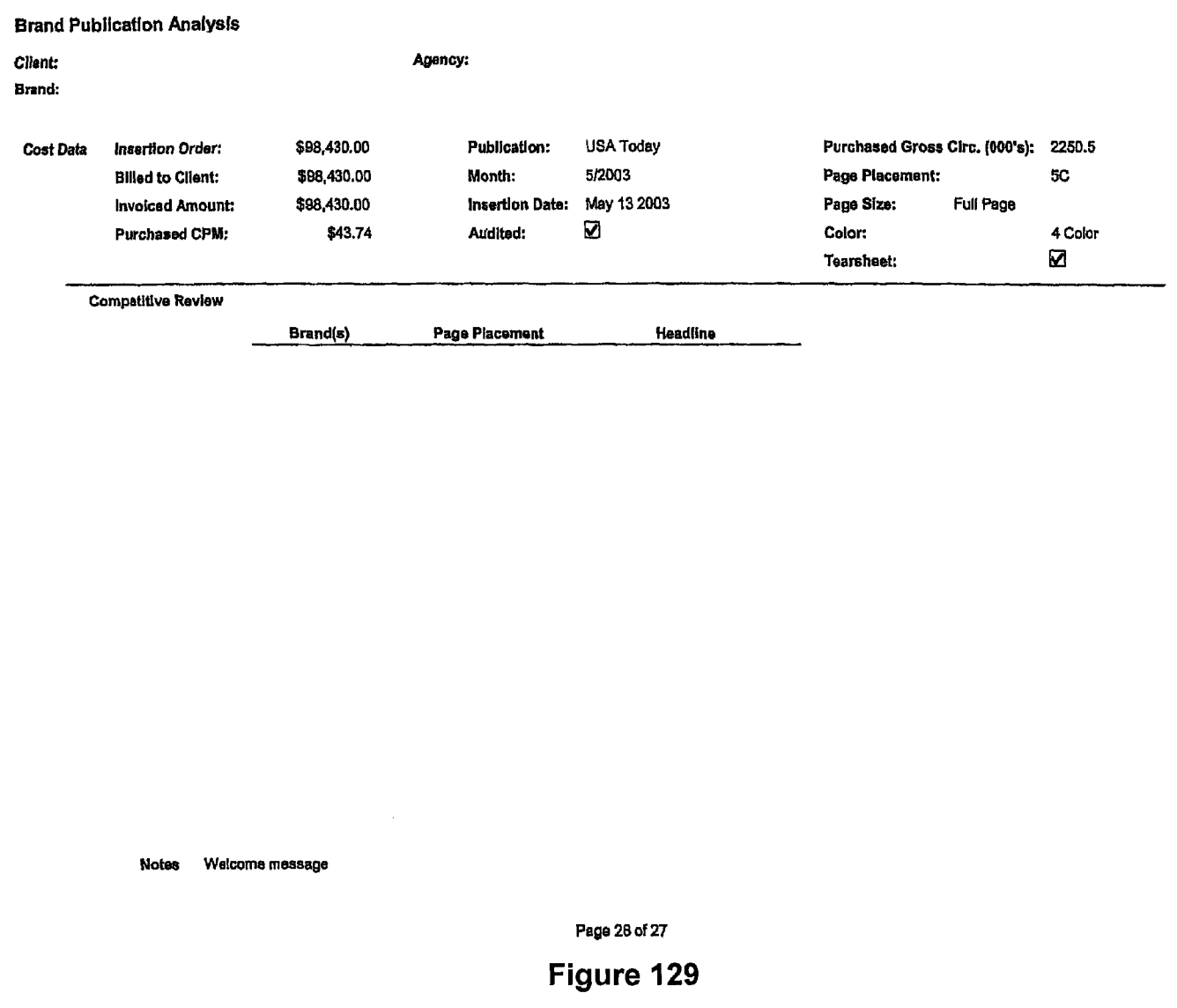

Brand Publication Analysis

Client: Agency:

Brand:

| | | | | | | |
|---|---|---|---|---|---|---|
| **Cost Data** | ***Insertion Order:*** | $98,430.00 | **Publication:** | USA Today | **Purchased Gross Circ. (000's):** | 2250.5 |
| | **Billed to Client:** | $98,430.00 | **Month:** | 5/2003 | **Page Placement:** | 5C |
| | **Invoiced Amount:** | $98,430.00 | **Insertion Date:** | May 13 2003 | **Page Size:** | Full Page |
| | **Purchased CPM:** | $43.74 | **Audited:** | ☑ | **Color:** | 4 Color |
| | | | | | **Tearsheet:** | ☑ |

Competitive Review

| Brand(s) | Page Placement | Headline |
|---|---|---|

Notes Welcome message

Page 28 of 27

Figure 129

Brand Publication Analysis

Client: Agency:

Brand:

| | | | | | | |
|---|---|---|---|---|---|---|
| Cost Data | Insertion Order: | $183,246.56 | Publication: | Wall Street Journal | Purchased Gross Circ. (000's): | 1820.6 |
| | Billed to Client: | $183,246.56 | Month: | 5/2003 | Page Placement: | A20 |
| | Invoiced Amount: | $183,246.56 | Insertion Date: | May 13 2003 | Page Size: | Full Page |
| | Purchased CPM: | $100.65 | Audited: | ☑ | Color: | 4 Color |
| | | | | | Tearsheet: | ☑ |

Competitive Review

| Brand(s) | Page Placement | Headline |
|---|---|---|

Notes Welcome message

Page 27 of 27

Figure 130

Brand Publication Analysis

Client:

Agency:

Brand:

| | | | | | | |
|---|---|---|---|---|---|---|
| Cost Data | Insertion Order: | $14,050.50 | Publication: | American Journal of Nursing | Purchased Gross Circ. (000's): | 338.8 |
| | Billed to Client: | $14,050.50 | Month: | 6/2003 | Page Placement: | 6 |
| | Invoiced Amount: | $14,050.50 | Insertion Date: | Jun 1 2003 | Page Size: | Full Page |
| | Purchased CPM: | $41.47 | Audited: | ☑ | Color: | 4 Color Bleed |
| | | | | | Tearsheet: | ☑ |

Competitive Review

| Brand(s) | Page Placement | Headline |
|---|---|---|

Notes Creative "One Taken Care Of" not "Call Button." 104 total pages,

Page 1 of 30

Figure 131

Brand Publication Analysis

Client: Agency:

Brand:

| | | | | | | |
|---|---|---|---|---|---|---|
| **Cost Data** | **Insertion Order:** | $12,082.75 | **Publication:** | Army Navy Times | **Purchased Gross Circ. (000's):** | 242.0 |
| | **Billed to Client:** | $12,082.75 | **Month:** | 6/2003 | **Page Placement:** | Cover 3 |
| | **Invoiced Amount:** | $12,082.75 | **Insertion Date:** | Jun 9 2003 | **Page Size:** | Tab Page |
| | **Purchased CPM:** | $49.93 | **Audited:** | ☑ | **Color:** | 4 Color Bleed |
| | | | | | **Tearsheet:** | ☑ |

Competitive Review

| Brand(s) | Page Placement | Headline |
|---|---|---|
| | 9 | You did your duty. |
| | 41 | Our way of supporting |
| | 21 | Operation: Throw you back |
| | 31 | Thanks. Here's a little |

Notes 54 total pages.

Figure 132

Brand Publication Analysis

Client: Agency:

Brand:

| | | | | | | | |
|---|---|---|---|---|---|---|---|
| **Cost Data** | **Insertion Order:** | $12,082.75 | **Publication:** | Army Navy Times | **Purchased Gross Circ. (000's):** | 242.0 |
| | **Billed to Client:** | $12,082.75 | **Month:** | 6/2003 | **Page Placement:** | Cover 3 |
| | **Invoiced Amount:** | $12,082.75 | **Insertion Date:** | Jun 23 2003 | **Page Size:** | Tab Page |
| | **Purchased CPM:** | $49.93 | **Audited:** | ☑ | **Color:** | 4 Color Bleed |
| | | | | | **Tearsheet:** | ☑ |

Competitive Review

| Brand(s) | Page Placement | Headline |
|---|---|---|
| | 11 | You did your duty. |
| | 27 | Our way of supporting |
| | 19 | Thanks. Here's a little |

Notes 62 total pages.

Figure 133

Brand Publication Analysis

Client: Agency:

Brand:

| | | | | | | |
|---|---|---|---|---|---|---|
| **Cost Data** | **Insertion Order:** | $12,561.30 | **Publication:** | Automotive News | **Purchased Gross Circ. (000's):** | 80.0 |
| | **Billed to Client:** | $12,561.05 | **Month:** | 6/2003 | **Page Placement:** | Cover 3 |
| | **Invoiced Amount:** | $12,561.05 | **Insertion Date:** | Jun 23 2003 | **Page Size:** | Tab Page |
| | **Purchased CPM:** | $157.02 | **Audited:** | ☑ | **Color:** | 4 Color Bleed |
| | | | | | **Tearsheet:** | ☑ |

Competitive Review

| Brand(s) | Page Placement | Headline |
|---|---|---|
| | 26 | The trade paper |
| | 5 | The link to success. |

Notes 42 total pages.

Page 4 of 30

Figure 134

Brand Publication Analysis

Client: Agency:

Brand:

| | | | | | | | |
|---|---|---|---|---|---|---|---|
| **Cost Data** | **Insertion Order:** | $93,508.50 | **Publication:** | Better Homes & Gardens | **Purchased Gross Circ. (000's):** | 7600.0 |
| | **Billed to Client:** | $93,508.50 | **Month:** | 6/2003 | **Page Placement:** | 100 |
| | **Invoiced Amount:** | $93,508.50 | **Insertion Date:** | Jun 1 2003 | **Page Size:** | Half Page Spread |
| | **Purchased CPM:** | $12.30 | ***Audited:*** | ☑ | **Color:** | 4 Color |
| | | | | | **Tearsheet:** | ☑ |

Competitive Review

| Brand(s) | Page Placement | Headline |
|---|---|---|
| | 109 | was here. |
| | 149 | Zero to "I'll take it" |
| | Cover 2 | *Serving overprotective parents* |
| | Cover 4 | r worst |
| | 42 | There's something about |
| | 8 | The first vehicle inspired |

Notes 320 total pages.

Page 5 of 30

Figure 135

Brand Publication Analysis

Client: Agency:

Brand:

| Cost Data | | | | | | |
|---|---|---|---|---|---|---|
| Insertion Order: | $12,750.00 | Publication: | Blender | Purchased Gross Circ. (000's): | 410.0 |
| Billed to Client: | $12,750.00 | Month: | 6/2003 | Page Placement: | 104 |
| Invoiced Amount: | $12,750.00 | Insertion Date: | Jun 1 2003 | Page Size: | Half Page Spread |
| Purchased CPM: | $31.10 | Audited: | ☑ | Color: | 4 Color |
| | | | | Tearsheet: | ☑ |

Competitive Review

| Brand(s) | Page Placement | Headline |
|---|---|---|
| | 54 | Spring with |
| | 17 | European driving performance |
| | 128 | 64 seating configurations. |
| | 66 | We'll get you to |
| | Cover 2 | The rotary engine spins |
| | 8 | Someday. The new |
| | Cover 4 | Wait 45 minutes after |
| | 116 | Drivers Wanted. |

Notes 172 total pages.

Page 6 of 30

Figure 136

Brand Publication Analysis

Client:

Agency:

Brand:

| | | | | | | | |
|---|---|---|---|---|---|---|---|
| **Cost Data** | **Insertion Order:** | $76,649.60 | **Publication:** | Car & Driver | **Purchased Gross Circ. (000's):** | | 1350.0 |
| | **Billed to Client:** | $76,649.60 | **Month:** | 6/2003 | **Page Placement:** | | 107 |
| | **Invoiced Amount:** | $76,649.60 | **Insertion Date:** | Jun 1 2003 | **Page Size:** | Full Page | |
| | **Purchased CPM:** | $56.78 | **Audited:** | ☑ | **Color:** | | 4 Color Bleed |
| | | | | | **Tearsheet:** | | ☑ |

Competitive Review

| Brand(s) | Page Placement | Headline |
|---|---|---|
| | 38 | Commonly used phrases |
| | 137 | If a towing contest |
| | 45 | Best. Best. Best. |
| | Cover 2 | The ( |
| | 66 | Fifty Years. Two Seats. |
| | 100 | You're either with us. |
| | 74 | They don't make cars |
| | 84 | The very limited edition |
| | Cover 4 | What's that in the |
| | 110 (CPPV) | Have we gotten ahead |
| | 21 | The future is stronger. |
| | 18 | When's the last time |
| | 65 | The new |
| | 49 | Forget the speed |
| | 77 | |
| | 58 | The all new |
| | 154 | Imagine. A golf tournament |
| | 136 | The retooled |

Notes 188 total pages. Did not run in 1st 60%.

CPPV - Competitive Pag Placement Violation

Page 7 of 30

Figure 137

Brand Publication Analysis

| | | |
|---|---|---|
| 53 | | volution VIII |
| 10 | | Someday. The new |
| 80 | | Driver is King. |
| 115 | | Recharged Reinvigorated |
| 143 | | "You have to muscle |
| 112 | (CPPV) | Its "Best Buy" status |
| 121 | | The first vehicle inspired |
| 158 | | Rise up and flee |
| 82 | | Wait 45 minutes after |
| 28 | | You think about everything |

Notes 188 total pages. Did not run in 1st 50%.
CPPV - Competitive Page Placement Violation Page 8 of 30

Figure 138

Brand Publication Analysis

Client: Agency:

Brand:

| | | | | | | |
|---|---|---|---|---|---|---|
| **Cost Data** | **Insertion Order:** $39,525.00 | **Publication:** | Cooking Light | **Purchased Gross Circ. (000's):** | 1600.0 |
| | **Billed to Client:** $39,525.00 | **Month:** | 6/2003 | **Page Placement:** | 196 |
| | **Invoiced Amount:** $39,525.00 | **Insertion Date:** | Jun 1 2003 | **Page Size:** | Half Page Spread |
| | **Purchased CPM:** $24.70 | **Audited:** | ☑ | **Color:** | 4 Color |
| | | | | **Tearsheet:** | ☑ |

Competitive Review

| Brand(s) | Page Placement | Headline |
|---|---|---|
| | 133 | was here. |
| | 235 | Zero to "I'll take it" |
| | Cover 2 | Some are inspired |
| | 70 | Here's to muscle. Past. |
| | 167 | "ZZZZZZZZZ" |
| | 141 | Class Ceiling |
| | 31 | If you pass another |
| | 33 | When commuting to |
| | 122 | Remember when driving |
| | 18 | Take a ride in |
| | 149 | Fact #2: |

Notes 244 total pages.

Figure 139

Brand Publication Analysis

Client: Agency:

Brand:

| | | | | | | | |
|---|---|---|---|---|---|---|---|
| **Cost Data** | **Insertion Order:** | $63,072.55 | **Publication:** | Entertainment Weekly | **Purchased Gross Circ. (000's):** | 1600.0 |
| | **Billed to Client:** | $63,071.87 | **Month:** | 6/2003 | **Page Placement:** | 72 |
| | **Invoiced Amount:** | $63,071.87 | **Insertion Date:** | Jun 6 2003 | **Page Size:** | Half Page Spread |
| | **Purchased CPM:** | $39.42 | **Audited:** | ☑ | **Color:** | 4 Color |
| | | | | | **Tearsheet:** | ☑ |

Competitive Review

| Brand(s) | Page Placement | Headline |
|---|---|---|
| | 23 | The 200-hp, 6 speed |
| | 44 | They don't make cars |
| | 6 | 100 Years |
| | 26 | You win some, you |
| | 52 | Introduces the 24 |
| | 13 | Global Extremes: |
| | 85 | Get Noticed. |

Notes 84 total pages.

Page 10 of 30

Figure 140

Brand Publication Analysis

Client: Agency:

Brand:

| | | | | | | |
|---|---|---|---|---|---|---|
| Cost Data | Insertion Order: | $70,745.50 | Publication: | ESPN | Purchased Gross Circ. (000's): | 1650.0 |
| | Billed to Client: | $70,745.50 | Month: | 6/2003 | Page Placement: | 64 |
| | Invoiced Amount: | $70,745.50 | Insertion Date: | Jun 9 2003 | Page Size: | Half Page Spread |
| | Purchased CPM: | $42.88 | Audited: | ☑ | Color: | 4 Color |
| | | | | | Tearsheet: | ☑ |

Competitive Review

| Brand(s) | Page Placement | Headline |
|---|---|---|
| | 101 | Tee it up with |
| | 2 | Room for every Tom, |
| | 115 | About this brain |
| | 18 | Raised on Video Games? |
| | 39 | In this case, the |
| | 54 | Hauling, towing and |
| | 91 | |
| | 79 | Wait 45 minutes after |

Notes 116 total pages.

Page 11 of 30

Figure 141

Brand Publication Analysis

Client: Agency:

Brand:

| | | | | | | |
|---|---|---|---|---|---|---|
| **Cost Data** | **Insertion Order:** $70,745.50 | **Publication:** | ESPN | **Purchased Gross Circ. (000's):** | 1650.0 |
| | **Billed to Client:** $70,745.50 | **Month:** | 6/2003 | **Page Placement:** | 82 |
| | **Invoiced Amount:** $70,745.50 | **Insertion Date:** | Jun 23 2003 | **Page Size:** | Half Page Spread |
| | **Purchased CPM:** $42.88 | **Audited:** | ☑ | **Color:** | 4 Color |
| | | | | **Tearsheet:** | ☑ |

Competitive Review

| Brand(s) | Page Placement | Headline |
|---|---|---|
| | Cover 4 | Best. Best. Best. |
| | 35 | They don't make cars |
| | 107 | Side cargo doors. |
| | 117 | In this case, the |
| | 62 | Driving is King. |
| | Cover 2 | You win some, you |
| | 43 | |
| | 91 | Rise up and flee |

Notes 124 total pages.

Figure 142

Brand Publication Analysis

Client: Agency:

Brand:

| | | | | | | |
|---|---|---|---|---|---|---|
| **Cost Data** | **Insertion Order:** | $35,002.15 | **Publication:** | Fast Company | **Purchased Gross Circ. (000's):** | 725.0 |
| | **Billed to Client:** | $35,002.15 | **Month:** | 6/2003 | **Page Placement:** | 110 |
| | **Invoiced Amount:** | $35,002.15 | **Insertion Date:** | Jun 1 2003 | **Page Size:** | Half Page Spread |
| | **Purchased CPM:** | $48.28 | **Audited:** | ☑ | **Color:** | 4 Color |
| | | | | | **Tearsheet:** | ☑ |

Competitive Review

| Brand(s) | Page Placement | Headline |
|---|---|---|
| | 41 | The 200-hp, 6 speed |
| | 59 | This is what you get |
| | Cover 2 | The |
| | 95 | "Alone at last". |
| | 65 | You give us the money, |
| | 30 | Have we gotten ahead |
| | 87 | All thumbs? Okay. |
| | 103 | The new |
| | 73 | Genuine exhilaration's back. |
| | 20 | Once you drive one, |
| | 118 | Nothing like a little |
| | 80 | Somewhere up there |
| | 125 | "If you're tough enough, |
| | 11 | Get that new planet |

Notes 124 total pages.

Figure 143

Brand Publication Analysis

Client: Agency:

Brand:

| | | | | | | |
|---|---|---|---|---|---|---|
| **Cost Data** | **Insertion Order:** | $54,811.40 | **Publication:** | Golf Magazine | **Purchased Gross Circ. (000's):** | 1400.0 |
| | **Billed to Client:** | $54,811.40 | **Month:** | 6/2003 | **Page Placement:** | 218 |
| | **Invoiced Amount:** | $54,811.40 | **Insertion Date:** | Jun 1 2003 | **Page Size:** | Half Page Spread |
| | **Purchased CPM:** | $39.15 | **Audited:** | ☑ | **Color:** | 4 Color |
| | | | | | **Tearsheet:** | ☑ |

Competitive Review

| Brand(s) | Page Placement | Headline |
|---|---|---|
| | 12 | Introducing the |
| | 250 | American's greatest car |
| | 182 | Break Through. |
| | 212 (CPPV) | Some are inspired by |
| | Cover 2 | The |
| | 127 | If you want to lead. |
| | 240 | There's something about |
| | 94 | 100 Years. The sheet |
| | 154 | . . . The world has been |
| | 103 | In this case, the |
| | 172 | Security. Unlike any other. |
| | 194 | Signal without looking |
| | 46 | Passengers dream of driving. |
| | 58 | Introducing the new |

Notes 298 total pages.

CPPV - Competitive Page Placement Violation

Figure 144

Brand Publication Analysis

Client: Agency:

Brand:

| Cost Data | | | | | | |
|---|---|---|---|---|---|---|
| Insertion Order: | $65,897.95 | Publication: | Men's Health | Purchased Gross Circ. (000's): | | 1625.0 |
| Billed to Client: | $65,897.00 | Month: | 6/2003 | Page Placement: | | 43 |
| Invoiced Amount: | $65,897.00 | Insertion Date: | Jun 1 2003 | Page Size: | Full Page | |
| Purchased CPM: | $40.55 | Audited: | ☑ | Color: | | 4 Color Bleed |
| | | | | Tearsheet: | | ☑ |

Competitive Review

| Brand(s) | Page Placement | Headline |
|---|---|---|
| | 138 | The 200-hp, 6 speed |
| | 177 | We'll be there. |
| | 25 | Buff. In the buff. |
| | 92 | They have a starring |
| | 51 | They don't make cars |
| | 69 | It's a bit of a |
| | 158 | We overdid it. |
| | Cover 2 | If fast were a color. |
| | 8 | To a gearhead, |
| | 35 | Genuine exhilaration's back. |
| | 59 | "If you're tough enough, |
| | 85 | The 2003 |
| | 16 | Drivers Wanted. |

Notes 176 total pages.

Page 15 of 30

Figure 145

Brand Publication Analysis

Client: Agency:

Brand:

| | | | | | | | |
|---|---|---|---|---|---|---|---|
| **Cost Data** | **Insertion Order:** | $67,199.30 | **Publication:** | Money | **Purchased Gross Circ. (000's):** | 1900.0 |
| | **Billed to Client:** | $67,197.60 | **Month:** | 6/2003 | **Page Placement:** | 130 |
| | **Invoiced Amount:** | $67,197.60 | **Insertion Date:** | Jun 1 2003 | **Page Size:** | Half Page Spread |
| | **Purchased CPM:** | $35.37 | **Audited:** | ☑ | **Color:** | 4 Color |
| | | | | | **Tearsheet:** | ☑ |

Competitive Review

| Brand(s) | Page Placement | Headline |
|---|---|---|
| | 62 | Zero to "I'll take it" |
| | 87 | Style |
| | 92 | The |
| | 30 | 100 years. The sheet |
| | Cover 2 | It's a bit of a |
| | 13 | "Alone at last". |
| | 100 | Introducing the ' |
| | 38 | Can your daily commute |
| | 109 | If you pass another |
| | 111 | When commuting to work, |
| | 21 | Other cars are pre-owned. |
| | 119 | Insects call it |
| | 58 | Passengers dream of driving. |
| | 49 | The four corners |
| | 140 | "If you're tough enough, |
| | Cover 3 | |
| | 58B | The mini-market. |

Notes 152 total pages.

Page 16 of 30

Figure 146

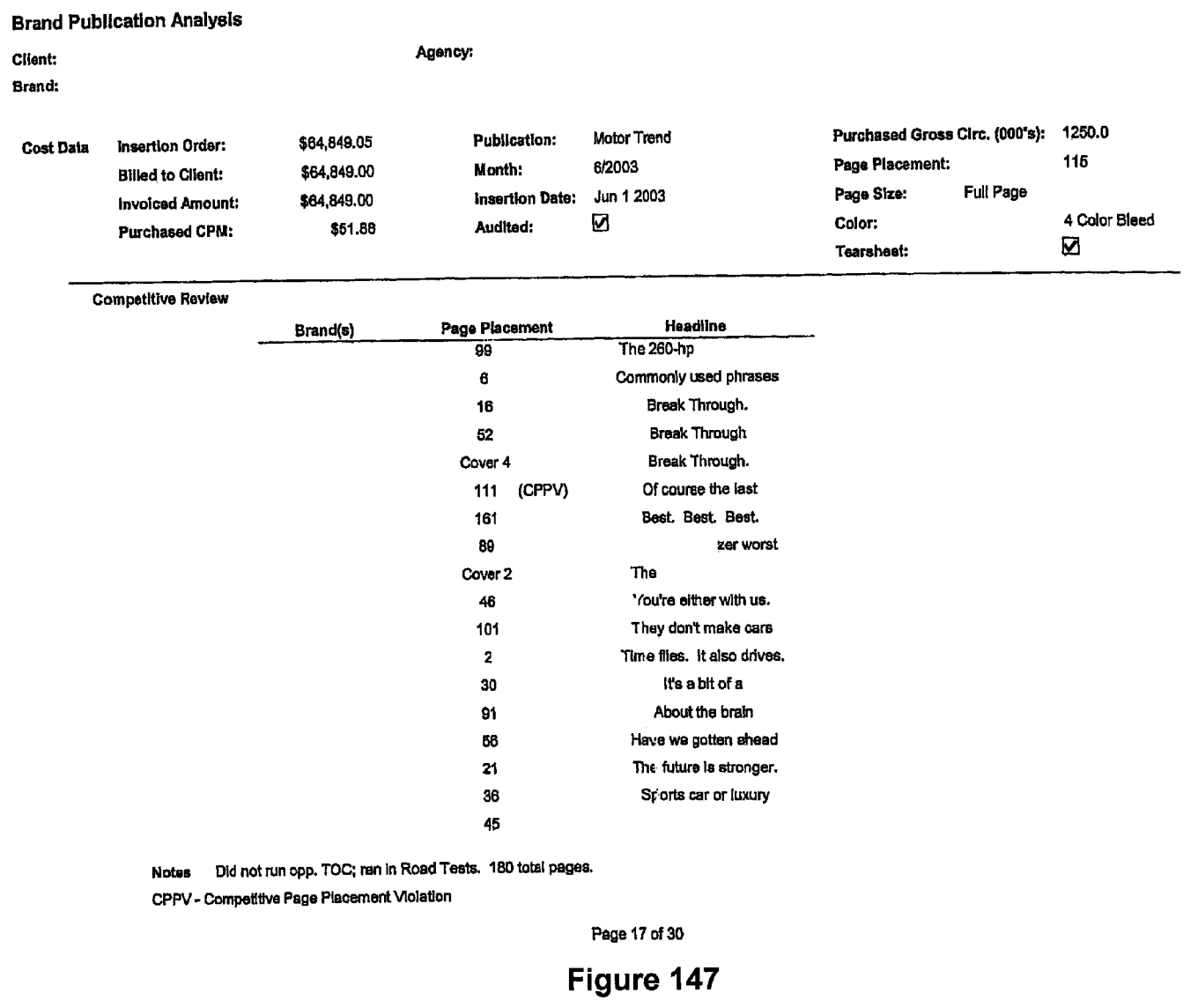

Brand Publication Analysis

Client:

Agency:

Brand:

| | | | | | | | |
|---|---|---|---|---|---|---|---|
| **Cost Data** | **Insertion Order:** | $64,849.05 | **Publication:** | Motor Trend | **Purchased Gross Circ. (000's):** | 1250.0 |
| | **Billed to Client:** | $64,849.00 | **Month:** | 6/2003 | **Page Placement:** | 116 |
| | **Invoiced Amount:** | $64,849.00 | **Insertion Date:** | Jun 1 2003 | **Page Size:** | Full Page |
| | **Purchased CPM:** | $51.88 | **Audited:** | ☑ | **Color:** | 4 Color Bleed |
| | | | | | **Tearsheet:** | ☑ |

Competitive Review

| Brand(s) | Page Placement | Headline |
|---|---|---|
| | 99 | The 260-hp |
| | 6 | Commonly used phrases |
| | 16 | Break Through. |
| | 52 | Break Through |
| | Cover 4 | Break Through. |
| | 111 (CPPV) | Of course the last |
| | 161 | Best. Best. Best. |
| | 89 | zer worst |
| | Cover 2 | The |
| | 46 | 'You're either with us. |
| | 101 | They don't make cars |
| | 2 | Time flies. It also drives. |
| | 30 | It's a bit of a |
| | 91 | About the brain |
| | 56 | Have we gotten ahead |
| | 21 | The future is stronger. |
| | 36 | Sports car or luxury |
| | 45 | |

Notes Did not run opp. TOC; ran in Road Tests. 180 total pages.

CPPV - Competitive Page Placement Violation

Page 17 of 30

Figure 147

Brand Publication Analysis

| | | |
|---|---|---|
| 70 | | Weight is the enemy. |
| 61 | | |
| 14 | | Driver is King. |
| 151 | | Recharged Reinvigorated |
| 9 | | Pavement will always |
| 119 | (CPPV) | It's "Best Buy" status |
| 10 | | Not everyone was qualified |
| 130 | | Attention: Motorheads, |
| Cover 3 | | Wait 45 minutes after |
| 76 | | You think about everything |

Notes Did not run opp. TOC; ran in Road Tests. 180 total pages.

CPPV - Competitive Page Placement Violation

Page 18 of 30

Figure 148

Brand Publication Analysis

Client: Agency:

Brand:

| | | | | | | |
|---|---|---|---|---|---|---|
| Cost Data | Insertion Order: | $16,005.50 | Publication: | Nursing | Purchased Gross Circ. (000's): | 316.9 |
| | Billed to Client: | $16,005.50 | Month: | 6/2003 | Page Placement: | 13 |
| | Invoiced Amount: | $16,005.50 | Insertion Date: | Jun 1 2003 | Page Size: | Full Page |
| | Purchased CPM: | $50.51 | Audited: | ☑ | Color: | 4 Color Bleed |
| | | | | | Tearsheet: | ☑ |

Competitive Review

| Brand(s) | Page Placement | Headline |
|---|---|---|

Notes Did not run Call Button creative, ran One Taken Care of. 104 total pages.

Page 19 of 30

Figure 149

Brand Publication Analysis

Client: Agency:

Brand:

| | | | | | | | |
|---|---|---|---|---|---|---|---|
| **Cost Data** | **Insertion Order:** | $45,343.25 | **Publication:** | Parenting | **Purchased Gross Circ. (000's):** | 2150.0 |
| | **Billed to Client:** | $45,343.46 | **Month:** | 6/2003 | **Page Placement:** | 38 |
| | **Invoiced Amount:** | $45,343.46 | **Insertion Date:** | Jun 1 2003 | **Page Size:** | Half Page Spread |
| | **Purchased CPM:** | $21.09 | **Audited:** | ☑ | **Color:** | 4 Color |
| | | | | | **Tearsheet:** | ☑ |

Competitive Review

| Brand(s) | Page Placement | Headline |
|---|---|---|
| | 48 | Some Superheroes use |
| | 98 | 100 years. The sheet |
| | 203 | "Anybody else in there"? |
| | Cover 2 | When driving on a |
| | 78 | Not everyone was qualified |

Notes 268 total pages.

Page 20 of 30

Figure 150

Brand Publication Analysis

Client: Agency:

Brand:

| Cost Data | | | | | | |
|---|---|---|---|---|---|---|
| **Insertion Order:** | $49,082.40 | **Publication:** | Real Simple | **Purchased Gross Circ. (000's):** | 1200.0 |
| **Billed to Client:** | $49,082.40 | **Month:** | 6/2003 | **Page Placement:** | 174 |
| **Invoiced Amount:** | $49,082.40 | **Insertion Date:** | Jun 1 2003 | **Page Size:** | Full Page |
| **Purchased CPM:** | $40.90 | **Audited:** | ☑ | **Color:** | 4 Color Bleed |
| | | | | **Tearsheet:** | ☑ |

Competitive Review

| Brand(s) | Page Placement | Headline |
|---|---|---|
| | 145 | Some are inspired by |
| | 261 | Burn Rubber, Not Money. |
| | 152 | Yes. Breathing room |
| | 70 | Here's to muscle. Past. |
| | 79 | Is there an award for |
| | 108 | "I'm no fool. |
| | 29 | Evolution of the |
| | 89 | You are practicing |
| | 91 | At intersections and |
| | 93 | If you're ever involved |
| | Cover 4 | Security. Unlike any other. |
| | 4 | FYI: The windshield |
| | 20 | Take a ride in my |
| | 38 | Nothing like a little |
| | 127 | Welcome to the state |
| | 63 | "Feel safe and you |
| | 12 | Not everyone was qualified |
| | 46 | You are here. |

Notes 288 total pages.

Page 21 of 30

Figure 151

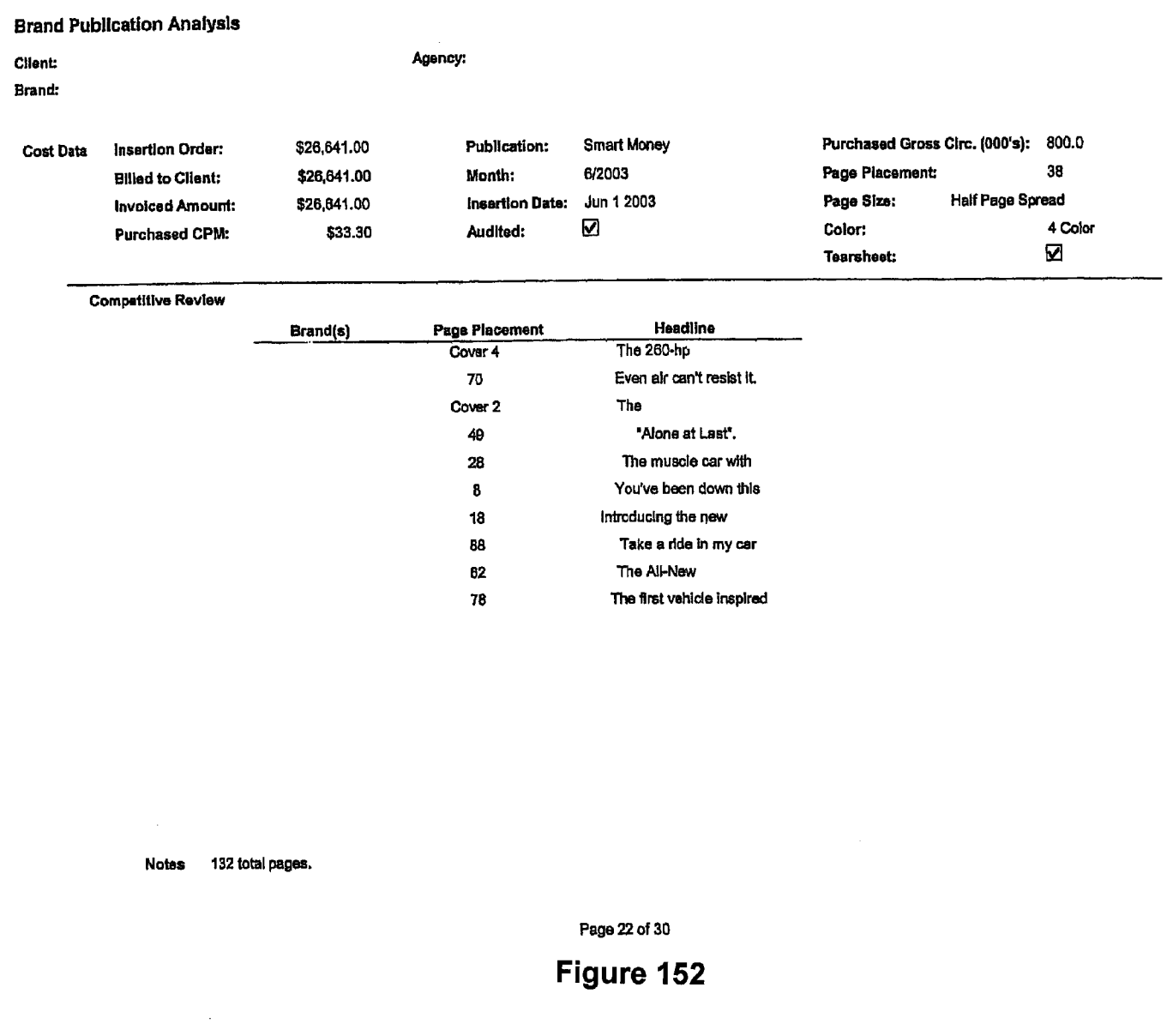

Brand Publication Analysis

Client: Agency:

Brand:

Cost Data

| | | | | | |
|---|---|---|---|---|---|
| **Insertion Order:** | $26,641.00 | **Publication:** | Smart Money | **Purchased Gross Circ. (000's):** | 800.0 |
| **Billed to Client:** | $26,641.00 | **Month:** | 6/2003 | **Page Placement:** | 38 |
| **Invoiced Amount:** | $26,641.00 | **Insertion Date:** | Jun 1 2003 | **Page Size:** | Half Page Spread |
| **Purchased CPM:** | $33.30 | **Audited:** | ☑ | **Color:** | 4 Color |
| | | | | **Tearsheet:** | ☑ |

Competitive Review

| Brand(s) | Page Placement | Headline |
|---|---|---|
| | Cover 4 | The 260-hp |
| | 70 | Even air can't resist it. |
| | Cover 2 | The |
| | 49 | "Alone at Last". |
| | 28 | The muscle car with |
| | 8 | You've been down this |
| | 18 | Introducing the new |
| | 88 | Take a ride in my car |
| | 62 | The All-New |
| | 78 | The first vehicle inspired |

Notes 132 total pages.

Figure 152

Brand Publication Analysis

Client: Agency:

Brand:

| Cost Data | | | | | | |
|---|---|---|---|---|---|---|
| Insertion Order: | $52,774.80 | Publication: | Smithsonian | Purchased Gross Circ. (000's): | 2000.0 |
| Billed to Client: | $52,774.80 | Month: | 6/2003 | Page Placement: | 28 |
| Invoiced Amount: | $52,774.80 | Insertion Date: | Jun 1 2003 | Page Size: | Half Page Spread |
| Purchased CPM: | $26.39 | Audited: | ☑ | Color: | 4 Color |
| | | | | Tearsheet: | ☑ |

Competitive Review

| Brand(s) | Page Placement | Headline |
|---|---|---|
| | 16 | There's something about |
| | Cover 2 | It's a bit of a |
| | 71 | Your own 105.6-Cubic |

Notes Did not run in Mall; ran in Object at Hand. 113 total pages.

Page 23 of 30

Figure 153

Brand Publication Analysis

Client: Agency:

Brand:

| | | | | | | |
|---|---|---|---|---|---|---|
| Cost Data | Insertion Order: | $64,145.25 | Publication: | Southern Living | Purchased Gross Circ. (000's): | 2550.0 |
| | Billed to Client: | $64,145.25 | Month: | 6/2003 | Page Placement: | 108 |
| | Invoiced Amount: | $64,145.24 | Insertion Date: | Jun 1 2003 | Page Size: | Half Page Spread |
| | Purchased CPM: | $25.16 | Audited: | ☑ | Color: | 4 Color |
| | | | | | Tearsheet: | ☑ |

Competitive Review

| Brand(s) | Page Placement | Headline |
|---|---|---|
| | 17 | Commonly used phrases |
| | 73 | Best. Best. Best. |
| | 99 | Zero to "I'll take it" |
| | Cover 2 | Protection and fun haven't |
| | 29 | Style |
| | 31 | Confidence |
| | 33 | Drive & Love |
| | 237 | Burn Rubber, Not Money. |
| | 117 | The ease of the |
| | 140 | Here for the long haul. |
| | 60 | There's something about |
| | 80 | Every king needs |
| | 188 | Sit back, Relax, |
| | 45 | You are practicing safe |
| | 47 | When commuting to work, |
| | 49 | If you're ever involved |
| | 8 | FYI: The windshield |
| | 91 | All this and change |

Notes 236 total pages.

Page 24 of 30

Figure 154

Brand Publication Analysis

Client: Agency:

Brand:

| | | | | | | |
|---|---|---|---|---|---|---|
| **Cost Data** | **Insertion Order:** | $234,362.00 | **Publication:** | Sports Illustrated | **Purchased Gross Circ. (000's):** | 3150.0 |
| | **Billed to Client:** | $234,362.00 | **Month:** | 6/2003 | **Page Placement:** | 8 |
| | **Invoiced Amount:** | $234,362.00 | **Insertion Date:** | Jun 23 2003 | **Page Size:** | Spread |
| | **Purchased CPM:** | $74.40 | **Audited:** | ☑ | **Color:** | 4 Color |
| | | | | | **Tearsheet:** | ☑ |

Competitive Review

| Brand(s) | Page Placement | Headline |
|---|---|---|
| | 81 | America's greatest car |
| | 17 | |
| | Cover 4 | If a towing contest |
| | 57 | The new i |
| | 64 | There's something about |
| | 27 | All new. |
| | 35 | It leaves other 4X4's |
| | 49 | You can almost hear |
| | 77 | Let's build a car |
| | 79 | Let's drive a more |
| | 81 | Let's go undercover. |
| | Cover 2 | You win some, you |
| | 41 | The all-new |

Notes 88 total pages.

Page 25 of 30

Figure 155

Brand Publication Analysis

Client: Agency:

Brand:

| | | | | | | | |
|---|---|---|---|---|---|---|---|
| **Cost Data** | **Insertion Order:** | $46,545.15 | **Publication:** | Sunset Magazine | **Purchased Gross Circ. (000's):** | | 1400.0 |
| | **Billed to Client:** | $46,545.23 | **Month:** | 6/2003 | **Page Placement:** | | 9 |
| | **Invoiced Amount:** | $46,545.23 | **Insertion Date:** | Jun 1 2003 | **Page Size:** | Full Page | |
| | **Purchased CPM:** | $33.25 | **Audited:** | ☑ | **Color:** | | 4 Color Bleed |
| | | | | | **Tearsheet:** | | ☑ |

Competitive Review

| Brand(s) | Page Placement | Headline |
|---|---|---|
| | Cover 4 | The 260-hp |
| | Cover 2 | The ( |
| | 37 | Burn Rubber, Not Money. |
| | 44 | Some superheroes use |
| | 69 | Here for the long |
| | 100 | Never confuse your net |
| | 28 | FYI: The windshield |
| | 21 | All this and change |

Notes 160 total pages.

Page 26 of 30

Figure 156

Brand Publication Analysis

Client: Agency:

Brand:

| | | | | | | |
|---|---|---|---|---|---|---|
| **Cost Data** | **Insertion Order:** $35,218.05 | **Publication:** | This Old House | **Purchased Gross Circ. (000's):** | 950.0 |
| | **Billed to Client:** $35,217.88 | **Month:** | 6/2003 | **Page Placement:** | 76 |
| | **Invoiced Amount:** $35,217.88 | **Insertion Date:** | Jun 1 2003 | **Page Size:** | Half Page Spread |
| | **Purchased CPM:** $37.07 | **Audited:** | ☑ | **Color:** | 4 Color |
| | | | | **Tearsheet:** | ☑ |

Competitive Review

| Brand(s) | Page Placement | Headline |
|---|---|---|
| | 88 | If a towing contest |
| | 112 | City miles. Country Miles. |
| | 40 | Room for every Tom, |
| | Cover 2 | "Hey, that's cheating". |
| | 8 | Our surefooted 4-wheel |
| | 130 | If you're ever involved |
| | 28 | Remember when driving |
| | 69 | "If you're tough enough, |
| | 187 | Find your own road. |

Notes 186 total pages.

Figure 157

Brand Publication Analysis

Client:

Agency:

Brand:

| | | | | | | |
|---|---|---|---|---|---|---|
| **Cost Data** | **Insertion Order:** | $96,407.00 | **Publication:** | Time | **Purchased Gross Circ. (000's):** | 4000.0 |
| | **Billed to Client:** | $96,407.00 | **Month:** | 6/2003 | **Page Placement:** | 18 |
| | **Invoiced Amount:** | $96,407.00 | **Insertion Date:** | Jun 9 2003 | **Page Size:** | Half Page Spread |
| | **Purchased CPM:** | $24.10 | **Audited:** | ☑ | **Color:** | 4 Color |
| | | | | | **Tearsheet:** | ☑ |

Competitive Review

| Brand(s) | Page Placement | Headline |
|---|---|---|
| | 26 | Here for the long |
| | 56 | 100 Years |
| | 106 | Thirty years ago, |
| | Cover 2 | And you thought we |
| | 116 | Sit back, relax, and |
| | 91 | There I was face |
| | 10 | Style. Unlike any other. |
| | 98 | Driver is king. |
| | 82 | You win some, you |
| | Cover 3 | All this and change back |

Notes 90 total pages.

Figure 158

Brand Publication Analysis

Client: Agency:

Brand:

| | | | | | | |
|---|---|---|---|---|---|---|
| Cost Data | Insertion Order: | $192,814.00 | Publication: | Time | Purchased Gross Circ. (000's): | 4000.0 |
| | Billed to Client: | $192,814.00 | Month: | 6/2003 | Page Placement: | 26 |
| | Invoiced Amount: | $192,814.00 | Insertion Date: | Jun 30 2003 | Page Size: | Spread |
| | Purchased CPM: | $48.20 | Audited: | ☑ | Color: | 4 Color |
| | | | | | Tearsheet: | ☑ |

Competitive Review

| Brand(s) | Page Placement | Headline |
|---|---|---|
| | 18 | This is cloud ten. |
| | 57 | Thirty years ago |
| | 14 | |
| | Cover 3 | The all-new |

Notes 76 total pages.

Page 29 of 30

Figure 159

Brand Publication Analysis

Client: Agency:

Brand:

| | | | | | | |
|---|---|---|---|---|---|---|
| **Cost Data** | **Insertion Order:** | $47,237.05 | **Publication:** | Travel & Leisure | **Purchased Gross Circ. (000's):** | 950.0 |
| | **Billed to Client:** | $47,237.05 | **Month:** | 6/2003 | **Page Placement:** | 80 |
| | **Invoiced Amount:** | $47,237.04 | **Insertion Date:** | Jun 1 2003 | **Page Size:** | Half Page Spread |
| | **Purchased CPM:** | $49.72 | **Audited:** | ☑ | **Color:** | 4 Color |
| | | | | | **Tearsheet:** | ☑ |

Competitive Review

| Brand(s) | Page Placement | Headline |
|---|---|---|
| | 18 | Commonly used phrases |
| | 96 | was here. |
| | 162 | Break Through |
| | 200 | Serving overprotective parents |
| | 131 | Style |
| | 133 | Confidence |
| | 135 | Drive & Love |
| | 62 | 100 years. The sheet |
| | Cover 3 | "Believe me. It's good |
| | 89 | The new |
| | 22 | The |
| | 47 | The new |
| | 55 | You can almost hear |
| | Cover 2 | Performance. Unlike any other. |
| | 10 | Signal without looking |
| | 26 | Passengers dream of driving. |

Notes 226 total pages.

Page 30 of 30

Figure 160

Print

- Brand analysis provided for all April, May and June insertions in
  - 37 consumer publications
    - Includes SIPs (special interest pubs)
  - 3 Hispanic magazines
  - 1 car enthusiast magazine
  - 1 Auto Show Program
  - 2 other print vehicles
    - SCLC Magazine
    - Trade Union Courier

Brand Analysis

- print ads are analyzed to verify that ads ran as ordered
- All discrepancies are noted on the following pages
- Total gross value of ads with print discrepancies:

$439,483 (8.0% of spending)

2Q03 Figure 162 68

Brand Analysis

- Compared insertion orders to ads "as run" in checking copies of issues and publication invoices
  - All creative unit sizes ran as ordered
  - All creative ad copy ran as ordered except
    - Reader's Digest, June Gross Cost: $180,000
      - ad ran with creative not as ordered 2Q03 Figure 163 69

Brand Analysis

- Compared requested and/or guaranteed ad positions as indicated on insertion orders
  - All were met with the following exceptions
    - NY Auto Show Program, 4/18
      Gross cost: $4,500
      - ad did not appear in 1st third of book as ordered; appeared on page 75 out of 144 (52%)
    - Car & Driver, May Gross cost: $90,176
      - ad did not appear in 1st 50% of book; appeared on page 149 out 184 (81%)
      - Also in this issue, ad within 12 pages of ad 2Q03 : Figure 164 70

Brand Analysis

- Exceptions (cont'd)
  - SL Vacations, May Gross cost: $ 0
    - ad did not appear in 1st third of book; appeared on page 219 out 264 (83%)
  - Budget Living, June Gross cost: $11,765
    - ad did not appear opposite Auto Column as ordered; appeared within Loose Change department opposite editorial 2Q03 Figure 165 71

Brand Analysis

- Exceptions (cont'd)
  - Nick Jr., June Gross cost: $28,400
    - ad did not appear opposite Heads Up or within 1st 10% of book as ordered; appeared in C'mon Over department opposite editorial on page 33 out of 84 (39%)

2Q03 ! Figure 166 72

Brand Analysis

- Ad position *upgrades* in 2Q03 occurred in
  - Family Circle, 6/10/03
    - From "first 10% of book" to Cover 2
  - Parenting, June
    - From "within editorial" to Cover 2
  - Travel & Leisure Family, June
    - From "1st third of book" to Cover 2

Brand Analysis

- All issues were examined for competitive advertising separation requirements as indicated on the insertion orders
  - Brand Analysis indicates CPPV (competitive page placement violation) when requirements fall short 2Q03 Figure 168 74

Figure 169:
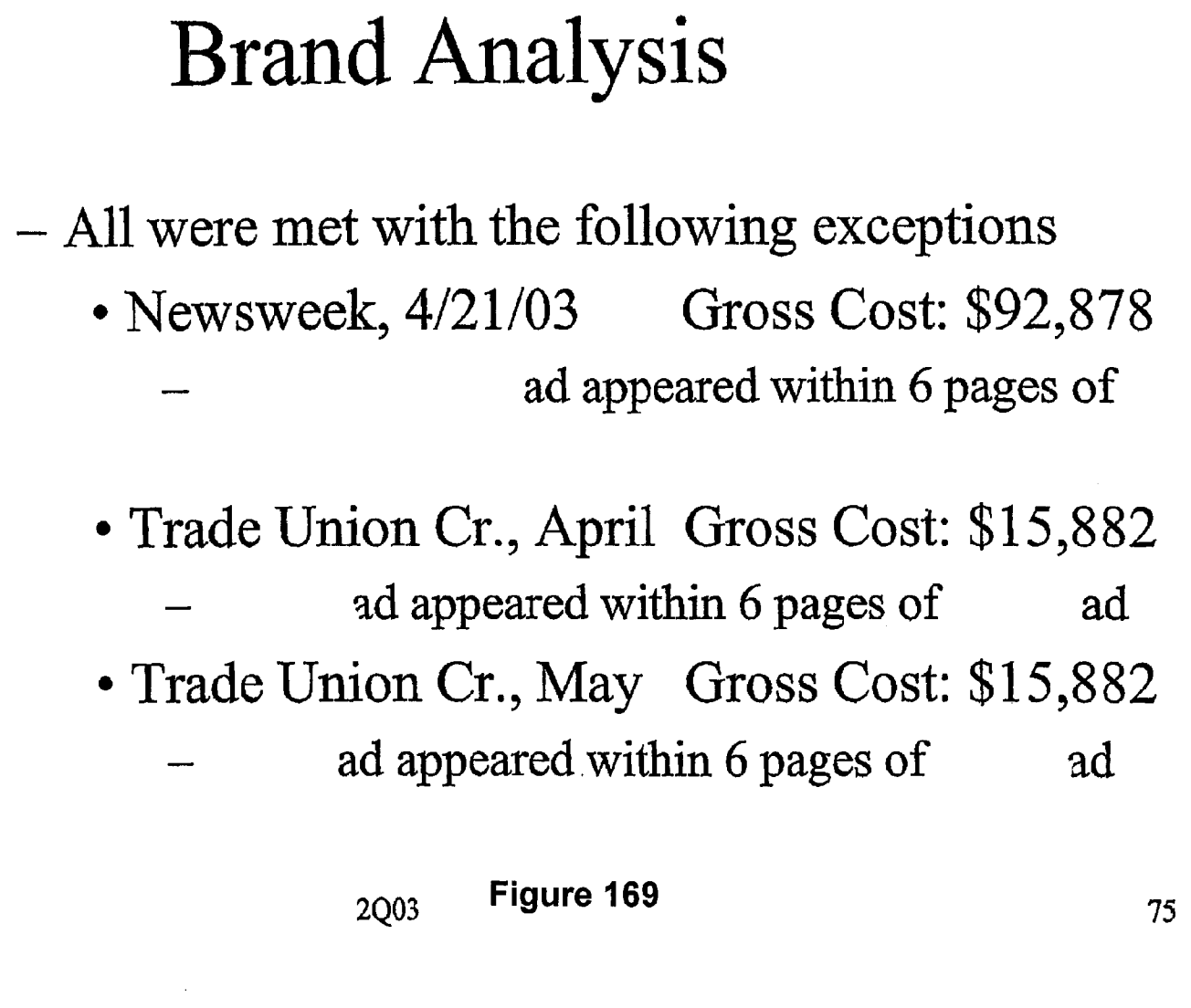

Brand Analysis

- All were met with the following exceptions
  - Newsweek, 4/21/03 Gross Cost: $92,878
    - ad appeared within 6 pages of
  - Trade Union Cr., April Gross Cost: $15,882
    - ad appeared within 6 pages of ad
  - Trade Union Cr., May Gross Cost: $15,882
    - ad appeared within 6 pages of ad

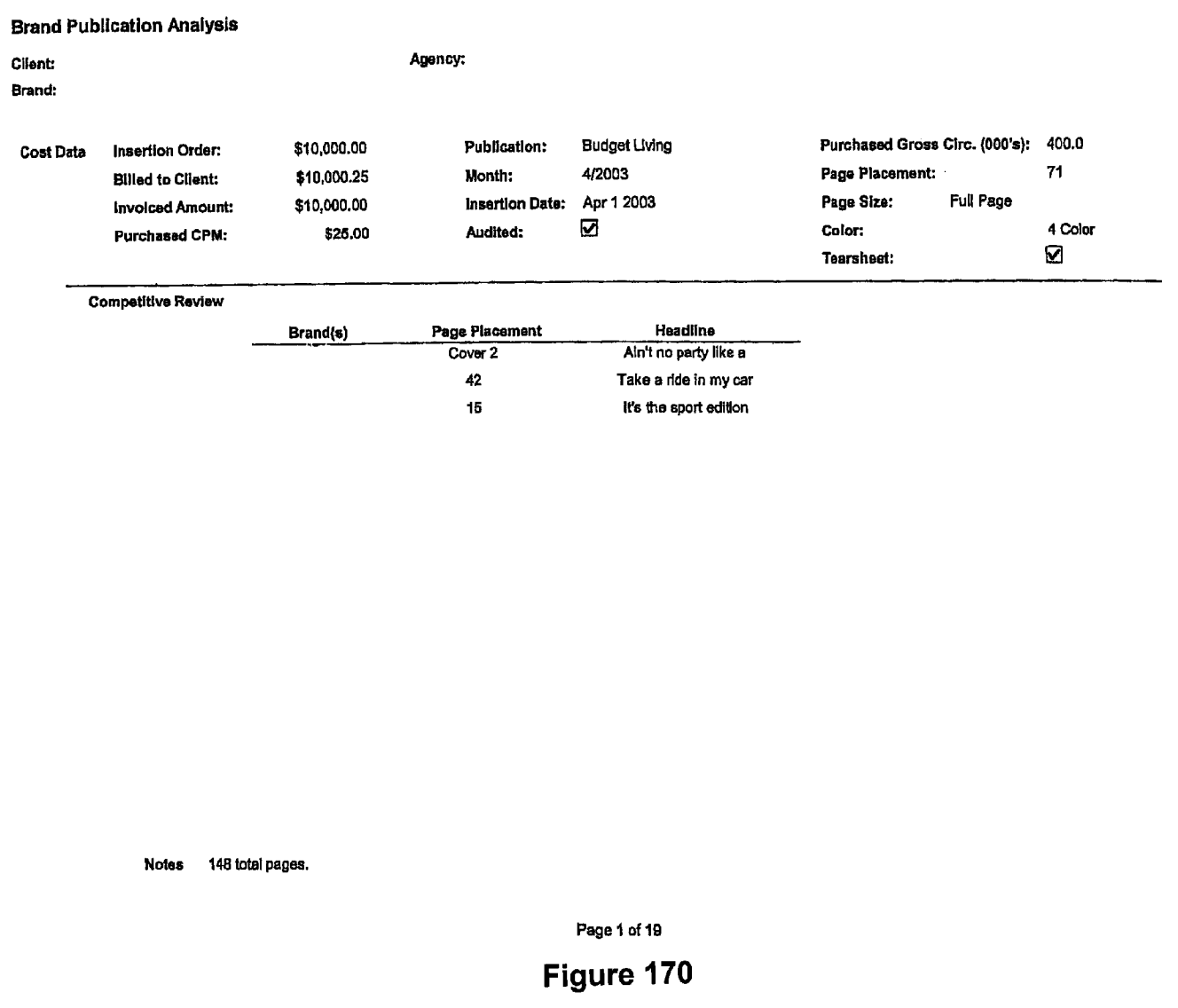

Brand Publication Analysis

Client: Agency:

Brand:

| | | | | | | |
|---|---|---|---|---|---|---|
| Cost Data | Insertion Order: | $10,000.00 | Publication: | Budget Living | Purchased Gross Circ. (000's): | 400.0 |
| | Billed to Client: | $10,000.25 | Month: | 4/2003 | Page Placement: | 71 |
| | Invoiced Amount: | $10,000.00 | Insertion Date: | Apr 1 2003 | Page Size: | Full Page |
| | Purchased CPM: | $25.00 | Audited: | ☑ | Color: | 4 Color |
| | | | | | Tearsheet: | ☑ |

Competitive Review

| Brand(s) | Page Placement | Headline |
|---|---|---|
| | Cover 2 | Ain't no party like a |
| | 42 | Take a ride in my car |
| | 15 | It's the sport edition |

Notes 148 total pages.

Page 1 of 19

Figure 170

Brand Publication Analysis

Client: Agency:

Brand:

| | | | | | | |
|---|---|---|---|---|---|---|
| Cost Data | Insertion Order: | $39,525.00 | Publication: | Cooking Light | Purchased Gross Circ. (000's): | 1600.0 |
| | Billed to Client: | $39,525.00 | Month: | 4/2003 | Page Placement: | 177 |
| | Invoiced Amount: | $39,525.00 | Insertion Date: | Apr 1 2003 | Page Size: | Full Page |
| | Purchased CPM: | $24.70 | Audited: | ☑ | Color: | 4 Color |
| | | | | | Tearsheet: | ☑ |

Competitive Review

| Brand(s) | Page Placement | Headline |
|---|---|---|
| | 153 | The new : |
| | 19 | Serving overprotective parents |
| | 211 | Zero to "I'll take it" |
| | 166 | Burn Rubber, not money. |
| | Cover 2 | Caution was not thrown |
| | 120 | Glass ceiling |
| | Cover 4 | |

Notes 238 total pages.

Page 2 of 19

Figure 171

Brand Publication Analysis

Client: Agency:

Brand:

| | | | | | | |
|---|---|---|---|---|---|---|
| **Cost Data** | **Insertion Order:** | $65,492.50 | **Publication:** | Good Housekeeping | **Purchased Gross Circ. (000's):** | 4600.0 |
| | **Billed to Client:** | $65,492.50 | **Month:** | 4/2003 | **Page Placement:** | 7 |
| | **Invoiced Amount:** | $65,492.50 | **Insertion Date:** | Apr 1 2003 | **Page Size:** | Full Page |
| | **Purchased CPM:** | $14.24 | **Audited:** | ☑ | **Color:** | 4 Color |
| | | | | | **Tearsheet:** | ☑ |

Competitive Review

| Brand(s) | Page Placement | Headline |
|---|---|---|
| | 54 | Zero to "I'll take it" |

Notes 224 total pages.

Page 3 of 19

Figure 172

Brand Publication Analysis

Client: Agency:

Brand:

| | | | | | | |
|---|---|---|---|---|---|---|
| Cost Data | Insertion Order: | $55,777.00 | Publication: | Instyle | Purchased Gross Circ. (000's): | 1600.0 |
| | Billed to Client: | $55,777.00 | Month: | 4/2003 | Page Placement: | 359 |
| | Invoiced Amount: | $55,777.00 | Insertion Date: | Apr 1 2003 | Page Size: | Full Page |
| | Purchased CPM: | $34.86 | Audited: | ☑ | Color: | 4 Color |
| | | | | | Tearsheet: | ☑ |

Competitive Review

| Brand(s) | Page Placement | Headline |
|---|---|---|
| | 398 | Break through |
| | 299 | What the? |
| | 281 | Glass ceiling |
| | 269 | The new discovery. |
| | 188 | Get Noticed. |
| | 437 | Wait 45 minutes after |

Notes 464 total pages.

Figure 173

Brand Publication Analysis

Client: Agency:

Brand:

| Cost Data | | | | | | |
|---|---|---|---|---|---|---|
| Insertion Order: | $67,197.60 | Publication: | Money | Purchased Gross Circ. (000's): | | 1900.0 |
| Billed to Client: | $67,197.60 | Month: | 4/2003 | Page Placement: | | 39 |
| Invoiced Amount: | $67,197.60 | Insertion Date: | Apr 1 2003 | Page Size: | Full Page | |
| Purchased CPM: | $35.37 | Audited: | ☑ | Color: | | 4 Color |
| | | | | Tearsheet: | | ☑ |

Competitive Review

| Brand(s) | Page Placement | Headline |
|---|---|---|
| | 107 | Zero to "I'll take it" |
| | 57 | The new |
| | Cover 2 | Your final destination |
| | 21 | Never confuse you net |
| | 56 | There I was face to |
| | 143 | You grab hold of it. |
| | 116 | Take a ride in my |
| | Cover 4 | Roughing it. |
| | 75 | Sumo size. Ninja reflexes. |

Notes 150 total pages.

Page 5 of 19

Figure 174

Brand Publication Analysis

Client: Agency:

Brand:

| | | | | | | |
|---|---|---|---|---|---|---|
| Cost Data | Insertion Order: | $1,487.50 | Publication: | Motor Trend - Spanish | Purchased Gross Circ. (000's): | 56.8 |
| | Billed to Client: | $1,487.50 | Month: | 4/2003 | Page Placement: | 17 |
| | Invoiced Amount: | $1,487.50 | Insertion Date: | Apr 1 2003 | Page Size: | Full Page |
| | Purchased CPM: | $26.19 | Audited: | ☑ | Color: | 4 Color |
| | | | | | Tearsheet: | ☑ |

Competitive Review

| Brand(s) | Page Placement | Headline |
|---|---|---|

Notes

Page 6 of 19

Figure 175

Brand Publication Analysis

Client: Agency:

Brand:

| | | | | | | | |
|---|---|---|---|---|---|---|---|
| **Cost Data** | **Insertion Order:** | $3,825.00 | **Publication:** | New York Auto Show | **Purchased Gross Circ. (000's):** | | 5.0 |
| | **Billed to Client:** | $3,825.00 | **Month:** | 4/2003 | **Page Placement:** | | 75 |
| | **Invoiced Amount:** | $3,825.00 | **Insertion Date:** | Apr 18 2003 | **Page Size:** | Full Page | |
| | **Purchased CPM:** | $765.00 | **Audited:** | ☑ | **Color:** | | 4 Color |
| | | | | | **Tearsheet:** | | ☑ |

Competitive Review

| Brand(s) | Page Placement | Headline |
|---|---|---|
| | Cover 3 | Flip a switch and |
| | 18 | Land Shark. |
| | 6 | was here. |
| | 40 | This vehicle causes frequent |
| | 8 | Break Through |
| | 36 | Bold New Crew |
| | 10 | The , arrives |
| | 31 | What if you didn't |
| | 21 | "Wish We'd thought |
| | 2 | Side cargo doors. |
| | 63 | Plenty to smile about. |
| | 12 | Different for the sake |
| | 15 | Introducing the all - |
| | 14 | Come see the new |
| | 4 | Putting the world on |
| | 57 | Chip Ol' Block. |
| | 27 | This two-seater cabriolet |
| | 35 | The all-new |

Notes Did not run in 1st third of book. No comp. separation guarantee. 144 total pages.

CPPV - Competitive Page Placement Violation

Page 7 of 19

Figure 176

Brand Publication Analysis

| | | |
|---|---|---|
| Cover 2 | | Turning the Auto Show |
| 49 | | Seats up to five |
| 47 | | Meet the car company |
| 22 | | This is what happens |
| 55 | | Here are a few tips |
| 71 | (CPPV) | Now available in |
| 51 | | Six brilliant ways to |
| Cover 2 | | "Man! Have you seen |
| Cover 4 | | Announcing our first |
| 16 | | The voice in our head |

Notes Did not run in 1st third of book. No comp. separation guarantee. 144 total pages.

CPPV - Competitive Page Placement Violation

Page 8 of 19

Figure 177

Brand Publication Analysis

Client: Agency:

Brand:

| | | | | | | | |
|---|---|---|---|---|---|---|---|
| **Cost Data** | **Insertion Order:** | $78,946.30 | **Publication:** | Newsweek | **Purchased Gross Circ. (000's):** | | 3100.0 |
| | **Billed to Client:** | $78,946.30 | **Month:** | 4/2003 | **Page Placement:** | | 54 |
| | **Invoiced Amount:** | $78,946.00 | **Insertion Date:** | Apr 21 2003 | **Page Size:** | Full Page | |
| | **Purchased CPM:** | $25.47 | **Audited:** | ☑ | **Color:** | | 4 Color |
| | | | | | **Tearsheet:** | | ☑ |

Competitive Review

| Brand(s) | Page Placement | Headline |
|---|---|---|
| | 15 | The new |
| | 60 (CPPV) | goes zero |
| | 37 | Sit back, relax, and |
| | Cover 2 | A rush, hour after hour. |
| | Cover 3 | |

Notes 66 total pages.

CPPV - Competitive Page Placement Violation

Figure 178

Brand Publication Analysis

Client: Agency:

Brand:

| | | | | | | | |
|---|---|---|---|---|---|---|---|
| **Cost Data** | **Insertion Order:** | $109,012.50 | **Publication:** | People | **Purchased Gross Circ. (000's):** | | 3350.0 |
| | **Billed to Client:** | $109,012.50 | **Month:** | 4/2003 | **Page Placement:** | | 42 |
| | **Invoiced Amount:** | $109,012.50 | **Insertion Date:** | Apr 1 2003 | **Page Size:** | Full Page | |
| | **Purchased CPM:** | $32.54 | **Audited:** | ☑ | **Color:** | | 4 Color |
| | | | | | **Tearsheet:** | | ☑ |

Competitive Review

| Brand(s) | Page Placement | Headline |
|---|---|---|
| | 14 | European driving performance |
| | Cover 2 | "ZZZZZZZZ" |
| | 85 | "We love you, too" |

Notes 118 total pages.

Figure 179

Brand Publication Analysis

Client: Agency:

Brand:

| | | | | | | | |
|---|---|---|---|---|---|---|---|
| **Cost Data** | **Insertion Order:** | $109,012.50 | **Publication:** | People | **Purchased Gross Circ. (000's):** | 3350.0 |
| | **Billed to Client:** | $109,012.50 | **Month:** | 4/2003 | **Page Placement:** | 101 |
| | **Invoiced Amount:** | $109,012.50 | **Insertion Date:** | Apr 28 2003 | **Page Size:** | Full Page |
| | **Purchased CPM:** | $32.54 | **Audited:** | ☑ | **Color:** | 4 Color |
| | | | | | **Tearsheet:** | ☑ |

Competitive Review

| Brand(s) | Page Placement | Headline |
|---|---|---|
| | 62 | Get Noticed. |

Notes 142 total pages.

Page 11 of 19

Figure 180

Brand Publication Analysis

Client: Agency:

Brand:

| | | | | | | |
|---|---|---|---|---|---|---|
| **Cost Data** | **Insertion Order:** | $49,082.40 | **Publication:** | Real Simple | **Purchased Gross Circ. (000's):** | 1200.0 |
| | **Billed to Client:** | $49,082.40 | **Month:** | 4/2003 | **Page Placement:** | 147 |
| | **Invoiced Amount:** | $49,082.40 | **Insertion Date:** | Apr 1 2003 | **Page Size:** | Full Page |
| | **Purchased CPM:** | $40.90 | **Audited:** | ☑ | **Color:** | 4 Color |
| | | | | | **Tearsheet:** | ☑ |

Competitive Review

| Brand(s) | Page Placement | Headline |
|---|---|---|
| | Cover 4 | The |
| | 54 | When you bring |
| | 117 | Get Noticed. |
| | 157 | Even those who |
| | 69 | Time to disappear. |

Notes 283 total pages.

Figure 181

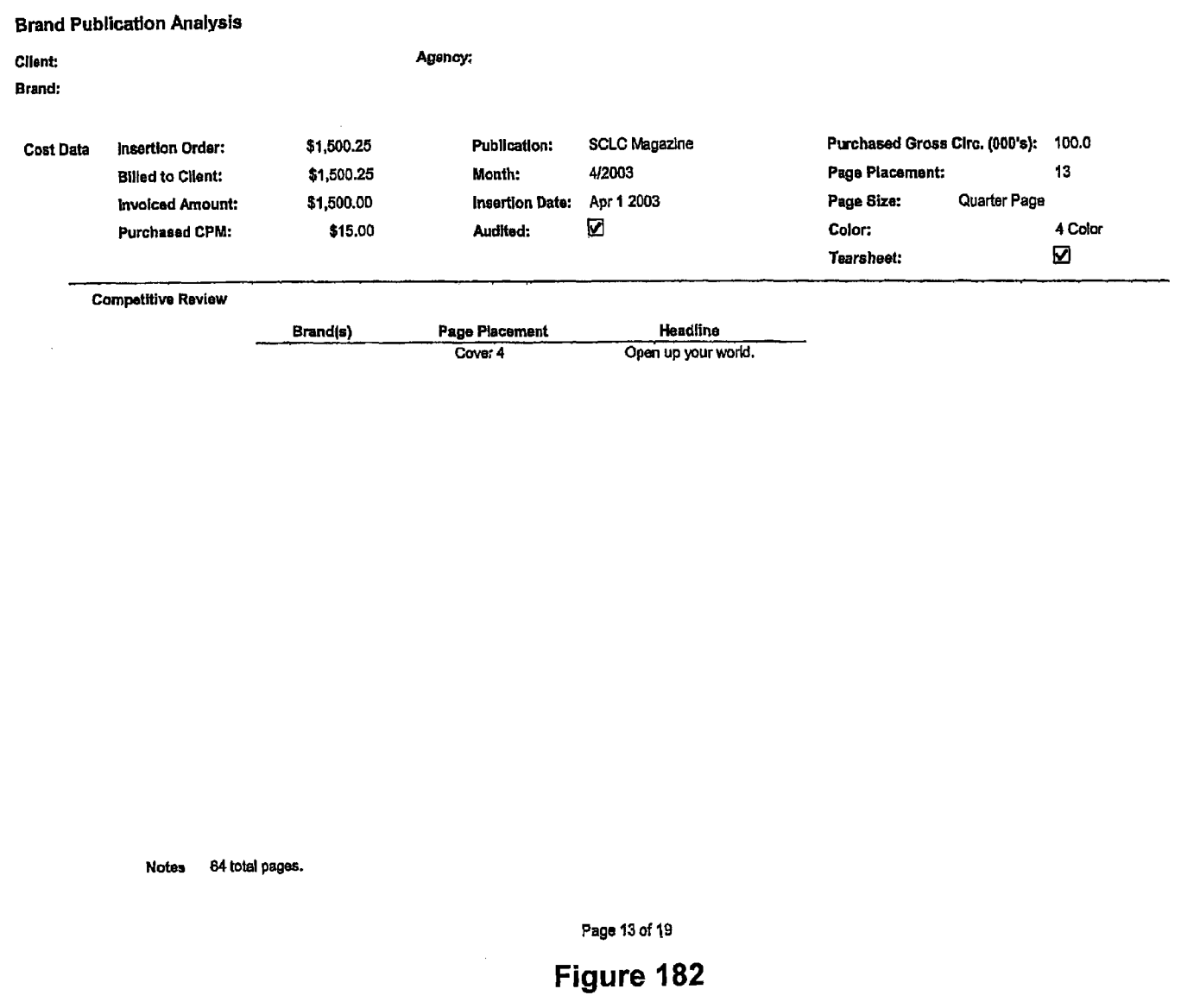

Brand Publication Analysis

Client: Agency:

Brand:

Cost Data

| | | | | | |
|---|---|---|---|---|---|
| **Insertion Order:** | $1,500.25 | **Publication:** | SCLC Magazine | **Purchased Gross Circ. (000's):** | 100.0 |
| **Billed to Client:** | $1,500.25 | **Month:** | 4/2003 | **Page Placement:** | 13 |
| **Invoiced Amount:** | $1,500.00 | **Insertion Date:** | Apr 1 2003 | **Page Size:** | Quarter Page |
| **Purchased CPM:** | $15.00 | **Audited:** | ☑ | **Color:** | 4 Color |
| | | | | **Tearsheet:** | ☑ |

Competitive Review

| Brand(s) | Page Placement | Headline |
|---|---|---|
| | Cover 4 | Open up your world. |

Notes 84 total pages.

Page 13 of 19

Figure 182

Brand Publication Analysis

Client: Agency:

Brand:

| | | | | | | |
|---|---|---|---|---|---|---|
| Cost Data | Insertion Order: | $64,145.25 | Publication: | Southern Living | Purchased Gross Circ. (000's): | 2550.0 |
| | Billed to Client: | $64,145.25 | Month: | 4/2003 | Page Placement: | Cover 4 |
| | Invoiced Amount: | $64,145.25 | Insertion Date: | Apr 1 2003 | Page Size: | Full Page |
| | Purchased CPM: | $25.16 | Audited: | ☑ | Color: | 4 Color |
| | | | | | Tearsheet: | ☑ |

Competitive Review

| Brand(s) | Page Placement | Headline |
|---|---|---|
| | 121 | was here. |
| | Cover 2 | Break through |
| | 131 | |
| | 78 | What trailers dream about. |
| | 33 | Evolution of the |
| | 45 | The 2003 |

Notes 185 total pages.

Figure 183

Brand Publication Analysis

Client: Agency:

Brand:

| | | | | | | | |
|---|---|---|---|---|---|---|---|
| Cost Data | Insertion Order: | $117,181.00 | Publication: | Sports Illustrated | Purchased Gross Circ. (000's): | | 3350.0 |
| | Billed to Client: | $117,181.00 | Month: | 4/2003 | Page Placement: | | 77 |
| | Invoiced Amount: | $117,181.00 | Insertion Date: | Apr 1 2003 | Page Size: | Full Page | |
| | Purchased CPM: | $34.98 | Audited: | ☑ | Color: | | 4 Color |
| | | | | | Tearsheet: | | ☑ |

Competitive Review

| Brand(s) | Page Placement | Headline |
|---|---|---|
| | 119 | The 200-hp, 6 speed |
| | 109 | Zero to "I'll take it" |
| | Cover 4 | You've heard of |
| | 142 | Best Premium Sports |
| | 17 | They have a starring |
| | 119 | "Anybody else in there?" |
| | 36 | Encourages traveling. |
| | 154 | Warning: Use the cup |
| | 50 | Three angry looking men |
| | Cover 2 | After years of throwing |
| | 173 | It's the sport edition |

Notes Baseball 2003 Preview Issue. 180 total pages.

Page 15 of 19

Figure 184

Brand Publication Analysis

Client: Agency:

Brand:

| | | | | | | |
|---|---|---|---|---|---|---|
| **Cost Data** | **Insertion Order:** $117,181.00 | **Publication:** | Sports Illustrated | **Purchased Gross Circ. (000's):** | | 3150.0 |
| | **Billed to Client:** $117,181.00 | **Month:** | 4/2003 | **Page Placement:** | | 53 |
| | **Invoiced Amount:** $117,181.00 | **Insertion Date:** | Apr 14 2003 | **Page Size:** | Full Page | |
| | **Purchased CPM:** $37.20 | **Audited:** | ☑ | **Color:** | | 4 Color |
| | | | | **Tearsheet:** | | ☑ |

Competitive Review

| Brand(s) | Page Placement | Headline |
|---|---|---|
| | 66 | The 260-hp. |
| | 45 | Zero to "I'll take it" |
| | Cover 2 | Best. Best. Best. |
| | Cover 4 | Evil twin included. |
| | 60 | It's a bit of a control |
| | 25 | There I was face |
| | 85 | Insects call it |
| | 18 | Makes everything else |
| | 32 | A rush, hour after hour. |
| | 78 | The 2003 |

Notes 90 total pages.

Figure 185

Brand Publication Analysis

Client: Agency:

Brand:

| Cost Data | | | | | | |
|---|---|---|---|---|---|---|
| Insertion Order: | $42,313.85 | Publication: | Sunset Magazine | Purchased Gross Circ. (000's): | | 1400.0 |
| Billed to Client: | $42,313.85 | Month: | 4/2003 | Page Placement: | | 23 |
| Invoiced Amount: | $42,313.85 | Insertion Date: | Apr 1 2003 | Page Size: | Full Page | |
| Purchased CPM: | $30.22 | Audited: | ☑ | Color: | | 4 Color |
| | | | | Tearsheet: | | ☑ |

Competitive Review

| Brand(s) | Page Placement | Headline |
|---|---|---|
| | Cover 2 | Break through |
| | 91 | Protection and fun |
| | 34 | The |
| | 213 | Burn rubber, not money. |
| | 147 | Anybody else in there? |
| | 46 | When you bring the |
| | 13 | It's the sport edition |

Notes 212 total pages.

Page 17 of 19

Figure 186

Brand Publication Analysis

Client: Agency:

Brand:

| | | | | | | | |
|---|---|---|---|---|---|---|---|
| **Cost Data** | **Insertion Order:** | $35,217.88 | **Publication:** | This Old House | **Purchased Gross Circ. (000's):** | | 950.0 |
| | **Billed to Client:** | $35,218.05 | **Month:** | 4/2003 | **Page Placement:** | | 27 |
| | **Invoiced Amount:** | $35,217.88 | **Insertion Date:** | Apr 1 2003 | **Page Size:** | Full Page | |
| | **Purchased CPM:** | $37.07 | **Audited:** | ☑ | **Color:** | | 4 Color |
| | | | | | **Tearsheet:** | | ☑ |

Competitive Review

| Brand(s) | Page Placement | Headline |
|---|---|---|
| | 66 | A sledgehammer in a |
| | 83 | Motor Trend truck |
| | 125 | Up here, the vehicle |
| | 42 | When you bring the |
| | Cover 2 | Introducing the new |
| | Cover 4 | Find your own road. |

Notes 154 total pages.

Page 18 of 19

Figure 187

Brand Publication Analysis

Client: Agency:

Brand:

| | | | | | | |
|---|---|---|---|---|---|---|
| **Cost Data** | **Insertion Order:** | $13,499.70 | **Publication:** | Trade Union Courier | **Purchased Gross Circ. (000's):** | 0.0 |
| | **Billed to Client:** | $13,499.70 | **Month:** | 4/2003 | **Page Placement:** | 54 |
| | **Invoiced Amount:** | $13,500.00 | **Insertion Date:** | Apr 1 2003 | **Page Size:** | Full Page |
| | **Purchased CPM:** | $0.00 | **Audited:** | ☑ | **Color:** | 4 Color |
| | | | | | **Tearsheet:** | ☑ |

Competitive Review

| Brand(s) | Page Placement | Headline |
|---|---|---|
| | 16 | Open up your world. |
| | 37 | Racing stripes, shaker |
| | 70 | What's up at |
| | Cover 2 | To a gearhead, |
| | 27 | Rain-Sensing windshield |
| | 59 (CPPV) | A "Best Buy" |

Notes 70 total pages.

CPPV - Competitive Page Placement Violation

Brand Publication Analysis

Client: Agency:

Brand:

| | | | | | | | |
|---|---|---|---|---|---|---|---|
| **Cost Data** | **Insertion Order:** | $29,282.50 | **Publication:** | AF Budget Travel | **Purchased Gross Circ. (000's):** | | 500.0 |
| | **Billed to Client:** | $29,282.50 | **Month:** | 5/2003 | **Page Placement:** | | Cover 2 |
| | **Invoiced Amount:** | $29,282.50 | **Insertion Date:** | May 1 2003 | **Page Size:** | Spread | |
| | **Purchased CPM:** | $58.57 | **Audited:** | ☑ | **Color:** | | 4 Color |
| | | | | | **Tearsheet:** | | ☑ |

Competitive Review

| Brand(s) | Page Placement | Headline |
|---|---|---|

Notes 129 total pages.

Page 1 of 29

Figure 189

Brand Publication Analysis

Client: Agency:

Brand:

| Cost Data | | | | | | |
|---|---|---|---|---|---|---|
| Insertion Order: | $7,417.10 | Publication: | Army Navy Times | Purchased Gross Circ. (000's): | | 242.0 |
| Billed to Client: | $7,417.10 | Month: | 5/2003 | Page Placement: | | 25 |
| Invoiced Amount: | $7,417.10 | Insertion Date: | May 26 2003 | Page Size: | Full Page | |
| Purchased CPM: | $30.65 | Audited: | ☑ | Color: | | Black and White |
| | | | | Tearsheet: | | ☑ |

Competitive Review

| Brand(s) | Page Placement | Headline |
|---|---|---|
| | 33 | Now you don't have |

Notes 63 total pages.

Figure 190

Brand Publication Analysis

Client:

Agency:

Brand:

| | | | | | | |
|---|---|---|---|---|---|---|
| **Cost Data** | **Insertion Order:** | $93,508.50 | **Publication:** | Better Homes & Gardens | **Purchased Gross Circ. (000's):** | 7600.0 |
| | **Billed to Client:** | $93,508.50 | **Month:** | 5/2003 | **Page Placement:** | 162 |
| | **Invoiced Amount:** | $93,508.50 | **Insertion Date:** | May 1 2003 | **Page Size:** | Spread |
| | **Purchased CPM:** | $12.30 | **Audited:** | ☑ | **Color:** | 4 Color |
| | | | | | **Tearsheet:** | ☑ |

Competitive Review

| Brand(s) | Page Placement | Headline |
|---|---|---|
| | 19 | Zero to "I'll take it" |
| | 4 | Protection and fun |
| | 126 | The |
| | 133 | Burn Rubber, not money. |
| | 54 | There's something about |
| | Cover 3 | And to think, they're |

Notes 312 total pages. One page ad and one page advertorial.

Figure 191

Brand Publication Analysis

Client: Agency:

Brand:

| | | | | | | | |
|---|---|---|---|---|---|---|---|
| **Cost Data** | **Insertion Order:** | $76,649.60 | **Publication:** | Car & Driver | **Purchased Gross Circ. (000's):** | | 1350.0 |
| | **Billed to Client:** | $76,649.60 | **Month:** | 5/2003 | **Page Placement:** | | 149 |
| | **Invoiced Amount:** | $76,649.60 | **Insertion Date:** | May 1 2003 | **Page Size:** | Full Page | |
| | **Purchased CPM:** | $56.78 | **Audited:** | ☑ | **Color:** | | 4 Color |
| | | | | | **Tearsheet:** | | ☑ |

Competitive Review

| Brand(s) | Page Placement | | Headline |
|---|---|---|---|
| | Cover 4 | | Introducing the |
| | 26 | | Every boy becomes a man. |
| | 57 | | Break through |
| | 8 | | Break through |
| | Cover 2 | | Break through |
| | 43 | | Of course the last 50 years |
| | 79 | | We'll be there. |
| | Cover 3 | | The new ( |
| | 85 | | "Fits like a glove." |
| | 155 | (CPPV) | You won't have to say |
| | 90 | | and they don't know |
| | 100 | | VVT-I. Or why padded |
| | 41 | | Stimulus the new V8 |
| | 30 | | Security. Unlike any other. |
| | 74 | | Remember when driving |
| | 108 | | Message Board |
| | 62 | | Take a ride in my car. |
| | 49 | | Recharged Reinvigorated |

Notes 184 total pages. Did not appear in 1st 50% of book.

CPPV - Competitive Page Placement Violation

Figure 192

Brand Publication Analysis

| | |
|---|---|
| 12 | If you're going to waste |
| 89 | Welcome to the state |
| 2 | "Control your power and |
| 128 | A "Best Buy" |
| 4 | Not everyone was qualified |
| 37 | Drivers Wanted. |

Notes 184 total pages. Did not appear in 1st 50% of book.

CPPV - Competitive Page Placement Violation

Figure 193

Brand Publication Analysis

Client: Agency:

Brand:

| | | | | | | |
|---|---|---|---|---|---|---|
| Cost Data | Insertion Order: | $51,708.90 | Publication: | Child | Purchased Gross Circ. (000's): | 1020.0 |
| | Billed to Client: | $51,708.90 | Month: | 5/2003 | Page Placement: | 32 |
| | Invoiced Amount: | $51,708.90 | Insertion Date: | May 1 2003 | Page Size: | Spread |
| | Purchased CPM: | $50.70 | Audited: | ☑ | Color: | 4 Color |
| | | | | | Tearsheet: | ☑ |

Competitive Review

| Brand(s) | Page Placement | Headline |
|---|---|---|
| | 132 | The |
| | 97 | "Anybody else in there?" |
| | Cover 2 | Caution was not |
| | 12 | The |

Notes 178 total pages.

Page 6 of 29

Figure 194

Brand Publication Analysis

Client: Agency:

Brand:

| Cost Data | | | | | | |
|---|---|---|---|---|---|---|
| Insertion Order: | $39,525.00 | Publication: | Cooking Light | Purchased Gross Circ. (000's): | 1600.0 |
| Billed to Client: | $39,525.00 | Month: | 5/2003 | Page Placement: | 247 |
| Invoiced Amount: | $39,525.00 | Insertion Date: | May 1 2003 | Page Size: | Full Page |
| Purchased CPM: | $24.70 | Audited: | ☑ | Color: | 4 Color |
| | | | | Tearsheet: | ☑ |

Competitive Review

| Brand(s) | Page Placement | Headline |
|---|---|---|
| | 173 | Zero to "I'll take it" |
| | 191 | Some are inspired |
| | 44 | The |
| | 46 | Bright lights. Superstar |
| | 199 | Burn rubber, not money. |
| | 211 | Yes, breathing room and |
| | 180 | Glass ceiling |
| | 98 | The new |
| | Cover 2 | Remember when driving |
| | 16 | The I |
| | 126 | "3.5 seconds flats." |
| | 63 | "Feel safe and you |
| | 167 | Get Noticed. |
| | Cover 4 | 43 MPG. Translation: |

Notes 252 total pages.

Figure 195

Brand Publication Analysis

Client: Agency:

Brand:

| | | | | | | | |
|---|---|---|---|---|---|---|---|
| **Cost Data** | **Insertion Order:** | $37,400.00 | **Publication:** | Country Home | **Purchased Gross Circ. (000's):** | 1200.0 |
| | **Billed to Client:** | $37,400.00 | **Month:** | 5/2003 | **Page Placement:** | 7 |
| | **Invoiced Amount:** | $37,400.00 | **Insertion Date:** | May 1 2003 | **Page Size:** | Full Page |
| | **Purchased CPM:** | $31.17 | **Audited:** | ☑ | **Color:** | 4 Color |
| | | | | | **Tearsheet:** | ☑ |

Competitive Review

| Brand(s) | Page Placement | Headline |
|---|---|---|
| | 107 | The new' |

Notes 176 total pages.

Page 8 of 29

Figure 196

Brand Publication Analysis

Client: Agency:

Brand:

| | | | | | | |
|---|---|---|---|---|---|---|
| **Cost Data** | **Insertion Order:** $39,440.00 | **Publication:** | Country Living | **Purchased Gross Circ. (000's):** | | 1700.0 |
| | **Billed to Client:** $39,440.00 | **Month:** | 5/2003 | **Page Placement:** | | 63 |
| | **Invoiced Amount:** $39,440.00 | **Insertion Date:** | May 1 2003 | **Page Size:** | Full Page | |
| | **Purchased CPM:** $23.20 | **Audited:** | ☑ | **Color:** | | 4 Color |
| | | | | **Tearsheet:** | | ☑ |

Competitive Review

| Brand(s) | Page Placement | Headline |
|---|---|---|
| | 46 | was here. |
| | 25 | Zero to "I'll take it" |
| | Cover 4 | Protection and fun |
| | 8 | The |
| | 80 | Bum rubber, not money. |
| | 109 | *It's a bit of a control* |

Notes 196 total pages.

Page 9 of 29

Figure 197

Brand Publication Analysis

Client: Agency:

Brand:

| Cost Data | | | | | | |
|---|---|---|---|---|---|---|
| Insertion Order: | $39,764.70 | Publication: | Ebony | Purchased Gross Circ. (000's): | 1700.0 |
| Billed to Client: | $39,764.70 | Month: | 5/2003 | Page Placement: | 13 |
| Invoiced Amount: | $39,764.70 | Insertion Date: | May 1 2003 | Page Size: | Full Page |
| Purchased CPM: | $23.39 | Audited: | ☑ | Color: | 4 Color |
| | | | | Tearsheet: | ☑ |

Competitive Review

| Brand(s) | Page Placement | Headline |
|---|---|---|
| | 39 | Break through] |
| | 119 | Top dolla' with the |
| | 67 | Because tattoos are |
| | 24 | Nothing like a little |
| | Cover 4 | Smart Move |

Notes 178 total pages.

Figure 198

Brand Publication Analysis

Client: Agency:

Brand:

| | | | | | | |
|---|---|---|---|---|---|---|
| **Cost Data** | **Insertion Order:** | $55,777.00 | **Publication:** | Instyle | **Purchased Gross Circ. (000's):** | 1600.0 |
| | **Billed to Client:** | $55,777.00 | **Month:** | 5/2003 | **Page Placement:** | 375 |
| | **Invoiced Amount:** | $55,777.00 | **Insertion Date:** | May 1 2003 | **Page Size:** | Full Page |
| | **Purchased CPM:** | $34.86 | **Audited:** | ☑ | **Color:** | 4 Color |
| | | | | | **Tearsheet:** | ☑ |

Competitive Review

| Brand(s) | Page Placement | Headline |
|---|---|---|
| | 198 | Introducing the |
| | 285 | |
| | 305 | The |
| | 382 | The C |
| | 392 | Autostick |
| | 412 | Bright lights. Superstar |
| | 328 | Burn rubber, not money. |
| | 335 | Every day of the week |
| | 268 | When you bring the |
| | 32 | Have we gotten ahead |
| | 420 | Glass ceiling |
| | Cover 3 | The new discovery. |
| | 135 | Attento Italia |
| | 277 | THX-certified sound. |
| | 158 | Style. Unlike any other. |
| | 232 | Remember when driving |
| | 258 | The |
| | 46 | Welcome to the state of |

Notes 458 total pages.

Page 11 of 29

Figure 199

Brand Publication Analysis

241 The 2003

Notes 458 total pages.

Page 12 of 29

Figure 200

Brand Publication Analysis

Client: Agency:

Brand:

| | | | | | | |
|---|---|---|---|---|---|---|
| Cost Data | Insertion Order: | $96,534.50 | Publication: | Ladies Home Journal | Purchased Gross Circ. (000's): | 4100.0 |
| | Billed to Client: | $96,534.50 | Month: | 5/2003 | Page Placement: | 4 |
| | Invoiced Amount: | $96,534.50 | Insertion Date: | May 1 2003 | Page Size: | Spread |
| | Purchased CPM: | $23.55 | Audited: | ☑ | Color: | 4 Color |
| | | | | | Tearsheet: | ☑ |

Competitive Review

| Brand(s) | Page Placement | Headline |
|---|---|---|
| | 15 | Zero to "I'll take it" |
| | 37 | Some superheroes use |

Notes 228 total pages.

Page 13 of 29

Figure 201

Brand Publication Analysis

Client:

Agency:

Brand:

| | | | | | | |
|---|---|---|---|---|---|---|
| **Cost Data** | **Insertion Order:** | $11,050.00 | **Publication:** | Latina | **Purchased Gross Circ. (000's):** | 250.0 |
| | **Billed to Client:** | $11,050.00 | **Month:** | 5/2003 | **Page Placement:** | 71 |
| | **Invoiced Amount:** | $11,050.00 | **Insertion Date:** | May 1 2003 | **Page Size:** | Full Page |
| | **Purchased CPM:** | $44.20 | **Audited:** | ☑ | **Color:** | 4 Color |
| | | | | | **Tearsheet:** | ☑ |

Competitive Review

| Brand(s) | Page Placement | Headline |
|---|---|---|
| | 128 | Excede tus limites |
| | 17 | Lo grandioso viene |
| | 30 | Te vendria bien una |
| | 4 | Si Te Falta El |
| | 91 | Sin techo. Con techo. |

Notes 160 total pages.

Page 14 of 29

Figure 202

Brand Publication Analysis

Client: Agency:

Brand:

| | | | | | | |
|---|---|---|---|---|---|---|
| **Cost Data** | **Insertion Order:** | $131,795.56 | **Publication:** | Men's Health | **Purchased Gross Circ. (000's):** | 1625.0 |
| | **Billed to Client:** | $131,795.56 | **Month:** | 5/2003 | **Page Placement:** | 36 |
| | **Invoiced Amount:** | $131,795.56 | **Insertion Date:** | May 1 2003 | **Page Size:** | Spread |
| | **Purchased CPM:** | $81.10 | **Audited:** | ☑ | **Color:** | 4 Color |
| | | | | | **Tearsheet:** | ☑ |

Competitive Review

| Brand(s) | Page Placement | Headline |
|---|---|---|
| | 56 | Introducing the ‹ |
| | 119 | Best. Best. Best. |
| | 81 | Go lt'l ( |
| | 91 | Motor Trend truck of |
| | 127 | European driving performance |
| | 73 | Every day of the week |
| | 50 | "Hey, that's cheating." |
| | 143 | 64 seating configurations. |
| | 89 | Because tattoos are way |
| | 20 | Have we gotten ahead |
| | 29 | Insects call it |
| | 12 | Take a ride in my car. |
| | 2 | Feel everything but neutral. |
| | Cover 4 | The all-new |
| | 65 | Drivers wanted. |

Notes 200 total pages.

Page 15 of 29

Figure 203

Brand Publication Analysis

Client: Agency:

Brand:

| Cost Data | | | | | | |
|---|---|---|---|---|---|---|
| Insertion Order: | $41,616.00 | Publication: | Midwest Living | Purchased Gross Circ. (000's): | 850.0 |
| Billed to Client: | $41,616.00 | Month: | 5/2003 | Page Placement: | 14 |
| Invoiced Amount: | $41,616.00 | Insertion Date: | May 1 2003 | Page Size: | Spread |
| Purchased CPM: | $48.96 | Audited: | ☑ | Color: | 4 Color |
| | | | | Tearsheet: | ☑ |

Competitive Review

| Brand(s) | Page Placement | Headline |
|---|---|---|
| | Cover 4 | Land Shark. |
| | 151 | Zero to "I'll take it" |
| | 130 | The |
| | 162 | It's a bit of a control |
| | 106 | "3.5 seconds flat." |
| | 58 | "Feel safe and you |

Notes 252 total pages.

Page 16 of 29

Figure 204

Brand Publication Analysis

Client: Agency:

Brand:

| Cost Data | | | | | | |
|---|---|---|---|---|---|---|
| Insertion Order: | $67,197.60 | Publication: | Money | Purchased Gross Circ. (000's): | | 1900.0 |
| Billed to Client: | $67,197.60 | Month: | 5/2003 | Page Placement: | | 113 |
| Invoiced Amount: | $67,197.60 | Insertion Date: | May 1 2003 | Page Size: | Full Page | |
| Purchased CPM: | $35.37 | Audited: | ☑ | Color: | | 4 Color |
| | | | | Tearsheet: | | ☑ |

Competitive Review

| Brand(s) | Page Placement | Headline |
|---|---|---|
| | 106 | Certified agility |
| | 69 | was here. |
| | 87 | Break through |
| | 15 | Zero to "I'll take it" |
| | 136 | One company |
| | 78 | Your boss just brought |
| | 98 | It's a bit of a control |
| | 125 | "ZZZZZZZZ" |
| | 144 | When you bring the |
| | 23 | Der Neu |
| | 36 | Genuine exhilaration's |
| | 56 | Driver is king. |
| | 50 | You know those toys |
| | Cover 2 | Not everyone was |
| | 51 | The mini-market. |

Notes 150 total pages.

Page 17 of 29

Figure 205

Brand Publication Analysis

Client: Agency:

Brand:

| | | | | | | |
|---|---|---|---|---|---|---|
| **Cost Data** | **Insertion Order:** | $1,487.50 | **Publication:** | Motor Trend - Spanish | **Purchased Gross Circ. (000's):** | 56.8 |
| | **Billed to Client:** | $1,487.50 | **Month:** | 5/2003 | **Page Placement:** | 17 |
| | **Invoiced Amount:** | $1,487.50 | **Insertion Date:** | May 1 2003 | **Page Size:** | Full Page |
| | **Purchased CPM:** | $26.19 | **Audited:** | ☑ | **Color:** | 4 Color |
| | | | | | **Tearsheet:** | ☑ |

Competitive Review

| Brand(s) | Page Placement | Headline |
|---|---|---|

Notes 80 total pages.

Page 18 of 29

Figure 206

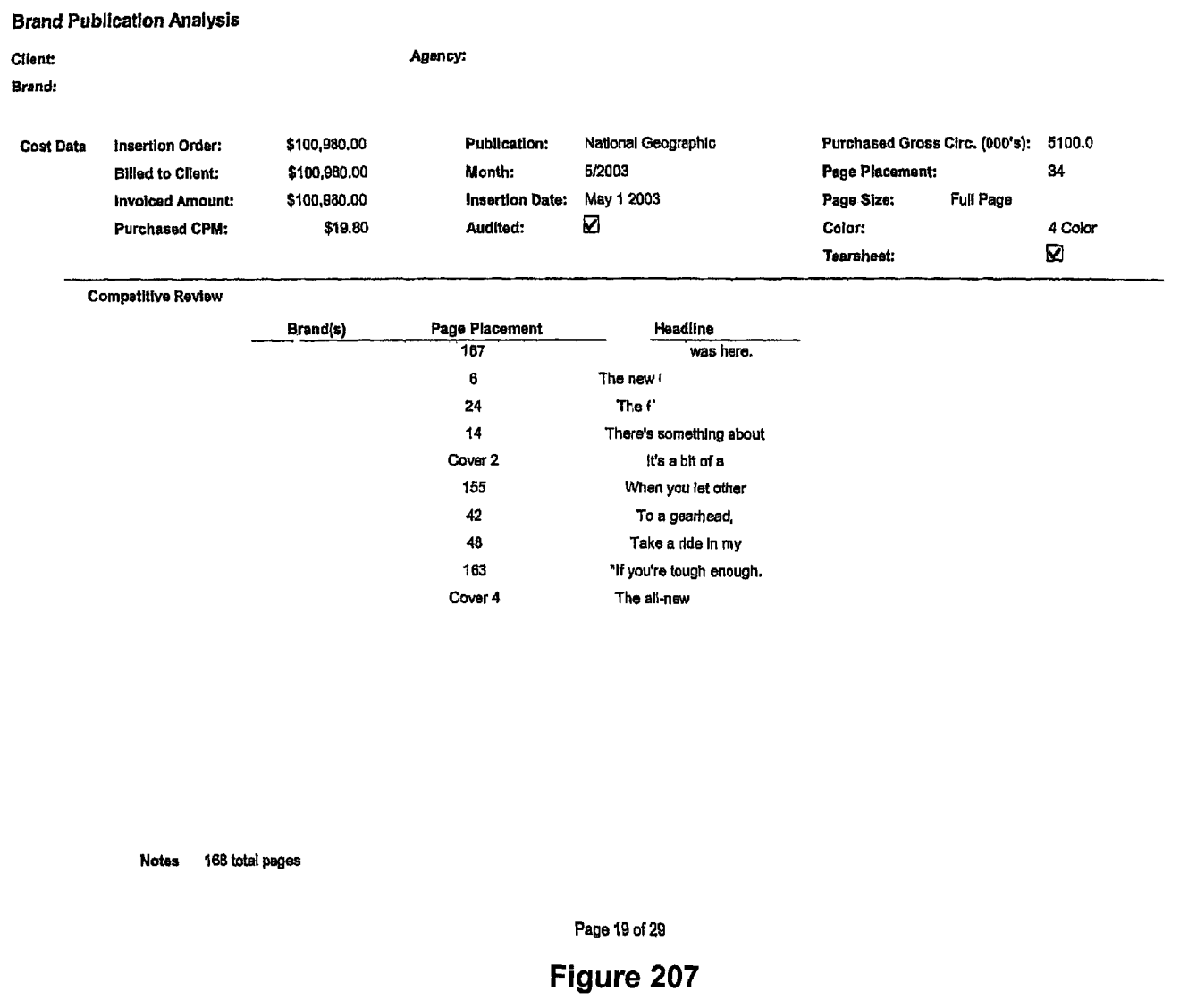

Brand Publication Analysis

Client:

Agency:

Brand:

| | | | | | | |
|---|---|---|---|---|---|---|
| **Cost Data** | **Insertion Order:** | $100,980.00 | **Publication:** | National Geographic | **Purchased Gross Circ. (000's):** | 5100.0 |
| | **Billed to Client:** | $100,980.00 | **Month:** | 5/2003 | **Page Placement:** | 34 |
| | **Invoiced Amount:** | $100,980.00 | **Insertion Date:** | May 1 2003 | **Page Size:** | Full Page |
| | **Purchased CPM:** | $19.80 | **Audited:** | ☑ | **Color:** | 4 Color |
| | | | | | **Tearsheet:** | ☑ |

Competitive Review

| Brand(s) | Page Placement | Headline |
|---|---|---|
| | 167 | was here. |
| | 6 | The new ı |
| | 24 | The f' |
| | 14 | There's something about |
| | Cover 2 | It's a bit of a |
| | 155 | When you let other |
| | 42 | To a gearhead, |
| | 48 | Take a ride in my |
| | 163 | "If you're tough enough. |
| | Cover 4 | The all-new |

Notes 168 total pages

Figure 207

Brand Publication Analysis

Client:
Agency:
Brand:

| Cost Data | | | | | | |
|---|---|---|---|---|---|---|
| Insertion Order: | $78,946.30 | Publication: | Newsweek | Purchased Gross Circ. (000's): | 3100.0 |
| Billed to Client: | $78,946.30 | Month: | 5/2003 | Page Placement: | 91 |
| Invoiced Amount: | $78,946.00 | Insertion Date: | May 12 2003 | Page Size: | Full Page |
| Purchased CPM: | $25.47 | Audited: | ☑ | Color: | 4 Color |
| | | | | Tearsheet: | ☑ |

Competitive Review

| Brand(s) | Page Placement | Headline |
|---|---|---|
| | 55 | Style |
| | 15 | This is cloud ten. |
| | 77 | All Day. All Night. |

Notes 102 total pages.

Page 20 of 29

Figure 208

Brand Publication Analysis

Client: Agency:

Brand:

| | | | | | | | |
|---|---|---|---|---|---|---|---|
| **Cost Data** | **Insertion Order:** | $23,651.25 | **Publication:** | People en Espanol | **Purchased Gross Circ. (000's):** | | 400.0 |
| | **Billed to Client:** | $23,587.50 | **Month:** | 5/2003 | **Page Placement:** | | 18 |
| | **Invoiced Amount:** | $23,587.50 | **Insertion Date:** | May 1 2003 | **Page Size:** | Full Page | |
| | **Purchased CPM:** | $59.13 | **Audited:** | ☑ | **Color:** | | 4 Color |
| | | | | | **Tearsheet:** | | ☑ |

Competitive Review

| Brand(s) | Page Placement | Headline |
|---|---|---|
| | 138 | Tu 000 |
| | 72 | El ( |
| | Cover 2 | Pura fuerza. |
| | 60 | Excede tus limites |
| | 90 | Te vendria bien una |
| | 50 | Si te falta el aire, |

Notes 148 total pages.

Figure 209

Brand Publication Analysis

Client: Agency:

Brand:

| | | | | | | | |
|---|---|---|---|---|---|---|---|
| Cost Data | Insertion Order: | $49,082.40 | Publication: | Real Simple | Purchased Gross Circ. (000's): | | 1200.0 |
| | Billed to Client: | $49,082.40 | Month: | 5/2003 | Page Placement: | | 115 |
| | Invoiced Amount: | $49,082.40 | Insertion Date: | May 1 2003 | Page Size: | Full Page | |
| | Purchased CPM: | $40.90 | Audited: | ☑ | Color: | | 4 Color |
| | | | | | Tearsheet: | | ☑ |

Competitive Review

| Brand(s) | Page Placement | Headline |
|---|---|---|
| | Cover 2 | Protection and fun |
| | 215 | Some superheroes use |
| | 126 | Yes, breathing room |
| | 102 | Glass Ceiling |
| | 20 | Security. Unlike any |
| | 30 | Remember when driving |
| | 8 | The. |
| | 40 | Nothing like a little |
| | 65 | Get Noticed. |

Notes 232 total pages.

Figure 210

Brand Publication Analysis

Client: Agency:

Brand:

| Cost Data | | | | | | |
|---|---|---|---|---|---|---|
| Insertion Order: | $64,145.25 | Publication: | Southern Living | Purchased Gross Circ. (000's): | 2550.0 |
| Billed to Client: | $64,145.25 | Month: | 5/2003 | Page Placement: | Cover 3 |
| Invoiced Amount: | $64,145.25 | Insertion Date: | May 1 2003 | Page Size: | Full Page |
| Purchased CPM: | $25.16 | Audited: | ☑ | Color: | 4 Color |
| | | | | Tearsheet: | ☑ |

Competitive Review

| Brand(s) | Page Placement | Headline |
|---|---|---|
| | 1 | .Powerful, yet astonishingly |
| | 133 | was here. |
| | 12 | break through |
| | 119 | Zero to "I'll take it" |
| | 41 | The new |
| | 76 | What trailers dream about. |
| | 84 | Some superheroes use |
| | 64 | There's something about |
| | 26 | Glass Ceiling |
| | 59 | It doesn't just come |

Notes Southern Living Favorites Issue. 164 total pages.

Page 23 of 29

Figure 211

Brand Publication Analysis

Client: Agency:

Brand:

| | | | | | | |
|---|---|---|---|---|---|---|
| **Cost Data** | **Insertion Order:** | *$0.00* | ***Publication:*** | Southern Living Vacations | **Purchased Gross Circ. (000's):** | 200.0 |
| | **Billed to Client:** | $0.00 | **Month:** | 5/2003 | **Page Placement:** | 219 |
| | **Invoiced Amount:** | $0.00 | **Insertion Date:** | May 1 2003 | **Page Size:** | Full Page |
| | **Purchased CPM:** | $0.00 | **Audited:** | ☑ | **Color:** | 4 Color |
| | | | | | **Tearsheet:** | ☑ |

Competitive Review

| Brand(s) | Page Placement | Headline |
|---|---|---|
| | Cover 4 | The 260 hp |
| | 103 | Land Shark. |
| | 195 | Break through |
| | 26 | Your boss just bought |
| | 231 | When you bring the bikes |

Notes 264 total pages. Did not run in 1st third of book.

Figure 212

Brand Publication Analysis

Client: Agency:

Brand:

| Cost Data | | | | | | |
|---|---|---|---|---|---|---|
| Insertion Order: | $42,313.85 | Publication: | Sunset Magazine | Purchased Gross Circ. (000's): | | 1400.0 |
| Billed to Client: | $42,313.85 | Month: | 5/2003 | Page Placement: | | 101 |
| Invoiced Amount: | $42,313.85 | Insertion Date: | May 1 2003 | Page Size: | Full Page | |
| Purchased CPM: | $30.22 | Audited: | ☑ | Color: | | 4 Color |
| | | | | Tearsheet: | | ☑ |

Competitive Review

| Brand(s) | Page Placement | Headline |
|---|---|---|
| | 191 | worst |
| | 89 | Serving overprotective |
| | 32 | The |
| | 146 | Burn Rubber, not money. |
| | 127 | The ease of the |
| | 155 | 100 years. The sheet |
| | Cover 2 | Caution was not |
| | 108 | Glass Ceiling |
| | 8 | Remember when driving |
| | 21 | "Feel safe and you |
| | Cover 4 | The first vehicle inspired |

Notes 208 total pages.

Page 25 of 29

Figure 213

Brand Publication Analysis

Client:

Agency:

Brand:

| | | | | | | |
|---|---|---|---|---|---|---|
| Cost Data | Insertion Order: | $0.00 | Publication: | Sunset Summer Travel | Purchased Gross Circ. (000's): | 180.0 |
| | Billed to Client: | $0.00 | Month: | 5/2003 | Page Placement: | 39 |
| | Invoiced Amount: | $0.00 | Insertion Date: | May 1 2003 | Page Size: | Full Page |
| | Purchased CPM: | $0.00 | Audited: | ☑ | Color: | 4 Color |
| | | | | | Tearsheet: | ☑ |

Competitive Review

| Brand(s) | Page Placement | Headline |
|---|---|---|
| | Cover 3 | "Anybody else in there?" |
| | 2 | When everything she'll |

Notes 128 total pages.

Page 26 of 29

Figure 214

Brand Publication Analysis

Client:

Agency:

Brand:

| | | | | | | | |
|---|---|---|---|---|---|---|---|
| Cost Data | Insertion Order: | $96,407.00 | Publication: | Time | Purchased Gross Circ. (000's): | | 4000.0 |
| | Billed to Client: | $96,407.00 | Month: | 5/2003 | Page Placement: | | 37 |
| | Invoiced Amount: | $96,407.00 | Insertion Date: | May 5 2003 | Page Size: | Full Page | |
| | Purchased CPM: | $24.10 | Audited: | ☑ | Color: | | 4 Color |
| | | | | | Tearsheet: | | ☑ |

Competitive Review

| Brand(s) | Page Placement | Headline |
|---|---|---|
| | 58 | Some are inspired by |
| | 101 | Confidence |
| | 104 | The ( |
| | 99 | Style |
| | 24 | It's a bit of a control |
| | 84 | Can your daily commute |
| | 91 | Take a Sunday drive |
| | 10 | Once you drive one, |
| | 46 | Take a ride in my car. |
| | Cover 4 | The first vehicle inspired |

Notes 92 total pages

Page 27 of 29

Figure 215

Brand Publication Analysis

Client: Agency:

Brand:

| | | | | | | | |
|---|---|---|---|---|---|---|---|
| **Cost Data** | **Insertion Order:** | $13,499.70 | **Publication:** | Trade Union Courier | **Purchased Gross Circ. (000's):** | | 0.0 |
| | **Billed to Client:** | $13,499.70 | **Month:** | 5/2003 | **Page Placement:** | | 53 |
| | **Invoiced Amount:** | $13,499.70 | **Insertion Date:** | May 1 2003 | **Page Size:** | Full Page | |
| | **Purchased CPM:** | $0.00 | **Audited:** | ☑ | **Color:** | | 4 Color |
| | | | | | **Tearsheet:** | | ☑ |

Competitive Review

| Brand(s) | Page Placement | Headline |
|---|---|---|
| | 59 (CPPV) | Rain-Sensing windshield |
| | Cover 3 | Find your own road. |
| | 16 | Drivers Wanted. |

Notes 70 total pages.

CPPV - Competitive Page Placement Violation

Page 28 of 29

Figure 216

Brand Publication Analysis

Client: Agency:

Brand:

| | | | | | | | |
|---|---|---|---|---|---|---|---|
| Cost Data | Insertion Order: | $94,474.10 | Publication: | Travel & Leisure | Purchased Gross Circ. (000's): | | 950.0 |
| | Billed to Client: | $94,474.10 | Month: | 5/2003 | Page Placement: | | 68 |
| | Invoiced Amount: | $94,474.10 | Insertion Date: | May 1 2003 | Page Size: | Spread | |
| | Purchased CPM: | $99.45 | Audited: | ☑ | Color: | | 4 Color |
| | | | | | Tearsheet: | | ☑ |

Competitive Review

| Brand(s) | Page Placement | Headline |
|---|---|---|
| | 10 | De-luxe American Road |
| | 2 | Pray for insomnia. |
| | 144 | Break through |
| | 134 | Some are inspired |
| | 58 | The |
| | 35 | This is cloud ten. |
| | 83 | Excessive. In a |
| | 99 | Sit back, relax, and |
| | 91 | THX-certified sound. |
| | 107 | You grab hold of it. |
| | 26 | Remember when driving |
| | 18 | The all-new 265-hp |
| | 42 | You think of how |

Notes 208 total pages.

Page 29 of 29

Figure 217

Brand Publication Analysis

Client: Agency:

Brand:

| | | | | | | | |
|---|---|---|---|---|---|---|---|
| Cost Data | Insertion Order: | $7,417.10 | Publication: | Army Navy Times | Purchased Gross Circ. (000's): | | 242.0 |
| | Billed to Client: | $7,417.10 | Month: | 6/2003 | Page Placement: | | 25 |
| | Invoiced Amount: | $7,417.10 | Insertion Date: | Jun 2 2003 | Page Size: | Full Page | |
| | Purchased CPM: | $30.65 | Audited: | ☑ | Color: | | Black and White |
| | | | | | Tearsheet: | | ☑ |

Competitive Review

| Brand(s) | Page Placement | Headline |
|---|---|---|
| | 17 | Thanks. Here's a little |
| | Cover 4 | The 2003 |

Notes 54 total pages.

Figure 218

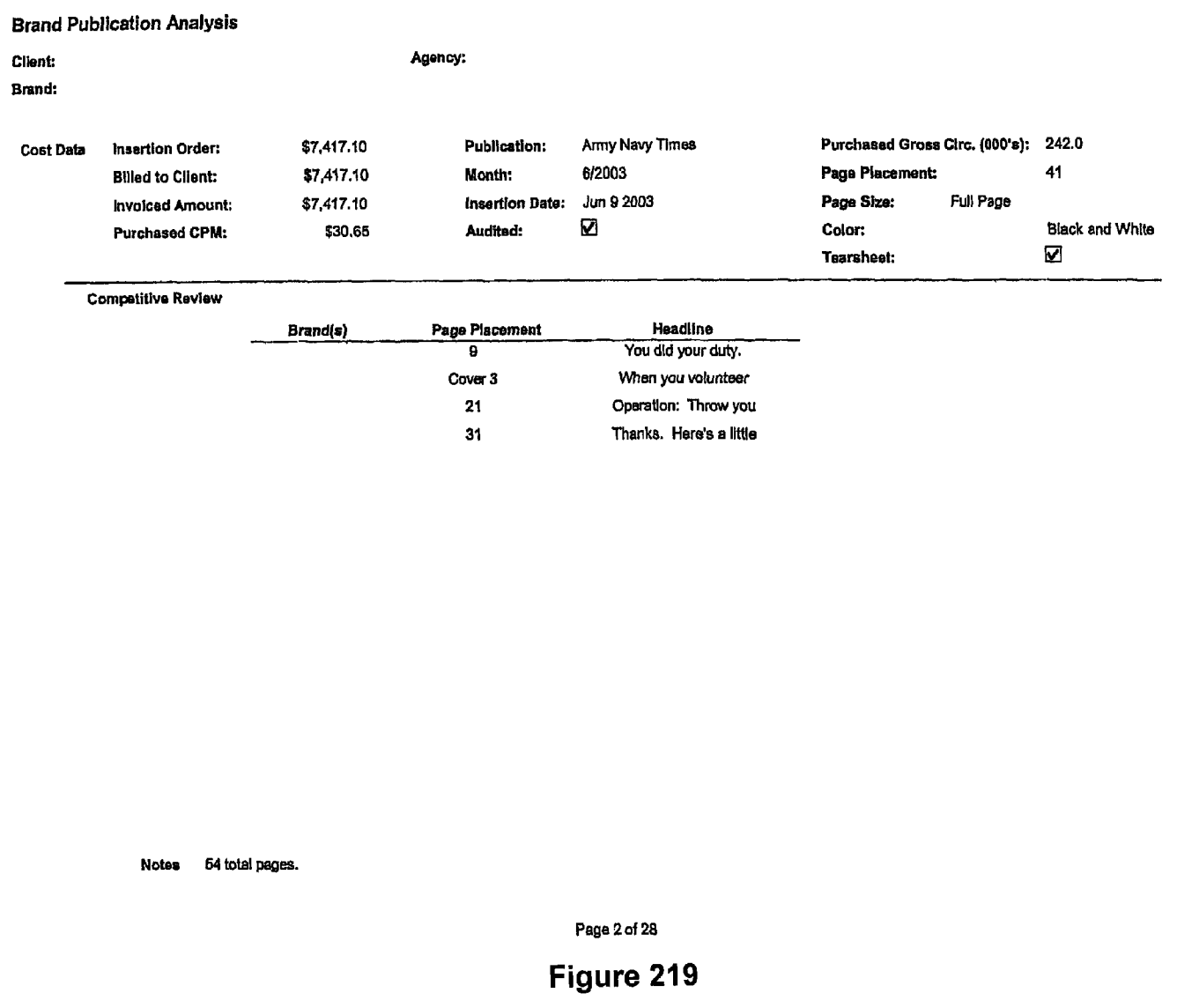

Brand Publication Analysis

Client: Agency:

Brand:

| Cost Data | | | | | | |
|---|---|---|---|---|---|---|
| **Insertion Order:** | $7,417.10 | **Publication:** | Army Navy Times | **Purchased Gross Circ. (000's):** | 242.0 |
| **Billed to Client:** | $7,417.10 | **Month:** | 6/2003 | **Page Placement:** | 41 |
| **Invoiced Amount:** | $7,417.10 | **Insertion Date:** | Jun 9 2003 | **Page Size:** | Full Page |
| **Purchased CPM:** | $30.65 | **Audited:** | ☑ | **Color:** | Black and White |
| | | | | **Tearsheet:** | ☑ |

Competitive Review

| Brand(s) | Page Placement | Headline |
|---|---|---|
| | 9 | You did your duty. |
| | Cover 3 | When you volunteer |
| | 21 | Operation: Throw you |
| | 31 | Thanks. Here's a little |

Notes 54 total pages.

Figure 219

Brand Publication Analysis

Client: Agency:

Brand:

| | | | | | | |
|---|---|---|---|---|---|---|
| Cost Data | Insertion Order: | $7,417.10 | Publication: | Army Navy Times | Purchased Gross Circ. (000's): | 242.0 |
| | Billed to Client: | $7,417.10 | Month: | 6/2003 | Page Placement: | 19 |
| | Invoiced Amount: | $7,417.10 | Insertion Date: | Jun 16 2003 | Page Size: | Full Page |
| | Purchased CPM: | $30.65 | Audited: | ☑ | Color: | Black and White |
| | | | | | Tearsheet: | ☑ |

Competitive Review

| Brand(s) | Page Placement | Headline |
|---|---|---|
| | Cover 2 | You did your duty. |
| | 11 | Now you don't have |
| | Cover 4 | How do you score |

Notes 62 total pages.

Figure 220

Brand Publication Analysis

Client:

Agency:

Brand:

| | | | | | | | |
|---|---|---|---|---|---|---|---|
| Cost Data | Insertion Order: | $7,417.10 | Publication: | Army Navy Times | Purchased Gross Circ. (000's): | 242.0 |
| | Billed to Client: | $7,417.10 | Month: | 6/2003 | Page Placement: | 27 |
| | Invoiced Amount: | $7,417.10 | Insertion Date: | Jun 23 2003 | Page Size: | Full Page |
| | Purchased CPM: | $30.65 | Audited: | ☑ | Color: | Black and White |
| | | | | | Tearsheet: | ☑ |

Competitive Review

| Brand(s) | Page Placement | Headline |
|---|---|---|
| | 11 | You did your duty. |
| | Cover 3 | When you volunteer |
| | 19 | Thanks. Here's a little |

Notes 62 total pages.

Figure 221

Brand Publication Analysis

Client: Agency:

Brand:

| | | | | | | |
|---|---|---|---|---|---|---|
| **Cost Data** | **Insertion Order:** | $10,000.25 | **Publication:** | Budget Living | **Purchased Gross Circ. (000's):** | 400.0 |
| | **Billed to Client:** | $10,000.25 | **Month:** | 6/2003 | **Page Placement:** | 29 |
| | **Invoiced Amount:** | $10,000.00 | **Insertion Date:** | Jun 1 2003 | **Page Size:** | Full Page |
| | **Purchased CPM:** | $25.00 | **Audited:** | ☑ | **Color:** | 4 Color Bleed |
| | | | | | **Tearsheet:** | ☑ |

Competitive Review

| Brand(s) | Page Placement | Headline |
|---|---|---|
| | 8 | Is there an award |
| | Cover 2 | Owner's Manual |
| | 19 | The SUV |

Notes Did not run opp. Auto column. 120 total pages.

Page 5 of 28

Figure 222

Brand Publication Analysis

Client: Agency:

Brand:

| | | | | | | |
|---|---|---|---|---|---|---|
| Cost Data | Insertion Order: | $79,050.00 | Publication: | Cooking Light | Purchased Gross Circ. (000's): | 1600.0 |
| | Billed to Client: | $79,050.00 | Month: | 6/2003 | Page Placement: | 31 |
| | Invoiced Amount: | $79,050.00 | Insertion Date: | Jun 1 2003 | Page Size: | 2 RHP Consecutive |
| | Purchased CPM: | $49.41 | Audited: | ☑ | Color: | 4 Color |
| | | | | | Tearsheet: | ☑ |

Competitive Review

| Brand(s) | Page Placement | Headline |
|---|---|---|
| | 133 | was here. |
| | 235 | Zero tp "I'll take it" |
| | Cover 2 | Some are inspired |
| | 70 | Here's to muscle. |
| | 167 | "ZZZZZZZ" |
| | 196 | When you bring the |
| | 141 | Glass Ceiling |
| | 122 | Remember when driving |
| | 18 | Take a ride in my car |
| | 149 | |

Notes 244 total pages.

Page 6 of 28

Figure 223

Brand Publication Analysis

Client: Agency:

Brand:

| | | | | | | |
|---|---|---|---|---|---|---|
| Cost Data | Insertion Order: | $74,800.00 | Publication: | Country Home | Purchased Gross Circ. (000's): | 1200.0 |
| | Billed to Client: | $74,800.00 | Month: | 6/2003 | Page Placement: | 15 |
| | Invoiced Amount: | $74,800.00 | Insertion Date: | Jun 1 2003 | Page Size: | 2 RHP Consecutive |
| | Purchased CPM: | $62.33 | Audited: | ☑ | Color: | 4 Color |
| | | | | | Tearsheet: | ☑ |

Competitive Review

| Brand(s) | Page Placement | Headline |
|---|---|---|
| | 99 | Serving overprotective |

Notes 156 total pages.

Figure 224

Brand Publication Analysis

Client: Agency:

Brand:

| | | | | | | |
|---|---|---|---|---|---|---|
| **Cost Data** | **Insertion Order:** | $117,205.37 | **Publication:** | Family Circle | **Purchased Gross Circ. (000's):** | 4600.0 |
| | **Billed to Client:** | $117,205.36 | **Month:** | 6/2003 | **Page Placement:** | Cover 2 |
| | **Invoiced Amount:** | $117,205.36 | **Insertion Date:** | Jun 10 2003 | **Page Size:** | Spread |
| | **Purchased CPM:** | $25.48 | **Audited:** | ☑ | **Color:** | 4 Color |
| | | | | | **Tearsheet:** | ☑ |

Competitive Review

| Brand(s) | Page Placement | Headline |
|---|---|---|

Notes Upgrade from first 10% of book to Cover 2. 200 total pages.

Page 8 of 28

Figure 225

Brand Publication Analysis

Client: Agency:

Brand:

| | | | | | | | |
|---|---|---|---|---|---|---|---|
| Cost Data | Insertion Order: | $56,134.00 | Publication: | Family Fun | Purchased Gross Circ. (000's): | | 1750.0 |
| | Billed to Client: | $56,134.00 | Month: | 6/2003 | Page Placement: | | 5 |
| | Invoiced Amount: | $56,134.00 | Insertion Date: | Jun 1 2003 | Page Size: | Full Page | |
| | Purchased CPM: | $32.08 | Audited: | ☑ | Color: | | 4 Color |
| | | | | | Tearsheet: | | ☑ |

Competitive Review

| Brand(s) | Page Placement | Headline |
|---|---|---|
| | 116 | Some superheroes use |
| | 48 | "Feel safe and you |
| | Cover 4 | You've earned enough |

Notes 148 total pages.

Page 9 of 28

Figure 226

Brand Publication Analysis

Client: Agency:

Brand:

| | | | | | | |
|---|---|---|---|---|---|---|
| Cost Data | Insertion Order: | $65,492.50 | Publication: | Good Housekeeping | Purchased Gross Circ. (000's): | 4600.0 |
| | Billed to Client: | $65,492.50 | Month: | 6/2003 | Page Placement: | 83 |
| | Invoiced Amount: | $65,493.00 | Insertion Date: | Jun 1 2003 | Page Size: | Full Page |
| | Purchased CPM: | $14.24 | Audited: | ☑ | Color: | 4 Color |
| | | | | | Tearsheet: | ☑ |

Competitive Review

| Brand(s) | Page Placement | Headline |
|---|---|---|
| | 92 | Zero to "I'll take it" |
| | 2 | It's a bit of a control |

Notes 240 total pages.

Page 10 of 28

Figure 227

Brand Publication Analysis

Client: Agency:

Brand:

| Cost Data | | | | | | |
|---|---|---|---|---|---|---|
| Insertion Order: | $111,554.00 | Publication: | Instyle | Purchased Gross Circ. (000's): | 1600.0 |
| Billed to Client: | $111,554.00 | Month: | 6/2003 | Page Placement: | 169 |
| Invoiced Amount: | $111,554.00 | Insertion Date: | Jun 1 2003 | Page Size: | 2 RHP Consecutive |
| Purchased CPM: | $69.72 | Audited: | ☑ | Color: | 4 Color |
| | | | | Tearsheet: | ☑ |

Competitive Review

| Brand(s) | Page Placement | Headline |
|---|---|---|
| | 20 | The 200 horsepower, |
| | 257 | Style |
| | 268 | The |
| | 282 | Thoroughly modern woman |
| | 134 | Burn rubber, not money. |
| | 126 | Is there an award for |
| | 166 | Time flies. It also drives. |
| | 291 | It's a bit of a control freak. |
| | 46 | If fast were a color. |
| | 119 | Indigenous to the |
| | 205 | The new |
| | 212 | FYI: The windshield |
| | 198 | Nothing like a little |
| | 141 | Slow and steady wins |
| | Cover 4 | The 2003 |
| | 188 | Drivers wanted. |

Notes 328 total pages

Page 11 of 28

Figure 228

Brand Publication Analysis

Client: Agency:

Brand:

| | | | | | | |
|---|---|---|---|---|---|---|
| **Cost Data** | **Insertion Order:** | $134,395.20 | **Publication:** | Money | **Purchased Gross Circ. (000's):** | 1900.0 |
| | **Billed to Client:** | $134,395.20 | **Month:** | 6/2003 | **Page Placement:** | 109 |
| | **Invoiced Amount:** | $134,395.20 | **Insertion Date:** | Jun 1 2003 | **Page Size:** | 2 RHP Consecutive |
| | **Purchased CPM:** | $70.73 | **Audited:** | ☑ | **Color:** | 4 Color |
| | | | | | **Tearsheet:** | ☑ |

Competitive Review

| Brand(s) | Page Placement | Headline |
|---|---|---|
| | 62 | Zero to "I'll take it" |
| | 87 | Style |
| | 30 | 100 years. |
| | Cover 2 | It's a bit of a control |
| | 13 | "Alone at last," |
| | 100 | Introducing the |
| | 130 | When you bring the |
| | 38 | Can your daily commute |
| | 21 | Other cars are pre-owned. |
| | 119 | Inserts call it |
| | 58 | Passengers dream of |
| | 49 | The four corners |
| | 140 | "If you're tough enough, |
| | Cover 3 | The SUV |
| | 58B | The mini-market. |

Notes 152 total pages.

Page 12 of 28

Figure 229

Brand Publication Analysis

Client:

Agency:

Brand:

| | | | | | | |
|---|---|---|---|---|---|---|
| Cost Data | Insertion Order: | $157,892.60 | Publication: | Newsweek | Purchased Gross Circ. (000's): | 3100.0 |
| | Billed to Client: | $157,892.60 | Month: | 6/2003 | Page Placement: | 7 |
| | Invoiced Amount: | $157,892.60 | Insertion Date: | Jun 2 2003 | Page Size: | 2 RHP Consecutive |
| | Purchased CPM: | $50.93 | Audited: | ☑ | Color: | 4 Color |
| | | | | | Tearsheet: | ☑ |

Competitive Review

| Brand(s) | Page Placement | Headline |
|---|---|---|
| | Cover 4 | So much power, you |
| | 33 | Quality is now an acronym: |
| | 66 | This is cloud ten. |
| | Cover 2 | You win some, you |
| | 45 | The 24 hour test drive |

Notes 74 total pages.

Figure 230

Brand Publication Analysis

Client: Agency:

Brand:

| | | | | | | |
|---|---|---|---|---|---|---|
| **Cost Data** | **Insertion Order:** | $78,946.30 | **Publication:** | Newsweek | **Purchased Gross Circ. (000's):** | 3100.0 |
| | **Billed to Client:** | $78,946.30 | **Month:** | 6/2003 | **Page Placement:** | 8 |
| | **Invoiced Amount:** | $78,946.00 | **Insertion Date:** | Jun 16 2003 | **Page Size:** | Full Page |
| | **Purchased CPM:** | $25.47 | **Audited:** | ☑ | **Color:** | 4 Color |
| | | | | | **Tearsheet:** | ☑ |

Competitive Review

| Brand(s) | Page Placement | Headline |
|---|---|---|
| | 90 | The new ı |
| | 51 | There's used. |
| | Cover 3 | Some superheroes use |
| | 25 | And they say cell |
| | Cover 2 | It's a bit of control |
| | 43 | The 24 hour test drive. |
| | 31 | The SUV |

Notes 98 total pages.

Figure 231

Brand Publication Analysis

Client:

Agency:

Brand:

| | | | | | | | |
|---|---|---|---|---|---|---|---|
| Cost Data | Insertion Order: | $24,140.00 | Publication: | Nick JR | Purchased Gross Circ. (000's): | | 1000.0 |
| | Billed to Client: | $24,140.00 | Month: | 6/2003 | Page Placement: | | 33 |
| | Invoiced Amount: | $24,140.00 | Insertion Date: | Jun 1 2003 | Page Size: | Full Page | |
| | Purchased CPM: | $24.14 | Audited: | ☑ | Color: | | 4 Color |
| | | | | | Tearsheet: | | ☑ |

Competitive Review

| Brand(s) | Page Placement | Headline |
|---|---|---|
| | 2 | Serving overprotective |

Notes 84 total pages. Did not run opposite Heads Up or within 1st 10%.

Page 15 of 28

Figure 232

Brand Publication Analysis

Client: Agency:

Brand:

| | | | | | | |
|---|---|---|---|---|---|---|
| **Cost Data** | **Insertion Order:** | $0.00 | **Publication:** | Nick JR Noodle | **Purchased Gross Circ. (000's):** | 250.0 |
| | **Billed to Client:** | $0.00 | **Month:** | 6/2003 | **Page Placement:** | 24 |
| | **Invoiced Amount:** | $0.00 | **Insertion Date:** | Jun 1 2003 | **Page Size:** | Full Page |
| | **Purchased CPM:** | $0.00 | **Audited:** | ☑ | **Color:** | 4 Color |
| | | | | | **Tearsheet:** | ☑ |

Competitive Review

| Brand(s) | Page Placement | Headline |
|---|---|---|
| | Cover 4 | Serving overprotective |

Notes 58 total pages.

Figure 233

Brand Publication Analysis

Client: Agency:

Brand:

| | | | | | | |
|---|---|---|---|---|---|---|
| Cost Data | Insertion Order: | $81,575.35 | Publication: | Oprah | Purchased Gross Circ. (000's): | 2100.0 |
| | Billed to Client: | $81,575.35 | Month: | 6/2003 | Page Placement: | 127 |
| | Invoiced Amount: | $81,575.35 | Insertion Date: | Jun 1 2003 | Page Size: | Full Page |
| | Purchased CPM: | $38.85 | Audited: | ☑ | Color: | 4 Color |
| | | | | | Tearsheet: | ☑ |

Competitive Review

| Brand(s) | Page Placement | Headline |
|---|---|---|
| | 207 | Top dolla' with the |
| | 70 | Protection and fun |
| | 49 | Style |
| | 18 | Ciao Bello! |
| | 10 | Take a ride in my car |
| | 150 | 'Feel safe and you can |
| | 100 | The restyled 2003 |

Notes 208 total pages.

Page 17 of 28

Figure 234

Brand Publication Analysis

Client: Agency:

Brand:

| | | | | | | |
|---|---|---|---|---|---|---|
| **Cost Data** | **Insertion Order:** | $90,686.93 | **Publication:** | Parenting | **Purchased Gross Circ. (000's):** | 2150.0 |
| | **Billed to Client:** | $90,686.93 | **Month:** | 6/2003 | **Page Placement:** | Cover 2 |
| | **Invoiced Amount:** | $90,686.92 | **Insertion Date:** | Jun 1 2003 | **Page Size:** | Spread |
| | **Purchased CPM:** | $42.18 | **Audited:** | ☑ | **Color:** | 4 Color |
| | | | | | **Tearsheet:** | ☑ |

Competitive Review

| Brand(s) | Page Placement | Headline |
|---|---|---|
| | 48 | Some superheroes use |
| | 98 | 100 years. |
| | 203 | "Anybody else in there?" |
| | 38 | When you bring the |
| | 78 | Not everyone was |

Notes Upgrade from within edit to cover 2. 268 total pages.

Page 18 of 28

Figure 235

Brand Publication Analysis

Client:

Agency:

Brand:

| | | | | | | |
|---|---|---|---|---|---|---|
| Cost Data | Insertion Order: | $218,025.00 | Publication: | People | Purchased Gross Circ. (000's): | 3350.0 |
| | Billed to Client: | $218,025.00 | Month: | 6/2003 | Page Placement: | 11 |
| | Invoiced Amount: | $218,025.00 | Insertion Date: | Jun 9 2003 | Page Size: | 2 RHP Consecutive |
| | Purchased CPM: | $65.08 | Audited: | ☑ | Color: | 4 Color |
| | | | | | Tearsheet: | ☑ |

Competitive Review

| Brand(s) | Page Placement | Headline |
|---|---|---|
| | 106 | Some superheroes use |
| | 48 | Introducing the |
| | 122 | The 24 hour test drive. |
| | 62 | Get Noticed. |

Notes 148 total pages.

Page 19 of 28

Figure 236

Brand Publication Analysis

Client: Agency:

Brand:

| | | | | | | |
|---|---|---|---|---|---|---|
| **Cost Data** | **Insertion Order:** | $109,012.50 | **Publication:** | People | **Purchased Gross Circ. (000's):** | 3350.0 |
| | **Billed to Client:** | $109,012.50 | **Month:** | 6/2003 | **Page Placement:** | 95 |
| | **Invoiced Amount:** | $109,012.50 | **Insertion Date:** | Jun 23 2003 | **Page Size:** | Full Page |
| | **Purchased CPM:** | $32.54 | **Audited:** | ☑ | **Color:** | 4 Color |
| | | | | | **Tearsheet:** | ☑ |

Competitive Review

| Brand(s) | Page Placement | Headline |
|---|---|---|
| | 116 | The new |
| | 17 | European driving performance |
| | Cover 2 | Thirty years ago. |
| | 83 | Thing to do this summer: |
| | 67 | The 24 hour test drive. |
| | Cover 4 | The all new |

Notes 128 total pages.

Page 20 of 28

Figure 237

Brand Publication Analysis

Client: Agency:

Brand:

| | | | | | | |
|---|---|---|---|---|---|---|
| **Cost Data** | **Insertion Order:** $153,000.00 | **Publication:** | Readers Digest | **Purchased Gross Circ. (000's):** | | 11000.0 |
| | **Billed to Client:** $153,000.00 | **Month:** | 6/2003 | **Page Placement:** | | Cover 2 |
| | **Invoiced Amount:** $153,000.00 | **Insertion Date:** | Jun 1 2003 | **Page Size:** | Spread | |
| | **Purchased CPM:** $13.91 | **Audited:** | ☑ | **Color:** | | 4 Color |
| | | | | **Tearsheet:** | | ☑ |

Competitive Review

| Brand(s) | Page Placement | Headline |
|---|---|---|
| | 18 | Your boss just bought |

Notes Ran creative, not as ordered. 216 total pages.

Page 21 of 28

Figure 238

Brand Publication Analysis

Client: Agency:

Brand:

| | | | | | | |
|---|---|---|---|---|---|---|
| Cost Data | **Insertion Order:** $147,247.20 | **Publication:** Real Simple | **Purchased Gross Circ. (000's):** 1200.0 |
| | **Billed to Client:** $147,247.20 | **Month:** 6/2003 | **Page Placement:** 89 |
| | **Invoiced Amount:** $147,247.20 | **Insertion Date:** Jun 1 2003 | **Page Size:** 3 RHP Consecutive |
| | **Purchased CPM:** $122.71 | **Audited:** ☑ | **Color:** 4 Color |
| | | | **Tearsheet:** ☑ |

Competitive Review

| Brand(s) | Page Placement | Headline |
|---|---|---|
| | 145 | Some are inspired by |
| | 251 | Burn rubber, not money. |
| | 152 | Yes, Breathing room |
| | 70 | Here's to muscle. Past. |
| | 79 | Is there an award |
| | 108 | "I'm no fool. There |
| | 29 | Evolution of the . |
| | 174 | When everything she'll |
| | Cover 4 | Security. Unlike any other. |
| | 4 | FYI: The windshield |
| | 20 | Take a ride in my car |
| | 38 | Nothing like a little |
| | 127 | Welcome to the state |
| | 63 | "Feel safe and you can |
| | 12 | Not everyone was qualified |
| | 46 | You are here |

Notes 268 total pages.

Page 22 of 28

Figure 239

Brand Publication Analysis

Client: Agency:

Brand:

| | | | | | | | |
|---|---|---|---|---|---|---|---|
| **Cost Data** | **Insertion Order:** | $192,435.75 | **Publication:** | Southern Living | **Purchased Gross Circ. (000's):** | 2550.0 |
| | **Billed to Client:** | $192,435.75 | **Month:** | 6/2003 | **Page Placement:** | 45 |
| | **Invoiced Amount:** | $192,435.75 | **Insertion Date:** | Jun 1 2003 | **Page Size:** | 3 RHP Consecutive |
| | **Purchased CPM:** | $75.47 | **Audited:** | ☑ | **Color:** | 4 Color |
| | | | | | **Tearsheet:** | ☑ |

Competitive Review

| Brand(s) | Page Placement | Headline |
|---|---|---|
| | 17 | Commonly used phrases |
| | 73 | Best. Best. Best. |
| | 99 | Zero to "I'll take it" |
| | Cover 2 | Protection and fun |
| | 29 | Style |
| | 31 | Confidence |
| | 33 | Drive & Love |
| | 237 | Burn rubber, not money. |
| | 117 | The ease of the world's |
| | 140 | Here for the long haul. |
| | 60 | There's something about |
| | 80 | Every king needs a |
| | 108 | When you bring the |
| | 188 | Sit back, relax, and |
| | 8 | FYI: The windshield |
| | 91 | All this and change |

Notes 238 total pages.

Figure 240

Brand Publication Analysis

Client:

Agency:

Brand:

| | | | | | | |
|---|---|---|---|---|---|---|
| Cost Data | Insertion Order: | $0.00 | Publication: | Southern Living Decorating | Purchased Gross Circ. (000's): | 250.0 |
| | Billed to Client: | $0.00 | Month: | 6/2003 | Page Placement: | 3 |
| | Invoiced Amount: | $0.00 | Insertion Date: | Jun 1 2003 | Page Size: | Full Page |
| | Purchased CPM: | $0.00 | Audited: | ☑ | Color: | 4 Color |
| | | | | | Tearsheet: | ☑ |

Competitive Review

| Brand(s) | Page Placement | Headline |
|---|---|---|

Notes 128 total pages.

Page 24 of 28

Figure 241

Brand Publication Analysis

Client: Agency:

Brand:

| | | | | | | | |
|---|---|---|---|---|---|---|---|
| Cost Data | Insertion Order: | $70,435.76 | Publication: | This Old House | Purchased Gross Circ. (000's): | | 950.0 |
| | Billed to Client: | $70,435.76 | Month: | 6/2003 | Page Placement: | | 130 |
| | Invoiced Amount: | $70,435.76 | Insertion Date: | Jun 1 2003 | Page Size: | Spread | |
| | Purchased CPM: | $74.14 | Audited: | ☑ | Color: | | 4 Color |
| | | | | | Tearsheet: | | ☑ |

Competitive Review

| Brand(s) | Page Placement | Headline |
|---|---|---|
| | 88 | If a towing contest ever |
| | 112 | City miles. Country miles. |
| | 40 | Room for every Tom, |
| | Cover 2 | "Hey, that's cheating." |
| | 8 | Our surefooted 4 wheel |
| | 76 | When you bring the |
| | 28 | Remember when driving |
| | 69 | "If you're tough enough, |
| | 187 | Find your own road. |

Notes 188 total pages.

Page 25 of 28

Figure 242

Brand Publication Analysis

Client: Agency:

Brand:

| | | | | | | | |
|---|---|---|---|---|---|---|---|
| **Cost Data** | **Insertion Order:** | $192,814.00 | **Publication:** | Time | **Purchased Gross Circ. (000's):** | 4000.0 |
| | **Billed to Client:** | $192,814.00 | **Month:** | 6/2003 | **Page Placement:** | 33 |
| | **Invoiced Amount:** | $192,814.00 | **Insertion Date:** | Jun 16 2003 | **Page Size:** | 2 RHP Consecutive |
| | **Purchased CPM:** | $48.20 | **Audited:** | ☑ | **Color:** | 4 Color |
| | | | | | **Tearsheet:** | ☑ |

Competitive Review

| Brand(s) | Page Placement | Headline |
|---|---|---|
| | Cover 4 | Best. Best. Best. |
| | 76 | The new |
| | 57 | Things to do this |
| | 65 | The new |
| | 70 | The 24 Hour test |

Notes 80 total pages.

Figure 243

Brand Publication Analysis

Client: Agency:

Brand:

| | | | | | | |
|---|---|---|---|---|---|---|
| **Cost Data** | **Insertion Order:** | $96,407.00 | **Publication:** | Time | **Purchased Gross Circ. (000's):** | 4000.0 |
| | **Billed to Client:** | $96,407.00 | **Month:** | 6/2003 | **Page Placement:** | 59 |
| | **Invoiced Amount:** | $96,407.00 | **Insertion Date:** | Jun 23 2003 | **Page Size:** | Full Page |
| | **Purchased CPM:** | $24.10 | **Audited:** | ☑ | **Color:** | 4 Color |
| | | | | | **Tearsheet:** | ☑ |

Competitive Review

| Brand(s) | Page Placement | Headline |
|---|---|---|
| | 46 | So much power, |
| | 73 | There's used. |
| | Cover 3 | Grab the best values |
| | 9 | It's a bit of control |
| | Cover 2 | Is that you? |
| | 80 | You know those toys |
| | 22 | The first vehicle |

Notes 86 total pages.

Figure 244

Brand Publication Analysis

Client: Agency:

Brand:

| | | | | | | |
|---|---|---|---|---|---|---|
| **Cost Data** | **Insertion Order:** | $26,698.50 | **Publication:** | Travel & Leisure Family | **Purchased Gross Circ. (000's):** | 275.0 |
| | **Billed to Client:** | $26,698.50 | **Month:** | 6/2003 | **Page Placement:** | Cover 2 |
| | **Invoiced Amount:** | $26,698.50 | **Insertion Date:** | Jun 1 2003 | **Page Size:** | Spread |
| | **Purchased CPM:** | $97.09 | **Audited:** | ☑ | **Color:** | 4 Color |
| | | | | | **Tearsheet:** | ☑ |

Competitive Review

| Brand(s) | Page Placement | Headline |
|---|---|---|
| | 34 | Serving overprotective |

Notes 38 total pages. Upgrade from 1st third of book to cover 2.

Page 28 of 28

Figure 245 and Print

- Annual print buys were negotiated with publications for individual brands
- Agency utilized the efficiencies of Consolidated contracts with publishing groups
  - Time, Inc.
  - The Hearst Group
  - Meredith Corp.
- MMI will assess the fulfillment of these contracts upon close of the year's print schedule

Print Billing Reconciliation

| | Total 2Q03 |
|---|---|
| • Insertion Orders | $ 3,826,208.67 |
| • Billed to Client | $ 3,826,204.40 |
| • Pub Invoice | $ 3,826,204.07 |
| • Remitted | $ 3,826,205.19 |

*All dollars are net*

2Q03 Figure 247 77

Print Billing Reconciliation

April

| | |
|---|---|
| • Insertion Orders | $ 862,641.20 |
| • Billed to Client | $ 862,640.86 |
| • Pub Invoice | $ 862,639.96 |
| • Remitted | $ 862,640.86 |

2Q03 Figure 248 78

Monthly Cost Analysis

Client:

Brand:

Month: 4/2003

| Agency | Publication | Insertion Order | Billed to Client | Invoiced Amount | Remitted Amount | Remitted vs Billed |
|---|---|---|---|---|---|---|
| | American Journal of Nursing | $14,050.50 | $14,050.50 | $14,050.50 | $14,050.50 | $0.00 |
| | Army Navy Times | $12,082.75 | $12,082.75 | $12,082.63 | $12,082.75 | $0.00 |
| | Automundo | $2,975.00 | $2,975.00 | $2,975.00 | $2,975.00 | $0.00 |
| | Car & Driver | $76,649.60 | $76,649.60 | $76,649.60 | $76,649.60 | $0.00 |
| | Fast Company | $35,002.15 | $35,002.15 | $35,002.15 | $35,002.15 | $0.00 |
| | Golf Magazine | $54,811.40 | $54,811.40 | $54,811.40 | $54,811.40 | $0.00 |
| | Men's Health | $65,897.95 | $65,897.78 | $65,897.00 | $65,897.78 | $0.00 |
| | Motor Trend | $64,849.05 | $64,849.05 | $64,849.05 | $64,849.05 | $0.00 |
| | New York Auto Show | $4,275.50 | $4,275.50 | $4,275.50 | $4,275.50 | $0.00 |
| | New York Times | $17,945.20 | $17,945.20 | $17,945.20 | $17,945.20 | $0.00 |
| | Nursing | $16,005.50 | $16,005.50 | $16,005.50 | $16,005.50 | $0.00 |
| | People | $109,012.50 | $109,012.50 | $109,012.50 | $109,012.50 | $0.00 |
| | Real Simple | $49,082.40 | $49,082.40 | $49,082.40 | $49,082.40 | $0.00 |
| | Shape Magazine | $92,514.00 | $92,514.00 | $92,514.00 | $92,514.00 | $0.00 |
| | Smithsonian | $52,774.80 | $52,774.80 | $52,774.80 | $52,774.80 | $0.00 |
| | Sports Illustrated | $117,181.00 | $117,181.00 | $117,181.00 | $117,181.00 | $0.00 |
| | Sunset Magazine | $42,313.85 | $42,313.85 | $42,313.85 | $42,313.85 | $0.00 |
| | This Old House | $35,218.05 | $35,217.88 | $35,217.88 | $35,217.88 | $0.00 |
| | Total | $862,641.20 | $862,640.86 | $862,639.96 | $862,640.86 | $0.00 |

Page 1 of 1

Figure 249

Print Billing Reconciliation

May

| | |
|---|---|
| • Insertion Orders | $ 1,291,458.22 |
| • Billed to Client | $ 1,291,457.80 |
| • Pub Invoice | $ 1,291,458.39 |
| • Remitted | $ 1,291,457.80 |

2Q03 Figure 250 79

Monthly Cost Analysis

Client:

Brand:

Month: 5/2003

| Agency | Publication | Insertion Order | Billed to Client | Invoiced Amount | Remitted Amount | Remitted vs Billed |
|---|---|---|---|---|---|---|
| | American Journal of Nursing | $14,050.50 | $14,050.50 | $14,050.50 | $14,050.50 | $0.00 |
| | Army Navy Times | $12,082.75 | $12,082.75 | $12,082.75 | $12,082.75 | $0.00 |
| | Automotive News | $12,561.30 | $12,561.05 | $12,561.04 | $12,561.05 | $0.00 |
| | Car & Driver | $76,649.60 | $76,649.60 | $76,649.60 | $76,649.60 | $0.00 |
| | Entertainment Weekly | $63,071.87 | $63,071.87 | $63,071.87 | $63,071.87 | $0.00 |
| | ESPN | $70,745.50 | $70,745.50 | $70,745.50 | $70,745.50 | $0.00 |
| | FHM | $21,848.40 | $21,848.40 | $21,848.00 | $21,848.40 | $0.00 |
| | Goal Magazine | $425.00 | $425.00 | $425.00 | $425.00 | $0.00 |
| | Instyle | $55,777.00 | $55,777.00 | $55,777.00 | $55,777.00 | $0.00 |
| | Marie Claire | $35,335.35 | $35,335.35 | $35,335.35 | $35,335.35 | $0.00 |
| | Money | $67,197.60 | $67,197.60 | $67,197.60 | $67,197.60 | $0.00 |
| | Motor Trend | $64,849.05 | $64,849.05 | $64,849.05 | $64,849.05 | $0.00 |
| | Motor Trend Special | $13,027.10 | $13,027.10 | $13,027.10 | $13,027.10 | $0.00 |
| | National Geographic | $63,246.80 | $63,246.80 | $63,246.80 | $63,246.80 | $0.00 |
| | New York Times | $56,815.04 | $56,815.04 | $56,816.04 | $56,815.04 | $0.00 |
| | People | $109,012.50 | $109,012.50 | $109,012.50 | $109,012.50 | $0.00 |
| | RN Magazine | $10,285.00 | $10,285.00 | $10,285.00 | $10,285.00 | $0.00 |
| | Shape Magazine | $46,257.00 | $46,257.00 | $46,257.00 | $46,257.00 | $0.00 |
| | Southern Living | $64,145.25 | $64,145.25 | $64,145.25 | $64,145.25 | $0.00 |
| | Southern Living Vacations | $0.00 | $0.00 | $0.00 | $0.00 | $0.00 |
| | Sports Illustrated | $117,181.00 | $117,181.00 | $117,181.00 | $117,181.00 | $0.00 |
| | Sunset Summer Travel | $0.00 | $0.00 | $0.00 | $0.00 | $0.00 |
| | This Old House | $35,218.05 | $35,217.88 | $35,217.88 | $35,217.88 | $0.00 |
| | USA Today | $98,430.00 | $98,430.00 | $98,430.00 | $98,430.00 | $0.00 |
| | Wall Street Journal | $183,246.56 | $183,246.56 | $183,246.56 | $183,246.56 | $0.00 |

Page 1 of 2

Figure 251

Monthly Cost Analysis

Client:

Brand:

Month: 5/2003

| Agency | Publication | | Insertion Order | Billed to Client | Invoiced Amount | Remitted Amount | Remitted vs Billed |
|---|---|---|---|---|---|---|---|
| | | Total | $1,291,458.22 | $1,291,457.80 | $1,291,458.39 | $1,291,457.80 | $0.00 |

Page 2 of 2

Figure 252

Print Billing Reconciliation

June

| | |
|---|---|
| • Insertion Orders | $ 1,672,109.25 |
| • Billed to Client | $ 1,672,105.74 |
| • Pub Invoice | $ 1,672,105.72 |
| • Remitted | $ 1,672,106.53 |

2Q03 Figure 253 80

Monthly Cost Analysis

Client:

Brand:

Month: 6/2003

| Agency | Publication | Insertion Order | Billed to Client | Invoiced Amount | Remitted Amount | Remitted vs Billed |
|---|---|---|---|---|---|---|
| | American Journal of Nursing | $14,050.50 | $14,050.50 | $14,050.50 | $14,050.50 | $0.00 |
| | Army Navy Times | $24,165.50 | $24,165.50 | $24,165.50 | $24,165.50 | $0.00 |
| | Automotive News | $12,561.30 | $12,561.05 | $12,561.05 | $12,561.05 | $0.00 |
| | Better Homes & Gardens | $93,508.50 | $93,508.50 | $93,508.50 | $93,508.50 | $0.00 |
| | Blender | $12,750.00 | $12,750.00 | $12,750.00 | $12,750.00 | $0.00 |
| | Car & Driver | $76,649.60 | $76,649.60 | $76,649.60 | $76,649.60 | $0.00 |
| | Cooking Light | $39,525.00 | $39,525.00 | $39,525.00 | $39,525.00 | $0.00 |
| | Entertainment Weekly | $63,072.55 | $63,071.87 | $63,071.87 | $63,071.87 | $0.00 |
| | ESPN | $141,491.00 | $141,491.00 | $141,491.00 | $141,491.00 | $0.00 |
| | Fast Company | $35,002.15 | $35,002.15 | $35,002.15 | $35,002.15 | $0.00 |
| | Golf Magazine | $54,811.40 | $54,811.40 | $54,811.40 | $54,811.40 | $0.00 |
| | Men's Health | $65,897.95 | $65,897.00 | $65,897.00 | $65,897.78 | ($0.78) |
| | Money | $67,199.30 | $67,197.60 | $67,197.60 | $67,197.60 | $0.00 |
| | Motor Trend | $64,849.05 | $64,849.00 | $64,849.00 | $64,849.00 | $0.00 |
| | Nursing | $16,005.50 | $16,005.50 | $16,005.50 | $16,005.50 | $0.00 |
| | Parenting | $45,343.25 | $45,343.46 | $45,343.46 | $45,343.46 | $0.00 |
| | Real Simple | $49,082.40 | $49,082.40 | $49,082.40 | $49,082.40 | $0.00 |
| | Smart Money | $26,641.00 | $26,641.00 | $26,641.00 | $26,641.01 | ($0.01) |
| | Smithsonian | $52,774.80 | $52,774.80 | $52,774.80 | $52,774.80 | $0.00 |
| | Southern Living | $64,145.25 | $64,145.25 | $64,145.24 | $64,145.25 | $0.00 |
| | Sports Illustrated | $234,362.00 | $234,362.00 | $234,362.00 | $234,362.00 | $0.00 |
| | Sunset Magazine | $46,545.15 | $46,545.23 | $46,545.23 | $46,545.23 | $0.00 |
| | This Old House | $35,216.05 | $35,217.88 | $35,217.88 | $35,217.88 | $0.00 |
| | Time | $289,221.00 | $289,221.00 | $289,221.00 | $289,221.00 | $0.00 |
| | Travel & Leisure | $47,237.05 | $47,237.05 | $47,237.04 | $47,237.05 | $0.00 |

Figure 254

Monthly Cost Analysis

Client:

Brand:

Month: 6/2003

| Agency | Publication | | Insertion Order | Billed to Client | Invoiced Amount | Remitted Amount | Remitted vs Billed |
|---|---|---|---|---|---|---|---|
| | | Total | $1,672,109.25 | $1,672,105.74 | $1,672,105.72 | $1,672,106.53 | ($0.79) |

Page 2 of 2

Figure 255

Print Billing Reconciliation

- No variances other than rounding

2Q0 Figure 256 81

Print Payment Analysis

- April 17-90 days
  - Motor Trend 119 days
  - Sunset Magazine 223 days (paid 10/29/03)
- May 24-78 days
  - Goal Magazine 129 days (invoiced in advance)
  - Money 108 days
  - Shape Magazine -66 days (pub sent revised invoice)
- June 18-88 days

Publication Monthly Payment Analysis

Client: Agency:

Brand: Quarter: 2Q03

Month: 4/2003

| Publication | Affidavit Date | Remittance Date | Terms (Days) |
|---|---|---|---|
| American Journal of Nursing | Apr 11, 2003 | May 29, 2003 | 48 |
| Army Navy Times | May 4, 2003 | Jul 1, 2003 | 58 |
| Automundo | Mar 24, 2003 | May 29, 2003 | 66 |
| Car & Driver | Mar 15, 2003 | May 29, 2003 | 75 |
| Fast Company | Mar 6, 2003 | May 29, 2003 | 84 |
| Golf Magazine | Mar 20, 2003 | May 29, 2003 | 70 |
| Men's Health | Mar 18, 2003 | May 29, 2003 | 72 |
| Motor Trend | Mar 4, 2003 | Jul 1, 2003 | 119 |
| New York Auto Show | May 12, 2003 | May 29, 2003 | 17 |
| New York Times | Apr 30, 2003 | May 29, 2003 | 29 |
| Nursing | Apr 11, 2003 | May 29, 2003 | 48 |
| People | Apr 15, 2003 | Jun 17, 2003 | 63 |
| Real Simple | Mar 18, 2003 | May 29, 2003 | 72 |
| Shape Magazine | Feb 28, 2003 | May 29, 2003 | 90 |
| Smithsonian | Mar 31, 2003 | May 29, 2003 | 59 |
| Sports Illustrated | Apr 8, 2003 | May 29, 2003 | 51 |
| Sunset Magazine | Mar 20, 2003 | Oct 29, 2003 | 223 |
| This Old House | Mar 28, 2003 | May 29, 2003 | 62 |

Page 1 of 1

Figure 258

Publication Monthly Payment Analysis

Client: Agency:

Brand: Quarter: 2Q03

Month: 5/2003

| Publication | Affidavit Date | Remittance Date | Terms (Days) |
|---|---|---|---|
| American Journal of Nursing | May 14, 2003 | Jun 24, 2003 | 41 |
| Army Navy Times | Jul 2, 2003 | Aug 4, 2003 | 33 |
| Automotive News | May 12, 2003 | Jun 24, 2003 | 43 |
| Car & Driver | Apr 15, 2003 | Jun 24, 2003 | 70 |
| Entertainment Weekly | Jul 10, 2003 | Aug 4, 2003 | 25 |
| ESPN | May 5, 2003 | Jun 24, 2003 | 50 |
| FHM | Apr 14, 2003 | Jun 24, 2003 | 71 |
| Goal Magazine | Jan 20, 2003 | May 29, 2003 | 129 |
| Instyle | Apr 19, 2003 | Jun 24, 2003 | 66 |
| Marie Claire | Jun 19, 2003 | Aug 4, 2003 | 46 |
| Money | Apr 18, 2003 | Aug 4, 2003 | 108 |
| Motor Trend | Apr 7, 2003 | Jun 24, 2003 | 78 |
| Motor Trend Special | May 30, 2003 | Jun 24, 2003 | 25 |
| National Geographic | May 1, 2003 | Jul 11, 2003 | 71 |
| New York Times | May 31, 2003 | Jul 11, 2003 | 41 |
| People | May 20, 2003 | Jun 24, 2003 | 35 |
| RN Magazine | May 7, 2003 | Jun 24, 2003 | 48 |
| Shape Magazine | Aug 29, 2003 | Jun 24, 2003 | -66 |
| Southern Living | Jun 30, 2003 | Aug 4, 2003 | 35 |
| Southern Living Vacations | Dec 16, 2003 | Dec 16, 2003 | 0 |
| Sports Illustrated | May 13, 2003 | Jun 24, 2003 | 42 |
| Sunset Summer Travel | Dec 17, 2003 | Dec 17, 2003 | 0 |
| This Old House | Apr 24, 2003 | Jul 4, 2003 | 71 |
| USA Today | May 18, 2003 | Jun 24, 2003 | 37 |

Page 1 of 2

Figure 259

Publication Monthly Payment Analysis

Client: Agency:

Brand: Quarter: 2Q03

Month: 6/2003

| Publication | Affidavit Date | Remittance Date | Terms (Days) |
|---|---|---|---|
| Wall Street Journal | May 31, 2003 | Jun 24, 2003 | 24 |

Page 2 of 2

Figure 260

Publication Monthly Payment Analysis

Client: Agency:

Brand: Quarter: 2Q03

Month: 6/2003

| Publication | Affidavit Date | Remittance Date | Terms (Days) |
|---|---|---|---|
| American Journal of Nursing | Jun 13, 2003 | Aug 4, 2003 | 52 |
| Army Navy Times | Jul 2, 2003 | Aug 4, 2003 | 33 |
| Army Navy Times | Jul 2, 2003 | Aug 4, 2003 | 33 |
| Automotive News | Jun 23, 2003 | Aug 4, 2003 | 42 |
| Better Homes & Gardens | May 13, 2003 | Aug 4, 2003 | 83 |
| Blender | Jun 17, 2003 | Aug 4, 2003 | 48 |
| Car & Driver | May 15, 2003 | Aug 4, 2003 | 81 |
| Cooking Light | Jun 20, 2003 | Aug 4, 2003 | 45 |
| Entertainment Weekly | Jul 10, 2003 | Aug 4, 2003 | 25 |
| ESPN | Jun 2, 2003 | Aug 4, 2003 | 63 |
| ESPN | Jun 16, 2003 | Aug 4, 2003 | 49 |
| Fast Company | May 8, 2003 | Aug 4, 2003 | 88 |
| Golf Magazine | May 22, 2003 | Aug 4, 2003 | 74 |
| Men's Health | May 23, 2003 | Aug 4, 2003 | 73 |
| Money | May 16, 2003 | Aug 4, 2003 | 80 |
| Motor Trend | May 30, 2003 | Aug 11, 2003 | 73 |
| Nursing | Jun 3, 2003 | Aug 4, 2003 | 62 |
| Parenting | May 21, 2003 | Aug 4, 2003 | 75 |
| Real Simple | May 29, 2003 | Aug 4, 2003 | 67 |
| Smart Money | Jul 24, 2003 | Aug 11, 2003 | 18 |
| Smithsonian | May 31, 2003 | Aug 4, 2003 | 65 |
| Southern Living | Jun 30, 2003 | Aug 4, 2003 | 35 |
| Sports Illustrated | Jun 24, 2003 | Aug 4, 2003 | 41 |
| Sunset Magazine | Jul 3, 2003 | Aug 11, 2003 | 39 |

Figure 261

Publication Monthly Payment Analysis

Client:

Agency:

Brand:

Quarter: 2Q03

Month: 6/2003

| Publication | Affidavit Date | Remittance Date | Terms (Days) |
|---|---|---|---|
| This Old House | May 23, 2003 | Aug 4, 2003 | 73 |
| Time | Jun 6, 2003 | Aug 4, 2003 | 59 |
| Time | Jun 27, 2003 | Aug 4, 2003 | 38 |
| Travel & Leisure | Jun 2, 2003 | Aug 4, 2003 | 63 |

Figure 262

Print Billing Reconciliation

| | Total 2Q03 |
|---|---|
| • Insertion Orders | $ 4,681,668.15 |
| • Billed to Client | $ 4,681,604.81 |
| • Pub Invoice | $ 4,681,603.78 |
| • Remitted | $ 4,585,261.56 |

*All dollars are net*

2Q03 Figure 263 83

Print Billing Reconciliation

April

| | |
|---|---|
| • Insertion Orders | $ 980,397.23 |
| • Billed to Client | $ 980,397.65 |
| • Pub Invoice | $ 980,396.98 |
| • Remitted | $ 980,397.65 |

2Q03 Figure 264 84

Monthly Cost Analysis

Client:

Brand:

Month: 4/2003

| Agency | Publication | Insertion Order | Billed to Client | Invoiced Amount | Remitted Amount | Remitted vs Billed |
|---|---|---|---|---|---|---|
| | Budget Living | $10,000.00 | $10,000.25 | $10,000.00 | $10,000.25 | $0.00 |
| | Cooking Light | $39,525.00 | $39,525.00 | $39,525.00 | $39,525.00 | $0.00 |
| | Good Housekeeping | $65,492.50 | $65,492.50 | $65,492.50 | $65,492.50 | $0.00 |
| | Instyle | $55,777.00 | $55,777.00 | $55,777.00 | $55,777.00 | $0.00 |
| | Money | $67,197.60 | $67,197.60 | $67,197.60 | $67,197.60 | $0.00 |
| | Motor Trend - Spanish | $1,487.50 | $1,487.50 | $1,487.50 | $1,487.50 | $0.00 |
| | New York Auto Show | $3,825.00 | $3,825.00 | $3,825.00 | $3,825.00 | $0.00 |
| | Newsweek | $78,946.30 | $78,946.30 | $78,946.00 | $78,946.30 | $0.00 |
| | People | $218,025.00 | $218,025.00 | $218,025.00 | $218,025.00 | $0.00 |
| | Real Simple | $49,082.40 | $49,082.40 | $49,082.40 | $49,082.40 | $0.00 |
| | SCLC Magazine | $1,500.25 | $1,500.25 | $1,500.00 | $1,500.25 | $0.00 |
| | Southern Living | $64,145.25 | $64,145.25 | $64,145.25 | $64,145.25 | $0.00 |
| | Sports Illustrated | $234,362.00 | $234,362.00 | $234,362.00 | $234,362.00 | $0.00 |
| | Sunset Magazine | $42,313.85 | $42,313.85 | $42,313.85 | $42,313.85 | $0.00 |
| | This Old House | $35,217.88 | $35,218.05 | $35,217.88 | $35,218.05 | $0.00 |
| | Trade Union Courier | $13,499.70 | $13,499.70 | $13,500.00 | $13,499.70 | $0.00 |
| | Total | $980,397.23 | $980,397.65 | $980,396.98 | $980,397.65 | $0.00 |

Page 1 of 1

Figure 265

Print Billing Reconciliation

<u>May</u>

- Insertion Orders $ 1,383,654.31
- Billed to Client $ 1,383,590.56
- Pub Invoice $ 1,383,590.26
- Remitted $ 1,383,654.31

2Q03 Figure 266 85

Monthly Cost Analysis

Client:

Brand:

Month: 5/2003

| Agency | Publication | Insertion Order | Billed to Client | Invoiced Amount | Remitted Amount | Remitted vs Billed |
|---|---|---|---|---|---|---|
| | AF Budget Travel | $29,282.50 | $29,282.50 | $29,282.50 | $29,282.50 | $0.00 |
| | Army Navy Times | $7,417.10 | $7,417.10 | $7,417.10 | $7,417.10 | $0.00 |
| | Better Homes & Gardens | $93,508.50 | $93,508.50 | $93,508.50 | $93,508.50 | $0.00 |
| | Car & Driver | $76,649.60 | $76,649.60 | $76,649.60 | $76,649.60 | $0.00 |
| | Child | $51,708.90 | $51,708.90 | $51,708.90 | $51,708.90 | $0.00 |
| | Cooking Light | $39,525.00 | $39,525.00 | $39,525.00 | $39,525.00 | $0.00 |
| | Country Home | $37,400.00 | $37,400.00 | $37,400.00 | $37,400.00 | $0.00 |
| | Country Living | $39,440.00 | $39,440.00 | $39,440.00 | $39,440.00 | $0.00 |
| | Ebony | $39,764.70 | $39,764.70 | $39,764.70 | $39,764.70 | $0.00 |
| | Instyle | $55,777.00 | $55,777.00 | $55,777.00 | $55,777.00 | $0.00 |
| | Ladies Home Journal | $96,534.50 | $96,534.50 | $96,534.50 | $96,534.50 | $0.00 |
| | Latina | $11,050.00 | $11,050.00 | $11,050.00 | $11,050.00 | $0.00 |
| | Men's Health | $131,795.56 | $131,795.56 | $131,795.56 | $131,795.56 | $0.00 |
| | Midwest Living | $41,616.00 | $41,616.00 | $41,616.00 | $41,616.00 | $0.00 |
| | Money | $67,197.60 | $67,197.60 | $67,197.60 | $67,197.60 | $0.00 |
| | Motor Trend - Spanish | $1,487.50 | $1,487.50 | $1,487.50 | $1,487.50 | $0.00 |
| | National Geographic | $100,980.00 | $100,980.00 | $100,980.00 | $100,980.00 | $0.00 |
| | Newsweek | $78,946.30 | $78,946.30 | $78,946.00 | $78,946.30 | $0.00 |
| | People en Espanol | $23,651.25 | $23,587.50 | $23,587.50 | $23,651.25 | ($63.75) |
| | Real Simple | $49,082.40 | $49,082.40 | $49,082.40 | $49,082.40 | $0.00 |
| | Southern Living | $64,145.25 | $64,145.25 | $64,145.25 | $64,145.25 | $0.00 |
| | Southern Living Vacations | $0.00 | $0.00 | $0.00 | $0.00 | $0.00 |
| | Sunset Magazine | $42,313.85 | $42,313.85 | $42,313.85 | $42,313.85 | $0.00 |
| | Sunset Summer Travel | $0.00 | $0.00 | $0.00 | $0.00 | $0.00 |
| | Time | $96,407.00 | $96,407.00 | $96,407.00 | $96,407.00 | $0.00 |

Page 1 of 2

Figure 267

Monthly Cost Analysis

Client:

Brand:

Month: 5/2003

| Agency | Publication | | Insertion Order | Billed to Client | Invoiced Amount | Remitted Amount | Remitted vs Billed |
|---|---|---|---|---|---|---|---|
| | Trade Union Courier | | $13,499.70 | $13,499.70 | $13,499.70 | $13,499.70 | $0.00 |
| | Travel & Leisure | | $94,474.10 | $94,474.10 | $94,474.10 | $94,474.10 | $0.00 |
| | | Total | $1,383,654.31 | $1,383,590.56 | $1,383,590.26 | $1,383,654.31 | ($63.75) |

Figure 268

Print Billing Reconciliation

June

| | |
|---|---|
| • Insertion Orders | $ 2,317,616.61 |
| • Billed to Client | $ 2,317,616.60 |
| • Pub Invoice | $ 2,317,616.54 |
| • Remitted | $ 2,221,209.60 |

2Q03 Figure 269 86

Monthly Cost Analysis

Client:

Brand:

Month: 6/2003

| Agency | Publication | Insertion Order | Billed to Client | Invoiced Amount | Remitted Amount | Remitted vs Billed |
|---|---|---|---|---|---|---|
| | Army Navy Times | $29,668.40 | $29,668.40 | $29,668.40 | $29,868.40 | $0.00 |
| | Budget Living | $10,000.25 | $10,000.25 | $10,000.00 | $10,000.25 | $0.00 |
| | Cooking Light | $79,050.00 | $79,050.00 | $79,050.00 | $79,050.00 | $0.00 |
| | Country Home | $74,800.00 | $74,800.00 | $74,800.00 | $74,800.00 | $0.00 |
| | Family Circle | $117,205.37 | $117,205.36 | $117,205.36 | $117,205.36 | $0.00 |
| | Family Fun | $56,134.00 | $56,134.00 | $56,134.00 | $56,134.00 | $0.00 |
| | Good Housekeeping | $65,492.50 | $65,492.50 | $65,493.00 | $65,492.50 | $0.00 |
| | Instyle | $111,554.00 | $111,554.00 | $111,554.00 | $111,554.00 | $0.00 |
| | Money | $134,395.20 | $134,395.20 | $134,395.20 | $134,395.20 | $0.00 |
| | Newsweek | $236,838.90 | $236,838.90 | $236,838.60 | $236,838.90 | $0.00 |
| | Nick JR | $24,140.00 | $24,140.00 | $24,140.00 | $24,140.00 | $0.00 |
| | Nick JR Noodle | $0.00 | $0.00 | $0.00 | $0.00 | $0.00 |
| | Oprah | $81,575.35 | $81,575.35 | $81,575.35 | $81,575.35 | $0.00 |
| | Parenting | $90,686.93 | $90,686.93 | $90,686.92 | $90,686.93 | $0.00 |
| | People | $327,037.50 | $327,037.50 | $327,037.50 | $327,037.50 | $0.00 |
| | Readers Digest | $153,000.00 | $153,000.00 | $153,000.00 | $153,000.00 | $0.00 |
| | Real Simple | $147,247.20 | $147,247.20 | $147,247.20 | $147,247.20 | $0.00 |
| | Southern Living | $192,435.75 | $192,435.75 | $192,435.75 | $192,435.75 | $0.00 |
| | Southern Living Decorating | $0.00 | $0.00 | $0.00 | $0.00 | $0.00 |
| | This Old House | $70,435.76 | $70,435.76 | $70,435.76 | $70,435.76 | $0.00 |
| | Time | $289,221.00 | $289,221.00 | $289,221.00 | $192,814.00 | $96,407.00 |
| | Travel & Leisure Family | $26,698.50 | $26,698.50 | $26,698.50 | $26,698.50 | $0.00 |
| | Total | $2,317,616.61 | $2,317,616.60 | $2,317,616.54 | $2,221,209.60 | $96,407.00 |

Page 1 of 1

Figure 270

Print Billing Reconciliation

- Variances
  - People en Espanol, May
    - Credit of $63.75 is due from publication
    - Agency to credit client billing same amount
  - Time, 6/23 issue
    - Agency to provide proof of remittance to Time in the amount of $96,407

2Q03 Figure 271 87

Print Payment Analysis

- April — 17-91 days
  - SCLC Magazine 126 days
- May — 18-84 days
  - Latina 111 days
- June — 41-97 days
  - Family Circle 112 days
  - Time (6/23 issue) 167 days 2Q03 Figure 272 88

Publication Monthly Payment Analysis

Client: Agency:

Brand: Quarter: 2Q03

Month: 4/2003

| Publication | Affidavit Date | Remittance Date | Terms (Days) |
|---|---|---|---|
| Budget Living | Apr 1, 2003 | May 29, 2003 | 58 |
| Cooking Light | Mar 20, 2003 | May 29, 2003 | 70 |
| Good Housekeeping | Mar 10, 2003 | May 29, 2003 | 80 |
| Instyle | Mar 15, 2003 | May 29, 2003 | 75 |
| Money | Mar 21, 2003 | May 29, 2003 | 69 |
| Motor Trend - Spanish | Apr 1, 2003 | May 29, 2003 | 58 |
| New York Auto Show | May 12, 2003 | May 29, 2003 | 17 |
| Newsweek | Apr 21, 2003 | Jul 21, 2003 | 91 |
| People | Mar 25, 2003 | May 29, 2003 | 65 |
| People | Apr 22, 2003 | May 29, 2003 | 37 |
| Real Simple | Mar 18, 2003 | May 29, 2003 | 72 |
| SCLC Magazine | Jan 23, 2003 | May 28, 2003 | 126 |
| Southern Living | Jul 11, 2003 | Jul 21, 2003 | 10 |
| Sports Illustrated | Apr 1, 2003 | May 29, 2003 | 58 |
| Sports Illustrated | Apr 15, 2003 | May 29, 2003 | 44 |
| Sunset Magazine | May 29, 2003 | May 29, 2003 | 0 |
| This Old House | Mar 28, 2003 | May 28, 2003 | 62 |
| Trade Union Courier | Jan 13, 2003 | Feb 24, 2003 | 42 |

Page 1 of 1

Figure 273

Publication Monthly Payment Analysis

Client: Agency:

Brand: Quarter: 2Q03

Month: 5/2003

| Publication | Affidavit Date | Remittance Date | Terms (Days) |
|---|---|---|---|
| AF Budget Travel | May 1, 2003 | Jun 24, 2003 | 54 |
| Army Navy Times | May 26, 2003 | Aug 11, 2003 | 77 |
| Better Homes & Gardens | Apr 8, 2003 | Jun 24, 2003 | 77 |
| Car & Driver | Apr 15, 2003 | Jun 24, 2003 | 70 |
| Child | Apr 15, 2003 | Jun 24, 2003 | 70 |
| Cooking Light | Jun 28, 2003 | Aug 11, 2003 | 44 |
| Country Home | Apr 22, 2003 | Jun 24, 2003 | 63 |
| Country Living | Apr 8, 2003 | Jun 24, 2003 | 77 |
| Ebony | Apr 1, 2003 | Jun 24, 2003 | 84 |
| Instyle | Apr 19, 2003 | Jun 24, 2003 | 66 |
| Ladies Home Journal | Apr 8, 2003 | Jun 24, 2003 | 77 |
| Latina | Apr 1, 2003 | Jul 21, 2003 | 111 |
| Men's Health | Apr 22, 2003 | Jun 24, 2003 | 63 |
| Midwest Living | Apr 29, 2003 | Jun 24, 2003 | 56 |
| Money | Apr 18, 2003 | Jun 24, 2003 | 67 |
| Motor Trend - Spanish | May 1, 2003 | Jun 24, 2003 | 54 |
| National Geographic | May 1, 2003 | Jul 21, 2003 | 81 |
| Newsweek | May 12, 2003 | Jun 24, 2003 | 43 |
| People en Espanol | Apr 8, 2003 | Jun 24, 2003 | 77 |
| Real Simple | Apr 23, 2003 | Jun 24, 2003 | 62 |
| Southern Living | Jun 30, 2003 | Jul 21, 2003 | 21 |
| Southern Living Vacations | Dec 10, 2003 | Dec 10, 2003 | 0 |
| Sunset Magazine | Jul 3, 2003 | Jul 21, 2003 | 18 |
| Sunset Summer Travel | Dec 10, 2003 | Dec 10, 2003 | 0 |

Page 1 of 2

Figure 274

Publication Monthly Payment Analysis

Client:

Agency:

Brand:

Quarter: 2Q03

Month: 5/2003

| Publication | Affidavit Date | Remittance Date | Terms (Days) |
|---|---|---|---|
| Time | May 2, 2003 | Jun 24, 2003 | 53 |
| Trade Union Courier | Jan 13, 2003 | Feb 24, 2003 | 42 |
| Travel & Leisure | May 1, 2003 | Jun 24, 2003 | 54 |

Page 2 of 2

Figure 275

Publication Monthly Payment Analysis

Client:

Brand:

Month: 6/2003

Agency:

Quarter: 2Q03

| Publication | Affidavit Date | Remittance Date | Terms (Days) |
|---|---|---|---|
| Army Navy Times | Jul 1, 2003 | Aug 11, 2003 | 41 |
| Army Navy Times | Jul 1, 2003 | Aug 11, 2003 | 41 |
| Army Navy Times | Jul 1, 2003 | Aug 11, 2003 | 41 |
| Army Navy Times | Jul 1, 2003 | Aug 11, 2003 | 41 |
| Budget Living | Jun 1, 2003 | Aug 11, 2003 | 71 |
| Cooking Light | May 28, 2003 | Aug 11, 2003 | 75 |
| Country Home | May 27, 2003 | Aug 11, 2003 | 76 |
| Family Circle | May 6, 2003 | Aug 26, 2003 | 112 |
| Family Fun | May 13, 2003 | Aug 11, 2003 | 90 |
| Good Housekeeping | May 10, 2003 | Aug 11, 2003 | 93 |
| Instyle | May 24, 2003 | Aug 26, 2003 | 94 |
| Money | May 16, 2003 | Aug 11, 2003 | 87 |
| Newsweek | Jun 2, 2003 | Aug 26, 2003 | 85 |
| Newsweek | Jun 16, 2003 | Aug 11, 2003 | 56 |
| Nick JR | Jun 15, 2003 | Aug 11, 2003 | 57 |
| Nick JR Noodle | Dec 9, 2003 | Dec 9, 2003 | 0 |
| Oprah | May 20, 2003 | Aug 11, 2003 | 83 |
| Parenting | May 21, 2003 | Aug 26, 2003 | 97 |
| People | Jun 3, 2003 | Aug 11, 2003 | 69 |
| People | Jun 17, 2003 | Aug 11, 2003 | 55 |
| Readers Digest | Jun 1, 2003 | Aug 11, 2003 | 71 |
| Real Simple | May 29, 2003 | Aug 11, 2003 | 74 |
| Southern Living | Jun 30, 2003 | Aug 11, 2003 | 42 |
| Southern Living Decorating | Dec 9, 2003 | Dec 9, 2003 | 0 |

Figure 276

Publication Monthly Payment Analysis

Client:
Agency:
Brand:
Quarter: 2Q03
Month: 6/2003

| Publication | Affidavit Date | Remittance Date | Terms (Days) |
|---|---|---|---|
| This Old House | May 23, 2003 | Aug 26, 2003 | 95 |
| Time | Jun 13, 2003 | Aug 11, 2003 | 59 |
| Time | Jun 20, 2003 | Dec 4, 2003 | 167 |
| Travel & Leisure Family | Jun 2, 2003 | Aug 11, 2003 | 70 |

Page 2 of 2

Figure 277

Attachments

- Network Buying Guidelines

2Q03 Figure 278 89

METHOD AND SYSTEM FOR RECONCILING ADVERTISING INVOICES AND FOR PROVIDING PROMPT PAYMENT THEREFOR

CROSS-REFERENCE AND PRIORITY CLAIM TO RELATED APPLICATION

This application is a continuation-in-part of U.S. patent application Ser. No. 10/810,466, filed Mar. 26, 2004 now abandoned and entitled "Method and Apparatus for Auditing the Performance of Advertising Agencies on Behalf of Their Clients", the entire disclosure of which is incorporated herein by reference.

FIELD OF THE INVENTION

The parent invention relates to a technique whereby advertising agencies are audited to analyze their performance in connection with executing advertising plans for their clients.

The present invention relates to a technique whereby advertising invoices can be promptly reconciled. The improved reconciliation also allows for prompt and accurate payment to media properties for advertising services that have been rendered.

BACKGROUND OF THE INVENTION

Companies typically utilize one or more advertising agencies to devise and implement one or more advertising plans on their behalf. In these plans, advertising agencies typically identify a number of goals and other information related to the plan. As used herein, the term advertising agency encompasses all business entities that engage in the practice of media buying.

For example, the plans will typically identify the media in which advertisements will run. Examples of media include but are not limited to television, radio, and print. The choice of the actual media properties, as well as the time and place in which the advertisements will run, is generally left to the discretion and expertise of the advertising agency. Examples of media properties include but are not limited to television networks, specific television stations, radio stations, newspapers, and magazines.

Further, the plans will typically identify the markets in which advertisements will run. Often, markets are identified in terms of designated market areas (DMAs). DMAs are well known in the field of advertising and typically encompass a core city and the surrounding area. Examples of DMAs include but are not limited to the St. Louis DMA (which would encompass the city of St. Louis, Mo. and nearby surrounding communities in Missouri and Illinois) and the Miami/Fort Lauderdale DMA (which would encompass the cities of Miami, Fla. and Fort Lauderdale, Fla. as well as their nearby surrounding communities). Depending upon the scope of the advertising plan, multiple DMAs may be targeted by an advertising agency when executing a client's advertising plan.

Further, advertising plans will typically identify a target demographic and a desired level of exposure for that target demographic. A common target demographic for companies engaged in mass market sales is the age 18-49 demographic. However, as would be understood, the target demographic can be particularized according to virtually any trait, including but not limited to different age classifications, gender, occupation, heritage, income level, political preference, etc. Exposure levels for television and radio advertising are typically expressed in terms of target rating points (TRPs). One TRP is well-known in the art to be one percentage point of the number of people estimated to be viewing a television/radio spot versus the number of people who could be viewing the television/radio spot. For example, if market A includes 100,000 people who could be watching television and an advertisement is run on a particular TV channel at a time when 50,000 people in market A are watching that channel, that advertisement will have achieved 50 TRPs. Exposure levels for print advertising are typically expressed in terms of circulation for the print item.

Advertising plans will typically identify a target number of total TRPs and/or a total amount of circulation desired for various advertisements during a specified time period (year, quarter, month, etc.). The budget for an advertising plan can then be expressed in terms of cost per TRP or cost per thousands of circulation (CPM), wherein a total cost for the advertising plan is expressed as the sum of (1) a total number of TRPs desired multiplied by the average cost of a TRP, and (2) a total amount of desired circulation (in the thousands) multiplied by an average CPM.

Once the expected cost for the advertising plan is calculated by the advertising agency and approved by the client, the advertising agency sets out to purchase the plan. Agencies execute clients' advertising plans by purchasing advertisement time/space with media properties. For TV/radio ads, advertisement times are usually requested in terms of dayparts. A daypart is a component of a day that relates to a specific time period. Dayparts are well known in the art, and common dayparts include, but are not limited to: morning, daytime, early fringe, early news, prime access, prime, late news, weekend, sports, etc. However, it should be noted that different entities may use different definitions for daypart components. For example, one media property may consider early fringe to begin at 4:30 pm CST and end at 5:00 pm CST, while a particular advertising agency may consider early fringe to extend from 4:00 pm CST to 5:00 pm CST. For print ads, advertisement placement is usually specified in terms of page placement.

The advertising agency's initial attempt to purchase advertisement time/space with media properties can be referred to as an original buy. Media properties generally have the final say on what gets aired, and media properties will often shuffle advertisement requests or fail to air advertisement requests included in the original buy for a variety of reasons (scheduling demands, better offers coming along, etc.).

After the shuffling settles following the original buy, the advertising agency places its final buy with the various media properties. Final buys correspond to final requests for advertisement spots placed with media properties by an agency. Once again, there is no guarantee that all elements of the final buy will be carried out as desired by the advertising agency because the media properties may make further alterations. The cost for a final buy is typically based on the cost per spot for the time at which the advertisement is to run.

Once the advertisements actually run, data corresponding to these actual advertisements are expressed in the actual buy. The actual buy TRP value for each actual advertisement can be determined from independent sources such as Nielsen TV ratings and Arbitron radio ratings, and represents the number of TRPs achieved by the airing.

As for costs, media properties typically bill advertising agencies for their clients' advertisements at the end of the standard broadcast month (based on a final Sunday per month cycle). The agencies typically receive their bills from the media properties by the $20^{th}$ of the month following the previous month's activity. Clients are typically pre-billed by the agencies throughout this process. Pre-billing to the client from the advertising agency typically occurs the first day of the month of the purchased activity, and the pre-bill is based on the estimated costs for the month billed. The portion of the client's payment to the agency that is to be applied to media property invoices is deposited in a financial account by the agency. As invoices are received from media properties and verified for accuracy by the agency, payments are made to media properties for their invoices from the financial account. Billed costs in media property invoices are typically based on unit costs as generated by the media property. Unit cost is typically a derivative of the estimated target rating point (TRP) multiplied by the cost per rating point.

It is believed by the inventors herein that a typical account receivable time period in the advertising industry for payment to media properties on media property invoices received by advertising agencies is around 90 days. During this lengthy account receivable period, the client's money (which was pre-billed by the agency) sits in the account maintained by the agency, where it earns interest. This interest is typically kept by the agency and represents a perk for agencies that creates a disincentive for prompt payment of media property invoices. It is believed by the inventors herein that the interest on these accounts amounts to a yearly boon to the advertising agency industry upward of $40 billion.

This interest is believed to represent a "hidden" cost to clients of advertising agencies. That is, due to the time value of money, the delay that media properties experience in connection with payment of their invoices effectively results in a loss of potential income to the media properties, which is believed to translate into higher advertising prices being passed on to clients.

Accordingly, the inventors herein believe that a need exists in the art for a new system that can decrease the delay experienced between the time a media property advertising invoice is received and the time that the media property advertising invoice is reconciled and paid. Also, in the past, attempts to accurately audit the performance of advertising agencies in carrying out the advertising plans of their clients throughout the process described above have been difficult.

Often, the advertising agency would provide its client with a self-audit of its own performance. However, due to the conflicts of interest inherent in such self-audits, these audits have not proven valuable to clients as an objective measure of an agency's performance because, more often than not, the self-audits would inevitably establish a wonderful performance by the agency.

With respect to independent advertising agency audits conducted by unbiased third parties, the task of assembling an audit report has proven to be a gargantuan task requiring tedious efforts by teams of auditors. To perform such an audit, these auditors are required to pore through and make sense of volumes of paper documents that relate to advertisement postings by advertising agencies. Because of the massive manpower required for these efforts and because of the unsatisfactory lack of detail and flexibility in these conventional independent audit reports, the inventors felt there was a great need in the art for an improved method of objectively auditing advertising agencies to evaluate their performances in executing their clients' advertising plans.

SUMMARY OF THE INVENTION

To fill such needs, the inventors herein have designed a system whereby a repository of data relating to agencies' executions of clients' advertising plans is maintained. From this repository, audit reports can be automatically generated that detail the agencies' performances on behalf of their clients.

According to one aspect of the parent invention, disclosed herein is a method of auditing an advertising agency to evaluate how the agency performed in executing an advertising plan on behalf of a client, the method comprising: (1) storing data that describes the advertising plan; (2) storing data that describes a plurality of actual advertisements, each actual advertisement corresponding to at least one client advertisement placed by the agency that was run by at least one media property; and (3) processing the stored plan data and the stored actual advertisements data to generate data indicative of whether the actual advertisements satisfied the advertising plan. The processing step of the method preferably comprises obtaining exposure data for the actual advertisements data from an independent source such as Nielsen ratings or Arbitron ratings and then matching the actual advertisements data with the exposure data obtained therefor, Further still, the method preferably further comprises generating a report from the generated data for delivery to the client. Such reports include not only paper reports printed from the generated data but also visual displays of the generated data such as those displayed on a computer monitor. The level of detail and the flexibility in the level of detail available in the generated reports is set forth in greater detail below.

According to another aspect of the parent invention, disclosed herein is a method of creating a database of data for evaluating how a plurality of advertising agencies perform on behalf of their clients, each client having at least one advertising plan that at least one of the advertising agencies has attempted to implement, the method comprising: (1) receiving data describing a plurality of actual advertisements, actual advertisements being advertisements placed by agencies with a plurality of media properties on behalf of the clients that were actually run by the media properties, the actual advertisements data having a plurality of formats; (2) converting the received actual advertisements data to a common format; and (3) storing the converted actual advertisements data in a database for subsequent use in an audit of at least one advertising agency for at least one client.

The inventors herein further disclose a system for determining an amount of money to be transferred to a media property in satisfaction of an invoice from that media property, the system comprising: an invoice reconciliation system configured to automatically reconcile a plurality of invoice items with a plurality of final buy items to determine an amount of money to be transferred, preferably electronically, to the media property in satisfaction of the invoice items, each invoice item corresponding to an actual advertisement spot that was run and invoiced by the media property, each final buy item corresponding to an advertisement spot request that was placed by the advertising agency with the media property.

This invoice reconciliation system can be further configured to (1) identify a plurality of invoice items for which an exception handling condition applies, and (2) provide at least one graphical user interface (GUI) for display to a user, the at least one GUI being configured to interact with the user about at least one invoice item for which an exception handling condition has been identified, the interaction including receiving input from the user corresponding to an action to be taken on the at least one invoice item.

A significant challenge in developing an invoice reconciliation system for media property invoices in the advertising industry relates to the ability of such a reconciliation system to be cross-platform in terms of the different software packages that many advertising agencies and media properties use in connection with the final buy and invoice activities.

Accordingly, the inventive system preferably also includes a conversion system and a database in communication with the conversion system and the invoice reconciliation system, wherein the conversion system is further configured to (1) receive the invoice items in a first format, (2) receive the final buy items in a second format, (3) convert at least the received final buy items to a format in common with the invoice items, and (4) store the invoice items and the converted final buy items in the database, and wherein the invoice reconciliation system is further configured to retrieve a plurality of the stored invoice items and a plurality of the stored final buy items prior to performing reconciliation.

Moreover, the invoice reconciliation system is preferably further configured to communicate money transfer authorization instructions to a computer system that controls the disbursement of funds to pay media property invoices, the money transfer authorization instructions identifying at least (1) the determined amount of money to be transferred to the media property and (2) the media property to which the determined money amount from the account is to be transferred.

According to another aspect of the present invention, the inventors herein disclose a computer-implemented method of reconciling media property invoice data for advertising services with advertising agency final buy data, the media property invoice data comprising a plurality of invoice items, each invoice item corresponding to an actual advertisement spot that was run by the media property, the final buy data comprising a plurality of final buy items, each final buy item corresponding to an advertisement spot request that was placed by the advertising agency with the media property, the method comprising: (a) comparing the invoice items with the final buy items, and (b) responsive to the comparing step, identifying the invoice items for which a payment to the media property is authorized. Corresponding software for performing this method is also disclosed herein.

According to yet another aspect of the present invention, the inventors herein disclose a computer-implemented method of creating commonly formatted media property invoice data for advertising services and advertising agency final buy data, to thereby allow reconciliation of the media property invoice data with the advertising agency final buy data, the media property invoice data comprising a plurality of invoice items, each invoice item corresponding to an actual advertisement spot that was run by the media property, the final buy data comprising a plurality of final buy items, each final buy item corresponding to an advertisement spot request that was placed by the advertising agency with the media property, the method comprising: (a) receiving the invoice items in a first format, (b) receiving the final buy items in a second format, and (c) performing at least one of the steps selected from the group consisting of (1) converting the received final buy data to a common format, (2) converting the received invoice data and the received final buy data to a common format, (3) converting the received invoice data to the second format, and (4) converting the received final buy data to the first format. Corresponding software for performing this method is also disclosed herein.

These and other features and advantages of the parent and present inventions will be in part apparent and in part pointed out in the following description, referenced figures, and appendices.

BRIEF DESCRIPTION OF THE DRAWINGS

FIG. 4 depicts an exemplary data format for raw final buy data;

FIG. 5 depicts an exemplary data format for invoice data;

FIG. 9 depicts a preferred GUI for viewing a list of messages received by a media property user;

FIGS. 10(*a*) and (*b*) depict various preferred GUIs for a media property user to respond to a request submitted via the GUIs of FIGS. 8(*a*)-(*f*);

FIG. 15 depicts an exemplary data format for raw final buy data;

FIG. 16 depicts an exemplary data format for raw posted buy data;

FIG. 18 depicts an example of a mapping table for recoding raw daypart data;

FIGS. 21(*a*)-(*d*) illustrate various preferred market analysis audit reports;

FIG. 22 illustrates a preferred average ratings audit report;

FIGS. 23(*a*)-(*c*) illustrate various preferred CPP audit reports;

FIGS. 24(*a*)-(*d*) illustrate various preferred under delivery tracking audit reports;

FIGS. 25(*a*)-(*h*) illustrate various other preferred audit reports;

FIGS. 26-68 illustrate a sample audit report for TV/radio; and

FIGS. 69-278 illustrate a sample audit report for print media.

DETAILED DESCRIPTION OF THE PREFERRED EMBODIMENTS

Parent U.S. patent application Ser. No. 10/810,466

Figure 11:
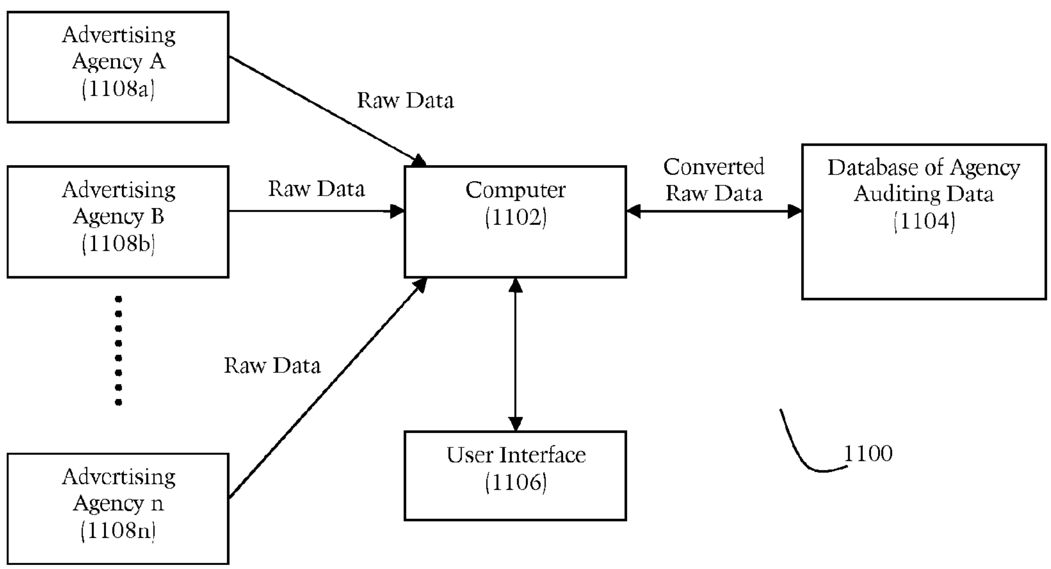
FIG. 11 depicts an overview of the preferred embodiment of the present invention.

FIG. 11 depicts an overview of the preferred embodiment of the parent invention. The auditing system 1100 comprises a computer 1102 that receives raw data relating to advertisement buys for clients by advertising agencies 1108. This raw data is preferably received from the agencies electronically over a network such as the Internet. However, any known form of communication can be used to communicate the raw data to the auditor, including leased data lines and mailings from agencies to the auditor. However, transmission of the data to the auditor in the form of paper copies is not preferred as it requires intervention by the auditor to perform manual entry of the raw data into a database. It is believed that through various negotiations between agencies, agency clients, and the auditor, advertising agencies can be persuaded to utilize electronic transmission of the raw data to the auditor. Preferred transmission techniques include e-mail and file uploads over a network, such as http uploading over the Internet.

The auditor preferably maintains a computer 1102 and database 1104 to perform the auditing functions of the preferred embodiment of the parent invention. The computer is preferably a commercially-available Dell Poweredge 2650, and the database is preferably a commercially-available Microsoft MS SQL 2000. It should be understood that the computer 1102 and database 1104 can be implemented with other hardware, including an implementation as a personal computer, workstation, or server that can be accessed over a network such as the Internet. As will be explained in greater detail below, the database 1104 serves as a repository for the data used in the auditing process. The computer 1102 preferably provides the programming logic, or code segments executable by a processor, for performing the audit. This programming logic can reside on memory of computer 1102 or on a device such as a compact disc (CD) or the like to be accessed by computer 1102 from a disk drive or the like. Also, this programming logic preferably includes a code segment for displaying and controlling a graphical user interface 1106 that is configured to interact with a user to manage the auditing process and, if necessary, provide data entry functionality. Preferred tasks for the user interface 1106 are to provide the user with the ability to add data to the database 1104 as appropriate and to provide the user with control for generating the audit reports of the preferred embodiment.

The auditor for the preferred embodiment of the parent invention is preferably a party or entity independent from the advertising agencies being audited. By virtue of this independence, clients can be reassured as to the unbiased nature of the audit results. However, as should be understood by those of ordinary skill in the art, an advertising agency and/or an advertising agency client can also practice the invention by serving as the auditor themselves.

In one embodiment, access to the user interface 1106 is restricted to the independent auditor. However, in another embodiment, some or all tasks of the user interface can be implemented on a client's computer such that the client has remote access over a network such as the Internet to the computer 1102 and database 1104. This embodiment provides clients with the power to generate audit reports without going through a third party auditor. In such an embodiment, it is preferred that the computer 1102 or a server that controls access to computer 1102 implement conventional security measures to maintain the integrity of clients' data in the database 1104 by restricting a client's access to the database to its own data. Further still, in another embodiment, the user interface can also be implemented on an agency's computer such that the agency has remote access over a network such as the Internet to the computer 1102 and database 1104, thereby providing agencies with the power to generate audit reports of themselves. This embodiment also preferably involves the computer 1102, or a server that controls access to computer 1102, implementing conventional security measures that prevents an agency from gaining access to data unrelated to that agency.

Creating the Database of Audit Data:

One aspect of the preferred embodiment relates to storing data that describes the agency advertising plans in the database. The advertising plan, which is typically communicated by the agency to the client in writing, generally specifies on a quarterly basis: the markets in which ads are to run, a target demographic for the plan, a desired number of TRPs for each daypart in the market that are to be achieved by the plan, and a total cost for the plan. Once the auditor receives such plan data, the auditor preferably uses the interface 1350 of FIG. 12 to store the plan data in the database. However, as should be understood, the plan data can also be communicated to the computer 1102 electronically from either the client or the agency.

Figure 12:
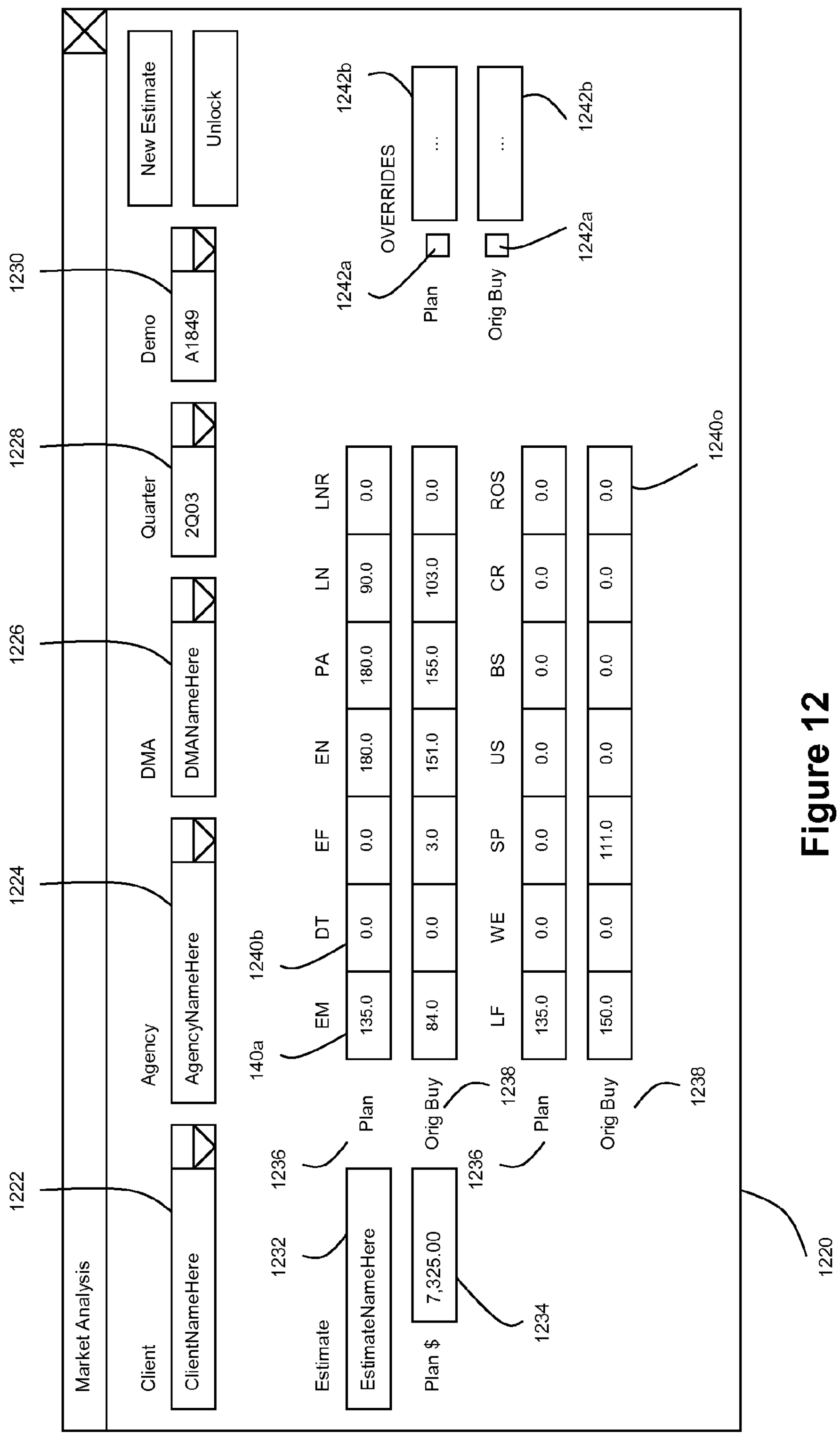
FIG. 12 depicts a preferred user interface for entering plan data and original buy data into the database.

With reference to FIG. 12, the auditor preferably enters a client identifier such as a client's name in field 1222. Further, the auditor preferably enters an agency identifier such as an agency's name in field 1224. The DMA for the plan is preferably entered in field 1226, the duration for the plan (typically measured in terms of quarters, although other durations, such as monthly, can also be used) in field 1228, and the target demographic in field 1230. Further still, the auditor preferably enters an identifier for the advertising plan in field 1232 and a total cost for the plan in field 1234.

Row 1236 is set aside for entering TRP data for the plan by daypart, with each daypart corresponding to a different column 1240*a* through 1240*o*. If the agency (or client) does not provide TRP data for the plan that is broken down by daypart, the interface 1350 preferably includes an override control feature 1242. By checking box 1242*a* and entering an aggregate sum of TRPs for all dayparts identified for the plan in field 1242*b*, the auditor can directly enter the aggregate TRP sum in the database.

Once the auditor has completed entry of the plan data, the database includes an important point of reference for performing an audit on the advertising agency.

Another aspect of the preferred embodiment relates to storing original buy data in the database. Advertising agencies typically provide clients with original buy data on a quarterly basis. This original buy data is often communicated in paper form, thus requiring further data entry by the auditor to get the data into the database. However, as should be understood, the agency or the client can communicate the original buy data to the auditor electronically as explained below in connection with the final buy data and the actual buy data. The interface 1220 of FIG. 12 can also be used by the auditor to enter original buy data into the database. Row 1238 is set aside for entering TRP data for the original buy by daypart, with each daypart corresponding to a different column 1240*a* through 1240*o*. If the agency (or client) does not provide TRP data for the original buy that is broken down by daypart, the interface 1350 preferably includes the override control feature 1242 as described above. Once the auditor has completed entry of the original buy data, the database includes another point of reference for performing an audit on the advertising agency.

Figure 13:
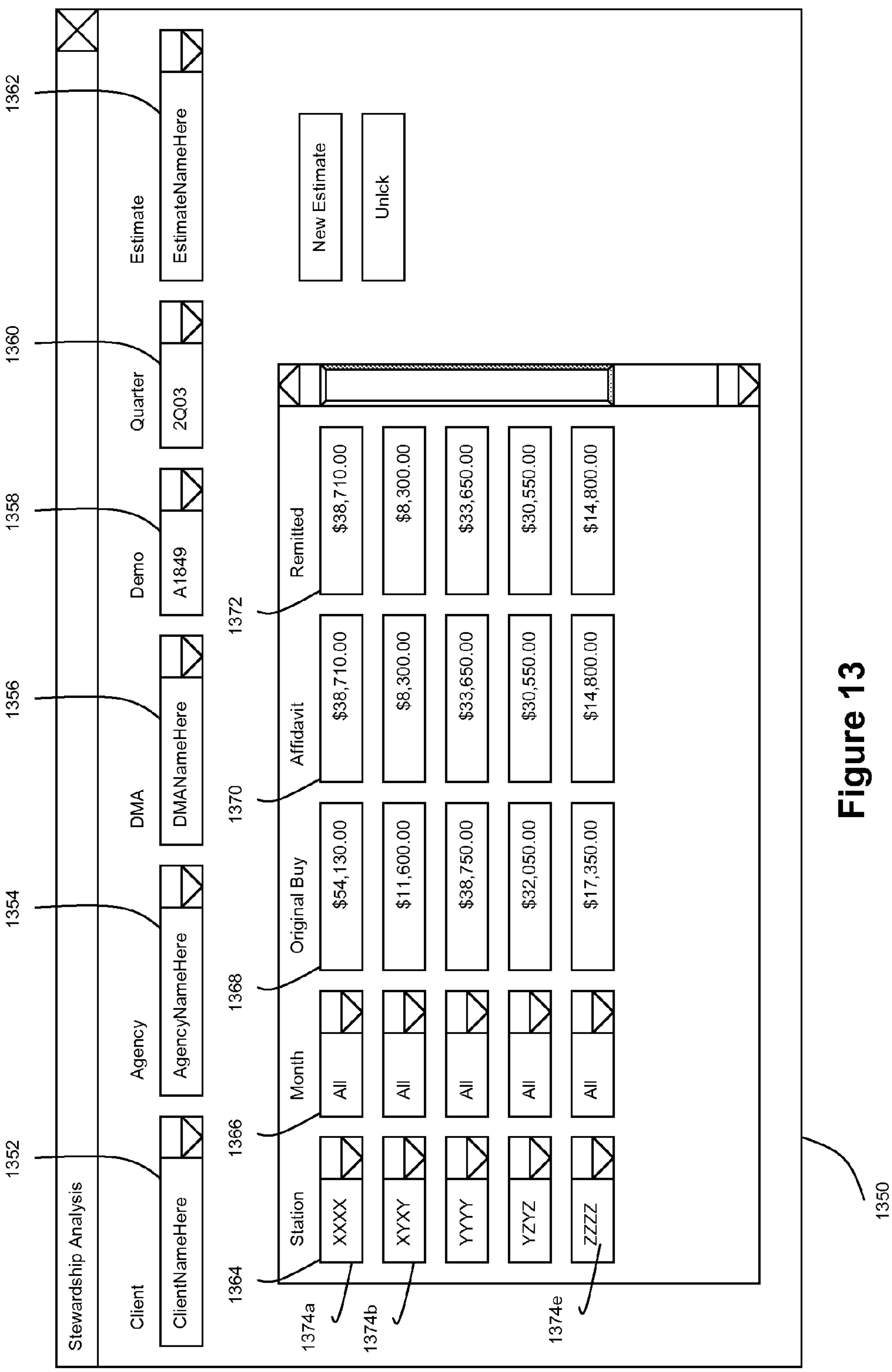
FIG. 13 depicts a preferred user interface for entering data relating to an analysis of costs per media property.

FIG. 13 corresponds to a user interface for entering data relating to an analysis of costs per media property. The auditor preferably enters data for the client, the agency, the DMA, the target demographic, the time duration, and the plan in fields 1352, 1354, 1356, 1358, 1360, and 1362 respectively. Further, each row 1374 corresponds to data for a different media property identified by an identifier, such as station call letters, in column 1364. For each media property, the interface 1350 provides a field in column 1366 for a time duration (preferably by month, although other time periods can be used), a field in column 1368 for the total cost of the original buy for the plan, a field in column 1370 for the amount of money billed to the agency by the media property for the plan (affidavit data), and a field in column 1372 for the amount of money remitted by the agency to the media property for the plan (remittance data).

Figure 14:
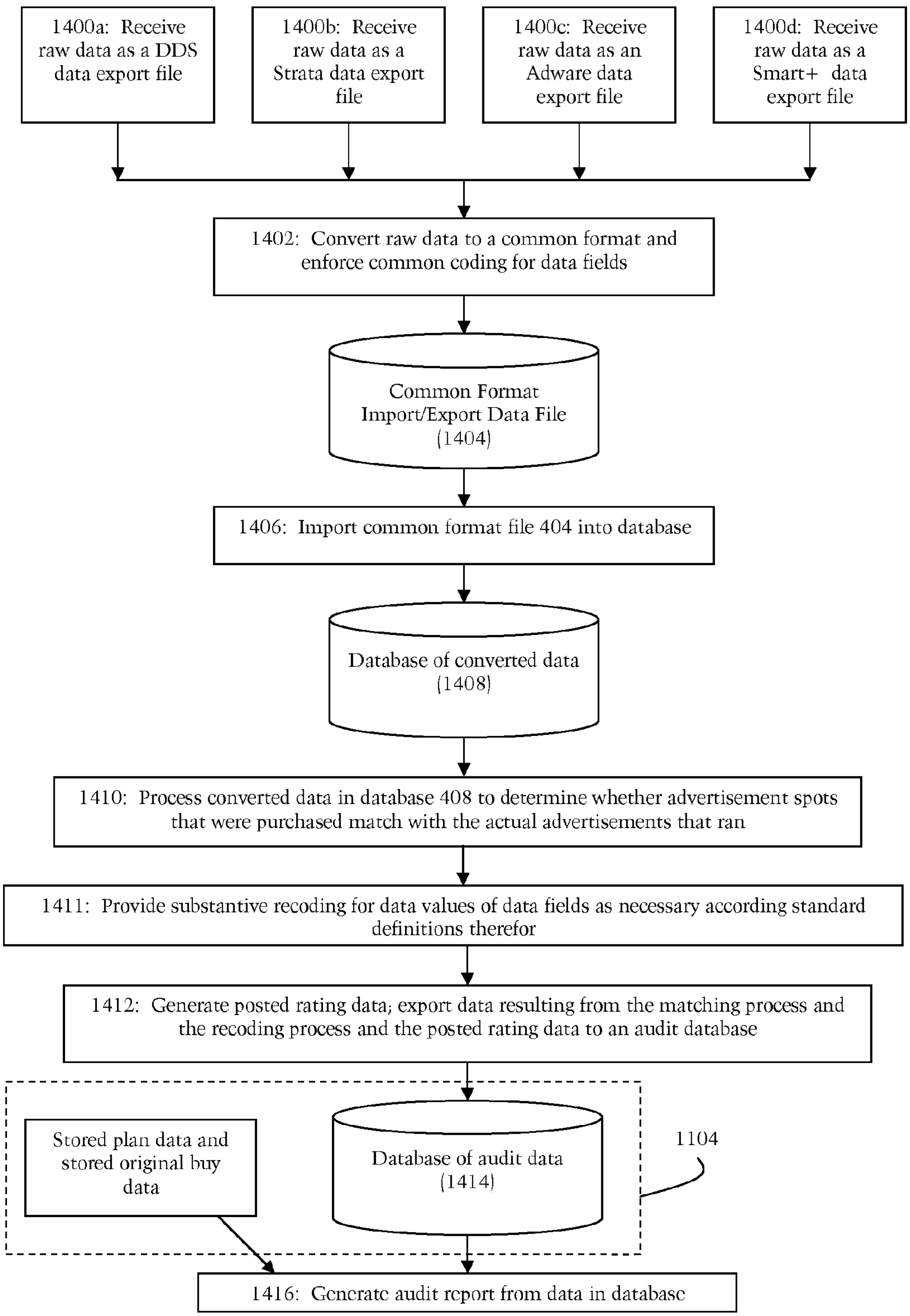
FIG. 14 is a flowchart overview for the auditing process for the preferred embodiment of the parent invention.

FIG. 14 is a flowchart overview for the auditing process for the preferred embodiment of the parent invention. At step 1400, the raw data relating agencies' final buys and actual buys are received from the agencies (preferably electronically). Each agency may store the final buy data and/or the actual buy data in different formats depending upon the software packages used by the agencies. Examples of industry-used formats for the final buy data and the actual buy data are the DDS format (1400*a*) for media buy software from Donovan Data Systems, Inc., the Strata format (1400*b*) for media buy software from Strata Marketing, Inc., the Adware (1400*c*) format for software from AdWare Systems, Inc., and the SmartPlus format (1400*d*) for software from the company Marketing Resources Plus. It should be noted that other data formats may also be used in the practice of the invention.

FIG. 15 illustrates a sample format for a final buy data file that would be received electronically from an advertising agency in the preferred embodiment of the parent invention. The final buy data can be provided as a flat file, as a relational database structure, or other known forms for maintaining data. In the example of FIG. 15, the final buy data is presented as a flat file through table 1500, with each table row corresponding to a different advertisement spot that was requested by the agency and each column including pertinent data for that advertisement spot.

With reference to FIG. 15, data in column 1502 identifies the media in which the advertisement spot is to run. The data in column 1504 identifies the client. The data in column 1506 provides an identifier for the product/service that corresponds to the advertisement. The data in column 1508 provides an identifier code for the plan corresponding to the advertisement spot, and the data in column 1510 provides the name of the plan corresponding to the advertisement spot.

Further, the data in column 1512 identifies the beginning and end dates for the final buy request (expressed by week). The data in column 1514 identifies the DMA in which the final buy was requested, the data in column 1516 identifies the media property with which the final buy request was placed, and the data in column 1518 identifies a line code for the media property. The line code serves as a reference to the advertising agency buy line, as is known in the art.

Further still, the data in column 1518 identifies the program during which the advertisement spot is to run, the data in column 1520 identifies the daypart code for the time during which the advertisement spot is to air, the data in column 1522 specifies the length (in seconds) for the advertisement spot, the data in column 1524 specifies the scheduling rotation by day for the program, and the data in column 1526 identifies the air time for the program. Moreover, the data in column 1528 identifies the cost for the advertisement spot, and the data in column 1530 identifies an estimation by the agency of the amount of exposure for the advertisement spot (in terms of a total number of TRPs that the agency thinks the advertisement spot will achieve if it runs during a commercial break for the program). Columns 1532, 1534, and 1536 each correspond to a particular week during the time period identified in column 1512. The data in each of these columns identifies the number of advertisement spots requested for that program during the specified week. Lastly, the data in column 1538 includes any comments that an agency may wish to include for the advertisement spot. For example, the agency may want to note as a comment that the spot was aired to make good on an earlier missed spot, that a spot's tardy airing was due to a sports program running long, or that a spot's airing was pre-empted by news war coverage.

It should be noted that the final buy data format of FIG. 15 is exemplary only. Different advertising agencies will often use different formats. As a result of this diversity, the final buy data received by a practitioner of the parent invention is expected to have a wide variety of formatting differences. For example, two agencies may use the same fields for their data, but provide those fields in a different sequential order. Also, some of the fields used by one agency may not be used by another agency (e.g., one agency provides a field for "line" data (column 1518 in FIG. 15, while another agency does not). Also, two or more agencies may use different formats for the data that populates the fields (e.g., Agency A codes dates numerically as mm/dd/yy (Dec. 31, 2003) while Agency B codes dates alphanumerically as month name, month date, year (Dec. 31, 2003); Agency A codes dayparts with a two letter code, Agency B codes dayparts with a three letter code, and Agency C codes dayparts with a four letter code). Further still, when the final buy data is provided as electronic files, some agencies may provide the final buy data in a relational database format, while others may supply the data in a flat file format, while yet others may supply the data in other known electronic data structures.

FIG. 16 illustrates a sample format for an actual buy data file that would be received electronically from an advertising agency in the preferred embodiment of the parent invention. This actual buy data preferably arrives as invoices from the agencies, although this need not be the case. For example, some agencies could conceivably provide the actual buy information as a report separate from their invoices. As with the final buy data, the actual buy data can be provided as a flat file, as a relational database structure, or other known forms for maintaining data. In the example of FIG. 16, the actual buy data is presented as a flat file through table 1600, with each table row corresponding to a different advertisement spot that was run by a media property (an actual advertisement) and each column including pertinent data for that actual advertisement.

The data in columns 1602, 1604, 1606, 1608, 1610, 1612, and 1614 correspond, respectively, to the data in columns 1502, 1504, 1506, 1508, 1510, 1514, and 1516 in the final buy data of FIG. 15. The data in column 1616 identifies the date on which the actual advertisement ran, and the data in column 1618 identifies the day on which the actual advertisement ran. The data in column 1620 identifies the time at which the actual advertisement ran, and the data in column 1622 identifies the length (in seconds) for the actual advertisement. The invoiced cost for the actual advertisement is identified in column 1624 and the invoice number is identified in column 1626. Lastly, the data in column 1628 identifies the film code for the actual advertisement. The film code is preferably defined by industry standards as known in the art.

It should be noted that, as with the final buy data, the actual buy data format of FIG. 16 is exemplary only. Different advertising agencies will often use different formats, as explained above in connection with FIG. 15.

Because of the diversity in the final buy data and the actual buy data received from the agencies (this received data can be referred to as raw final buy data and raw actual buy data), the parent invention preferably converts the received raw data to a common format to greatly simplify the processing logic used to audit the data stored in the database. Accordingly, the programming logic for performing the audit need not account for each individual raw data file format, thereby enhancing the modularity of the auditing logic to provide for increased flexibility in the event the auditing logic is to be altered, or in the event that a new format for raw data is received.

A practitioner of the parent invention can select the common format for the conversion step 1402 of FIG. 14 as a design choice based on a personal evaluation of the facts and circumstances relating to the system. For example, the common format can be one created by the auditor. The common format can also be one of the existing "raw" formats (such as Strata or DDS), which would reduce the translational burden and allow other processing steps to utilize off-the-shelf software (such as steps 1410 and 1412 discussed below). However, as facts and circumstances may dictate, some practitioners of the parent invention who do not want to be limited to the use of such off-the-shelf software may find it more agreeable to develop their own common format. Further, the data structures for the common format may be selected to be structures for a relational database to facilitate storage using well-known database language techniques, or it can be a flat file format for practitioners of the parent invention who are less comfortable with relational databases.

Once the practitioner of the parent invention identifies the raw data formats and common data format involved in the conversion process, a mapping table for mapping raw data values for each of the fields in the raw data file records in the various exemplary file formats 1400*a* through 1400*d* into the common format can be generated using ordinary skill in the art. This mapping table can then be used in performing the conversion step 1402.

One preferred aspect of the raw data conversion is the enforcement of standardized coding for the data fields (step 1402 of FIG. 14). One of the data fields that is preferably standardized is the daypart code field for the raw data. Each file format often uses different daypart codes to express the same daypart.

Figure 17:
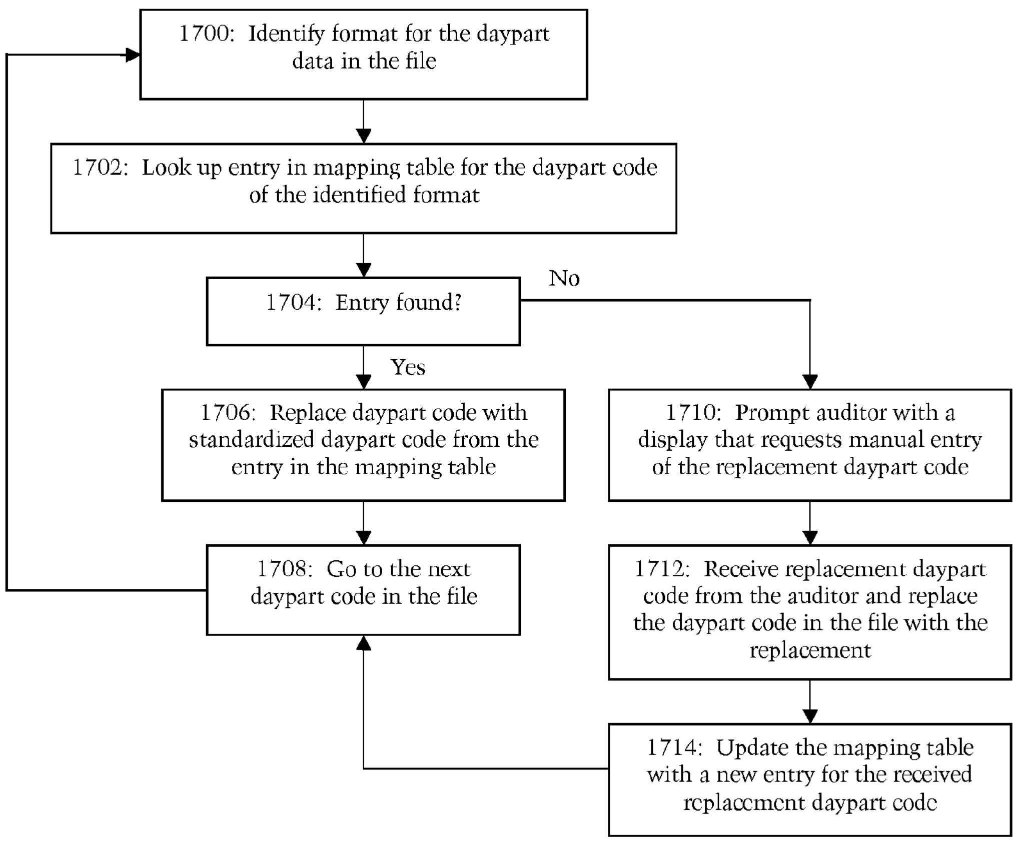
FIG. 17 is a flowchart illustrating the processing for recoding raw daypart data.

FIG. 17 illustrates the process for daypart recoding. At step 1700, the format for the daypart code data for a buy record in a file is identified. Then, at step 1702, the process performs a look-up in a daypart mapping table for an entry that matches the daypart code of the identified format. FIG. 18 illustrates an exemplary daypart coding matching table 1800. The data in column 1802 identifies the format for the mapping table entry 1810, the data in column 1804 identifies a known daypart code for the format of column 1802, the data in column 1806 identifies the standardized daypart code for that entry, and the data in column 1808 identifies the media type for the entry.

If step 1704 finds a matching entry in column 1804 of the table 1800 for the format of column 1802, then at step 1706, the daypart code is replaced by the standardized code in column 1806 of the matching entry. Thereafter, at step 1708, the process moves on to the next daypart code in the raw data file and the process begins anew.

If step 1704 does not find a matching entry in the daypart mapping table, the process proceeds to step 1710. At step 1710, an auditor is preferably prompted with a user interface that requests manual entry of a replacement daypart code. To facilitate the auditor's task, the user interface preferably identifies the file format for the daypart code data, the actual daypart code, the program corresponding to the daypart code from the same buy record of raw data, the day(s) of the week and date(s) for the entry in the same row of raw data, and the time for the program. From this data, the auditor will be able to determine the appropriate replacement daypart code and enter that code through the interface. At step 1712, the replacement daypart code received from the auditor replaces the raw daypart code, and at step 1714, the mapping table 1800 is updated with the new replacement daypart code data. Accordingly, the mapping table 1800 is a "learning" table that is updated as new daypart code translations are needed. Over time, it would be expected that the route through the flow of FIG. 17 will follow more and more the automated path of steps 1700-1708, bypassing the auditor intervention steps of 1710-1714.

Further, it is preferable that other aspects of the raw data be standardized, such as the DMAs, media property identifiers, and demographic classifications. Likewise, the technique of FIG. 17 can be used for mapping data value of these data fields as well.

With reference to FIG. 14, the output of the conversion step 1402 will be an import/export file 1404 for the converted final buy data and the converted actual buy data. This file will be in the common format. Thereafter, at step 1406, this common format file 1404 is imported into a database to create a database 1408 of converted final buy and converted actual buy data.

Thereafter, at step 1410, the content of the database 1408 is processed to determine whether the advertisement spots in the final buy data match with the actual advertisements in the actual buy data. This step is performed by attempting to match entries in the final buy data with entries in the posted buy data and vice versa. Matching and non-matching entries are flagged accordingly.

Further, at step 1411, the data values of data fields in the database 1408 are recoded as necessary to provide uniform standards for data from different agencies. It is within the judgment of a practitioner of the invention as to which fields will have their data values standardized. However, it is preferred that the daypart codes assigned to the records in the final buy data and actual buy data be standardized at step 1411. As previously noted, different agencies often use different definitions for dayparts such that the time period covered by Agency A's "early fringe" daypart may be different than the time period covered by Agency B's "early fringe" daypart. Thus, at step 1411, it is preferred that the final buy and actual buy daypart records be substantively re-evaluated using a standard set of daypart definitions based at least in part on time of day, day, and date. This standard set of daypart definitions is preferably client-specified, although this need not be the case. In a current implementation, the auditor manually evaluates and recodes (if necessary) the dayparts assigned to the final buy and actual buy records. However, it should be noted that this step can also be automated.

Next, at step 1412, the process obtains exposure data for the actual advertisements from an independent source. This exposure data is preferably expressed in terms a number of TRPs achieved for an actual advertisement. There are a number of well-known commercial sources for independent exposure data, such as A.C. Nielsen for TV ratings data and Arbitron for radio ratings data. The entries for each actual advertisement are thereafter updated with the exposure data, thus creating database 1414 of advertisement postings data (or posted buy data).

Additionally, it is preferred that step 1412 also include obtaining Spot Quotation and Data (SQAD) data that pertains to TRP costs. SQAD data is well-known and commercially-available in the art. This SQAD data can be entered in the database manually, although as should be understood, this need not be the case. It is also preferred that step 1412 include obtaining NSI average ratings data, which is also commercially-available in the art. This NSI data can also be entered in the database manually, although this need not be the case.

Further still, the obtaining of the SQAD data and the NSI data need not be limited to step 1412, as the SQAD and NSI data can also entered into the database at other times, unrelated to the flow of FIG. 14.

The creation of software code for steps 1410 and 1412 is within the skill of ordinary programmers. However, it should be noted that software is commercially available for performing these tasks. Suitable commercially-available software platforms for performing steps 1410 and 1412 are available from Strata Marketing, Inc., CORE, TvScan (formerly known as TAPSCAN, Inc., and now a part of Marketron International), Marketing Resources Plus, Donovan Data Systems, Inc., and AdWare Systems, Inc., as is known in the art.

Figure 19:
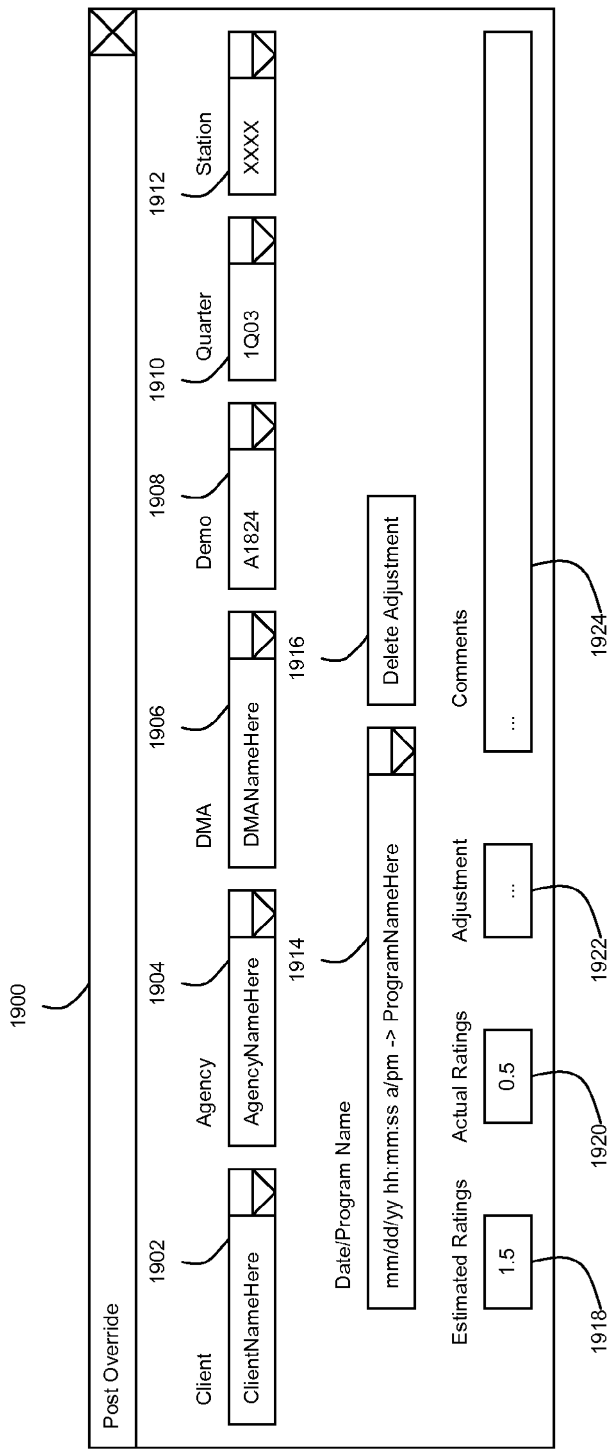
FIG. 19 depicts a preferred user interface for overriding the independent exposure data for an advertisement posting.
Figure 20A:
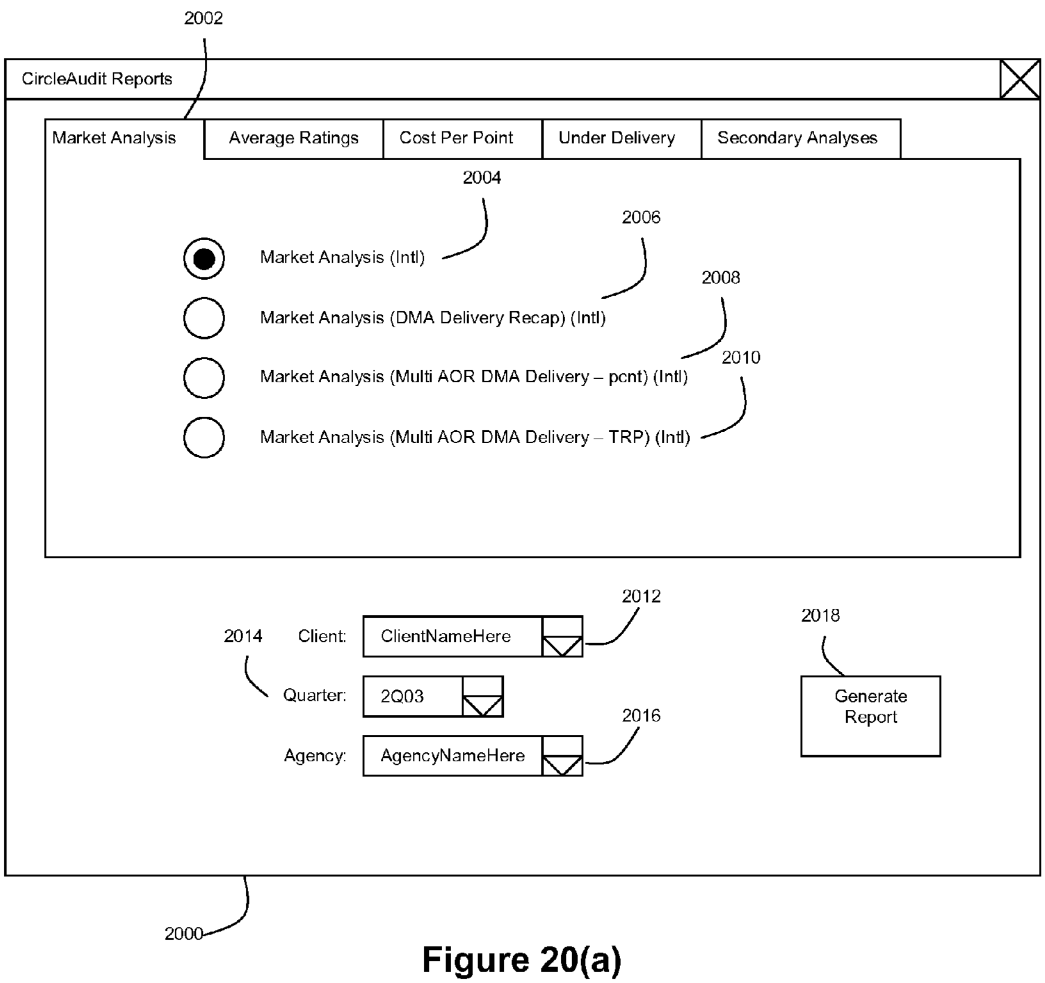
FIG. 20(*a*)-(*e*) illustrate various preferred user interfaces for generating audit reports.
Figure 20B:
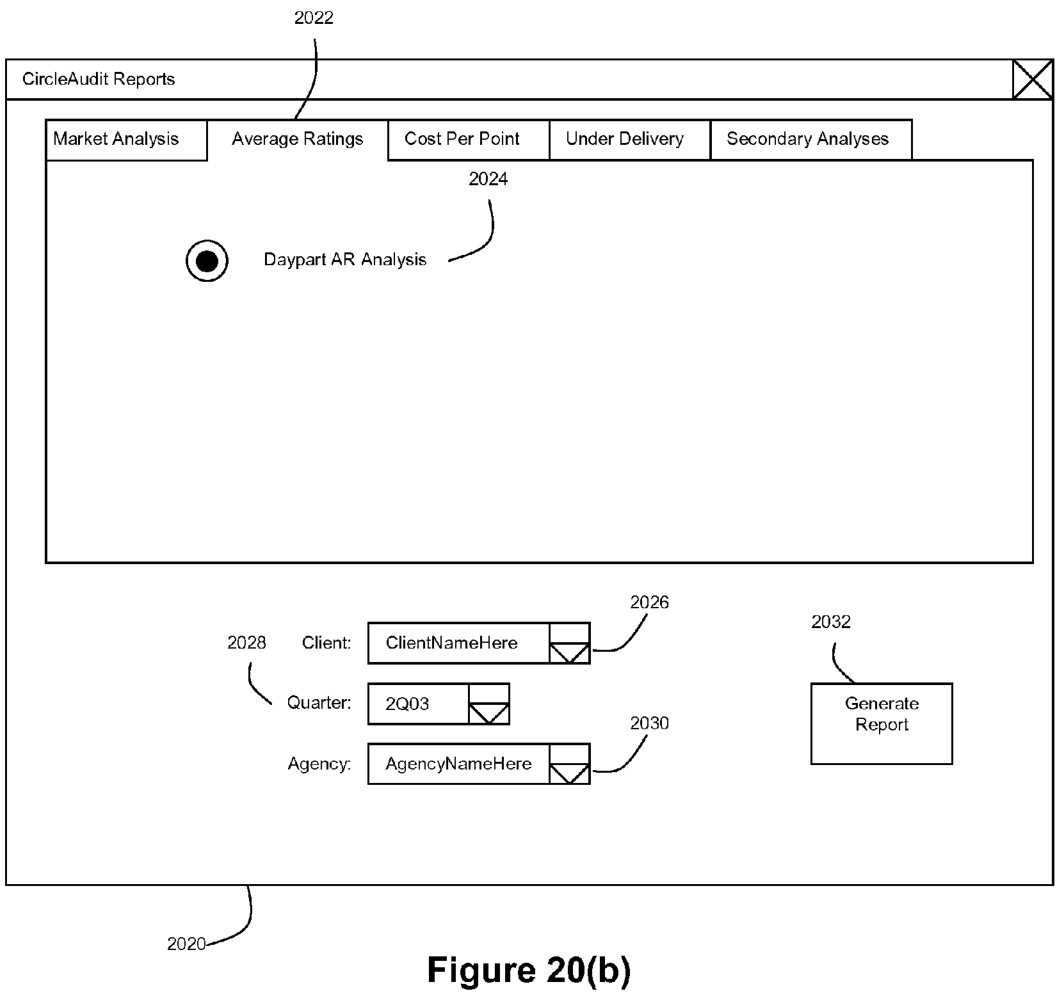
Figure 20C:
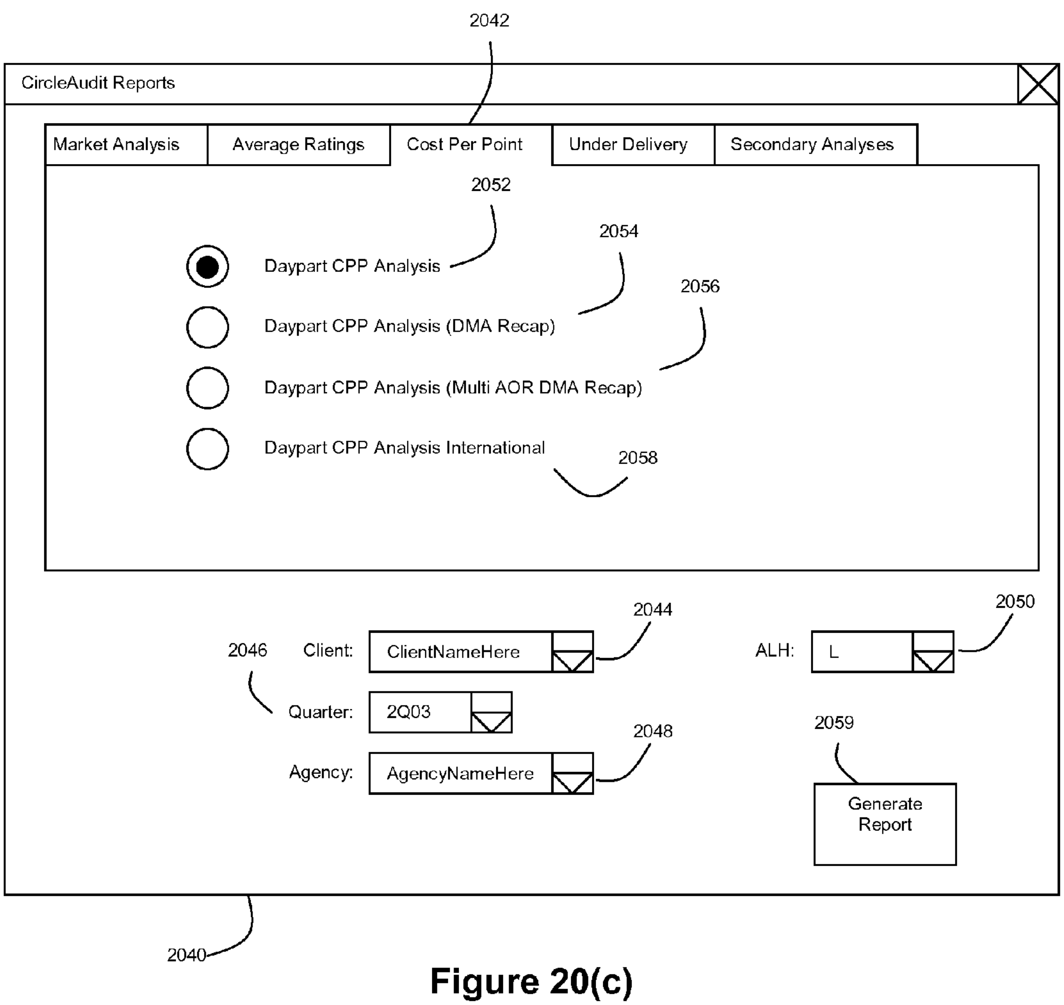
Figure 20D:
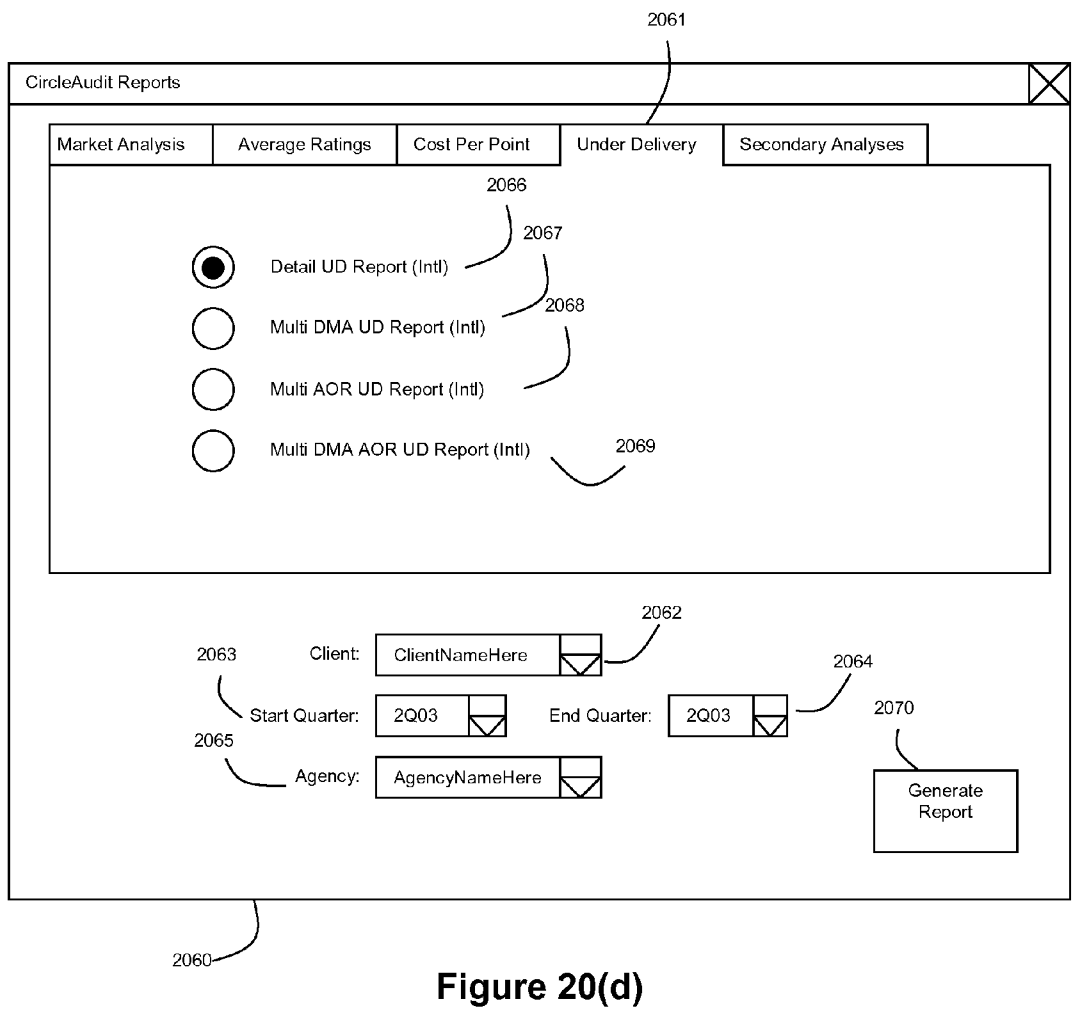
Figure 20E:
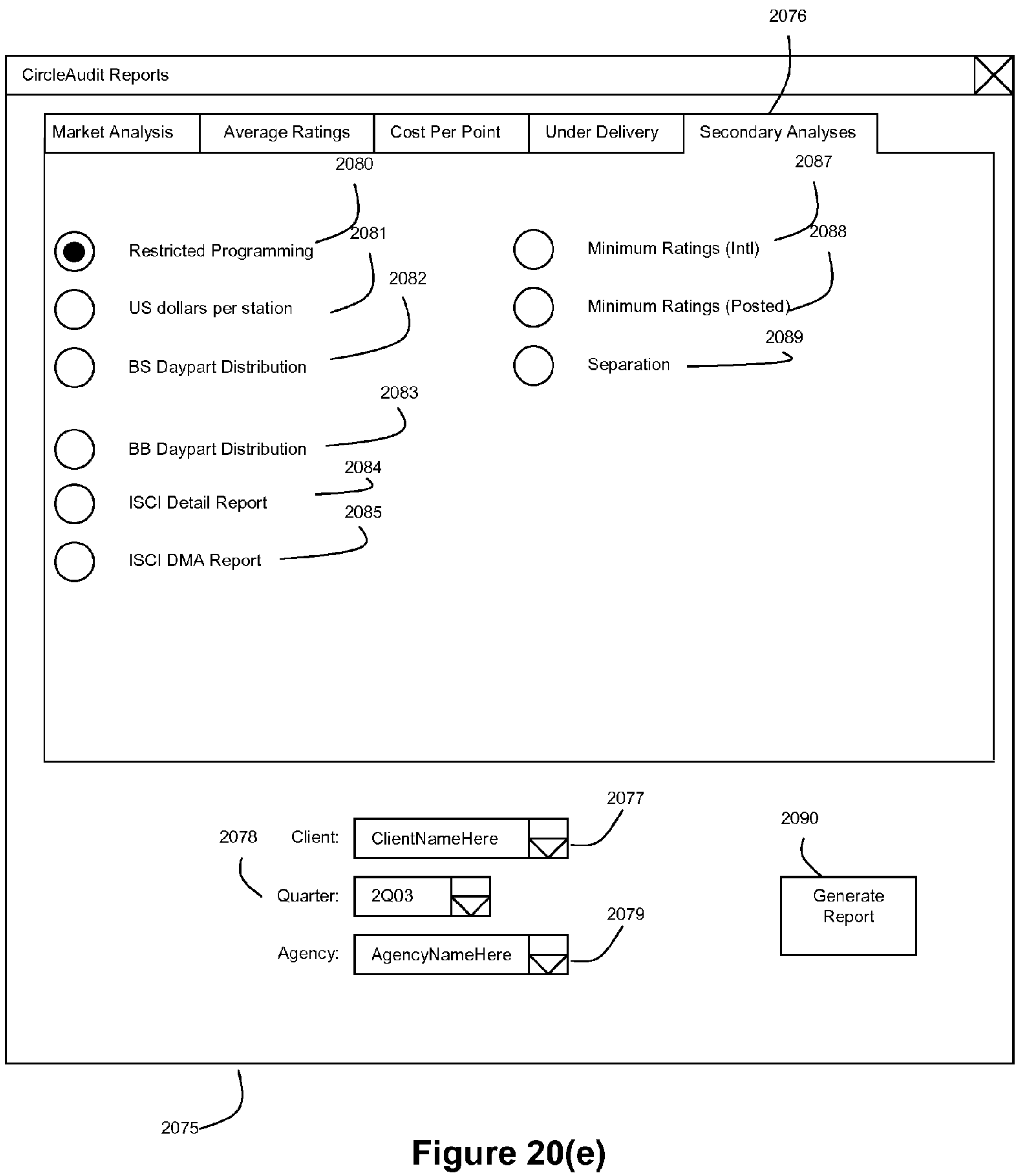

In some cases, an advertising agency, a client, or a media property disagrees with the independent TRP value assigned to a particular actual advertisement. Typically, the TRP provided by the independent source represents a measure based at least in part on a ¼ TRP achieved by a program for a certain time period. Such ¼ hour TRPs may not take into account the special circumstances of a particular airing of the program. For example, if the program during which an actual advertisement ran was a baseball game for a team based in the applicable DMA, the ¼ hour TRP measure for that team's games may be much lower than a TRP achieved when a game with the team's archrival is aired. In such circumstances, the agency/client/media property may request that the independent TRP amount for the program be overridden with a different measure. To achieve this functionality, the preferred embodiment of the parent invention includes the interface 1900 of FIG. 19.

Through interface 1900, the auditor preferably can specify the applicable client, agency, DMA, target demographic, time duration, and media property in fields 1902, 1904, 1906, 1908, 1910, and 1912 respectively. In field 1914, the auditor can pull up the name of the program applicable to the inquiry (i.e., the name of the program during which the actual advertisement ran). Once the applicable program is identified, its estimated TRP value from the final buy data is preferably displayed in field 1918 and its "actual" TRP value from the independent source is preferably displayed in field 1920. Through field 1922, the auditor can provide an adjustment of the "actual" TRP value. Further, the auditor can provide the reason(s) for the adjustment in the "comments" field 1924. Further still, if the auditor would like to remove an adjustment made to the "actual" TRP value for an advertisement posting, he/she can do so using the "delete adjustment" button 1916.

Database 1414, together with the database(s) into which the plan data and the original buy data were stored, form the audit database 1104. Database 1104 can be implemented as a single database or can be implemented as several distributed databases according to the preference of a practitioner of the invention.

The database 1104 serves as a valuable repository for analyzing the performance of advertising agencies when executing the advertising plans of their clients. From the content of database 1104, audit reports detailing the agency performances from a variety of analytical perspectives can be generated. For example, the reports can identify the performance of multiple agencies for a single client (for those clients having multiple advertising agencies working on their behalf). Further, the reports can audit agency performance by DMA for advertising plans that stretch into more than one DMA. The audit reports can be particularized down to virtually any field in the content of database 1104.

Creating Audit Reports:

Step 1416 relates to the processing logic configured to generate such audit reports. The creation of the logic for generating audit reports from the database contents will be apparent to a programmer with ordinary skill in the art who follows the teachings herein with respect to the database and audit reports. The generation of audit reports is preferably initiated by the auditor through user interfaces as shown in FIGS. 20(*a*)-(*e*). However, it should be noted that the system can also be designed to generate each of the reports automatically, with the automatically generated reports being stored for subsequent retrieval. Also, the report generating logic can be implemented on either the computer 1102, a client computer that has access to the computer 1102, or some other computing device in communication with computer 1102.

FIG. 20(*a*) illustrates a preferred user interface 2000 for generating market analysis audit reports. Through selection of the "market analysis" tab 2002, the auditor is presented with fields 2012, 2014, and 2016 in which he/she is to specify the client, time period (preferably quarter, although other time durations may be used), and advertising agency for the audit. Further, the interface 2000 may preferably include field(s) (not shown) for specifying the applicable DMA and/or demographic group for the report. Preferably, each field can be populated through drop down menus that are preloaded with the clients, time durations, and agencies already present in the database. Further, as any fields are filled, it is preferred that the range of choices in the drop down menus be further limited based on the previous selection(s). For example, if Client A is selected in field 2012, then it is preferred that the drop down menu for the agency field 2016 be limited to agencies already associated with Client A in the database. Further still, it is preferred that if the auditor selects a report for which certain conditional qualifiers are not needed (e.g. with the Multi AOR DMA Delivery reports corresponding to options 2008 and 2010, the auditor need not specify an agency in field 2016), then the conditional fields of interface 2000 be restricted accordingly.

Further, the auditor can specify the type of market analysis audit report that is to be generated, with checkbox 2004 corresponding to a "Market Analysis (Intl)" report, checkbox 2006 corresponding to a "Market Analysis (DMA Delivery Recap) (Intl)" report, checkbox 2008 corresponding to a "Market Analysis (Multi AOR DMA Delivery—pcnt) (Intl)" report, and checkbox 2010 corresponding to a "Market Analysis (Multi AOR DMA Delivery—TRP (Intl)" report. Selection of the "generate report" button 2018 by the auditor causes the selected market analysis report for the selected client/quarter/agency to be generated.

FIG. 21(*a*) illustrates an exemplary market analysis report 2100 that corresponds to box 2004 of FIG. 20(*a*). The report identifies the client, advertising agency, DMA, target demographic, and time duration in fields 2102, 2104, 2106, 2108, and 2110 respectively to which the report is pertinent. This data corresponds to the selections made by the auditor through the user interface 2000.

The report preferably includes a daypart analysis for the advertising plan and plan execution that indicates whether the advertising agency satisfied the exposure goals for the plan. Each row 2112*a* through 2112*o* corresponds to a different daypart. Column 2114 includes the TRP values for each daypart from the plan data stored in the database, as described above in connection with FIG. 12. Column 2116 includes the TRP values for each daypart from the original buy data stored in the database, as also described above in connection with FIG. 12. Further, column 2118 includes the TRP values for each daypart from the final buy data. These TRP values are taken from entries in the received final buy files for the specified conditions 2102-2110, as converted and recoded by step 1402 of FIG. 14. As previously noted, the TRP values of column 2118 correspond to the agency's estimations of the amount of exposure expected for an advertisement. Further still, column 2120 includes the posted TRP values for each daypart obtained from an independent source including TRP value overrides (if any) provided by the auditor. The TRP values of column 2120 correspond to the actual TRP values assigned to the actual advertisements by an independent source.

With this base of TRP data, the report preferably also displays a plurality of indicators that identify how the agency's performance in executing the plan compares with the plan. Further, the report preferably displays an indicator of how closely the posted buy data matches with the final buy data.

Column 2122 preferably displays, for each daypart, an index comparing the amount of TRPs in the original buy with the amount of TRPs in the plan. This index is preferably displayed as a percentage and can be computed as 100 times the number of TRPs for that daypart in the original buy divided by the number of TRPs for that daypart in the plan.

Column 2124 preferably displays, for each daypart, an index comparing the amount of TRPs in the final buy with the amount of TRPs in the plan. This index is preferably displayed as a percentage and can be computed as 100 times the number of TRPs for that daypart in the final buy divided by the number of TRPs for that daypart in the plan.

Column 2126 preferably displays, for each daypart, an index comparing the amount of TRPs in the posted buy (the actual buy plus the third party exposure data, as possibly adjusted through an override) with the amount of TRPs in the plan. This index is preferably displayed as a percentage and can be computed as 100 times the number of TRPs for that daypart in the posted buy divided by the number of TRPs for that daypart in the plan.

Lastly, column 2128 preferably displays, for each daypart, an index comparing the amount of TRPs in the posted buy with the amount of TRPs in the final buy. This index is preferably displayed as a percentage and can be computed as 100 times the number of TRPs for that daypart in the posted buy divided by the number of TRPs for that daypart in the final buy.

Row 2130 preferably includes the sum for each daypart TRP value of columns 2114, 2116, 2118, and 2120. Further, the total index values for columns 2122, 2124, 2126, and 2128 are preferably calculated from these summed values.

The audit report 2100 further preferably includes a stewardship analysis section 2132 that breaks down the financial data for the various buys by media property in the applicable DMA. Each row 2134*a* through 2134*f* corresponds to a different media property (identified by columns 2136 (call letters) and 2138 (network affiliation)) in the applicable DMA. The media property-specific original buy data in column 2142, affidavit data in column 2146, and remittance data in column 2150 is readily available in the database as described above in connection with FIG. 13. The media property-specific final buy data and posted data is readily available in the database as described above in connection with FIG. 14.

Further, it is preferred that the stewardship analysis section be displayed in terms of dollars. The dollar value for the total plan cost is available in the database as taught in connection with FIG. 12 (see field 1234 of FIG. 12). The dollar values for the original buys in column 2142, for the affidavit amounts in column 2146, and for the remitted amounts in column 2150 are available in the database as taught in connection with FIG. 13. The dollar values for the final buy column 2144 and posted buy column 2146 are preferably computed using the cumulative cost values in the final buy data and the posted buy data under the applicable client/agency/media property/DMA/time duration/demographic conditions.

Further, row 2154 preferably displays a percentage relating the total values for the original buy cost, the final buy cost, the affidavit cost, and the posted buy cost to the plan cost. Thereafter, row 2156 preferably displays the cost per TRP for each of the plan cost, the original buy cost, the final buy cost, and the posted buy cost. This value is preferably computed as 100 times the total cost in row 2154 divided by the total TRPs in row 2132 for the applicable category. Further still, it is preferred that row 2158 display a percentage that relates the cost per TRP for the original buy, the final buy, the posted buy to the cost per TRP for the plan. This value is computed as 100 times the appropriate cost per TRP in columns 2142, 2144, and 2148 divided by the planned cost per TRP.

FIG. 21(*b*) illustrates an exemplary market analysis report 2160 that corresponds to box 2006 of FIG. 20(*a*). The report identifies the client, advertising agency, target demographic, and time duration in fields 2164, 2166, 2168, and 2170 respectively to which the report is pertinent. This data corresponds to the selections made by the auditor through the user interface 2000. Report 2160 details the agency's performance per DMA. Each row 2162 corresponds to a DMA associated with the plan data for the specified conditions. Columns 2172, 2174, 2176, and 2178 identify the total number of TRPs for that row's DMA, respectively, in the plan, the original buy, the final buy, and the posted buy. These total values can be obtained as described above in connection with row 2130 of FIG. 21(*a*).

Column 2180 preferably displays, for each DMA, an index comparing the amount of TRPs in the original buy with the amount of TRPs in the plan. This index is preferably displayed as a percentage and can be computed as 100 times the number of TRPs for that DMA in the original buy divided by the number of TRPs for that DMA in the plan.

Column 2182 preferably displays, for each DMA, an index comparing the amount of TRPs in the final buy with the amount of TRPs in the plan. This index is preferably displayed as a percentage and can be computed as 100 times the number of TRPs for that DMA in the final buy divided by the number of TRPs for that DMA in the plan.

Column 2184 preferably displays, for each DMA, an index comparing the amount of TRPs in the posted buy with the amount of TRPs in the plan. This index is preferably displayed as a percentage and can be computed as 100 times the number of TRPs for that DMA in the posted buy divided by the number of TRPs for that DMA in the plan.

Lastly, column 2186 preferably displays, for each DMA, an index comparing the amount of TRPs in the posted buy with the amount of TRPs in the final buy. This index is preferably displayed as a percentage and can be computed as 100 times the number of TRPs for that DMA in the posted buy divided by the number of TRPs for that DMA in the final buy.

FIG. 21(*c*) illustrates an exemplary market analysis report 2190 that corresponds to box 2008 of FIG. 20(*a*). This report identifies various performance indices in percentage terms for multiple advertising agencies on behalf of a single client in multiple DMAs. The client for which the report 2190 was specified via field 2012 in FIG. 20(*a*) is identified in field 2191. The demographic group to which the report is applicable is preferably identified in field 2192. The time period for which the report was specified via field 2014 of FIG. 20(*a*) is identified in field 2193. Each row of the report identifies index data for a different DMA/agency pair. The DMA is identified in column 2194 and the advertising agency is identified in column 2195. Columns 2196, 2197, and 2198 identify, for the DMA/agency pairs of columns 2194 and 2195, the percentage measure, relative to the planned number of TRPs, of the original buy TRPs, final buy TRPs, and posted buy TRPs, respectively. Column 2199 identifies the percentage measure of the TRPs in the posted buy versus the TRPs in the final buy for the DMA/agency pairs of columns 2194 and 2195. The data in these columns can be calculated as discussed in connection with the like columns in the report of FIG. 21(*a*).

FIG. 21(*d*) illustrates an exemplary market analysis report 2101 that corresponds to box 2010 of FIG. 20(*a*). This report identifies various performance indices in total TRP terms for multiple advertising agencies on behalf of a single client in multiple DMAs. The client for which the report 2101 was specified via field 2012 in FIG. 20(*a*) is identified in field 2103. The demographic group to which the report is applicable is preferably identified in field 2105. The time period for which the report was specified via field 2014 of FIG. 20(*a*) is identified in field 2107. Each row of the report identifies total TRP data for a different DMA/agency pair. The DMA is identified in column 2109 and the advertising agency is identified in column 2111. Columns 2113, 2115, 2117, and 2119 identify the total TRPs in the plan, original buy, final buy, and posted buy, respectively, for the DMA/agency pairs of columns 2109 and 2111.

FIG. 20(*b*) illustrates a preferred user interface 2020 for generating average ratings audit reports. Through selection of folder tab 2022, the auditor can control the creation of average ratings audit reports. Control conditions for the audit report are set through fields 2026 (for client), and 2028 (for time duration). Preferably, field 2030 (for advertising agency) is left unused because the report produced from interface 2020 is preferably agency independent. As with interface 2000 of FIG. 20(*a*), interface 2020 may also include field(s) (not shown) for specifying a DMA and/or a demographic group to which the report will be applicable. Checkbox 2024 corresponds to a selection of a "Daypart Average Ratings Analysis" audit report. The user can create such an audit report by selecting the "generate report" button 2032.

FIG. 22 illustrates an exemplary "Daypart Average Ratings Analysis" audit report 2200. The report preferably identifies the parameters for client, DMA, demographic, and time duration in fields 2202, 2204, 2206, and 2208, respectively. Table 2210 includes TRP data broken down by daypart (column 2218*a* through column 2218*h*) for the final buy TRP estimates, the posted TRP values received from a first independent source, and TRP values received from a second independent source. The second independent source TRP data is preferably NSI average rating data, which is well-known in the art. Each entry in row 2212 corresponds to an average estimated TRP value for the final buy entries per daypart. Each entry in row 2214 corresponds to the average posted ratings from the independent source for the actual advertisements in the posted buy data per daypart. Each entry in row 2216 corresponds to the NSI average rating value per daypart. From this data, the indexes of rows 2220 and 2222 are computed. Row 2220 displays, per daypart, a percentage relating the final ratings estimates of row 2212 to the NSI average ratings of column 2216 (for each daypart, 100 times the final ratings estimate divided by the NSI average rating). Row 2222 displays, per daypart, a percentage relating the posted ratings of row 2214 to the NSI average ratings of column 2216 (for each daypart, 100 times the posted ratings estimate divided by the NSI average rating). This audit report provides an accuracy measure for the agency's exposure estimates and further provides an accuracy measure for the independent exposure data used to analyze the posted buy data.

FIG. 20(*c*) illustrates a preferred user interface 2040 for generating audit reports detailing the cost per TRP. Through selection of folder tab 2042, the auditor can control the creation of these audit reports. Control conditions for the audit report are set through fields 2044 (for client), 2046 (for time duration), field 2048 (for advertising agency), and field 2050 (for average/low/high (ALH) cost per TRP levels within the SQAD data). Also, it should be noted that the interface 2040 may also include field(s) (not shown) for specifying a DMA and/or demographic group to which the report will be applicable. Checkbox 2052 corresponds to a selection of a "Daypart CPP Analysis" audit report, wherein CPP stands for cost per point (or cost per TRP). Checkbox 2054 corresponds to a selection of a "Daypart CPP Analysis (DMA Recap)" audit report. Checkbox 2056 corresponds to a selection of a "Daypart CPP Analysis (Multi AOR DMA Recap)" audit report. Lastly, checkbox 2058 corresponds to a selection of a "Daypart CPP Analysis International" audit report. The user can create the selected ones of these audit reports by selecting the "generate report" button 2059.

FIG. 23(*a*) illustrates an exemplary "Daypart CPP Analysis" audit report 2300. The control conditions for the report are displayed in field 2302 (which identifies the client), in field 2304 (which identifies the applicable DMA), in field 2306 (which identifies the applicable demographic), in field 2308 (which identifies the applicable time duration), and in field 2310 (which identifies the agency being audited). Further, field 2312 identifies the length of the actual advertisements that are the subject of the report, and field 2314 identifies the factor for the length, wherein the factor is a weighting scalar for the length that relates the length of an advertisement to its cost. Typically, a 15 second advertisement will have a factor of 0.7 for a 30 second length advertisement, and a 10 second advertisement will have a factor of 0.5 for a 30 second length advertisement. If the report 2300 is to include this length and factor data, it is preferred that interface 2040 of FIG. 20(*c*) include fields (not shown) through which the auditor can specify the length and factor.

Table 2315 includes rows corresponding to a cost for a TRP per daypart. Rows 2316 and 2318 correspond to the cost for a TRP in the final buy data per daypart and the cost for a TRP in the posted buy data per daypart, respectively, under the applicable client/agency/DMA conditions. The costs for a TRP in the final buy per daypart are computed by dividing the cumulative final buy costs for all of the final buy spots in a particular daypart by the cumulative TRPs for all of the final buy spots in that particular daypart. The costs for a TRP in the posted buy per daypart are computed by dividing the cumulative posted buy costs for all of the actual advertisements in a particular daypart by the cumulative TRPs for all of the actual advertisements in that particular daypart.

Row 2320 identifies the SQAD cost for a TRP per daypart. This SQAD data is known in the art and represents a commercially accepted average industry cost for a TRP point under the stated conditions of daypart, DMA, demographic, length, factor, and time duration. The entries in row 2324 provide an index relating the final buy cost per TRP for each daypart to the corresponding SQAD value. Lastly, the entries in row 2326 provide an index relating the posted buy cost per TRP for each daypart to the corresponding SQAD value. Thus, FIG. 23(*a*) provides an indication of whether the advertising agency has purchased media in an efficient manner relative to a relevant industry benchmark (such as SQAD).

The "Daypart CPP Analysis International" audit report (not shown) that corresponds to box 2058 of FIG. 20(*c*) is an international version of audit report 2300 of FIG. 23(*a*), albeit with some country-specific language changes. For example, if the Daypart CPP Analysis International report is for Canadian markets, the term TRP would be expressed as TVR, the term DMA would be expressed as EMA, and the term CPP would be expressed as CPR. Other than these nomenclature changes, the content of the report and its mode of generation remains the same.

FIG. 23(*b*) illustrates an exemplary "Daypart CPP Analysis (DMA Recap)" audit report 2330. Fields 2332 through 2342 correspond to the like fields in FIG. 23(*a*). Each row 2344*a* and 2344*b* corresponds to a different DMA that is the subject of the report. Column 2346 provides an index to the average/low/high SQAD value for each DMA, as specified in the ALH field 2050 of FIG. 20(*c*). Columns 2348*a* through 2348*h* provide percentages for each DMA by daypart that are indicative of the cost for one posted buy TRP versus the SQAD value for such a TRP. The values in rows 2344*a* and 2344*b* are computed in the same manner as those values in row 2326 of FIG. 23(*a*) for the applicable DMAs. The values in row 2350 are computed as the average of the percentages for each DMA in columns 2348*a* through 2348*h*, wherein inactive dayparts (dayparts for which no spots were purchased or ran) are not factored into the average.

FIG. 23(*c*) illustrates an exemplary "Multi AOR DMA Recap" audit report 2360 corresponding to box 2056 of FIG. 20(*c*). This audit report 2360 preferably displays the same content as that of audit report 2330 of FIG. 23(*b*), albeit for a plurality of different agencies 2362*a*, 2362*b*, . . . employed by the client.

FIG. 20(*d*) illustrates a preferred user interface 2060 for generating audit reports detailing under delivery (UD). Through selection of folder tab 2061, the auditor can control the creation of these audit reports. Control conditions for the audit report are set through fields 2062 (for client), 2063 (for start time), field 2064 (for end time), and field 2065 (for advertising agency). It should be noted that interface 2060 may also include field(s) (not shown) for specifying a demographic group and/or DMA applicable to the report. Because UD reports are most useful when they track multiple quarters (so the restitution owed for UD from a prior quarter can be tracked), it is preferred that multiple quarters be specified in the start and end time fields. However, if a single quarter's UD report is desired, a user can generate such a report by specifying the same time as the start time and the end time. Checkbox 2066 corresponds to a selection of a "Detailed UD Report (Intl)" audit report. Checkbox 2067 corresponds to a selection of a "Multi DMA UD Report" audit report. Checkbox 2068 corresponds to a selection of a "Multi AOR UD Report" audit report. Lastly, checkbox 2069 corresponds to a selection of a "Multi DMA AOR UD Report" audit report. The user can create the selected ones of these audit reports by selecting the "generate report" button 2070.

FIG. 24(*a*) illustrates an exemplary "Detailed UD Report" audit report 2400 corresponding to box 2066 of FIG. 20(*d*). An under delivery (UD) situation occurs when a media property fails to deliver in a given time period (preferably a quarter), through TRPs in the posted buy, at least a minimum threshold of the TRPs requested in the final buy. This minimum threshold is preferably 90%. The applicable control conditions for report 2400 are specified in fields 2402, 2404, 2406, and 2408, which identify client, demographic group, time duration, and advertising agency, respectively. Field 2410 identifies the date on which report 2400 was generated. Field 2412 identifies the DMA for which the report is pertinent. Row 2430 identifies the summed UD data for the media properties in DMA 2412. Each row 2414*a*, 2414*b*, . . . corresponds to a different media property within DMA 2412. Column 2416 identifies the total number of estimated TRPs for a media property in the final buy data. Column 2418 identifies the total number of posted TRPs for a media property in the posted buy data. Column 2420 is an index measure that identifies the posted-to-final percentage (100 times the column 2418 value divided by the column 2416 value). Column 2422 identifies the number of TRPs owed by a station, as determined per quarter, for under delivery. This value may be calculated on a media property specific basis for each quarter as: TRPs owed (by a media property) equals 0.9 multiplied by the number of TRPs in the final buy with that media property minus the number of TRPs in the posted buy with that media property. Thus, for a multi-quarter report such as report 2400, the TRPs owed by each media property would be the sum of TRPs owed for each quarter (quarters 1Q04 through 4Q04 in the example of FIG. 24(*a*)).

Column 2424 identifies the number of restitution TRPs that were posted for the applicable media property during the specified time period 2406 to make good on previously-owed UD TRPs. It is preferred that actual advertisements that ran as UD restitution be flagged accordingly in the actual buy data, thereby rendering their detection in the database much easier. Column 2426 identifies a revised index that takes into consideration the restitution TRPs of column 2424 (revised index=100*(column 2424 value+column 2418 value)/column 2416 value). Column 2428 identifies the balance of UD TRPs, which is preferably calculated, per quarter, as the difference between TRPs owed and restitution TRPs. Thus, for a multi-quarter report such as report 2400, the balances reflected in column 2428 reflects the sum of these quarterly differences between the TRPs owed and restitution TRPs.

Lastly, table 2432 identifies the UD data in monetary terms for all media properties in the DMA 2412. The monetary amount for value owed 2434 can be computed as the sum of TRPs owed (column 2422, row 2430) multiplied by the agency-purchased cost per TRP ascertained from the posted buy data. Value received 2436 can be computed as the sum of restitution TRPs (column 2424, row 2430) multiplied by the agency-purchased cost per TRP. Balance 2438 can be computed as the sum of balances in column 2428 multiplied by the agency-purchased cost per TRP ascertained from the posted buy data.

FIG. 24(*b*) illustrates an exemplary "Multi DMA UD Report" audit report 2440 corresponding to box 2067 of FIG. 20(*d*). This report provides UD data for multiple DMAs 2442*a*, 2442*b*, . . . under control conditions 2444. Column 2446 identifies the gross dollar amount spent in the posted buy data for the DMA. Columns 2448, 2450, 2452, 2454, 2456, and 2458 correspond to columns 2416, 2418, 2420, 2422, 2424, and 2426 respectively of FIG. 24(*a*), but for an entire DMA (row 2430 of FIG. 24(*a*)).

FIG. 24(*c*) illustrates an exemplary "Multi AOR UD Report" audit report 2460 corresponding to box 2068 of FIG. 20(*d*). This report provides UD data for multiple agencies. The control conditions for the report are identified in field 2462 (client-specific and time duration-specific). Each row 2464*a*, 2464*b*, . . . corresponds to a different agency employed by the client. The data in the columns corresponds to the number of DMAs in which the agency placed buys, the posted delivery index, TRPs owed, restitution TRPs owed, value owed, value received, and balance for each agency. These values may be computed as would be understood by a person of ordinary skill in the art in view of FIGS. 24(*a*) and (*b*) and the descriptions thereof.

FIG. 24(*d*) illustrates an exemplary "Multi DMA/AOR UD Report" audit report 2480 corresponding to box 2069 of FIG. 20(*d*). This report displays the content of UD report 2440 of FIG. 24(*b*), but for multiple agencies 2482, 2482*b*, . . . .

FIG. 20(*e*) illustrates a preferred user interface 2075 for generating various miscellaneous audit reports. Through selection of folder tab 2076, the auditor can control the creation of these audit reports. Through fields 2077, 2078, and 2079, the auditor can specify, respectively, the client, quarter, and advertising agency on which the audit report will be based.

Checkbox 2080 corresponds to an audit report that identifies whether any of the advertisement postings in the posted buy data aired during a program for which the client has requested no advertising. In some circumstances, a client will communicate to an agency that it does not want its advertisements to run during certain programs. If the posted buy data indicates that an actual advertisement did in fact run during such a prohibited program, then the preferred embodiment of the parent invention preferably detects such an occurrence. Preferably, a user interface is provided to the auditor so that such program restrictions can be entered in the database with the other plan data. FIG. 25(*a*) depicts a preferred Restricted Programming Report 2500. Report 2500 details the restricted program(s) in column 2502 and the DMA therefor in column 2504, and further provides data about the unauthorized advertisement, this data preferably including its invoiced cost and TRPs achieved.

Checkbox 2081 corresponds to an audit report that identifies unspecified dollars spent with each media property in the final buy data and or the posted buy data. As shown in FIG. 25(*b*), this audit report 2510 provides advertisement spot level detail per media property of those spots invoiced by the media property that do not match any spots that were placed by the agency with that media property, as reflected in the final buy data.

Checkbox 2082 corresponds to an audit report that identifies bonus advertisements by daypart, that is actual advertisements for which no charge was made by the media property. As shown in FIG. 25(*c*), such a report 2520 preferably identifies, per DMA, the dayparts in which the bonus spots ran, the posted ratings for the bonus spots in the dayparts, and the number of bonus spots that ran in each daypart.

Checkbox 2083 corresponds to an audit report that identifies daypart audience delivery/TRPs, which helps clients understand when and where they are receiving billboards. As shown in FIG. 25(*d*), this audit report 2530 preferably identifies, per DMA, the dayparts in which the billboards ran, the posted ratings therefor, and the number of billboard spots per daypart. It is preferred that the daypart codes assigned to the actual advertisements include a code for billboards (such as "BB" code).

Checkbox 2084 corresponds to an audit report that identifies market analysis data for a user-specified ISCI code. As shown in FIG. 25(*e*), report 2540 preferably identifies, per DMA, how many spots ran for each ISCI code, and the percentage total that each ISCI code took up among all the spots that ran in that DMA.

Checkbox 2085 corresponds to an audit report that identifies DMA data for a user-specified ISCI code. As shown in FIG. 25(*f*), this report 2550 preferably provides the details of report 2540 of FIG. 25(*e*) on a DMA level rather than on a per media property level.

Checkbox 2087 corresponds to an audit report that identifies whether any of the TRP estimates for the advertisement requests in the final buy data fall below a minimum threshold value. Some clients will request that no advertisements be requested for a time slot expected to generate a TRP below a minimum threshold level. Preferably, if such a situation exists, the user interface for entering plan data includes a field for entering the minimum threshold value for the final buy data. As shown in FIG. 25(*g*), this report 2560 preferably identifies, per DMA, pertinent data about these spots. The violation cost preferably identifies the cost for the actual advertisement that should not have been purchased pursuant to the minimum ratings threshold. The daypart cost column identifies the total costs for the actual advertisements placed by the agency in a DMA for each daypart. The index corresponding thereto is a percentage measure of the violation cost to the daypart cost, which thereby indicates how much of a daypart's cost was taken up with advertising that should not have been purchased. The remaining columns of this audit report 2360 preferably display this data in TRP terms.

Checkbox 2088 corresponds to an audit report that identifies whether any of the TRPs posted for the actual advertisements in the posted buy data fall below a minimum threshold value. This audit report (not shown) is similar in type to that of FIG. 25(*g*), but uses the posted buy data for analysis. As mentioned above in connection with the final buy, some clients will request that no advertisements be aired during a time slot that will generate a TRP below a minimum threshold level. Preferably, if such a situation exists, the user interface for entering plan data includes a field for entering the minimum threshold value for the posted buy data.

Checkbox 2089 corresponds to an audit report that identifies whether an appropriate degree of spacing (separation) between advertisements for the plan was achieved. Some clients desire that there be some minimum level of spacing between the client's advertisements. The posted buy data includes air time data that allows a separation determination to be made. Preferably, if such a minimum separation rule exists, the user interface for entering plan data includes a field for entering the parameters of the separation rule. As shown in FIG. 25(*h*), this report 2570 preferably identifies a separation rule 2572, such as a rule that the time separation between successive actual advertisements in a DMA be 20 minutes. The remainder of the report 2570 preferably identifies, per DMA, the successive actual advertisements 2574 and 2576, pertinent details therefor (such as the run time), and the actual separation 2578 between the spots. The detail of report 2570 is preferably limited to successive spots that violate the rule.

It is also worth noting that the audit reports generated by the preferred embodiment may also include summary paragraphs that describe salient aspects of the audit. For example, the report may include descriptive paragraphs that communicate to the client the amount of UD restitution owed to them, or the report may include descriptive paragraphs that communicate to the client the posted buy-to-plan index of total TRP values, or the report may include descriptive paragraphs that communicate to the client how the agency's cost per TRP measured against industry averages. A sample preferred audit report for TV/radio is included herein as FIGS. 26-68 (see also Appendix A of the incorporated parent '466 patent application).

While the parent invention has been described above in relation to its preferred embodiment, various modifications may be made thereto that still fall within the invention's scope, as would be recognized by those of ordinary skill in the art. For example, the techniques of the preferred embodiment can also be applied to advertising in print media. Corollaries to the original buy and the final buy for TV/radio ads are the original insertion orders and the revised insertion orders for print ads. Print advertising plans typically specify cost, circulation, and positioning. Exposure data for print media is typically measured in terms of circulation, and a suitable third party source for such circulation data is the Audit Bureau of Circulation (ABC), as is known in the art. A sample preferred audit report for print media is included herein as FIGS. 69-278 (see also Appendix B of the incorporated parent '466 patent application). Such modifications to the invention will be recognizable upon review of the teachings herein. Accordingly, the full scope of the parent invention is to be defined solely by the appended claims and their legal equivalents.

Present U.S. patent application Ser. No. 11/253,040

Figure 1:
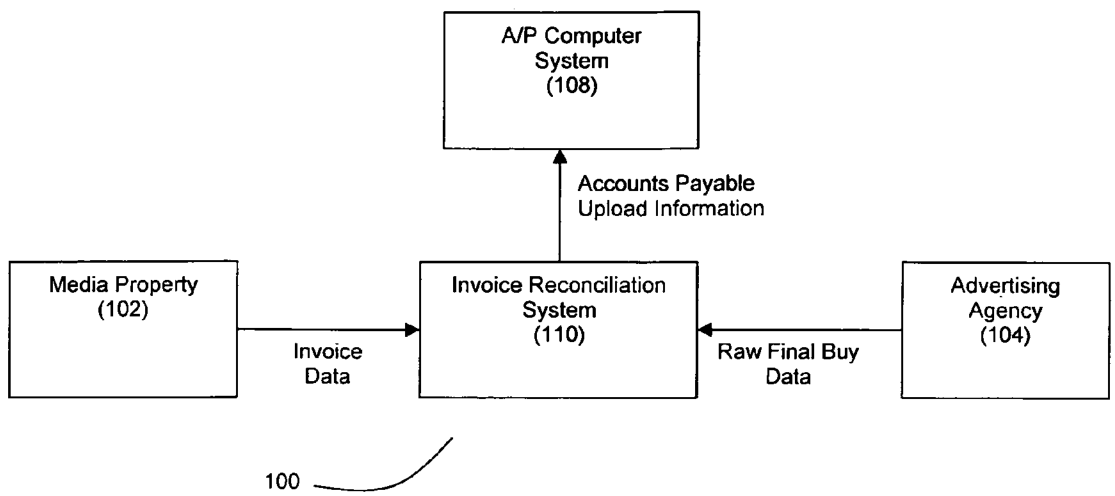
FIG. 1 depicts an overview of the preferred embodiment of the present invention.

FIG. 1 depicts an overview of the preferred embodiment of the present invention. The system 100 comprises at least one media property 102, at least one advertising agency 104, an accounts payable (NP) computer system 108, and an invoice reconciliation system 110.

A computer system operated by the media property 102 preferably sends invoice data to the invoice reconciliation system 110. This invoice data corresponds to an invoice for advertisement spots that were run by that media property 102 for an advertising agency 104 on behalf of its client. These invoices are typically sent 15-20 days after the end of the standard broadcast month. However, with the present invention, this need not be the case, as invoices can just as easily be sent on a weekly, daily, bimonthly or other basis. This invoice data is preferably communicated by the media property 102 to the invoice reconciliation system 110 electronically over a network such as the Internet. Preferred transmission techniques include e-mail, publication on an electronic bulletin board, and file uploads over a network, such as http uploading over the Internet. However, any known form of communication can be used to communicate the invoice data to the invoice reconciliation system 110, including leased data lines and paper copy mailings from the media property 102 to an operator of the invoice reconciliation system 110. However, the transmission of invoice data to the operator of the invoice reconciliation system 110 in the form of paper copies is not preferred (at least in connection with the practice of the preferred embodiment of the present invention) as it requires intervention by data entry personnel to get the invoice data into a database.

A computer system operated by the advertising agency 104 preferably sends raw final buy data to the invoice reconciliation system 110. This raw final buy data corresponds to final requests placed by the agency 104 on behalf of its client for advertisement spots to be run by a media property 102. This raw final buy data is preferably communicated by the media property 102 to the invoice reconciliation system 110 electronically over a network such as the Internet. However, any known form of communication can be used to communicate the raw final buy data to the invoice reconciliation system 110, including leased data lines and paper copy mailings from the advertising agency 102 to an operator of the invoice reconciliation system 110. However, the transmission of raw final buy data to the operator of the invoice reconciliation system 110 in the form of paper copies is not preferred as it requires intervention by data entry personnel to get the invoice data into a database. It is believed that through various negotiations between agencies, agency clients, and operator(s) of the invoice reconciliation system, advertising agencies can be persuaded to utilize electronic transmission of the raw final buy data to the invoice reconciliation system. Preferred transmission techniques include e-mail, publication on an electronic bulletin board, and file uploads over a network, such as http uploading over the Internet.

The agency 104 typically prebills the client for the original buy, with billing adjustments being issued to the client as changes occur with the original buy. As such, the resultant pre-billing to the client typically approximates final buy billing. Thus, before the agency has been invoiced for the ad spots requested in the final buy, the client has paid the agency 104 some amount of funds that are to be applied toward invoices from media properties. The agency 104 typically deposits this payment amount in an account, wherein appropriate amounts of the deposited funds are later transferred from the account to the appropriate media property after reconciling an invoice from that media property. This account is typically an interest bearing account with the advertising agency 104 as the account holder, and the agency 104 typically collects the interest that accrues to the funds placed in the account. As such, the longer time that it takes the agency to reconcile media property invoices, the more interest money that the agency takes in.

The inventors herein believe that media properties and advertisers (clients) are desirous of significantly reducing the account receivable time period because prompter payment on invoices will allow the media properties to take advantage of the "time value of money". Accordingly, the inventors herein further believe that strong market potential exists in the advertising industry for a system by which media property invoices can be more promptly reconciled. In turn, media properties can be expected to provide discounts to advertisers in exchange for prompt payment on invoices (e.g., a 2% discount for paying an invoice within 10 days). Toward this end, the invoice reconciliation system 110 is provided.

The primary task of the invoice reconciliation system is to reconcile invoices from media properties with final buys from advertising agencies to ensure that agencies (and their clients) are being properly billed for what they purchased. This reconciliation can be done in an automated fashion by computer software wherein matches between invoices and final buys (preferably on a per ad spot basis) are identified automatically. Invoice items that cannot be matched to a corresponding final buy item are preferably referred to an exception handling process within the invoice reconciliation system 110, wherein GUIs are preferably provided to seek human intervention to resolve invoice-to-final buy inconsistencies.

After reconciling the invoice data with the final buy data, the invoice reconciliation system 110 can preferably provide payment authorization instructions regarding reconciled invoices to the NP system 108 that enable the transfer of an amount of funds to the media property 102 that is consistent with invoiced items that were satisfactorily reconciled (via either the automatic matching process or the exception handling process) with the final buy items. These instructions are preferably provided directly to an automated financial system 108 that controls the account such that funds can be transferred electronically from the account to the media property 102.

Figure 2:
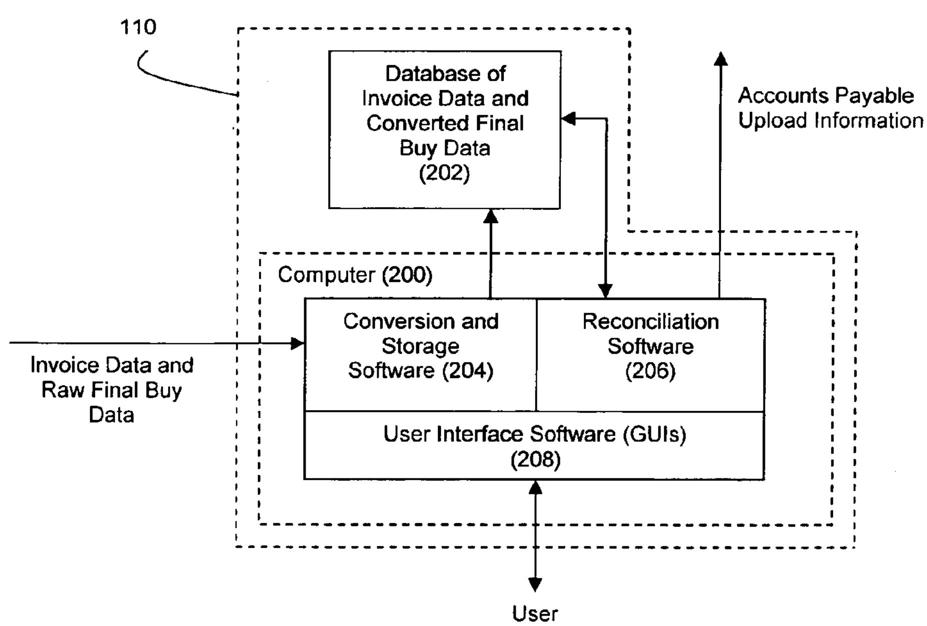
FIG. 2 depicts a preferred invoice reconciliation system.

FIG. 2 provides a block diagram overview of a preferred invoice reconciliation system 110, which preferably comprises a computer 200 and a database 202 in communication with the computer 200.

The computer 200 is preferably a commercially-available Dell Poweredge 2650 or a device of similar processing capabilities, and the database 202 is preferably a commercially-available Microsoft MS SQL 2000 or a newer version thereof. It should be understood that the computer 200 and database 202 can be implemented with other hardware, including an implementation as a personal computer, workstation, or server that can be accessed over a network such as the Internet. As will be explained in greater detail below, the database 202 serves as a repository for the data used in the invoice reconciliation process. The computer 200 preferably provides the programming logic, or code segments executable by a processor, for (1) converting the received raw final buy data into a common format for storage in the database 202 (conversion and storage software 204), (2) performing the invoice reconciliation, including the communication of payment instructions (reconciliation software 206), and (3) displaying and controlling a plurality of GUIs that are configured to interact with a user to manage the invoice reconciliation and payment process and, if necessary, provide data entry functionality (user interface software 208). This programming logic can reside on memory that is accessible to computer 200 or on a device such as a compact disc (CD) or the like to be accessed by computer 200 from a disk drive or the like.

Preferred tasks for the GUIs are to provide the user with the ability to perform exception handling tasks that arise during the invoice reconciliation process and to control the payment process. To operate the invoice reconciliation system, these GUIs can preferably be accessed by a user from a remote computer in communication with computer 200 over a network such as the Internet. However, this need not be the case. The users for system 110 can include employees of the client, advertising agency, or media property, or hired outside parties, as explained below in connection with FIGS. 8(*a*)-10(*b*). Conventional security techniques are preferably implemented on computer 200 to prevent users from gaining access to unauthorized data. For example, client users will preferably only be able to access their own final buy and invoice data, advertising agency users will preferably only be able to access final buy data and invoice data relating to advertising spots they have placed, and media property users will preferably only be able to access their own invoice data and the final buy data related to their invoices. Outside party users' access to data will be limited in accordance with the authority of the party (client, advertising agency or media property) that hired them.

Creating the Database of Converted Invoice and Final Buy Data:

One aspect of the preferred embodiment relates to storing invoice data and final buy data in the database 202. Preferably, the final buy data is stored in a common format to facilitate the reconciliation process of matching final buy items with invoice items. It is expected that the raw final buy data received from different advertising agencies will possess varying formats. In such cases, it is preferred that, prior to being stored in database 202, this raw final buy data be converted to a common format. However, as a less preferred alternative, the raw final buy data can be stored in the database 202 in its raw format, and the conversion can occur at the time of the matching process upon retrieval from the database. Another less preferred alternative is for the reconciliation logic to take on the burden of accounting for the different expected raw final buy data formats, with no final buy data conversion taking place. Further still, it is worth noting that the conversion step may be rendered unnecessary if the data formats for the media property's invoice data and advertising agency's raw final buy data are both the same or if the raw final buy formats for the different agencies are all the same. Such situations can conceivably exist if the media properties and advertising agencies use software on their respective computer systems that is configured to output the invoice data and final buy data in formats that allow for an apples to apples comparison without the need of a conversion step. However, at the current time, the inventors believe that it is highly likely that a conversion step will be needed to ensure a wide scope of potential use for the preferred embodiment of the present invention. The invoice data will preferably arrive in an XML format, from which the pertinent data can be readily extracted and stored in database 202 (step 308 of FIG. 3).

As mentioned above, the raw final buy data can be expected to arrive in a variety of different formats depending upon the platform used by each advertising agency. The conversion of raw final buy data to a common format preferably utilizes the techniques disclosed in pending U.S. patent application Ser. No. 10/810,466, filed Mar. 26, 2004 described above and entitled "Method and Apparatus for Auditing the Performance of Advertising Agencies on Behalf of Their Clients", the entire disclosure of which has been incorporated herein by reference. That pending application discloses, among other things, a technique whereby final buy data and actual buy data are converted to a common format to enable an auditing process.

Figure 3:
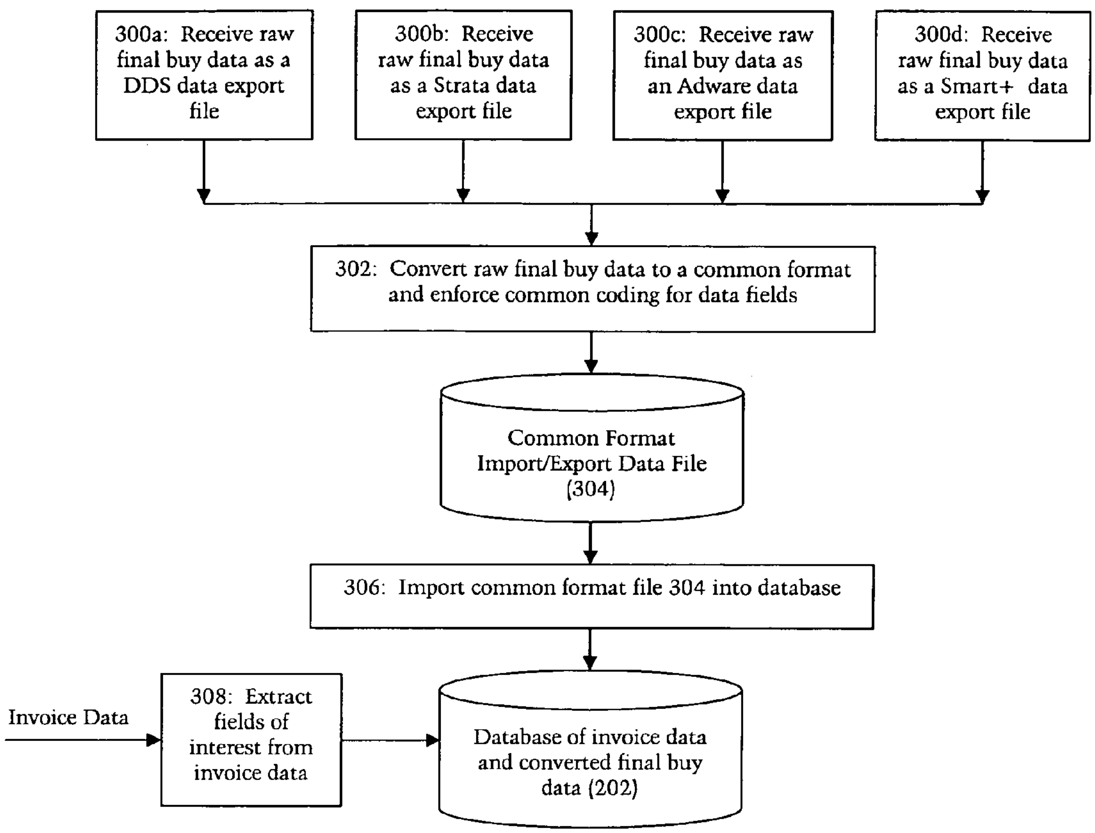
FIG. 3 is a flowchart overview for creating a database of commonly formatted invoice data and final buy data.

FIG. 3 is a flowchart overview for a preferred final buy data conversion process performed by computer 200. At step 300, the raw data relating agencies' final buys are received (preferably electronically). Each agency may store the final buy data in a different format depending upon the software packages used by the agencies. Examples of industry-used formats for the final buy data are the DDS format (300*a*) for media buy software from Donovan Data Systems, Inc., the Strata format (300*b*) for media buy software from Strata Marketing, Inc., the Adware (300*c*) format for software from AdWare Systems, Inc., and the SmartPlus format (300*d*) for software from the company Marketing Resources Plus. It should be noted that other data formats may also be used in the practice of the invention.

FIG. 4 illustrates a sample format for a raw final buy data file that would be received electronically from an advertising agency in the preferred embodiment of the present invention. The final buy data can be provided as a flat file, as a relational database structure, or other known forms for maintaining data. In the example of FIG. 4, the final buy data is presented as a flat file through table 400, with each table row corresponding to a different final buy item for an advertisement spot that was requested by the agency and each column including pertinent data for that advertisement spot.

With reference to FIG. 4, data in column 402 identifies the media in which the advertisement spot is to run. The data in column 404 identifies the client. The data in column 406 provides an identifier for the product/service that corresponds to the advertisement. The data in column 408 provides an identifier code for the estimate corresponding to the advertisement spot, and the data in column 410 provides the name of the estimate corresponding to the advertisement spot.

Further, the data in column 412 identifies the beginning and end dates for the final buy request (expressed by week). The data in column 414 identifies the DMA in which the final buy was requested, the data in column 416 identifies the media property with which the final buy request was placed, and the data in column 418 identifies a buy line code for the media property. The buy line code serves as a reference to the advertising agency buy line, as is known in the art.

Further still, the data in column 420 identifies the program during which the advertisement spot is to run, the data in column 422 identifies the daypart code for the time during which the advertisement spot is to air, the data in column 424 specifies the length (in seconds) for the advertisement spot, the data in column 426 specifies the scheduling rotation by day for the program, and the data in column 428 identifies the air time for the program. Moreover, the data in column 430 identifies the cost for the advertisement spot, and the data in column 432 identifies an estimation by the agency of the amount of exposure for the advertisement spot (in terms of a total number of TRPs that the agency thinks the advertisement spot will achieve if it runs during a commercial break for the program). Columns 434, 436, and 438 each correspond to a particular week during the time period identified in column 412. The data in each of these columns identifies the number of advertisement spots requested for that program during the specified week. Lastly, the data in column 440 includes any comments that an agency may wish to include for the advertisement spot. For example, the agency may want to note as a comment that the spot was aired to make good on an earlier missed spot, that a spot's tardy airing was due to a sports program running long, or that a spot's airing was pre-empted by news war coverage.

It should be noted that the final buy data format of FIG. 4 is exemplary only. Different advertising agencies will often use different formats. As a result of this diversity, the final buy data received by a practitioner of the present invention is expected to have a wide variety of formatting differences. For example, two agencies may use the same fields for their data, but provide those fields in a different sequential order. Also, some of the fields used by one agency may not be used by another agency (e.g., one agency provides a field for "line" data (column 418 in FIG. 4, while another agency does not). Also, two or more agencies may use different formats for the data that populates the fields (e.g., Agency A codes dates numerically as mm/dd/yy (Dec. 31, 2003) while Agency B codes dates alphanumerically as month name, month date, year (Dec. 31, 2003); Agency A codes dayparts with a two letter code, Agency B codes dayparts with a three letter code, and Agency C codes dayparts with a four letter code). Further still, when the final buy data is provided as electronic files, some agencies may provide the final buy data in a relational database format, while others may supply the data in a flat file format, while yet others may supply the data in other known electronic data structures.

Moreover, any fields that are not needed to perform invoice reconciliation, may optionally be omitted from the final buy data transmitted from the agency 104, from the raw final buy data that is converted to the common format, or from the converted final buy data that is stored in database 202.

FIG. 5 illustrates a sample format for an invoice data file that would be received electronically from a media property in the preferred embodiment of the present invention. As with the final buy data, the invoice data can be provided as a flat file, as a relational database structure, or other known forms for maintaining data. In the example of FIG. 5, the invoice data is presented as a flat file through table 500, with each table row corresponding to a different invoice item for an advertisement spot that was run by a media property (an actual advertisement) and each column including pertinent data for that actual advertisement.

The data in column 502 identifies the client for whom the actual advertisement ran, and the data in column 504 identifies the advertising agency who placed that advertisement on the client's behalf. Columns 506 and 508 identify, respectively, the name of the estimate corresponding to the advertisement spot, and a code for the estimate corresponding to the advertisement spot. These fields effectively correspond to columns 410 and 408 of FIG. 4. Column 510 identifies an invoice number that is applicable to an actual advertisement. Columns 514, 516, and 518 identify, respectively, the date on which the actual advertisement ran, the time at which the actual advertisement ran (typically identified by the hour and minute that the actual advertisement began), and length for the actual advertisement. Column 520 identifies the gross cost for the actual advertisement and column 522 identifies the ad-ID or ISCI creative code for the actual advertisement, which is preferably defined by industry standards as known in the art.

It should be noted that, as with the final buy data, the invoice data format of FIG. 5 is exemplary only. It can be expected that most media properties electronic invoices will be in an XML format, in which the invoice data is tagged to facilitate the extraction of pertinent data therefrom (step 308). Also, in the event of disparities in the field formatting within invoice files from different media properties, the invoice data can also go through the conversion process of steps 300-306 of FIG. 3. Such conversion can be implemented in response to user interaction with a GUI-based export tool through which media properties submit their invoice data to the invoice reconciliation system 110. Using ordinary skill in the art, software to perform this extraction and/or format conversion can be readily created.

Because of the diversity in the received raw final buy data, the present invention preferably converts this received final buy data to a common format to greatly simplify the processing logic used to reconcile invoiced advertisements with advertisements requested in the final buy. Accordingly, the programming logic for performing the invoice reconciliation need not account for each individual raw final buy data file format, thereby enhancing the modularity of the reconciliation logic to provide for increased flexibility in the event the reconciliation logic is to be altered, or in the event that a new format for raw data is received.

A practitioner of the present invention can select the common format for the conversion step 302 of FIG. 3 as a design choice based on a personal evaluation of the facts and circumstances relating to the system. Preferably, the common format that is chosen is the XML format used by the media properties for the invoice data described in connection with FIG. 5. However, other common formats can be used. For example, the common format can also be one of the existing "raw" final buy data formats (such as Strata or DDS). However, as facts and circumstances may dictate, some practitioners of the present invention may find it more agreeable to develop their own common format. Further, the data structures for the common format may also be selected to be structures for a relational database to facilitate storage using well-known database language techniques, or it can be a flat file format for practitioners of the present invention who are less comfortable with relational databases. In the event that the common format is a format that is different than the invoice data format, then it is preferred that the conversion process described for the final buy data also be performed on the invoice data.

Once the practitioner of the present invention identifies the raw final buy data formats and common data format involved in the conversion process, a mapping table for mapping raw data values for each of the fields in the raw final buy data file records in the various exemplary file formats 300*a* through 300*d* into the common format can be generated using ordinary skill in the art. This mapping table can then be used in performing the conversion step 302.

The output of the conversion step 302 will be an import/export file 304 for the converted final buy data. The data in this file 304 will be in the common format. Thereafter, at step 306, this common format file 304 is imported into a database to create a database 202 of invoice data and converted final buy data. Preferably, the final buy data items are stored in the database 202 such that they are associated with appropriate identifiers for the advertising agencies that placed the final buys. Further still, the invoice items are preferably stored in the database 202 such that they are associated with appropriate identifiers for the media properties that ran the advertising spots. Database 202 can be implemented as a single database or can be implemented as several distributed databases according to the preference of a practitioner of the invention.

Figure 6:
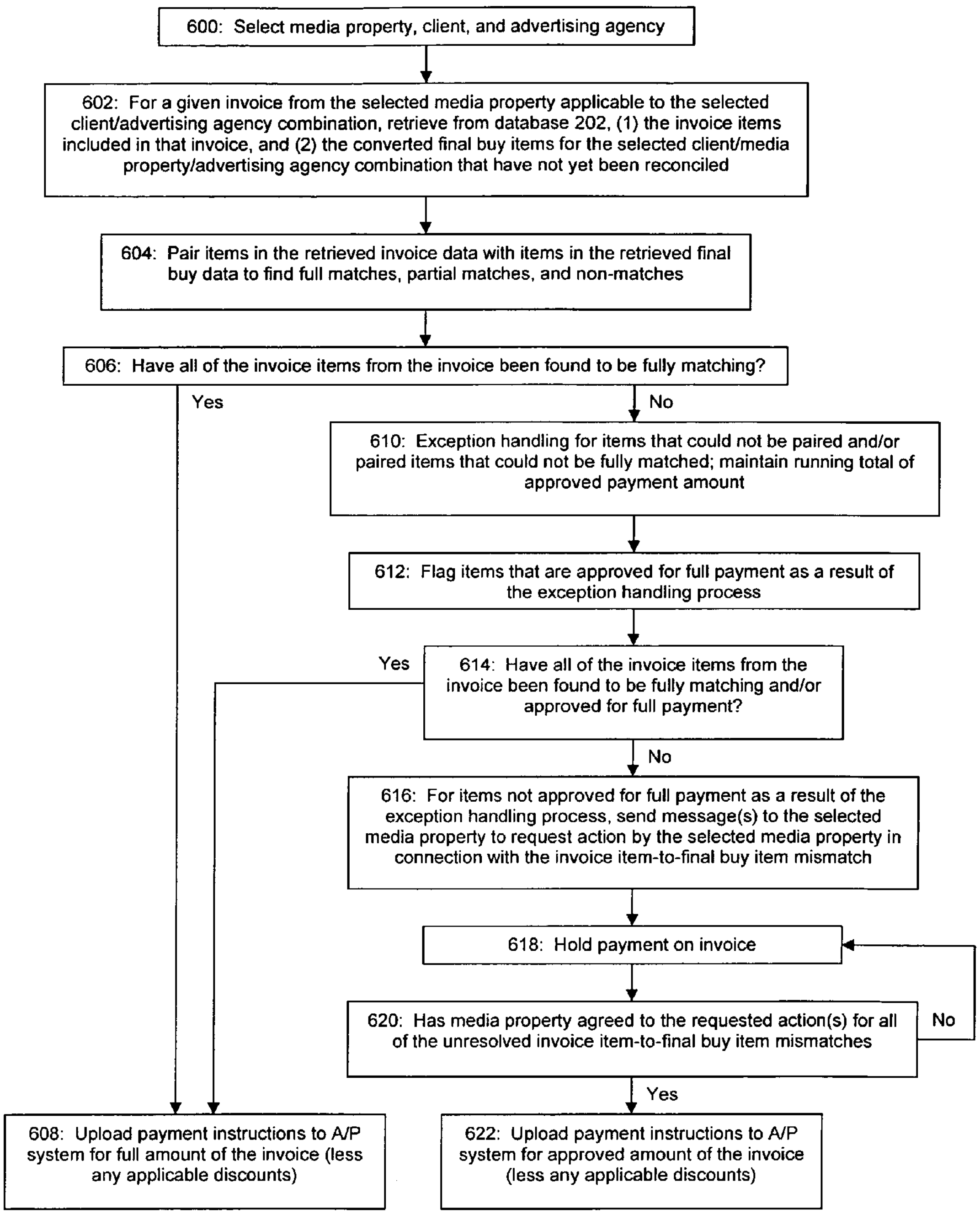
FIG. 6 is a flowchart illustrating a preferred process for reconciling the invoice data with the converted final buy data.

Reconciling Converted Invoice Data with Converted Final Buy Data:

From the data stored in database 202, media property invoices can be accurately and efficiently reconciled to determine appropriate payment amounts and identify invoice items that are in dispute. FIG. 6 illustrates a flowchart for a preferred reconciliation process that is executed by computer 200. It is worth noting that the computer 200 that performs the reconciliation process need not be the same computer that performed the conversion process of FIG. 3.

At step 600, the user selects the media property, client, and advertising agency that will be applicable to the reconciliation process. The user may also enter an invoice number or other criteria to identify the invoice against which the reconciliation process will run. These selections are preferably made by the user via one or more GUIs. If the user is the client, the client portion of this selection is preferably pre-set to only that client (to thereby avoid a client gaining access to the advertising data of another company). If the user is the advertising agency, (1) the advertising agency portion of this selection is preferably pre-set to only that advertising agency (to thereby avoid an advertising agency gaining access to the advertising data of another advertising agency), and (2) the client portion of this selection is configured to allow the advertising agency to select only clients that it represents (to thereby avoid an advertising agency gaining access to the advertising data of non-clients). Preferably, step 600 is initiated after receipt of a media property invoice, which are typically issued in accordance with the industry standard broadcast month.

Once the media property/client/advertising agency constraints have been selected, the process preferably retrieves from database 202 the pending extracted invoice items and pending converted final buy items that to which the media property/client/advertising agency constraints are applicable (step 602). An invoice item and final buy item can be said to be "pending" if not yet reconciled. Because the final buy data will be available well before the invoice data corresponding thereto is available, it can generally be expected that the appropriate final buy data will be available for retrieval from the database when a media property invoice is received.

Figure 7:
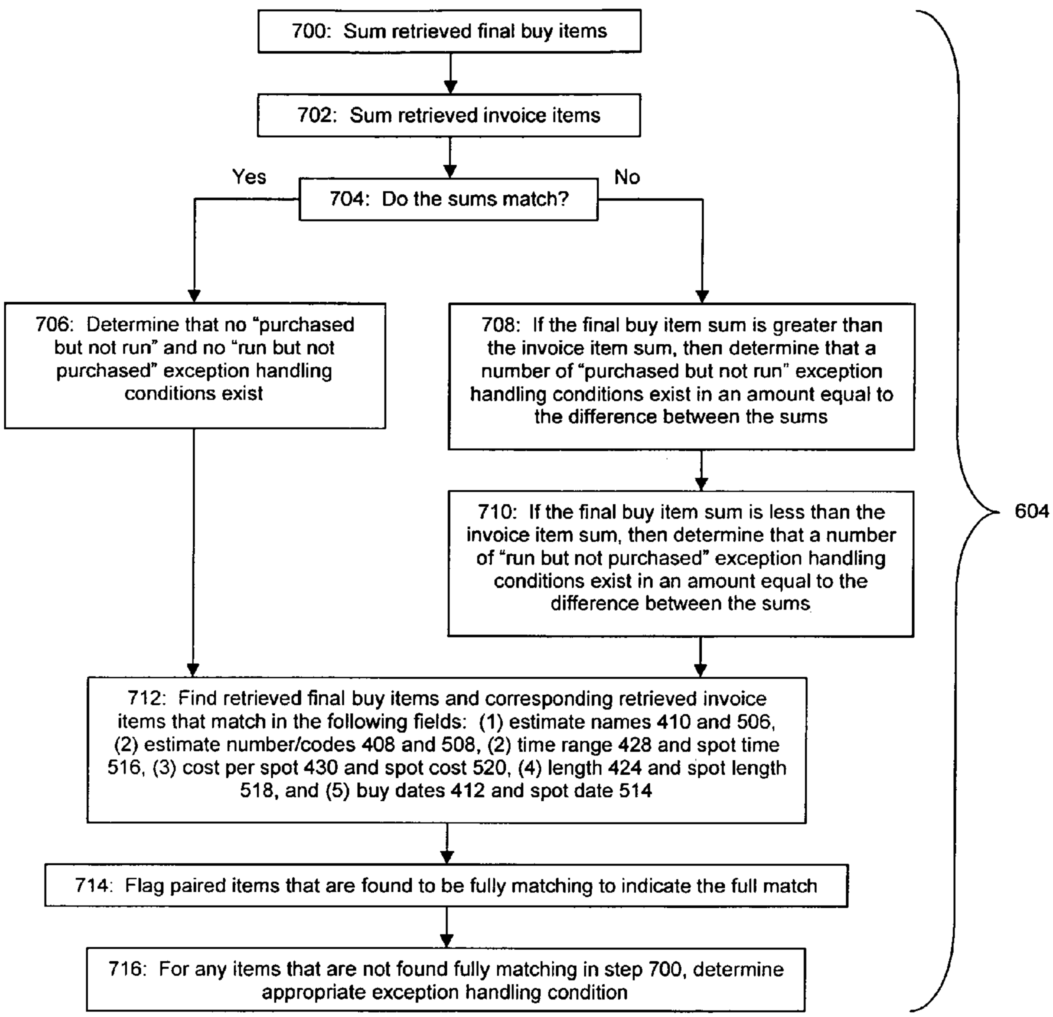
FIG. 7 is a flowchart detailing step 604 of FIG. 6.
Figure 8A:
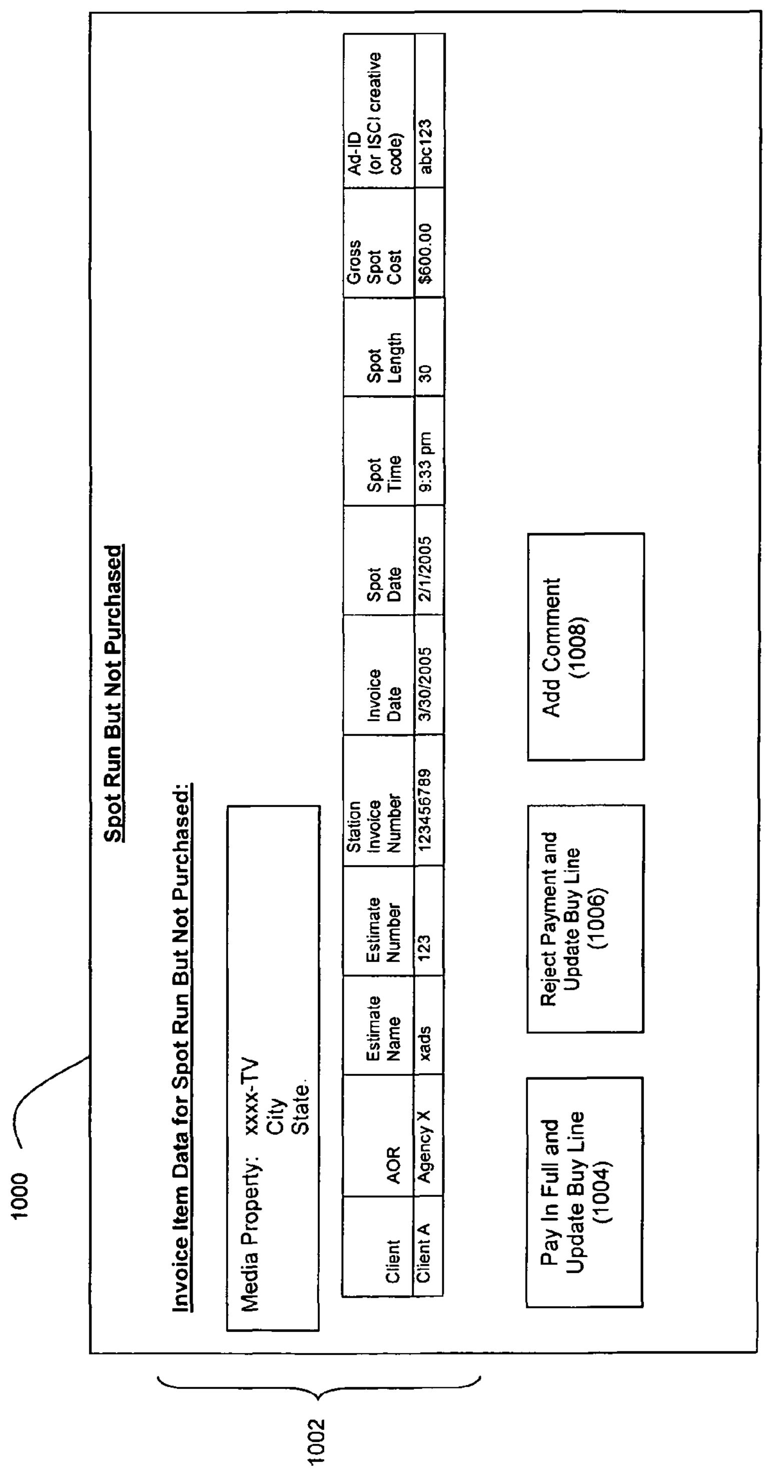
FIGS. 8(*a*)-(*f*) illustrate various preferred exception handling GUIs.
Figure 8B:
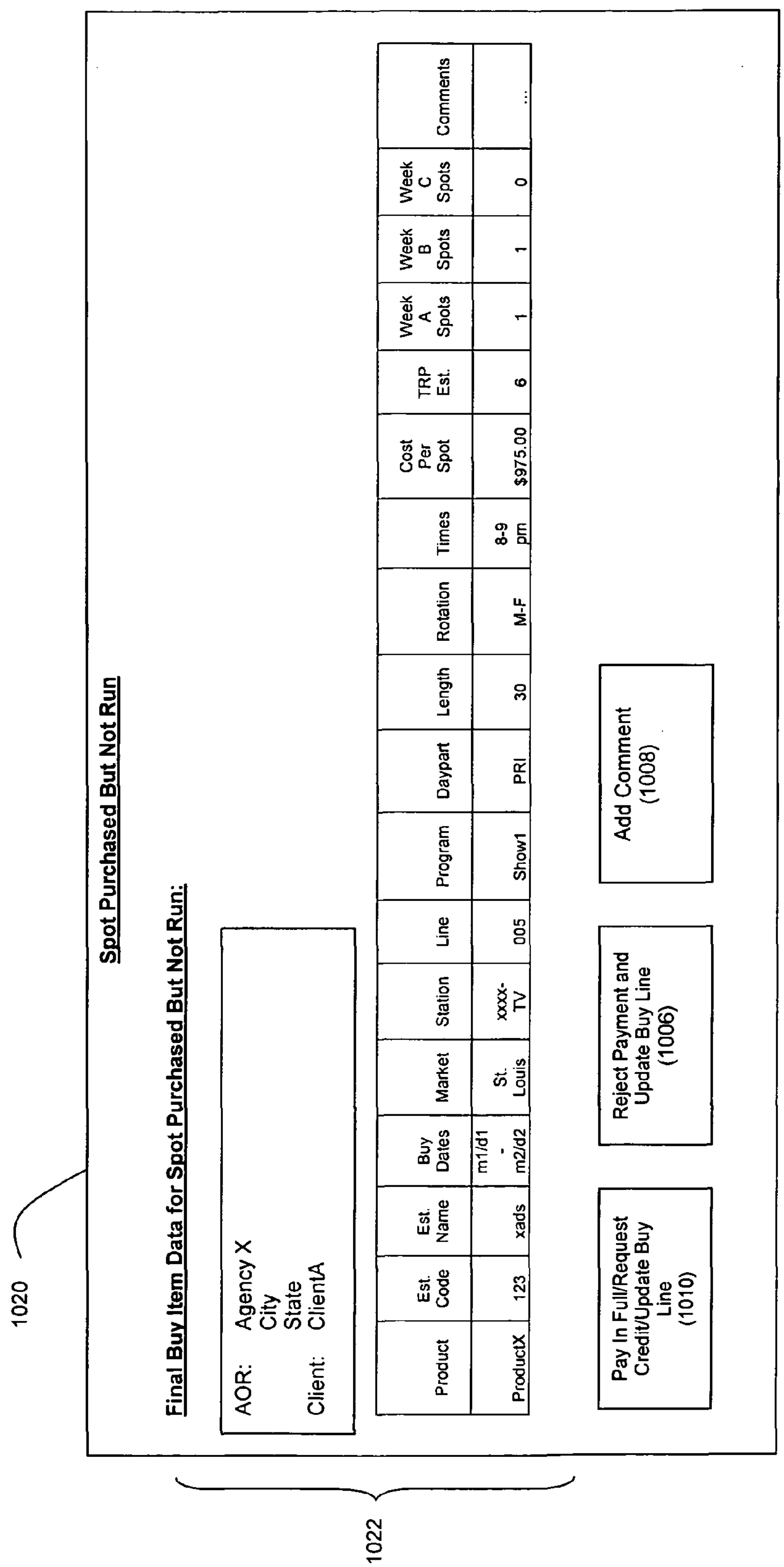
Figure 8C:
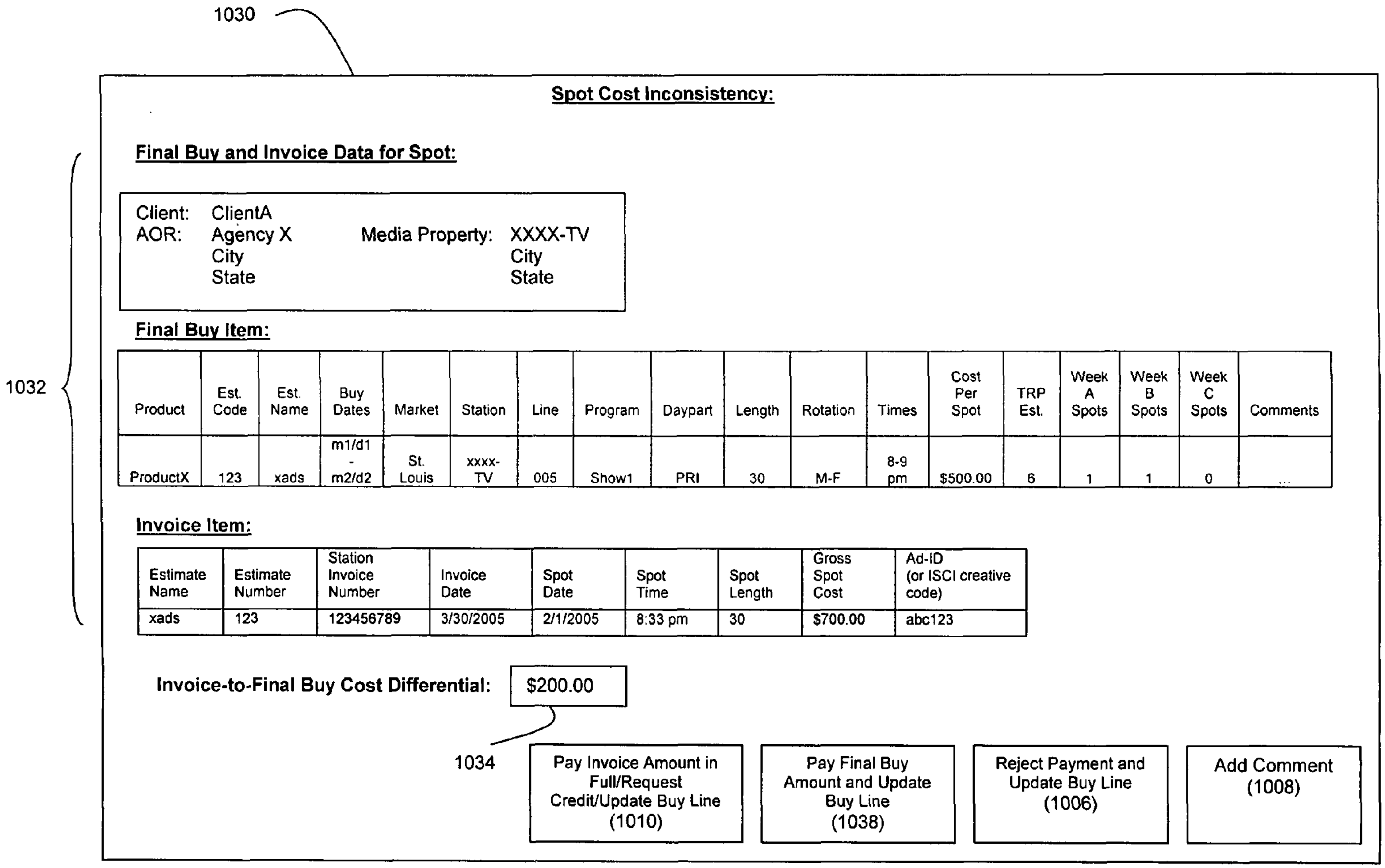
Figure 8E:
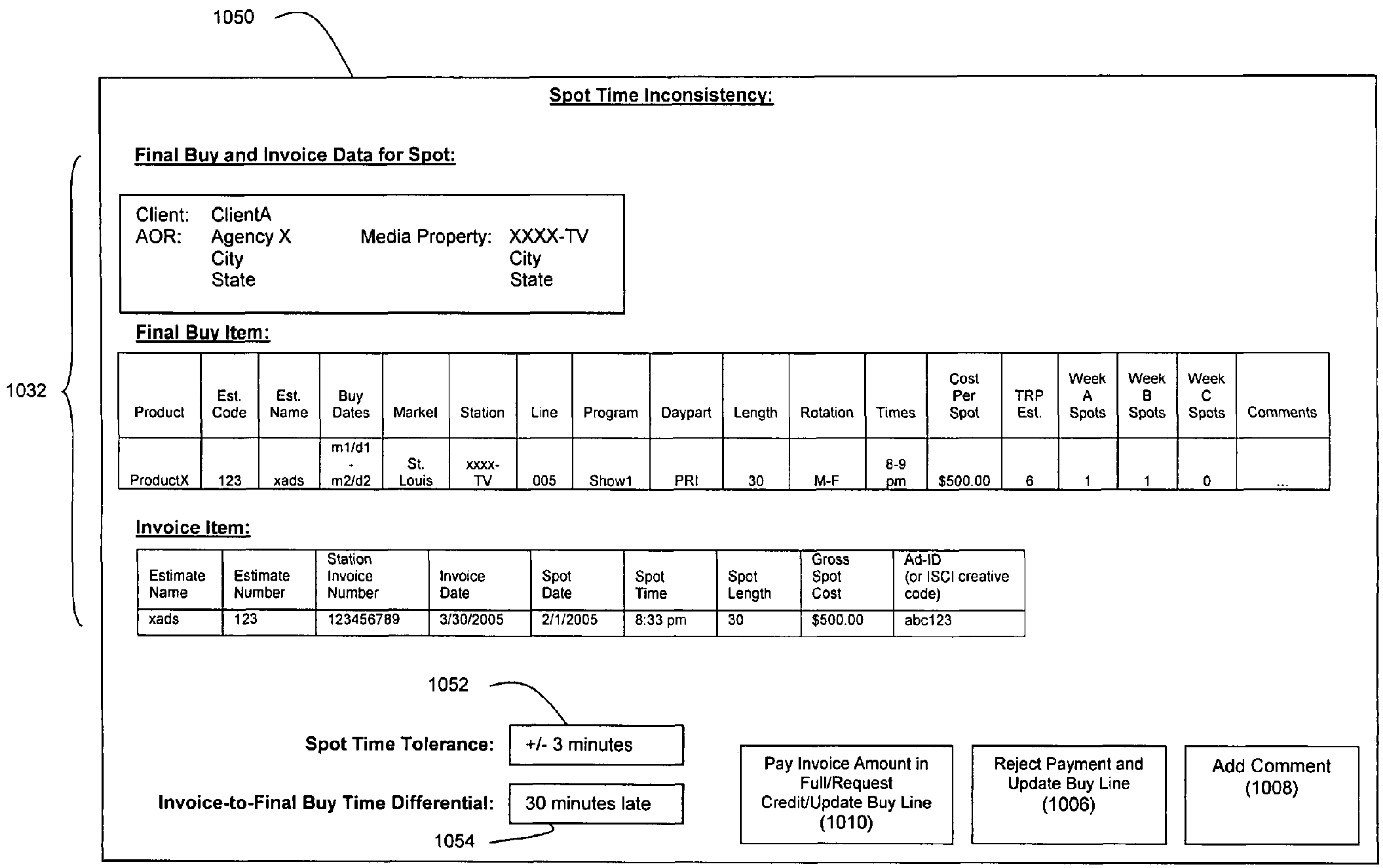

Next, at step 604, the process attempts to pair retrieved invoice items with retrieved final buy items to thereby identify (1) full matches between invoice items and final buy items, (2) partial matches between invoice items and final buy items, and (3) invoice items and/or final buy items that cannot be paired with a counterpart. FIG. 7 illustrates step 604 in greater detail. At step 700, the retrieved final buy items are summed. At step 702, the retrieved invoice items are summed. At step 704, these sums are compared. If the invoice items sum and final buy items sum do not match, then this indicates that either one or more extra invoice items are present or one or more extra final buy items are present (step 708). Too many invoice items indicates that one or more of the invoiced advertising spots were not purchased (a "run but not purchased" exception handling condition). Too many final buy items indicates that one or of the requested advertising spots was not run (a "purchased but not run" exception handling condition). The value of the difference between the sums represents the number of such exception handling conditions that exist (step 710). If the sums are equal, the system will determine that no "run but not purchased" or "purchased but not run" exception handling conditions exist (step 706). This does not necessarily indicate that what was purchased was run and what was run was purchased (as it may mean that an equal number of "run but not purchased" and "purchased but not run" inconsistencies exist), but the system will detect these anomalies as a mismatched pair rather than an unmatched item. It is worth noting that techniques other than steps 700-708 may be used in connection with step 604. For example, a variety of matching metrics can be used to assess the degree of a match between an invoice item and a final buy item, wherein extremely low levels of matching (or complete mismatching) can result in "run but not purchased" and/or "purchased but not run" exception handling conditions being found.

At step 712, the retrieved final buy items and the retrieved invoice items are processed to find invoice item-to-final buy item pairs that match in the following fields (1) estimate name fields 410 and 506, (2) estimate number/code fields 408 and 508, (3) times field 428 and spot time field 516, (4) length field 424 and spot length field 518, (5) cost per spot field 430 and gross spot cost field 520, and (6) buy dates field 412 and spot date 514. Invoice items that fully match final buy items in each of these fields are preferably identified as full matches, and the process flags those items accordingly (step 714). Fully matching items represent items that have been satisfactorily reconciled such that payment is approved therefor. A running total that represents the amount of money approved for payment on an invoice is preferably maintained as full matches are identified.

For invoice items and final buy items that do not fully match, step 716 operates to identify the appropriate exception handling conditions for the mismatches. To pair partially matching invoice items with final buy items, a variety of techniques can be used. Preferably, each invoice item is paired with the final buy item that it most closely matches. If one or more "purchased but not run" exception handling conditions are found to exist at step 710, the final buy item(s) with the least similarity to any of the invoice items can be designated with the "purchased but not run" exception handling condition. If one or more "run but not purchased" exception handling conditions are found to exist at step 710, the invoice item(s) with the least similarity to any of the final buy items can be designated with the "run but not purchased" exception handling condition. Additional examples of preferred exception handling conditions include (1) a spot cost inconsistency exception for pairs whose cost fields do not match, (2) a spot length inconsistency exception for pairs whose length fields do not match, (3) a spot time inconsistency exception for pairs whose time fields cannot be correlated, and (4) a spot date inconsistency exception for pairs whose date fields cannot be correlated. For pairs that mismatch in more than one field (e.g., a pair for which a spot cost inconsistency exception and a spot length inconsistency exception exists), more than one exception handling condition may apply. Furthermore, it should be understood that more or fewer exception handling conditions can be defined if desired by a practitioner of the present invention. For example, the Ad-ID/ISCI-related fields in the final buy and invoice data can also be reconciled to determine whether the appropriate advertisement was run, presuming appropriate final buy data is available to perform such reconciliation.

Preferably, steps 712-716 incorporate a tolerance (e.g., +/−2 minutes) into the time range for the final buy item when assessing whether the spot time for the invoice data matches what was requested. This tolerance may be defined by the user via a GUI. Through this tolerance, a time match can be found even if the media property ran the advertisement in question outside of the final buy's time range, so long as the advertisement still ran sufficiently close to the time range to fall within the tolerance. It is worth noting that this tolerance need not be user-specified; it can alternately be a predetermined built-in feature of the reconciliation system.

Returning to FIG. 6, at step 606, a determination is made as to whether all of the invoice items on the subject invoice have been found to be fully matching. If the answer is yes, then that invoice is approved for payment, and at step 608, the process operates to upload payment instructions to the accounts payable (NP) computer system 108 that enable the reconciled invoice to be paid. The amount of payment that is authorized via these instructions can include any discounts that have been negotiated with the media property for prompt payment of its invoices. For example, a media property may agree to provide some form of discount (e.g., 2%) on an invoice if payment is made on that invoice within a predetermined amount of time (e.g., 48 hours). These payments instructions will preferably interface with the NP software on computer system 108 to provide the NP software with an identifier for the applicable media property, an identifier for the applicable invoice, and the net amount of payment due on the invoice. These instructions may also include an identifier or other related data for an applicable campaign corresponding to the advertisements that are the subject of the invoice. The exact details of these instructions are expected to vary as a function of what NP software package is run by computer system 108. Examples of common NP software include the various NP software packages provided by companies such as Oracle/PeopleSoft, Microsoft, and SAP.

If step 606 results in a determination that less than all of the invoice items included in the subject invoice have been successfully reconciled, then the process preferably proceeds to step 610, where exception handling for the mismatched and unmatched items identified by step 716 occurs. FIGS. 8(*a*)-(*f*) depict exemplary GUIs through which users can handle the exceptions.

FIG. 8(*a*) depicts a preferred GUI 1000 for handling a "spot run but not purchased" exception which occurs when an invoice item cannot be paired with a final buy item. GUI 1000 preferably includes a display section 1002 that identifies the invoice item data for such a spot. This data preferably includes an identification of the media property, client, and advertising agency to which the invoice item is applicable. Further, this data preferably includes an identification of the estimate name, estimate number, invoice number, invoice date, spot date, spot time, spot length, spot cost, and ad-Id/ISCI/creative code. From this data and from any other guidelines that may be in place for processing such exceptions (e.g., instructions from a client such as agency buying guidelines as to how to handle such an exception), the user can choose to undertake any of a plurality of options. A first option is to pay the invoice item in full and update the buy line accordingly via button 1004. Upon selection of button 1004, that final buy item-invoice item pair is marked as reconciled and the running total that represents the amount to be paid to the media property is preferably increased by the spot cost amount that is displayed in section 1002. Also, updating the buy line following selection of button 1004 preferably results in the invoiced spot being added to the agency's buy line and a billing update being sent to the client. Another option is to reject payment on the invoice and update the buy line accordingly via button 1006. In this instance, updating the buy line preferably results in the spot being subtracted from the invoice and a billing update message being sent to the media property to inform the media property of the discrepancy. This message can be communicated to the media property in a variety of ways. For example, an email could be sent to the media property. Preferably, in an embodiment wherein the users access computer 200 of system 110 via a network such as the Internet, a message for a media property is placed in a mailbox associated with that media property, the messages in this mailbox being accessible via one or more GUIs as described in connection with FIGS. 10(*a*) and (*b*). Until the media property approves the rejection, payment on all or a portion of the subject invoice (identified by the invoice number field displayed in FIG. 8(*a*) will preferably be put on hold. A final option is to add a comment that is to be associated with the invoice item via button 1008.

FIG. 8(*b*) depicts a preferred GUI 1020 for handling a "spot purchased but not run" exception which occurs when a final buy item cannot be paired with an invoice item. GUI 1020 preferably includes a display section 1022 that identifies the final buy item data for such a spot. The final buy data fields that are displayed are preferably the same as those shown in FIG. 4. This data preferably also includes an identification of the media property, client, and advertising agency to which the invoice item is applicable. From this data and from any other guidelines that may be in place for processing such exceptions (e.g., instructions from a client as to how to handle such an exception), the user can choose to undertake any of a plurality of options. A first option is to pay the invoice amount in full, request a credit for the spot cost, and update the buy line accordingly, via button 1010. Upon selection of button 1010, (1) the running total that represents the amount to be paid to the media property is preferably increased by the invoice item's spot cost amount that is displayed in section 1032, and (2) a credit from the media property in the amount of that spot cost is requested. To communicate this credit request, a corresponding message is preferably electronically sent to the media property. Preferably, until the media property approves the credit request, payment on all or a portion of the subject invoice is put on hold.

If desired by a practitioner of the present invention, separate commands can be entered by the user to approve invoice payment and thereafter request a credit, for example by the inclusion of a separate "request credit" button on the GUI or by the inclusion of a second GUI through which the user can request a credit. Also, updating the buy line following selection of button 1010 preferably results in the invoiced spot being added to the agency's buy line and a billing update being sent to the client. Additional options that the user can choose are preferably those set forth in connection with buttons 1006 and 1008 described above.

FIG. 8(*c*) depicts a preferred GUI 1030 for handling a "spot cost inconsistency" exception which occurs when a final buy item's "cost per spot" data does not match the "spot cost" data in its counterpart invoice item. GUI 1030 preferably includes a display section 1032 that identifies the media property, client, and advertising agency to which the spot cost inconsistency is applicable. Section 1032 preferably also lists the pertinent data fields for the applicable final buy item and applicable invoice item (preferably the fields shown in FIGS. 4 and 5). Display section 1034 preferably identifies the difference in cost between the final buy item's "cost per spot" field and the invoice item's "spot cost" field. If the invoice item's cost is greater than the final buy item's cost, then this difference in section 1034 is preferably a positive number. If the final buy item's cost is greater than the invoice item's cost, then this difference in section 1034 is preferably a negative number. In situations where the invoice item cost is greater than the final buy item cost (or vice versa), from the data in sections 1032 and 1034 and from any other guidelines that may be in place for processing such exceptions (e.g., instructions from a client as to how to handle such an exception), the user can choose to undertake any of a plurality of options. A first option is to pay the invoice amount in full, request a credit for the difference in section 1034, and update the buy line accordingly, via button 1010. A second option is to pay the final buy amount and update the buy line accordingly, via button 1038. With this option, a message is preferably electronically sent to the media property requesting that the invoiced amount for the item be adjusted to the final buy amount. Until the media property consents to the requested change, payment on all or a portion of the subject invoice is preferably put on hold. Yet other options include rejecting payment via button 1006 and adding a comment via button 1008, as set forth in connection with FIGS. 8(*a*) and (*b*).

FIG. 8(*d*) depicts a preferred GUI 1040 for handling a "spot length inconsistency" exception which occurs when a final buy item's "length" data does not match the "spot length" data in its counterpart invoice item. GUI 1040 preferably includes a display section 1032 that identifies the media property, client, and advertising agency to which the spot length inconsistency is applicable. Section 1032 preferably also lists the pertinent data fields for the applicable final buy item and applicable invoice item (preferably the fields shown in FIGS. 4 and 5). Display section 1042 preferably identifies the difference in cost between the final buy item's "length" field and the invoice item's "spot length" field. If the invoice item's length is less than the final buy item's length, then this difference in section 1042 is preferably a negative number. If the final buy item's length is less than the invoice item's length, then this difference in section 1042 is preferably a positive number. In situations where the final buy item length is greater than the invoice item length (or vice versa), from the data in sections 1032 and 1042 and from any other guidelines that may be in place for processing such exceptions (e.g., instructions from a client as to how to handle such an exception), the user can choose to undertake any of a plurality of options, which preferably include the options set forth above in connection with buttons 1010, 1006, and 1008.

FIG. 8(*e*) depicts a preferred GUI 1050 for handling a "spot time inconsistency" exception which occurs when the invoice item's "spot time" data does not fall within the range of its counterpart final buy item's "times" data range (including any tolerance that may be built into this range as previously explained). GUI 1050 preferably includes a display section 1032 that identifies the media property, client, and advertising agency to which the spot time inconsistency is applicable. Section 1032 preferably also lists the pertinent data fields for the applicable final buy item and applicable invoice item (preferably the fields shown in FIGS. 4 and 5). Display section 1052 preferably identifies the tolerance (if any) that is built into the final buy item's time range, and section 1054 preferably identifies the time differential between the invoice item and the final buy item (taking into consideration the tolerance 1052). From this data and from any other guidelines that may be in place for processing such exceptions (e.g., instructions from a client as to how to handle such an exception), the user can choose to undertake any of a plurality of options, which preferably include the options set forth above in connection with buttons 1010, 1006, and 1008.

FIG. 8(*f*) depicts a preferred GUI 1060 for handling a "spot date inconsistency" exception which occurs when the invoice item's "spot date" data does not fall within the range of its counterpart final buy item's "buy dates" data range. GUI 1060 preferably includes a display section 1032 that identifies the media property, client, and advertising agency to which the spot time inconsistency is applicable. Section 1032 preferably also lists the pertinent data fields for the applicable final buy item and applicable invoice item (preferably the fields shown in FIGS. 4 and 5). Display section 1062 preferably identifies the date differential between the invoice item and the final buy item. From this data and from any other guidelines that may be in place for processing such exceptions (e.g., instructions from a client as to how to handle such an exception), the user can choose to undertake any of a plurality of options, which preferably include the options set forth above in connection with buttons 1010, 1006, and 1008.

It is worth noting that the GUIs of FIGS. 8(*a*)-(*f*) need not list only a single exception. A practitioner of the present invention can also design one or more of these GUIs such that a plurality of the applicable exception items for the selected media property/client/advertising agency conditions are listed. It is also worth noting that the GUIs of FIGS. 8(*a*)-(*f*) may also include a user action button that is effective to allow the user to pay a user-specified amount for a spot that triggered an exception handling condition, thereby allowing for partial payments of disputed invoice items. In such a case, a field on the GUI or an additional GUI could be used through which the user could enter this partial payment amount. Upon entry of such a partial payment amount, the running total that represents the amount to be paid to the media property can preferably be increased by the partial payment amount that was entered by the user.

Returning to FIG. 6, at step 612, any items that were approved for full payment during the exception handling process and that do not require further action from the media property (such as to approve a credit request) are flagged as approved for full payment. At step 614, a determination is made as to whether all of the items listed in the subject invoice have been appropriately reconciled with final buy items (either exactly matched or approved for payment as a result of the exception handling process). If the answer to that question is yes, the process preferably proceeds to step 608. If the answer to that question is no, then at step 616, one or more messages are preferably electronically communicated to the media property to request action from the media property on the disputed invoice items, and payment on the subject invoice is placed on hold (step 618).

As a result of step 616, the media property can expect to receive one or more messages requesting action on a disputed invoice item. FIG. 9 depicts an exemplary GUI 900 that could be presented on the computer screen of a media property employee that lists received messages about disputed invoice items. Section 902 of GUI 900 serves as an inbox for such received messages. By way of example, each received message can be identified in a row 904 of section 902 by the date/time of receipt, the name of the applicable advertising agency for the disputed advertisement spot, the name of the applicable advertiser for the disputed advertisement spot, the invoice number for the disputed advertisement spot, the invoice date for the disputed advertisement spot, and a message code or short text section that briefly summarizes the nature of the dispute. To review a message that is listed in section 902, the user can select the review button 906 corresponding to that message.

Upon selection of a review button 906, a GUI such as the ones shown in FIGS. 10(*a*) and 10(*b*) will be displayed. FIG. 10(*a*) depicts a GUI 1000 that would be displayed after the user has selected a message relating to a credit request arising from an invoice item that is disputed due to a spot cost inconsistency. GUI 1000 preferably includes a section 1002 that identifies the applicable advertising agency and advertiser as well as the pertinent final buy and invoice data in dispute. Section 1004 preferably displays the cost differential between the final buy and the invoice and section 1006 preferably displays the requested credit amount. The user can then approve the requested credit via selection of button 1010 or reject the requested credit via selection of button 1012. If the user approves of the requested credit, then that final buy item-invoice item pair will be deemed reconciled. If not, alternative means will preferably be employed to resolve the dispute (such as telephone calls, etc.) as payment the subject invoice will remain on hold.

FIG. 10(*b*) depicts a GUI 1020 that would be displayed after the user has selected a message relating to a invoice item for which payment has been rejected due to a spot time inconsistency. GUI 1020 preferably includes a section 1002 that identifies the applicable advertising agency and advertiser as well as the pertinent final buy and invoice data in dispute. Section 1022 preferably displays the allowed tolerance between the final buy's time range and the spot time identified on the invoice. Section 1024 preferably displays the how far outside this tolerance the actual spot time on the invoice fell. The user can then approve the requested invoice item rejection via selection of button 1026 or refuse the invoice rejection via selection of button 1028. If the user approves of the rejection, then that final buy item-invoice item pair will be deemed reconciled. If not, alternative means will preferably be employed to resolve the dispute (such as telephone calls, etc.) as payment on the subject invoice will remain on hold.

Returning to FIG. 6, at step 620, the process will check to see if the media property has agreed to all of the user actions requested as a result of the exception handling process for the subject invoice. Essentially, this step operates to determine whether all of the invoice items for the subject invoice have been appropriately reconciled. If the answer is no, then payment on the subject invoice will remain on hold (step 618). If the answer is yes, then at step 622, instructions for payment of the subject invoice for the approved amount are communicated to the NP system 108, less any applicable discounts for prompt payment. As with step 608, these payments instructions will preferably interface with the NP software on computer system 108 to effectuate payment from the account on the approved adjusted invoice.

Therefore, using the preferred embodiment, invoices from media properties for advertising services can be quickly and accurately reconciled. Furthermore, the account receivable time for such invoices can be drastically reduced because payment on such invoices can be delivered to media properties in near real-time after successful reconciliation, thereby benefiting media properties by providing media properties with money owed to them sooner rather than later.

While the present invention has been described above in relation to its preferred embodiment, various modifications may be made thereto that still fall within the invention's scope, as would be recognized by those of ordinary skill in the art. For example, while the preferred embodiment described in connection with FIG. 6 operates where payment is made on a monthly invoice-by-invoice basis, it should be noted that the system can also be configured to pay media properties on an invoice item by invoice item basis (wherein payment of a invoice that lists 100 spots would not be held up due to a dispute over 2 or 3 spots). With such an invoice item, as each invoice item is reconciled with a final buy item, payment can be authorized and remitted for the cost of that invoice item (less any applicable discounts). Further still, it is worth noting that the invoices need not be monthly; other invoicing intervals could be used such as weekly, daily, bimonthly, etc. Such modifications to the invention will be recognizable upon review of the teachings herein. As such, the full scope of the present invention is to be defined solely by the appended claims and their legal equivalents.

What is claimed is:

1. A computer-implemented method of reconciling media property invoice data for advertising services with advertising agency final buy data, the media property invoice data comprising a plurality of invoice items, each invoice item corresponding to an advertisement spot for which the media property requests payment, the method comprising:

receiving the invoice data, the invoice data comprising a plurality of data fields representative of a plurality of advertisement spots for which the media property requests payment;

receiving final buy data in a plurality of different formats from a plurality of advertising agencies, the received final buy data comprising a plurality of final buy items, each final buy item corresponding to an advertisement spot request that was placed by an advertising agency with the media property;

generating commonly formatted data by converting the received final buy data to a common format, the commonly formatted data comprising a plurality of data fields representative of the plurality of final buy items;

comparing the invoice data with the commonly formatted data representative of the final buy items;

generating data indicative of an extent to which a plurality of the fields of the invoice data match up with a plurality of the fields of the commonly formatted data based on the comparing step; and generating report data based on the generated data resulting from the comparing step, the generated report data being indicative of an extent to which the invoiced advertisement spots correspond to the advertisement spot requests that were placed by the advertising agencies with the media property; and wherein the method steps are performed by a processor.

2. The method of claim 1 further comprising:

receiving the media property invoice data in a second format, wherein the common format is the second format; and storing the received invoice data and the converted final buy data in a database for subsequent processing during the comparing step.

3. A nontransitory computer-readable storage medium for reconciling media property invoice data for advertising services with advertising agency final buy data, the media property invoice data comprising a plurality of invoice items, each invoice item corresponding to an advertisement spot for which the media property requests payment, the nontransitory computer-readable storage medium comprising:

encoded executable program code resident on the nontransitory computer-readable storage medium, the executable program code comprising a plurality of code segments executable by a processor, the code segments configured to:

receive the invoice data, the invoice data comprising a plurality of data fields representative of a plurality of advertisement spots for which the media property requests payment;

receive final buy data in a plurality of different formats from a plurality of advertising agencies, the received final buy data comprising a plurality of final buy items, each final buy item corresponding to an advertisement spot request that was placed by the advertising agency with the media property;

generate commonly formatted data by converting the received final buy data to a common format, the commonly formatted data comprising a plurality of data fields representative of the plurality of final buy items;

compare the invoice data with the commonly formatted data representative of the final buy items;

generate data indicative of an extent to which a plurality of the fields of the invoice data match up with a plurality of the fields of the commonly formatted data based on the comparison; and generate report data based on the generated data resulting from the comparison, the generated report data being indicative of an extent to which the invoiced advertisement spots correspond to the advertisement spot requests that were placed by the advertising agencies with the media property.

4. A system for reconciling media property invoice data for advertising services with advertising agency final buy data, the media property invoice data comprising a plurality of invoice items, each invoice item corresponding to an advertisement spot for which the media property requests payment, the system comprising:

a processor; and a memory; and wherein the processor and memory are configured to:

receive the invoice data, the invoice data comprising a plurality of data fields representative of a plurality of advertisement spots for which the media property requests payment;

receive final buy data in a plurality of different formats from a plurality of advertising agencies, the final buy data comprising a plurality of final buy items, each final buy item corresponding to an advertisement spot request that was placed by the advertising agency with the media property;

generate commonly formatted data by converting the received final buy data to a common format, the commonly formatted data comprising a plurality of data fields representative of the final buy items;

compare the invoice data with the commonly formatted data representative of the final buy items;

generate data indicative of an extent to which a plurality of the fields of the invoice data match up with a plurality of the fields of the commonly formatted data based on the comparison operation; and generate report data based on the generated data resulting from the comparison operation, the generated report data being indicative of an extent to which the invoiced advertisement spots correspond to the advertisement spot requests that were placed by the advertising agencies with the media property.

5. The method of claim 1 wherein each of at least a plurality of the final buy items present in the received final buy data comprises a data field pertaining to an aspect of the final buy item and populated with coded data, the final buy data received from at least two of the advertising agencies having coded data for the data field that are coded in different formats, the method further comprising:

the processor performing the converting step by converting the coded data for each of the received final buy items to coded data of a standardized coding format.

6. The method of claim 5 further comprising:

the processor storing a data table in a memory, the data table defining a mapping between coded data present in the data field of the received final buy items and the coded data of the standardized coding format; and wherein the converting step comprises the processor converting the coded data for each of the received final buy items to the coded data of the standardized coding format based on the data table.

7. The method of claim 6 wherein the data table comprises a plurality of mapping records, each mapping record comprising a plurality of data table fields, the data table fields comprising:

a first field for data representative of an identifier for a software package used by an advertising agency to generate final buy data;

a second field for data representative of a data value for the coded data in the data field of the received final buy items; and a third field for data representative of a data value for the coded data of the standardized coding format corresponding to the data value for the coded data in the data field of the received final buy items for that mapping record; and wherein the converting step further comprises the processor, for each of a plurality of final buy items in the received final data;

determining a software package used by the advertising agency to generate the data for that final buy item;

searching the data table;

determining whether a mapping record therein corresponding to the determined software package and the coded data in the data field for that final buy item is present in the data table based on the searching step; and based at least in part on a determination that such a mapping record is present in the data table, replacing the coded data in the data field for that final buy item with the data value from the third field of that mapping record.

8. The method of claim 7 wherein the converting step further comprises:

the processor, based at least in part on a determination that a mapping record corresponding to the determined software package and the coded data in the data field for that final buy item is not present in the data table;

providing a user interface for display to a user;

receiving user input through the user interface corresponding to the data value to be used as the coded data of the standardized format for that final buy item;

replacing the coded data in the data field for that final buy item with the data value of the received user input; and updating the data table with a new mapping record that associates the determined software package for that final buy item with the coded data in the data field for that final buy item and the data value of the received user input.

9. The method of claim 5 wherein the data field comprises a daypart code field.

10. The method of claim 5 further comprising:

the processor receiving raw invoice data in a plurality of different formats from a plurality of media properties; and the processor generating commonly formatted data representative of the invoice items by converting raw invoice data to the common format; and wherein the comparing step comprises comparing the commonly formatted data representative of the invoice items with the commonly formatted data representative of the final buy items.

11. The method of claim 10 further comprising:

the processor generating a database by storing the commonly formatted data representative of the invoice items and the commonly formatted data representative of the final buy items in a memory, the generated database comprising invoice item records and final buy item records corresponding to invoiced advertisement spots and advertisement spot requests that were placed by the advertising agencies with the media properties, the invoice item records and the final buy item records comprising a plurality of data fields populated with data that is coded in a standardized coding format; and the processor performing the comparing step on the invoice item records and the final buy item records in the database by executing programming logic in response to user input.

12. The method of claim 11 further comprising:

the processor receiving data describing an advertising plan for a company;

the processor storing the received advertising plan data in the database;

the processor comparing the invoice item records in the database with the advertising plan data in the database; and the processor generating data for the report indicative of an extent to which the invoiced advertisement spots satisfy the advertising plan data based on the step of comparing the invoice item records in the database with the advertising plan data in the database.

13. The method of claim 12 wherein the advertising plan data comprises data representative of a target amount of exposure for an advertising campaign by the company, the method further comprising:

the processor associating the invoice item records with ratings data for the invoiced advertisement spots;

the processor comparing the ratings data associated with the invoice item records with the advertising plan data; and the processor generating data for the report indicative of an extent to which the invoiced advertisement spots for the company satisfied the target amount of exposure for the advertising campaign defined in the advertising plan data based on the step of comparing the ratings data associated with the invoice item records with the advertising plan data.

14. The method of claim 13 further comprising:

the processor comparing the final buy item records in the database with the advertising plan data in the database; and the processor generating data for the report indicative of an extent to which the advertisement spot requests that were placed by the advertising agency with the media properties satisfy the advertising plan data based on the step of comparing the final buy item records in the database with the advertising plan data in the database.

15. The nontransitory computer-readable storage medium of claim 3 wherein each of at least a plurality of the final buy items present in the received final buy data comprises a data field pertaining to an aspect of the final buy item and populated with coded data, the final buy data received from at least two of the advertising agencies having coded data for the data field that are coded in different formats, and wherein the code segments are further configured to perform the conversion operation by converting the coded data for each of the received final buy items to coded data of a standardized coding format.

16. The system of claim 4 wherein each of at least a plurality of the final buy items present in the received final buy data comprises a data field pertaining to an aspect of the final buy item and populated with coded data, the final buy data received from at least two of the advertising agencies having coded data for the data field that are coded in different formats, and wherein the processor and memory are further configured to perform the conversion operation by converting the coded data for each of the received final buy items to coded data of a standardized coding format.

17. The system of claim 16 wherein the processor and memory are further configured to (1) store a data table in the memory, the data table defining a mapping between coded data present in the data field of the received final buy items and the coded data of the standardized coding format, and perform the conversion operation by converting the coded data for each of the received final buy items to the coded data of the standardized coding format based on the data table.

18. The system of claim 17 wherein the data table comprises a plurality of mapping records, each mapping record comprising a plurality of data table fields, the data table fields comprising:

a first field for data representative of an identifier for a software package used by an advertising agency to generate final buy data;

a second field for data representative of a data value for the coded data in the data field of the received final buy items; and a third field for data representative of a data value for the coded data of the standardized coding format corresponding to the data value for the coded data in the data field of the received final buy items for that mapping record; and wherein the processor and memory are further configured to perform the conversion operation by, for each of a plurality of final buy items in the received final data;

determining a software package used by the advertising agency to generate the data for that final buy item;

searching the data table;

determining whether a mapping record corresponding to the determined software package and the coded data in the data field for that final buy item is present in the data table based on the search operation;

based at least in part on a determination that such a mapping record is present in the data table, replacing the coded data in the data field for that final buy item with the data value from the third field of that mapping record.

19. The system of claim 18 wherein the processor and memory are further configured to perform the conversion operation by, based at least in part on a determination that a mapping record corresponding to the determined software package and the coded data in the data field for that final buy item is not present in the data table;

providing a user interface for display to a user;

receiving user input through the user interface corresponding to the data value to be used as the coded data of the standardized format for that final buy item;

replacing the coded data in the data field for that final buy item with the data value of the received user input; and updating the data table with a new mapping record that associates the determined software package for that final buy item with the coded data in the data field for that final buy item and the data value of the received user input.

20. The system of claim 18 wherein the data field comprises a daypart code field.

21. The system of claim 17 wherein the data field comprises a daypart code field.

22. The system of claim 16 wherein the data field comprises a daypart code field.

23. The system of claim 16 wherein each of at least a plurality of the final buy items present in the received final buy data comprises a plurality of data fields pertaining to a plurality of aspects of the final buy item and populated with coded data, and wherein the processor and memory are further configured to perform the conversion operation for a plurality of the data fields.

24. The system of claim 16 wherein the processor and memory are further configured to perform the comparison operation by executing programming logic to compare the invoice data with the commonly formatted data representative of the final buy items received from a first advertising agency as is executed to compare the invoice data with the commonly formatted data representative of the final buy items received from a second advertising agency.

25. The system of claim 16 wherein the processor and memory are further configured to:

receive raw invoice data in a plurality of different formats from a plurality of media properties; and generate commonly formatted data representative of the invoice items by converting the raw invoice data to the common format.

26. The system of claim 25 wherein the processor and memory are further configured to:

generate a database by storing the commonly formatted data representative of the invoice items and the commonly formatted data representative of the final buy items in a memory, the generated database comprising invoice item records and final buy item records corresponding to invoiced advertisement spots and advertisement spot requests that were placed by the advertising agencies with the media properties, the invoice item records and the final buy item records comprising a plurality of data fields populated with data that is coded in a standardized coding format; and perform the comparison operation on the invoice item records and the final buy item records in the database by executing programming logic in response to user input.

27. The system of claim 26 wherein the processor and memory are further configured to:

receive data describing an advertising plan for a company;

store the received advertising plan data in the database;

compare the invoice item records in the database with the advertising plan data in the database; and generate data for the report indicative of an extent to which the invoiced advertisement spots satisfy the advertising plan data based on the comparison of the invoice item records in the database with the advertising plan data in the database.

28. The system of claim 27 wherein the advertising plan data comprises data representative of a target amount of exposure for an advertising campaign by the company, and wherein the processor and memory are further configured to:

associate the invoice item records with ratings data for the invoiced advertisement spots;

compare the ratings data associated with the invoice item records with the advertising plan data; and generate data for the report indicative of an extent to which the invoiced advertisement spots for the company satisfied the target amount of exposure for the advertising campaign defined in the advertising plan data based on the comparison of the ratings data associated with the invoice item records with the advertising plan data.

29. The system of claim 28 wherein the processor and memory are further configured to compare the final buy item records in the database with the advertising plan data in the database to thereby generate data for the report indicative of an extent to which the advertisement spot requests that were placed by the advertising agency with the media properties satisfy the advertising plan data.

30. The system of claim 4 wherein the common format is one of the formats for the received final buy data.

* * * * *